(12) United States Patent
Kubler et al.

(10) Patent No.: US 8,194,595 B2
(45) Date of Patent: *Jun. 5, 2012

(54) HIERARCHICAL DATA COLLECTION NETWORK SUPPORTING PACKETIZED VOICE COMMUNICATIONS AMONG WIRELESS TERMINALS AND TELEPHONES

(75) Inventors: Joseph J. Kubler, Boulder, CO (US); Michael D. Morris, Cedar Rapids, IA (US)

(73) Assignee: Broadcom Corporation, Irvine, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 12/547,348

(22) Filed: Aug. 25, 2009

(65) Prior Publication Data

US 2010/0080182 A1    Apr. 1, 2010

Related U.S. Application Data

(63) Continuation of application No. 10/760,167, filed on Jan. 16, 2004, now Pat. No. 7,580,384, which is a continuation of application No. 10/141,506, filed on May 8, 2002, now Pat. No. 6,850,510, which is a continuation of application No. 09/037,535, filed on Mar. 10, 1998, now Pat. No. 6,389,010, which is a continuation of application No. 08/539,817, filed on Oct. 5, 1995, now Pat. No. 5,726,984.

(51) Int. Cl.
    *H04W 4/00* (2009.01)
(52) U.S. Cl. .................. 370/328; 370/493; 370/466
(58) Field of Classification Search .................. None
    See application file for complete search history.

(56) References Cited

U.S. PATENT DOCUMENTS 3,786,195 A    1/1974  Schiffman
4,317,195 A    2/1982  Barberis et al.
(Continued)

FOREIGN PATENT DOCUMENTS

WO    PCT/WO91/08629        6/1991
(Continued)

OTHER PUBLICATIONS

U.S. Appl. No. 08/493,480, filed Jun. 1995, Angle.
(Continued)

*Primary Examiner* — Bob Phunkulh
(74) *Attorney, Agent, or Firm* — Brinks Hofer Gilson & Lione

(57) ABSTRACT

A packet-based, hierarchical communication system, arranged in a spanning tree configuration, is described in which wired and wireless communication networks exhibiting substantially different characteristics are employed in an overall scheme to link portable or mobile computing devices. The network accommodates real time voice transmission both through dedicated, scheduled bandwidth and through a packet-based routing within the confines and constraints of a data network. Conversion and call processing circuitry is also disclosed which enables access devices and personal computers to adapt voice information between analog voice stream and digital voice packet formats as proves necessary. Routing pathways include wireless spanning tree networks, wide area networks, telephone switching networks, internet, etc., in a manner virtually transparent to the user. A voice session and associate call setup simulates that of conventional telephone switching network, providing well-understood functionality common to any mobile, remote or stationary terminal, phone, computer, etc.

15 Claims, 80 Drawing Sheets

U.S. PATENT DOCUMENTS

| | | |
|---|---|---|
| 4,320,500 A | 3/1982 | Barberis et al. |
| 4,450,554 A | 5/1984 | Steensma et al. |
| 4,453,247 A | 6/1984 | Suzuki et al. |
| 4,493,021 A | 1/1985 | Agrawal et al. |
| 4,630,262 A | 12/1986 | Callens et al. |
| 4,641,302 A | 2/1987 | Miller |
| 4,704,696 A | 11/1987 | Reimer et al. |
| 4,706,242 A | 11/1987 | Harland |
| 4,757,497 A | 7/1988 | Beierle et al. |
| 4,777,633 A | 10/1988 | Fletcher et al. |
| 4,847,829 A | 7/1989 | Tompkins et al. |
| 4,872,160 A | 10/1989 | Hemmady et al. |
| 4,884,132 A | 11/1989 | Morris et al. |
| 4,903,261 A | 2/1990 | Baran et al. |
| 4,910,794 A | 3/1990 | Mahany |
| 4,914,586 A | 4/1990 | Swinehart |
| 4,941,089 A | 7/1990 | Fischer |
| 5,008,929 A | 4/1991 | Olsen et al. |
| 5,068,916 A | 11/1991 | Harrison et al. |
| 5,103,467 A | 4/1992 | Bedlek et al. |
| 5,121,391 A | 6/1992 | Paneth et al. |
| 5,128,959 A | 7/1992 | Bruckert |
| 5,142,532 A | 8/1992 | Adams |
| 5,148,429 A | 9/1992 | Kudo et al. |
| 5,159,592 A | 10/1992 | Perkins |
| 5,168,498 A | 12/1992 | Adams et al. |
| 5,220,565 A | 6/1993 | Wilson et al. |
| 5,222,152 A | 6/1993 | Fishbine et al. |
| 5,231,646 A | 7/1993 | Heath et al. |
| 5,251,205 A | 10/1993 | Callon et al. |
| 5,251,232 A | 10/1993 | Nonami |
| 5,268,933 A | 12/1993 | Averbuch |
| 5,273,437 A | 12/1993 | Caldwell et al. |
| 5,280,472 A | 1/1994 | Gilhousen et al. |
| 5,287,384 A | 2/1994 | Avery et al. |
| 5,295,154 A | 3/1994 | Meier et al. |
| 5,301,356 A | 4/1994 | Bodin et al. |
| 5,325,419 A | 6/1994 | Connolly et al. |
| 5,327,486 A | 7/1994 | Wolff et al. |
| 5,335,276 A | 8/1994 | Thompson |
| 5,341,374 A | 8/1994 | Lewen et al. |
| 5,367,558 A | 11/1994 | Gillig et al. |
| 5,373,503 A | 12/1994 | Chen |
| 5,384,807 A | 1/1995 | Yatim et al. |
| 5,392,281 A | 2/1995 | Baumert et al. |
| 5,394,436 A | 2/1995 | Meier et al. |
| 5,398,190 A | 3/1995 | Wortham |
| 5,404,579 A | 4/1995 | Obayashi et al. |
| 5,406,271 A | 4/1995 | Sonnendorfer et al. |
| 5,422,656 A | 6/1995 | Allard et al. |
| 5,428,616 A | 6/1995 | Field et al. |
| 5,428,664 A | 6/1995 | Kobayashi |
| 5,434,856 A | 7/1995 | Huang |
| 5,444,707 A | 8/1995 | Cerna et al. |
| 5,452,289 A | 9/1995 | Sharma et al. |
| 5,453,986 A | 9/1995 | Davis et al. |
| 5,461,611 A | 10/1995 | Drake et al. |
| 5,477,531 A | 12/1995 | McKee et al. |
| 5,477,539 A | 12/1995 | Brown |
| 5,481,533 A | 1/1996 | Honig et al. |
| 5,481,539 A | 1/1996 | Hershey et al. |
| 5,483,676 A | 1/1996 | Mahany et al. |
| 5,490,134 A | 2/1996 | Fernandes et al. |
| 5,499,287 A | 3/1996 | Beck et al. |
| 5,502,726 A | 3/1996 | Fischer |
| 5,506,847 A | 4/1996 | Shobatake |
| 5,506,848 A | 4/1996 | Drakopoulos et al. |
| 5,521,925 A | 5/1996 | Merakos et al. |
| 5,524,145 A | 6/1996 | Parker |
| 5,526,353 A | 6/1996 | Henley et al. |
| 5,533,019 A | 7/1996 | Jayapalan |
| 5,534,937 A | 7/1996 | Zhu et al. |
| 5,535,207 A | 7/1996 | Dupont |
| 5,539,729 A | 7/1996 | Bodnar |
| 5,550,893 A | 8/1996 | Heidari |
| 5,557,664 A | 9/1996 | Burns et al. |
| 5,564,077 A | 10/1996 | Obayashi et al. |
| 5,566,170 A | 10/1996 | Bakke et al. |
| 5,570,367 A | 10/1996 | Ayanoglu et al. |
| 5,579,487 A | 11/1996 | Meyerson et al. |
| 5,581,596 A | 12/1996 | Hogan |
| 5,586,113 A | 12/1996 | Adachi et al. |
| 5,594,782 A | 1/1997 | Zicker et al. |
| 5,596,573 A | 1/1997 | Bertland |
| 5,600,638 A | 2/1997 | Bertin et al. |
| 5,602,836 A | 2/1997 | Papadopoulos et al. |
| 5,602,846 A | 2/1997 | Holmquist et al. |
| 5,604,737 A | 2/1997 | Iwami et al. |
| 5,610,617 A | 3/1997 | Gans et al. |
| 5,610,910 A | 3/1997 | Focsaneanu et al. |
| 5,613,190 A | 3/1997 | Hylton |
| 5,615,210 A | 3/1997 | Kaiyama et al. |
| H001641 H | 4/1997 | Sharman |
| 5,617,410 A | 4/1997 | Matsumoto |
| 5,623,485 A | 4/1997 | Bi |
| 5,628,055 A | 5/1997 | Stein |
| 5,631,900 A | 5/1997 | McCaslin et al. |
| 5,635,980 A | 6/1997 | Lin et al. |
| 5,649,010 A | 7/1997 | Gysel et al. |
| 5,650,994 A | 7/1997 | Daley |
| 5,654,957 A | 8/1997 | Koyama |
| 5,654,969 A | 8/1997 | Wilhelmsson |
| 5,659,698 A | 8/1997 | Weng et al. |
| 5,666,534 A | 9/1997 | Gilbert et al. |
| 5,678,172 A | 10/1997 | Dinkins |
| 5,682,379 A | 10/1997 | Mahany et al. |
| 5,699,423 A | 12/1997 | Yoshida et al. |
| 5,717,737 A | 2/1998 | Doviak et al. |
| 5,726,984 A | 3/1998 | Kubler et al. |
| 5,729,544 A | 3/1998 | Lev et al. |
| 5,734,981 A | 3/1998 | Kennedy et al. |
| 5,742,592 A | 4/1998 | Scholefield et al. |
| 5,742,639 A | 4/1998 | Fasulo et al. |
| 5,745,533 A | 4/1998 | Asada et al. |
| 5,745,556 A | 4/1998 | Ronen |
| 5,754,542 A | 5/1998 | Ault et al. |
| 5,758,256 A | 5/1998 | Berry et al. |
| 5,764,736 A | 6/1998 | Shachar et al. |
| 5,774,461 A | 6/1998 | Hyden et al. |
| 5,774,854 A | 6/1998 | Sharman |
| 5,777,991 A | 7/1998 | Adachi et al. |
| 5,793,762 A | 8/1998 | Penners et al. |
| 5,796,727 A | 8/1998 | Harrison et al. |
| 5,796,772 A | 8/1998 | Smith et al. |
| 5,812,531 A | 9/1998 | Cheung et al. |
| 5,812,944 A | 9/1998 | Matsumoto |
| 5,838,730 A | 11/1998 | Cripps |
| 5,842,134 A | 11/1998 | Brown et al. |
| 5,842,224 A | 11/1998 | Fenner |
| 5,912,882 A | 6/1999 | Yafuso |
| 5,915,214 A | 6/1999 | Reece et al. |
| 5,953,319 A | 9/1999 | Dutta et al. |
| 5,956,673 A | 9/1999 | Weaver et al. |
| 5,960,074 A | 9/1999 | Clark |
| 5,987,099 A | 11/1999 | O'Neill et al. |
| 6,006,100 A | 12/1999 | Koenck et al. |
| 6,046,992 A | 4/2000 | Meier et al. |
| 6,073,030 A | 6/2000 | Nair et al. |
| 6,104,706 A | 8/2000 | Richter et al. |
| 6,108,704 A | 8/2000 | Hutton et al. |
| 6,131,121 A | 10/2000 | Mattaway et al. |
| 6,132,306 A | 10/2000 | Trompower |
| 6,134,312 A | 10/2000 | Peoples |
| 6,157,653 A | 12/2000 | Kline et al. |
| 6,345,047 B1 | 2/2002 | Regnier |
| 6,359,872 B1 | 3/2002 | Mahany et al. |
| 6,366,771 B1 | 4/2002 | Angle et al. |
| 6,453,351 B1 | 9/2002 | Endo |
| 6,542,497 B1 | 4/2003 | Curry et al. |
| 6,553,410 B2 | 4/2003 | Kikinis |
| 6,633,635 B2 | 10/2003 | Kung et al. |
| 6,850,510 B2 | 2/2005 | Kubler et al. |
| RE38,787 E | 8/2005 | Sainton et al. |
| 6,961,312 B2 | 11/2005 | Kubler et al. |
| 7,058,424 B2 | 6/2006 | Gadgil et al. |
| 7,136,475 B1 | 11/2006 | Rogers et al. |
| 7,161,931 B1 | 1/2007 | Li et al. |

| | | |
|---|---|---|
| 7,366,151 B2 | 4/2008 | Kubler et al. |
| 7,580,384 B2 | 8/2009 | Kubler et al. |
| 2001/0055978 A1 | 12/2001 | Herrod et al. |
| 2003/0002482 A1 | 1/2003 | Kubler et al. |
| 2003/0002637 A1 | 1/2003 | Miyahchi et al. |
| 2003/0118081 A1 | 6/2003 | Philips et al. |
| 2003/0174695 A1 | 9/2003 | Lautenschlager et al. |
| 2004/0023651 A1 | 2/2004 | Gollnick et al. |
| 2004/0039833 A1 | 2/2004 | Ludwig et al. |
| 2004/0081135 A1 | 4/2004 | Ewing et al. |
| 2004/0114567 A1 | 6/2004 | Kubler et al. |
| 2004/0146037 A1 | 7/2004 | Kubler et al. |
| 2004/0151150 A1 | 8/2004 | Kubler et al. |
| 2004/0151151 A1 | 8/2004 | Kubler et al. |
| 2004/0165573 A1 | 8/2004 | Kubler et al. |
| 2004/0174841 A1 | 9/2004 | Kubler et al. |
| 2004/0174842 A1 | 9/2004 | Kubler et al. |
| 2004/0174843 A1 | 9/2004 | Kubler et al. |
| 2004/0228330 A1 | 11/2004 | Kubler et al. |
| 2004/0246940 A1 | 12/2004 | Kubler et al. |
| 2005/0013266 A1 | 1/2005 | Kubler et al. |
| 2005/0036467 A1 | 2/2005 | Kubler et al. |
| 2005/0152319 A1 | 7/2005 | Kubler et al. |
| 2005/0254475 A1 | 11/2005 | Kubler et al. |

FOREIGN PATENT DOCUMENTS

| | | |
|---|---|---|
| WO | WO 92/02084 | 2/1992 |
| WO | WO 94/11967 | 5/1994 |
| WO | WO 96/05592 | 2/1996 |

OTHER PUBLICATIONS

Amended Preliminary Invalidity Contentions with Exhibit E, Feb. 21, 2006.
Koyama et al., "Personal Multimedia Communication Systems", 44(4), Hitachi Review 207, Hitachi, Ltd., Aug. 1995.
Huang, "Data Replication for Mobile Computers", ACM-SIGMOD, May 1994.
Blaze, "Catching in Large-Scale Distributed File Systems", PhD thesis, Princeton University, Jan. 1993.
Imielinski et al., "Mobile Wireless Computing: Solutions and Challenges in Data Management", Dept. of Computer Science, Rutgers University, 1992.
Douglas, "Transparent Process Migration: Design Alternatives and the Sprite Implementation", Software-Practice and Experience, vol. 21(8), 757-785, Aug. 1991.
Bartal et al., The Distributed k-Server Problem—A Competitive Distributed Translator for k-Server Algorithms, 1992.
Barbara et al., "Replicated Data Management in Mobile Environments: Anything New Under the Sun?", Oct. 22, 1993.
Huang et al., "Object Allocation in Distributed Databases and Mobile Computers", Feb. 1994.
Defendant and Counterclaim Plaintiff Qualcomm Incorporated's Final Invalidity Contentions, With Exhibit C, Nov. 21, 2006.
Harrick et al., "Multimedia Conferencing in the Etherphone Environment," IEEE Computer, vol. 24, No. 10, Oct. 1991.
Swinehart et al., "Adding Voice to an Office Computer Network", Proceedings of IEEE Globecom '83, Feb. 1984.
Zellweger et al., "An Overview of the Etherphone System and Its Applications," Proceedings of the $2^{nd}$ IEEE Conference on Computer Workstations, 1988.
Qualcomm's STU-III Service Option for Wideband Spread Spectrum Systems (Proposed Draft Text), Version 3.05, Jun. 2, 1994.
Qualcomm's STU-III Service Option for Wideband Spread Spectrum Systems (Proposed Draft Text), Version 2.09, Mar. 6, 1995.
Qualcomm's STU-III Service Option for Wideband Spread Spectrum Systems (Proposed Draft Text), Version 3.02, Apr. 5, 1995.
Qualcomm's STU-III Service Option for Wideband Spread Spectrum Systems (Proposed Draft Text), Version 3.04, May 8, 1995.
Qualcomm's STU-III Service Option for Wideband Spread Spectrum Systems (Proposed Draft Text), Version 3.04a, Jun. 2, 1995.
Weissman et al., End-To-End Security for Commercial PCS Networks, Apr. 23, 1995.
Defendant Qualcomm Incorporated's Supplemental Responses to Plaintiff Broadcom Corporation's First Set of Interrogatories (Nos. 1-19), Feb. 17, 2006.
Defendant Qualcomm Incorporated's Second Supplemental Responses to Plaintiff Broadcom Corporation's First Set of Interrogatories (Nos. 1-19), Mar. 1, 2006.
Defendant Qualcomm Incorporated's Third Supplemental Responses to Plaintiff Broadcom Corporation's First Set of Interrogatories (Nos. 5, 10), Sep. 5, 2006.
Defendant Qualcomm Incorporated's Fifth Supplemental Responses to Plaintiff Broadcom Corporation's First Set of Interrogatories (Nos. 2-4, 60 and First Supplemental Response to Interrogatory No. 18), Jan. 31, 2007.
DeTreville et al., "A Distributed Experimental Communication System", IEEE Journal on Selected Areas in Communications, vol. SAC-1, No. 6, Dec. 1983.
Fye, "Expert Report of Donald M. Fye Regarding U.S. Patent No. 6,389,010", with Appendix A and Exhibits 1-10, and 12-18, Dec. 22, 2006.
Weinstein, et al., "Experience with Speech Communication in Packet Networks," IEEE Journal on Selected Areas in Communications, vol. SAC-I, No. 6, pp. 963-980, Dec. 1983.
Metcalfe, et al., "Ethernet: Distributed Packet Switching for Local Computer Networks," Communications of the ACM, vol. 19, No. 7, pp. 395-404, Jul. 1976.
Crane, et al., "Practical Considerations in Ethernet Local Network Design," Xerox, Feb. 1980.
Postel, "Internetwork Protocol Approaches," IEEE Transactions on Communications, vol. COM-28, No. 4, pp. 604-611, Apr. 1980.
*Broadcom Corp.* v. *Qualcomm, Inc.*, U.S.D.C., So. Dist., Case No. SACV05-467 JVS—May 8, 2007 Trial Transcript (vol. 1), 75:6-76:3).
Decision of Appeals 2008-1199, -1271, -1272 in the United States Court of Appeals for the Federal Circuit, *Broadcom Corporation* v. *Qualcomm Incorporated*, On appeal from the United States District Court for the Central District of California in Case No. 05-CV-467-JVS, Decided Sep. 24, 2008.
Black, Uyless; ATM vol. I; Prentice Hall, 1995, pp. 244-245.
Dynamic Computation of TCP Maximum Window Size for Directly Connected Hosts, Apr. 1, 1994, IBM Technical Disclosure Cross Ref. No. 0018-8689-37-4A-601, pp. 601-608.
Martin, Local Area Networks, 1994, Prentice Hall, pp. 367-369.
Martin, Local Area Networks, 1994, Prentice-Hall, pp. 372-373.
Stevens, TCP/IP Illustrated, vol. 1, 1994, Addison-Wesley, pp. 104-107.

| Freq. 1<br>2466 MHz | Freq. 2<br>2411 MHz | Freq. 3<br>2417 MHz | Freq. 4<br>2472 MHz | Freq. 5<br>2444 MHz | ⋯ | Freq. 79<br>2403 MHz | Freq. 1<br>2466 MHz |
|---|---|---|---|---|---|---|---|
| 10 ms | 10 ms | 10 ms | 10 ms | 10 ms | 10 ms | 10 ms | 10 ms |

| Freq. 1<br>2466 MHz | Freq. 2<br>2411 MHz | Freq. 3<br>2417 MHz | Freq. 4<br>2472 MHz | Freq. 5<br>2444 MHz | ⋯ | Freq. 79<br>2403 MHz | Freq. 1<br>2466 MHz |
|---|---|---|---|---|---|---|---|
| 20 ms | 20 ms | 20 ms | 20 ms | 20 ms | 20 ms | 20 ms | 20 ms |

| Freq. 1: 2466 MHz | | Freq. 2: 2411 MHz | | Freq. 3: 2417 MHz | Freq. 5: 2444 MHz | |
|---|---|---|---|---|---|---|
| Al. 1 20 ms | Al. 2 20 ms | Al. 1 20 ms | Al. 2 20 ms | Al. 1 20 ms | Al. 1 20 ms | Al. 2 20 ms |

| Freq. 1: 2466 MHz | | | | Freq. 2: 2411MHz | | | |
|---|---|---|---|---|---|---|---|
| Al. 1 20 ms | Al. 2 20 ms | Al. 3 20 ms | Al. 4 20 ms | Al. 1 20 ms | Al. 2 20 ms | Al. 3 20 ms | Al. 4 20 ms |

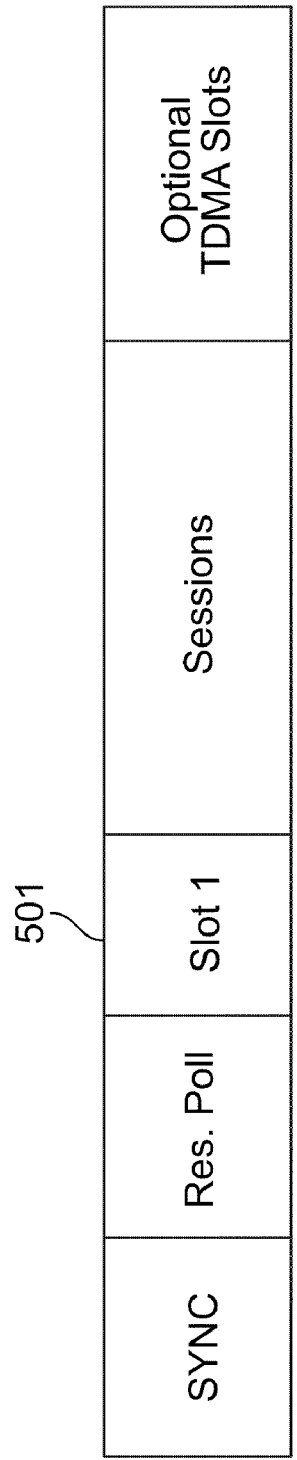
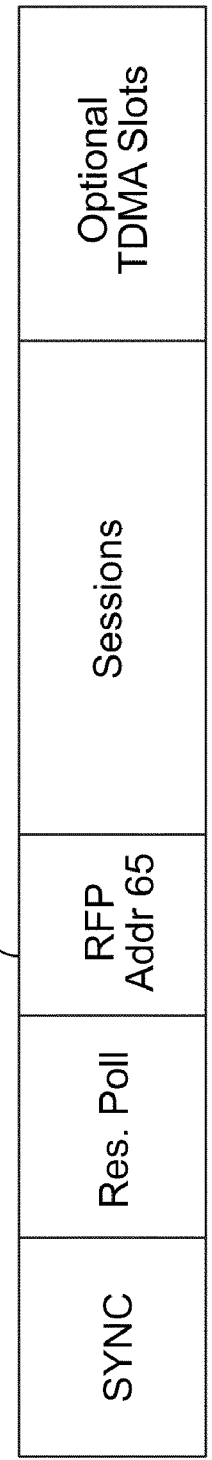
FIG. 5A
FIG. 5B

| SYNC | Res. Poll | Slot 1 | Slot 2 | ...... | Slot n | Sessions | Optional TDMA Slots |

| SYNC | Res. Poll | RFP Addr 19 | Slot 2 | RFP Addr 111 / RFP Addr 02 | Slot n | Sessions | Optional TDMA Slots |

SYNC

| Byte | Content | Definition |
|---|---|---|
| 1 | FLAG | Frame Delimiter |
| 2 | Dest. Address 1 | Destination Address (SYNC = Broadcast = FFFF$_H$) |
| 3 | Dest. Address 2 | Destination Address, 2nd Byte |
| 4 | TYPE | Messsage Type=SYNC, Priority SYNC, or Priority SYNC with HELLO |
| 5 | Source Address 1 | Control Point Address |
| 6 | Source Address 2 | Control Point Address 2nd Byte |
| 7* | SYSTEM ID | System Identifier (LAN ID) |
| 8* | NET ID | Net ID |
| 9* | Command/Status 1 | Control Point Status |
|  |  | 2 Bits  Control Point Type |
|  |  | 2 Bits  Loading Factor |
|  |  | 1 Bit  Scheduled Service Availability |
|  |  | 3 Bits  Reserved |
| 10* | Command/Status 2 | Scheduled Services |
|  |  | 5 Bits  Number of Allocated TDMA Time Slots |
|  |  | 3 Bits  Number of Available Time Slots |
| 11* | Random | Randomly Selected Character for Improved Encryption |
| 12 | CRC 1 | Error Check |
| 13 | CRC 2 | Error Check |
| 14 | FLAG | Frame Delimiter |

2600

*Optionally Encrypted Bytes

FIG. 26

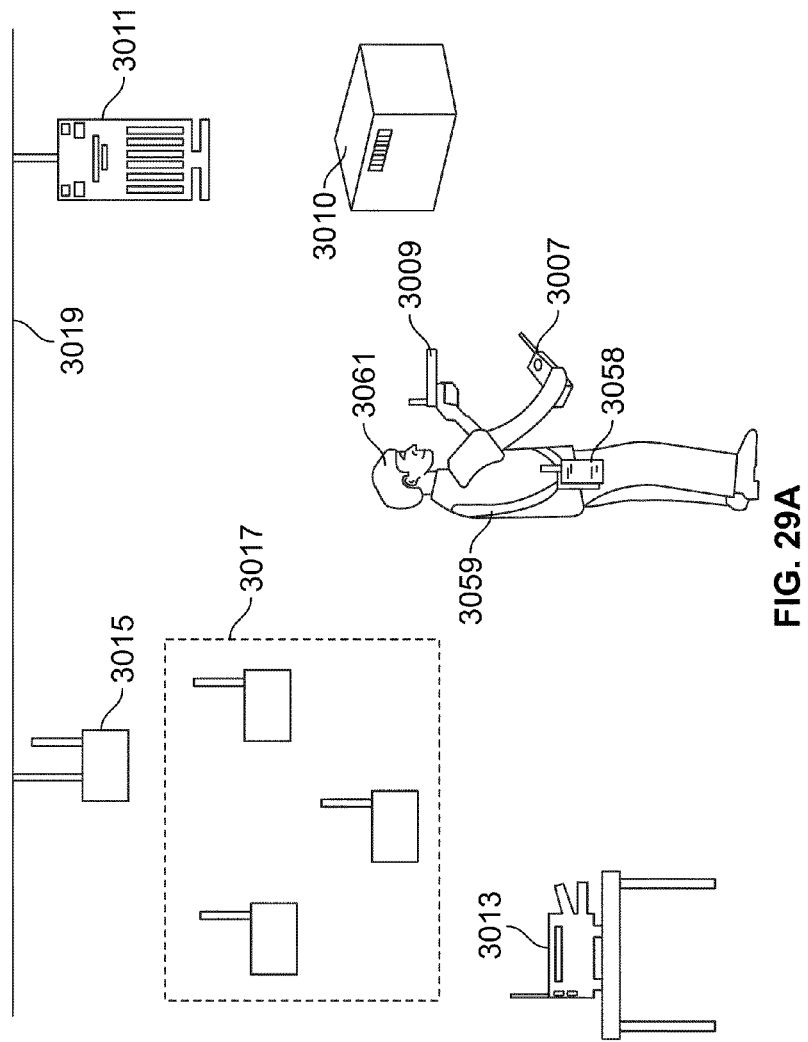

HIERARCHICAL DATA COLLECTION NETWORK SUPPORTING PACKETIZED VOICE COMMUNICATIONS AMONG WIRELESS TERMINALS AND TELEPHONES

CROSS-REFERENCE TO RELATED APPLICATIONS

Claiming Benefit Under 35 U.S.C. 120

This application is a continuation of U.S. Ser. No. 10/760,167 filed Jan. 16, 2004, now U.S. Pat. No. 7,580,384 issued Aug. 25, 2009, which is a continuation of U.S. Ser. No. 10/141,506 filed May 8, 2002, now U.S. Pat. No. 6,850,510 issued Feb. 1, 2005, which is a continuation of U.S. Ser. No. 09/037,535 filed Mar. 10, 1998, now U.S. Pat. No. 6,389,010 issued May 14, 2002, which is a continuation of U.S. Ser. No. 08/539,817 filed Oct. 5, 1995, now U.S. Pat. No. 5,726,984 issued Mar. 10, 1998. With respect to the present application, Applicants hereby rescind any disclaimer of claim scope made in the parent application or any predecessor or related application. The Examiner is advised that any previous disclaimer of claim scope, if any, and the alleged prior art that it was made to allegedly avoid, may need to be revisited. Nor should a disclaimer of claim scope, if any, in the present application be read back into any predecessor or related application.

STATEMENT REGARDING FEDERALLY SPONSORED RESEARCH OR DEVELOPMENT

N/A

The application U.S. Ser. No. 08/279,148 is a continuation-in-part of: PCT Application Serial No. PCT/US94/05037 filed May 6, 1994; U.S. application Ser. No. 08/205,639 filed Mar. 4, 1994; and U.S. application Ser. No. 08/275,821, filed Jun. 10, 1994.

PCT Application Serial No. PCT/US94/05037 is based on U.S. application Ser. No. 08/198,404, filed Feb. 22, 1994, which is itself a continuation of U.S. application Ser. No. 08/198,452, filed Feb. 18, 1994, which is in turn a continuation-in-part of U.S. application Ser. No. 08/168,478, filed Dec. 16, 1993, and PCT Application Serial No. PCT/US93/12628 filed Dec. 23, 1993. The application U.S. Ser. No. 08/168,478 is a continuation-in-part of U.S. application Ser. No. 08/147,377 filed Nov. 3, 1993, which is a continuation-in-part of U.S. application Ser. No. 08/101,254 filed Aug. 3, 1993, which is itself a continuation-in-part of U.S. application Ser. No. 08/085,662 filed Jun. 29, 1993, which is itself a continuation-in-part of U.S. application Ser. No. 08/076,340 filed Jun. 11, 1993, which is in turn a continuation-in-part of U.S. application Ser. No. 08/062,457, filed May 11, 1993.

PCT Application Serial No. PCT/US93/12628 is based on pending U.S. application Ser. No. 08/027,140 filed Mar. 5, 1993, which is itself a continuation-in-part of U.S. application Ser. No. 07/997,693 filed Dec. 23, 1992, now abandoned, which is a continuation-in-part of U.S. application Ser. No. 07/982,292 filed Nov. 27, 1992, now abandoned, which is itself a continuation-in-part of U.S. application Ser. No. 07/700,704 filed May 14, 1991, now abandoned, which is itself a continuation-in-part of U.S. application Ser. No. 07/699,818 filed May 13, 1991, now abandoned.

The application U.S. Ser. No. 08/205,639 is a continuation-in-part of U.S. application Ser. No. 07/735,128 filed Jul. 22, 1991, which is itself a continuation-in-part of U.S. application Ser. No. 07/467,096 filed Jan. 18, 1990, now U.S. Pat. No. 5,052,020.

U.S. application Ser. No. 08/062,457 is a continuation in part of U.S. Ser. No. 07/876,776, filed Apr. 28, 1992, which is itself a continuation in part of U.S. Ser. No. 07/854,115, filed Mar. 18, 1992, which is in turn a continuation in part of U.S. Ser. No. 07/558,895, filed Jul. 25, 1990. U.S. Ser. No. 07/558,895 is a continuation in part of U.S. Ser. No. 07/529,353, filed May 25, 1990, which is itself a continuation in part of U.S. Ser. No. 07/347,602, filed May 3, 1989, which is itself a continuation of U.S. Ser. No. 07/345,771, filed May 2, 1989, which is itself a continuation of U.S. Ser. No. 07/345,200, filed Apr. 28, 1989, which is itself a continuation of U.S. Ser. No. 07/305,302, filed Jan. 31, 1989.

The application U.S. Ser. No. 07/876,629 is also a continuation in part of U.S. Ser. No. 07/854,115, filed Mar. 18, 1992, with its parentage as listed above.

The application U.S. Ser. No. 08/267,758 is a continuation in part of U.S. Ser. No. 07/748,150, filed Aug. 21, 1991, now issued as U.S. Pat. No. 5,349,678 on Sep. 20, 1994.

INCORPORATION BY REFERENCE

The above referenced applications, PCT Application No. PCT/US92/08610 filed Oct. 1, 1992, as published under. International Publication No. WO 93/07691 on Apr. 15, 1993, together with U.S. Pat. No. 5,070,536, by Mahany et al., U.S. Pat. No. 4,924,426, by Sojka, and U.S. Pat. No. 4,910,794, by Mahany, are incorporated herein by reference in their entirety, including drawings and appendices, and hereby are made a part of this application.

BACKGROUND OF THE INVENTION

1. Field of the Invention

The present invention relates generally to data communication networks having a plurality of wired and/or wireless access servers configured to support remote processing, data storage and voice communication. More specifically, this invention relates to the intelligent routing of packetized voice communication between telephones and radio terminals through wireless and hardwired channels in a data processing network.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of Related Art

To support data collection, multiple radio base station networks have been developed to overcome a variety of problems with single radio base station networks such as spanning physical radio wave penetration barriers, wasted transmission power by portable computing devices, etc. However, multiple radio base station networks have their own inherent problems.

For example, in a multiple base station network employing a single shared channel, each base station transmission is prone to collision with neighboring base station transmissions in the overlapping coverage areas between the base stations. Therefore, it often proves undesirable for each base station to use a single or common communication channel.

In contradistinction, to facilitate the roaming of portable or mobile devices from one coverage area to another, use of a common communication channel for all of the base stations is convenient. A roaming device may easily move between coverage areas without loss of connectivity to the network.

Such exemplary competing commonality factors have resulted in tradeoff decisions in network design. These factors become even more significant when implementing a frequency hopping spread spectrum network. Frequency hopping is a desirable transmission technique because of its ability to combat frequency selective fading, avoid narrowband interference, and provide multiple communications channels.

Again, however, changing operating parameters between coverage areas creates difficulties for the roaming devices which move therebetween. In particular, when different communication parameters are used, a portable or mobile device roaming into a new base station coverage area is not able to communicate with the new base station without obtaining and synchronizing to the new parameters. This causes a communication backlog in data collection networks.

Such data collection networks and their communication protocols have been specifically designed for data collection and forwarding through wireless and hardwired links. They are designed in attempts to optimize overall data flow through the network. Among other flow optimizing techniques used, the data is segmented and packetized in preparation for transmission. Packet by packet, the data is transmitted as channel bandwidth becomes available.

Thus, instead of disabling a channel by dedicating bandwidth to service only a pair of participants exchanging potentially large amounts of data (data possibly having no immediate need), the channel is shared by many participants, each sending segments of data in packets whenever an opening in the channel occurs.

In contrast, to support the delivery of real time voice, alternate network design constraints must be considered. For example, such networks often dedicated bandwidth to voice transmission exchanges. However, by dedicating channel bandwidth to voice, efficient communication of data through such networks is seriously impacted. Data communication would have to wait for longer periods of time until dedicated voice bandwidth has been released. Similarly, data communication would have to be immediately discontinued upon requests for voice bandwidth.

Thus, there is a need for a communication network that provides efficient distribution and utilization of network resources in support of both data and voice delivery.

An object of the invention is to provide a method and apparatus wherein seamless voice and data communication is provided among both roaming devices within wireless portions of a communication network and stationary devices within hardwired portions of the network.

Another object of the present invention is to provide a hierarchical communications system for providing an efficient communication pathway for both data and voice.

Other objects, advantages, and novel features of the present invention will become apparent from the following detailed description of the invention when considered in conjunction with the accompanying drawings.

SUMMARY OF THE INVENTION

The present invention solves many of the foregoing problems in a variety of embodiments. For example, in one embodiment, a communication network is disclosed which operates to support voice and data communication within a premises. The communication network comprises a plurality of mobile network devices, a stationary network device, a wireless network, a hardwired network and a telephone.

Each mobile network device has a buffer that stores incoming digital voice information for a predetermined queuing period before beginning voice reproduction from the stored digital voice information. Each mobile network device uses the wireless network to selectively exchange voice and data packets with other mobile network devices. Similarly, the hardwired network is connected to both said stationary network device and the wireless network, and is used to route voice and data packets between the stationary network device and the plurality of mobile network devices which participate via the wireless network.

The telephone, which is connected to the stationary network device, captures, delivers, receives and reproduces voice in an analog voice stream form.

The stationary network device also has a buffer that stores digital voice information, received from the wireless network, for a predetermined queuing period before converting it into an analog voice stream. After conversion, the stationary network device delivers the analog voice stream to the telephone. In addition, the stationary network device converts analog voice streams received from the telephone into voice packets for delivery via the hardwired and wireless networks to a selected one of the mobile network devices.

Further detail regarding this embodiment and variations thereof are also disclosed. For example, the predetermined queuing period can be determined through examining delays found in test signal routing. The stationary network device can be a computer. The wireless network may utilize a polling protocol and spanning tree routing. The stationary network device can provide call setup assistance for the telephone.

Moreover, the communication network may further comprise a telephone switching network, connected to the stationary network device, which selectively routes analog voice streams received from the telephone onto the telephone switching network. The stationary network device may also selectively route analog voice streams received from the telephone switching network to the telephone.

Further detail regarding the present invention (and embodiments thereof) may be found in reference to the claims below, in view of the following detailed description and drawings.

BRIEF DESCRIPTION OF THE DRAWINGS

FIGS. 3A and 3B illustrate the frequency of operation periodically changing corresponding to access interval boundaries in a frequency hopping communication protocol of the present invention.

FIGS. 4A and 4B illustrate more than one access interval being used per hop in a frequency hopping communication protocol of the present invention.

FIG. 5A illustrates an embodiment of an access interval used by the hierarchical network of the present invention wherein a reservation phase is Idle Sense Multiple Access.

FIG. 5B illustrates an embodiment of an access interval used by the hierarchical network of the present invention wherein a device response follows a reservation poll.

FIG. 6A illustrates an embodiment of an access interval used by the hierarchical network of the present invention having multiple reservation slots for transmission of a Request For Poll signal.

FIG. 6B illustrates an embodiment of an access interval used by the hierarchical network of the present invention wherein general devices contend for channel access.

FIG. 26 illustrates the information contained in a sample SYNC message.

FIG. 29A is a diagrammatic illustration of the use of a peripheral LAN supporting roaming data collection by an operator according to the present invention.

FIG. 56a illustrates an embodiment of the conversion circuitry contained within a computer card 5601 which plugs into the computer 5515 of FIG. 55a.

FIG. 59 is a block diagram illustrating the packet processing functionality of the access devices illustrated in FIG. 55a.

DETAILED DESCRIPTION OF THE INVENTION

Figure 1A:
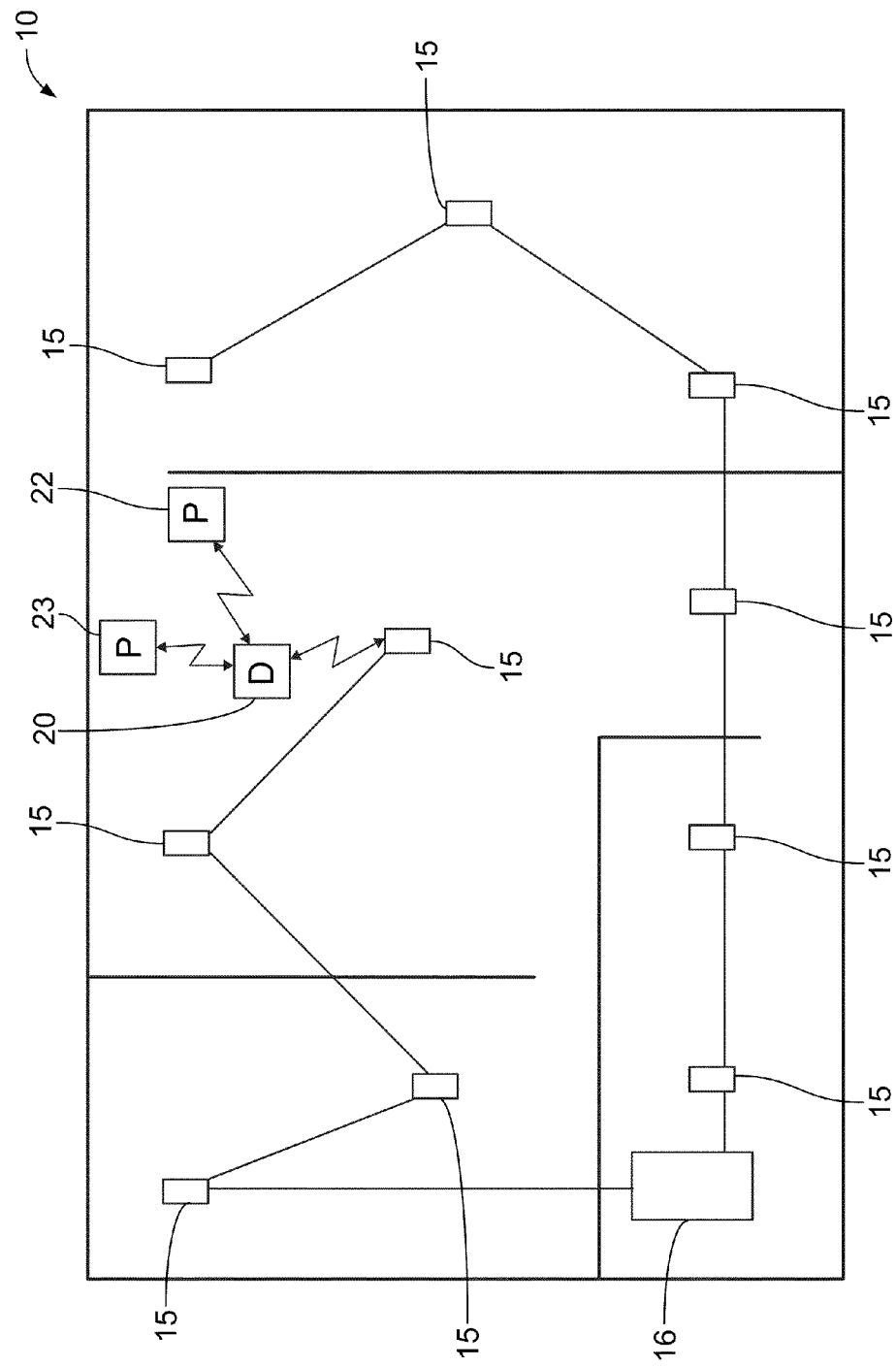
FIG. 1A is a diagrammatic illustration of a hierarchal communication system built in accordance with the present invention.

FIG. 1A illustrates a hierarchical communication system 10 within a building in accordance with the present invention. The illustrated hierarchical communication system 10 includes a local area network (LAN) for maintaining typical communication flow within the building premises, herein referred to as a premises LAN. The premises LAN is designed to provide efficient end-to-end routing of information among hardwired and wireless, stationary and roaming devices located within the hierarchical communication system 10.

The premises LAN consists of an infrastructure network comprising radio base stations, i.e., wireless access points 15, and a data base server 16 which may be part of a more extensive, wired LAN (not shown). Herein, base stations which participate in routing and relaying data throughout the communication network are referred to as "access points." If they also participate in the storage or migration of data and program code or in local processing, the base stations are referred to herein as "access servers." As will become apparent below, an access point may be modified with additional circuitry and/or programming resources to become an access server. Additionally, access servers and access points are both referred to herein as "access devices."

The access points 15 may communicate with each other via hardwired links, such as Ethernet, RS232, etc., or via wireless (radio frequency) links. A plurality of roaming terminal devices, such as a roaming computing device 20, participate in the premises LAN of the hierarchical communication network 10 to exchange information with: 1) other roaming computing devices; 2) the data base server 16; 3) other devices which might be associated with data base server 16 (not shown); and 4) any other devices accessible via the premises LAN (not shown). A roaming computing device can be, for example, a hand-held computer terminal or vehicle mounted computer terminal (vehicle terminal).

In most circumstances, the premises LAN provides a rather optimal solution to the communication needs of a given network. However, in some circumstances, to serve a variety of particular communication needs, the premises LAN does not offer the optimal solution. Instead of relying on the premises LAN for such communications, when and where beneficial, alternate LANs are spontaneously created by (or with) network devices, such as the roaming computing device 20, within the hierarchical communication system 10. Such spontaneously created LANs are referred to herein as spontaneous LANs. After the immediate benefits end, i.e., a task has been completed, or if the participants of the spontaneous LAN move out of range of each other, the spontaneous LAN terminates operation.

An exemplary spontaneous. LAN involves the use of peripheral devices as illustrated in FIG. 1A. Although bulk data transfer destined for a peripheral device 23, such as a printer, from the roaming computing device 20 might be communicated through the premises LAN, a more direct interconnection proves less intrusive, saves power, and offers a lower cost solution. Specifically, instead of communicating through the premise LAN, the roaming computing device 20 needing to print: 1) identifies the presence of an available printer, the peripheral device 23; 2) establishes an RF link (binds) with the peripheral device 23; 3) directly begins transferring the bulk data for printing; and 4) lastly, when the roaming terminal finishes the transfer, the spontaneous LAN with the peripheral device 23 terminates. A spontaneous LAN created between the computing devices and peripheral devices is herein referred to as a peripheral LAN. Other types of spontaneous LANs, such as vehicular LANs, are also possible. Embodiments described below identify vehicular LANs and wide area radio networks (WANs) which are part of the hierarchical communication system according to the present invention.

Although a spontaneous LAN may operate completely independent of the premises LAN, it is more likely that there will be some degree of coordination between the two. For example, while participating in the peripheral LAN, the roaming computing device 20 may terminate participation in the premises LAN, and vice versa. Alternately, the roaming computing device 20 may only service the peripheral LAN when specific participation on the premises LAN is not required, or vice versa. Moreover, the roaming computing device 20 may attempt to service each peripheral LAN as necessary in a balanced time-sharing fashion, placing little priority upon either LAN. Thus, based on the protocols and hardware selected, a spontaneous LAN can be configured so as to exist hierarchically above, below, at the same level, or independent of the premises LAN.

Generally, to design a given LAN configuration, only the characteristics of that LAN are considered for optimization purposes. However, in the hierarchical communication system of the present invention, the operation of other LANs must also be taken into account. For example, because of the roaming computing devices participation in both the premises and peripheral LANs, the requirements and operation of the premises LAN must be taken into consideration when defining the peripheral LAN, and vice versa. Thus, the hierarchical communication system of the present invention provides a series of tightly coupled radio LANs and WANs with radio transceiver and communication protocol designs which take into consideration such factors as cost, weight, power conservation, channel loading, response times, interference, communication flow, etc., as modified by a primary factor of multiple participation.

The peripheral LAN replaces hardwired connection between a roaming computing device and associated peripherals. In a typical configuration, a peripheral LAN will consist of one or more peripherals slaved to a single master roaming computing device, although multiple master roaming computing devices are possible. Peripheral devices may be printers, code scanners, magnetic card readers, input styluses, etc.

Each of the peripheral devices 22 has a built-in radio transceiver to communicate with the roaming computing devices 20. The roaming computing devices 20 are configured with built-in radio transceivers capable of communicating on both the peripheral and premises LAN. The access points 15 may be configured with radio transceivers only capable of communicating in the premises LAN. In alternate embodiments, as described below, the access points 15 might instead be configured to participate on both the premises and peripheral LANs.

In particular, the peripheral LAN is intended to provide communications between two or more devices operating within near proximity, e.g., distances of a few tens of feet. The majority of constituents of the peripheral LAN are generally devices that do not require access to resources outside their immediate group, or which can suffice with indirect access through devices which participate outside their immediate peripheral LAN group. In contradistinction, the premises LAN is intended to provide communications between relatively many devices operating across great distances throughout a building.

The characteristics of the peripheral LAN permit the use of radio transceivers of lower cost, lower power consumption, and generally more simplistic operation than permitted by the premises LAN. However, the operation of the peripheral LAN is adapted for integration with the premises LAN so that a radio transceiver and protocol designed for operation on the premises LAN includes features which allow concurrent or sequentially concurrent operation on the peripheral LAN. For example, by selecting similar communication hardware characteristics and integrating protocols, communication within the premises and peripheral LANs may be achieved with a single radio transceiver.

In one embodiment, radio communication through the premises LAN, i.e., among the access points 15 and the roaming computing device 20, utilizes relatively higher-power spread-spectrum frequency-hopping communication with a reservation access protocol. The reservation access protocol facilitates frequency-hopping and supports adaptive data rate selection. Adaptive data rate selection is based upon the quality of communication on the premises LAN radio channel. Radio communication through the peripheral LAN utilizes a relatively lower-power single frequency communication also with a reservation access protocol. As more fully described below, the coordinated use of reservation access protocols in the peripheral and premises LANs maximize information flow while minimizing conflicts between devices participating in the two LANs.

Figure 1B:
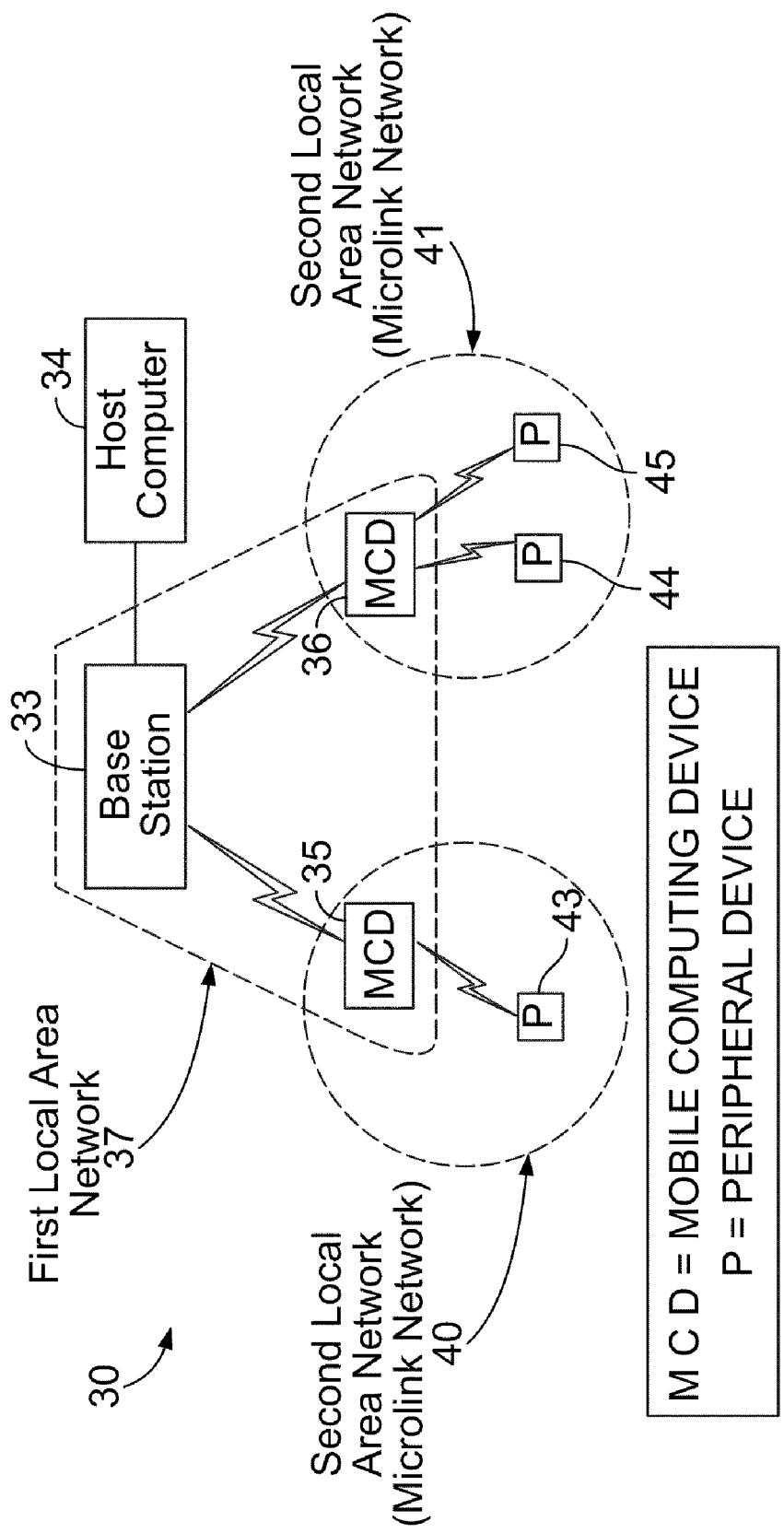
FIG. 1B is a diagrammatic illustration of another hierarchal communication system built in accordance with the present invention.

Referring to FIG. 1B, a small hierarchal communication system 30 built in accordance with the present invention is shown. An access point 33 and two roaming or mobile computing devices 35 and 36 form a premises LAN 37. The premises LAN 37 provides for communication among the mobile computing devices 35 and 36 and a host computer 34. The mobile computing devices 35 and 36 can roam anywhere within the range of the access point 33 and still communicate with the host computer 34 via the access point 33.

Two peripheral LANs 40 and 41 allow for wireless communication between each mobile computing device 35 and 36 and its respective peripheral devices 43, 44 and 45 when the mobile computing device is not communicating on the premises LAN 37. Specifically, the peripheral LAN 40 consists of the mobile computing device 35 and the peripheral device 43, while the peripheral LAN 41 consists of the mobile computing device 36 and the two peripheral devices 44 and 45.

Figure 1C:
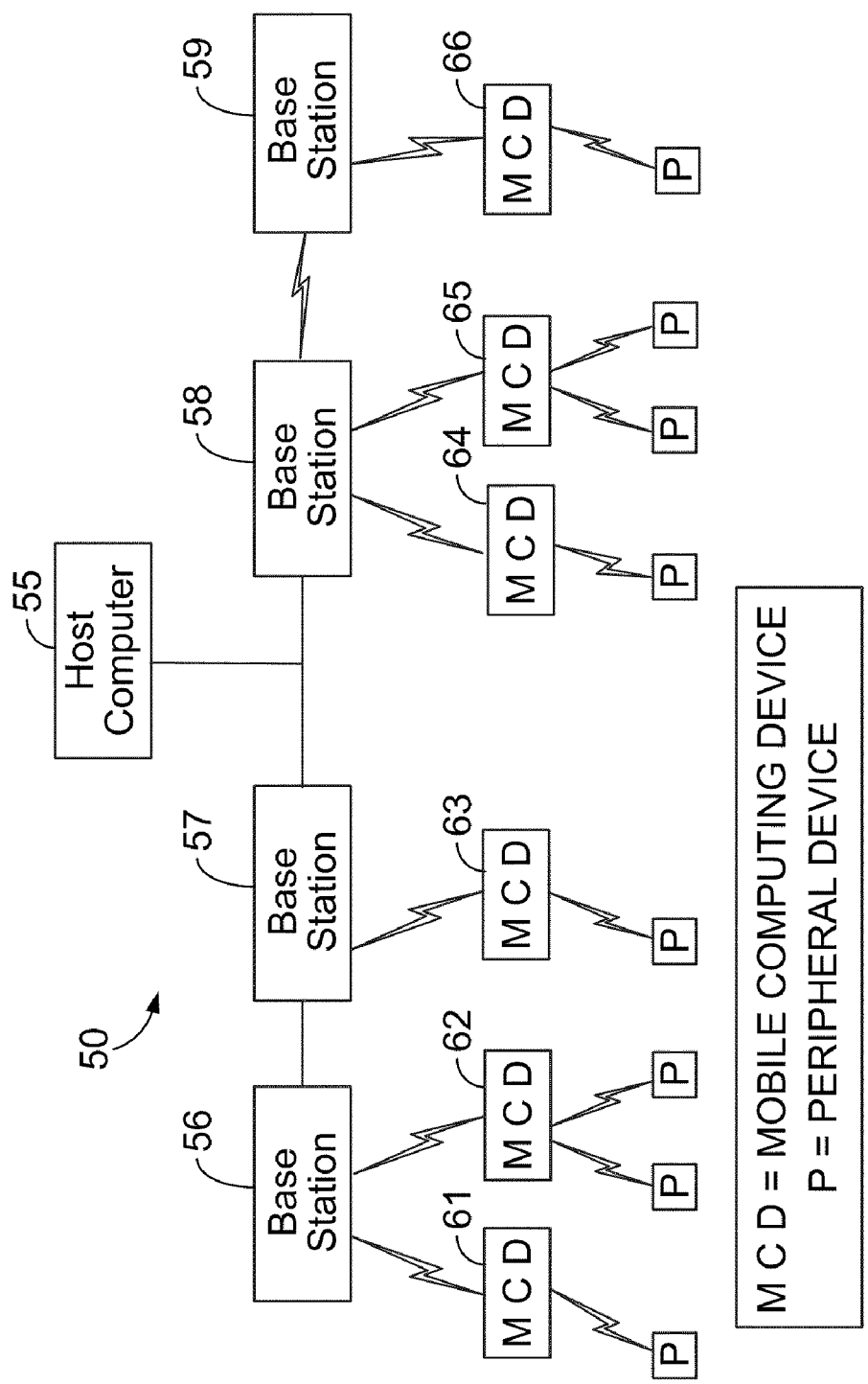
FIG. 1C is a diagrammatic illustration of still another hierarchal communication system built in accordance with the present invention.

FIG. 1C illustrates another embodiment according to the present invention of a larger hierarchal communication system 50. The host computer 55 is connected to access points 56, 57, 58 and 59. The host computer 55 and the access points 56, 57, 58 and 59 provide the infrastructure for the premises LAN. The access points need not be hardwired together. For example, as illustrated in FIG. 1C, the access points 56, 57 and 58 access each other and the host computer 55 via a hardwired link, while the access point 59 accomplishes such access via a wireless link with the access point 58.

The access points 56, 58 and 59 can support multiple mobile computing devices. For example, the access point 56 uses a frequency-hopping communication protocol for maintaining communication with mobile computing devices 61 and 62. Moreover, each of the mobile computing devices may roam out of range of the access point with which they have been communicating and into the range of an access point with which they will at least temporarily communicate. Together, the host computer 55 and the access points 56, 57, 58 and 59 and mobile computing devices 61, 62, 64, 65 and 66 constitute a premises LAN.

More particularly, each access point operates with a different set of communication parameters. For example, each access point may use a different frequency hopping sequence. Additionally, different access points may not employ a common master clock and will not be synchronized so as to have the frequency hopping sequences start at the same time.

Mobile computing devices 61, 62, 64, 65 and 66 are capable of roaming into the vicinity of any of the access points 56, 58 and 59 and connecting thereto. For example, mobile computing device 62 may roam into the coverage area of access point 58, disconnecting from access point 56 and connecting to access point 58, without losing connectivity with the premises LAN.

Each mobile computing device 61, 62, 64, 65 and 66 also participates with associated peripherals in a peripheral LAN. Each peripheral LAN is made up of the master device and its slave device. Similarly, as illustrated, the access point 57 is shown as a direct participant in not only the premises LAN but also in the peripheral LAN. The access point 57 may have either limited or full participation in the premises LAN. For example, the access point 57 may be configured as a mobile computing device with the full RF capability of transmission in both the premises and peripheral LANs. Instead, however, participation in the premises LAN may be limited to communicating through the hardwired link, effectively dedicating the access point 57 to the task of servicing peripherals.

Although the use of a plurality of built-in radio transceivers could be used so as to permit simultaneous participation by a single device, factors of cost, size, power and weight make it desirable to only build-in a single radio transceiver capable of multiple participation. Furthermore, even where a plurality of radio transceivers are built-in, simultaneous participation may not be possible depending upon the potential transmission interference between transceivers. In fact, full simultaneous participation may not be desirable at least from a processing standpoint when one transceiver, servicing one LAN, always or usually takes precedence over the other. Justification for such precedence generally exists in a premises LAN over a peripheral LAN.

For example, communication flow in most premises LANs must be fast, efficient and rather robust when considering the multitude of participants that operate thereon. In the peripheral LAN, however, response times and other transmission related delays are generally more acceptable—even adding extra seconds to a peripheral printer's print time will usually not bother the user. Thus, in such communication environments, it may be desirable to design the transmitters and associated protocols so that the premises LAN takes precedence over the peripheral LAN. This may yield a communication system where fully simultaneous participation in both the premises and peripheral LANs does not exist.

In communication environments wherein fully simultaneous participation does not exist or is not desired, transmitter circuitry might be shared for participation in both the premises and peripheral LANs. Similarly, in such environments, the communication protocol for the peripheral LAN can be tightly coupled with the protocol for the premises LAN, i.e., integrated protocols, so as to accommodate multiple participation. Moreover, one protocol might be designed to take precedence over the other. For example, the premises LAN protocol might be designed so as to minimize participation or response time in the peripheral LAN. As described in more detail below, such transceiver and protocol analysis also takes place when considering additional multiple participation in the vehicular LAN and WAN environments.

Figure 2:
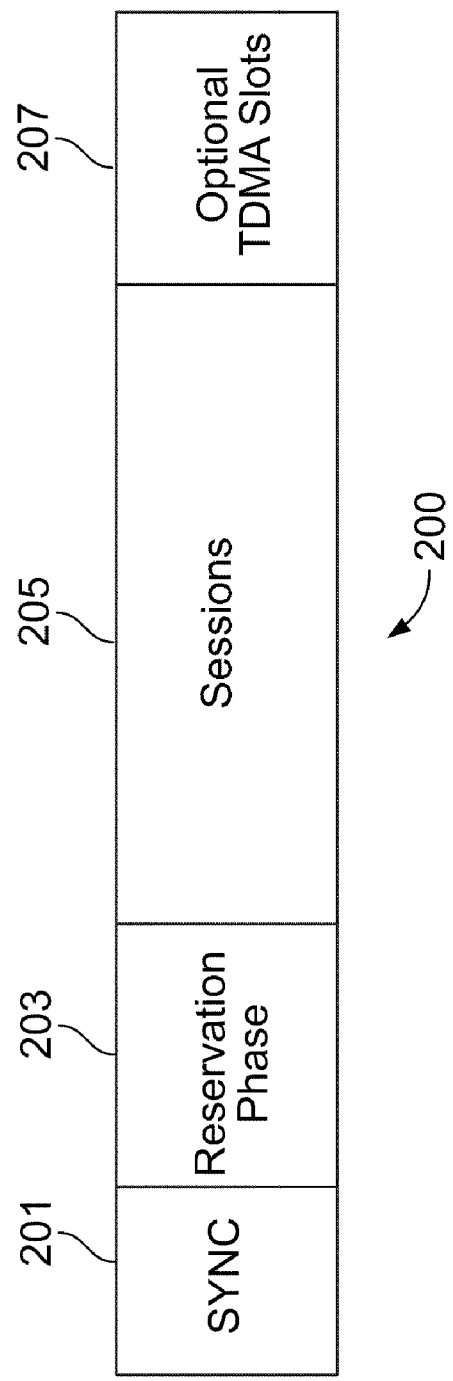
FIG. 2 illustrates an embodiment of a basic access interval structure used by a hierarchical network of the present invention.

FIG. 2 illustrates an embodiment of a communication protocol for the premises LAN which uses a basic Access Interval 200 ("AI") structure according to the present invention. Generally, an Access Interval is the basic communication unit, a fixed block of time, that allocates bandwidth to synchronization, media access, polled communications, contention-based communications, and scheduled services. The Access Interval in FIG. 2 includes a SYNC header 201 generated by a Control Point ("CP") device of a NET. The term NET describes a group of users of a given hopping sequence or a hopping sequence itself. The Control Point device is generally the access point 15 referenced above with regard to FIG. 1. The SYNC header 201 is used by constituents of the NET to attain and maintain hopping synchronization. A reservation phase 203 follows permitting a reservation poll, which provides the NET constituents an opportunity to gain access to media. A sessions frame 205 is next allocated for communication protocol. A frame 207 follows for optional time division multiple access ("TDMA") slots in order to accommodate scheduled services. Scheduled services, for example, real time voice or slow scan video, are such that a dedicated time slot may be required to provide acceptable quality of service. However, as described in more detail below in relation to FIG. 55, for example, acceptable real-time voice support is possible without dedicating time slots. The function of frames 201, 203, 205 and 207 will be discussed in greater detail below.

Figure 21:
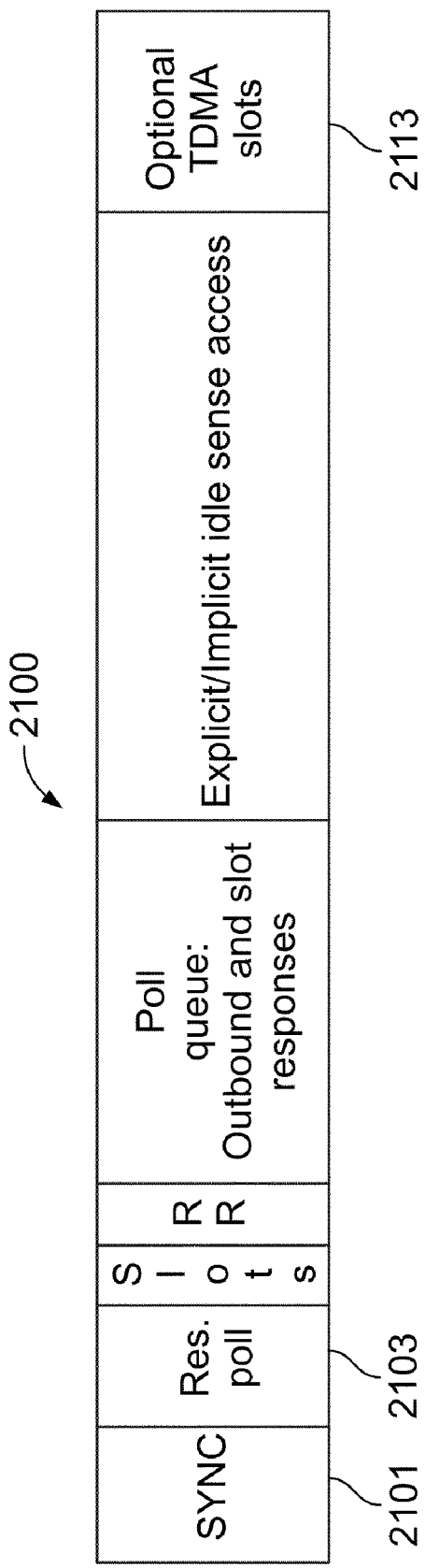
FIG. 21 illustrates a sequence in an access interval used in the hierarchical communication network of the present invention with Time Division Multiple Access slots positioned at the end of the access interval.

FIG. 21 illustrates a sequence in an access interval 2100 with the Time Division Multiple Access slots 2113 positioned at the end of the access interval 2100. In the present example, if this were also a HELLO interval, the HELLO would immediately follow the SYNC 1201. Location of the Time Division Multiple Access slots at such a position provides certain advantages including, for example, 1) the SYNC 2101, HELLO (not shown), Reservation Poll 2103, may all be combined into a single transmission (concatenated frames); 2) hopping information may be moved to or included in the Reservation Poll 2103 allowing for a shorter preamble in the SYNC 2101; and 3) the HELLO messages will occur early in the Access Interval 2100 providing for shorter periods during which a sleeping terminals' receiver is on.

Figure 22:
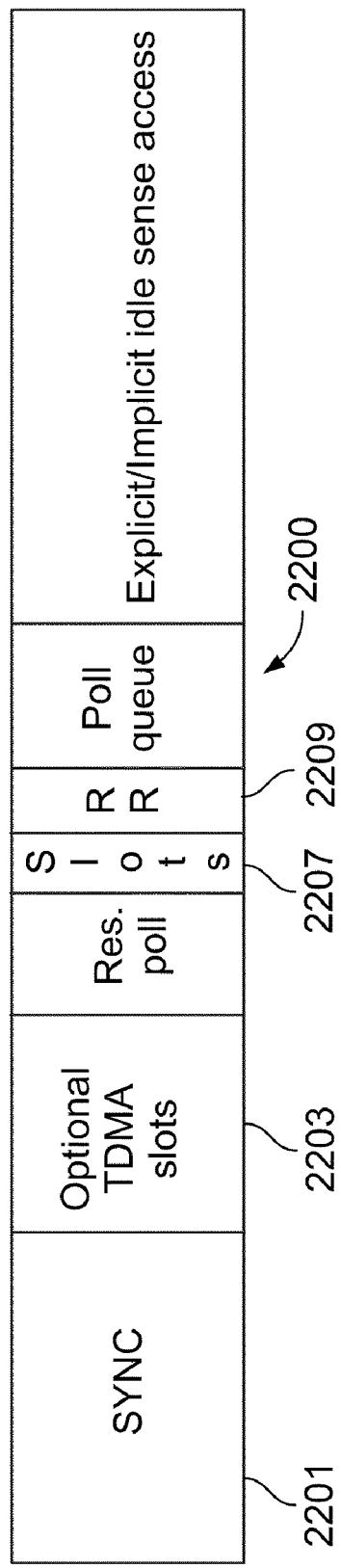
FIG. 22 illustrates a sequence in an access interval used by the hierarchical network of the present invention with the Time Division Multiple Access slots positioned immediately following the SYNC.

The Time Division Multiple Access slots may also be located at different points within the access interval. Positioning the Time Division Multiple Access slots allow for various systemic advantages. Referring now to FIG. 22, an access interval 2200 is illustrated showing the Time Division Multiple Access slots 2203 immediately following the SYNC 2201. Location of the Time Division Multiple Access slots 2203 at this position provides certain advantages including, for example, 1) better timing accuracy is achieved when the Time Division Multiple Access slots 2203 immediately follow the SYNC 2201; 2) session overruns do not interfere with the Time Division Multiple Access slots 2203; 3) devices which do not use the Time Division Multiple Access slots 2203 do not necessarily need to be informed of the Time Division Multiple Access slot allocation; and 4) HELLO message may follow Time Division Multiple Access slots 2203, Reservation Slots 2207 or Reservation Resolution Poll 2209.

Figure 23:
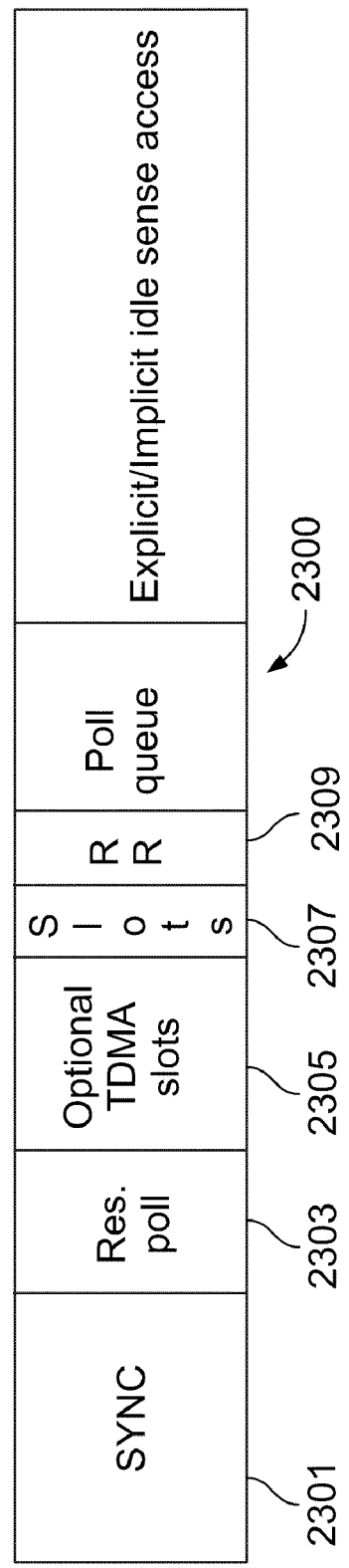
FIG. 23 illustrates a sequence in an access interval used by the hierarchical network of the present invention with the Time Division Multiple Access slots positioned immediately following the SYNC and Reservation Poll.

Referring now to FIG. 23, an access interval 2300 is illustrated showing the Time Division Multiple Access slots 2305 immediately following the SYNC 2301 and the Reservation Poll 2303. In the present example, if this were a HELLO interval, a HELLO message would immediately follow the Reservation Resolution Poll 2309.

Location of the Time Division Multiple Access slots 2305 at the position shown in FIG. 23 provides certain advantages including, for example, 1) the Time Division Multiple Access slot timing is keyed to SYNC 2301 for better accuracy; 2) the number of Time Division Multiple Access slots 2305 may be indicated in SYNC 2301 or the Reservation Poll 2303, providing greater flexibility; 3) session frame overruns do not interfere with Time Division Multiple Access slots 2305; 4) only one maintenance transmission is required per Access Interval 2300; and 5) hopping information may be moved to or included in the Reservation Poll 2303, permitting a shorter preamble in SYNC 2301.

In the access interval 2300 configuration shown in FIG. 23, it is possible that the Time Division Multiple Access slots 2305 and the response slots 2307 could be the same. The Reservation Poll 2303 would allocate the correct number of slots and indicate which are reserved for Time Division Multiple Access. For example, to use Idle Sense Multiple Access 1 slot) with 1 inbound and 1 outbound Time Division Multiple Access slots, three slots would be allocated with the first two slots reserved. The appropriate Time Division Multiple Access slot duration is 80 bits at a hop rate of 200 hops per second which is just about the expected duration of a Request for Poll. At slower hop rates, multiple slots could be allocated to Time Division Multiple Access allowing the Time Division Multiple Access slot duration to be constant regardless of hop rate.

Figure 24:
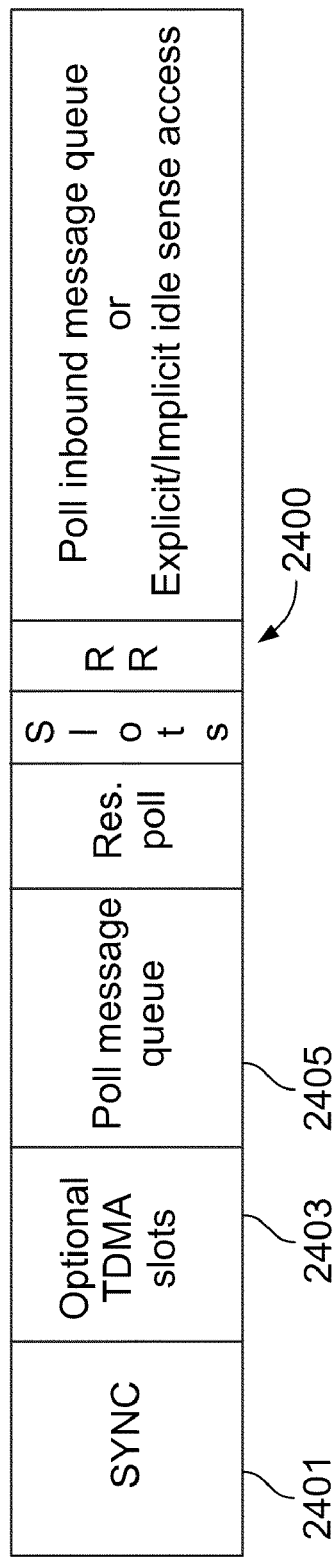
FIG. 24 illustrates another sequence in an access interval used by the hierarchical network of the present invention with the Time Division Multiple Access slots positioned immediately following the SYNC.

Referring now to FIG. 24, another access interval 2400 is illustrated showing the Time Division Multiple Access slots 2403 immediately following the SYNC 2401. In this example the Poll Message Queue 2405 immediately follows the Time Division Multiple Access slots 2403. The configuration shown in FIG. 24 provides for certain advantages including, for example, 1) the Time Division Multiple Access slot timing is keyed to SYNC 2401 for better accuracy; and 2) session frame overruns do not interfere with Time Division Multiple Access slots 2403.

The configurations shown in FIG. 21 and in FIG. 23 are preferred because they allow the Reservation Poll messages to be transmitted immediately following the SYNC and because of the power management and interference reduction advantages.

In one embodiment of the Access Interval structure, all message transmissions use standard high-level data link control ("HDLC") data framing. Each message is delimited by High-Level Data Link Control Flags, consisting of the binary string 01111110, at the beginning of the message. A preamble, consisting of a known data pattern, precedes the initial FLAG. This preamble is used to attain clock and bit synchronization prior to the start of data. Receiver antenna selection is also made during the preamble for antenna diversity. A CRC for error detection immediately precedes the ending FLAG. Data is NRZ-I (differentially) encoded to improve data clock recovery. High-Level Data Link Control NRZ-I data is run-length-limited to six consecutive bits of the same state. Alternatively, a shift register scrambler could be applied instead of differential encoding to obtain sufficient transitions for clock recovery. Data frames may be concatenated, with two or more frames sent during the same transmission, with a single FLAG separating them. An example of this is SYNC, followed by a HELLO or Reservation Poll (SYNC, HELLO and Reservation Poll are discussed more fully below).

While much of the following discussion centers on the use of frequency hopping in the premises LAN, the Access Interval structure of the present invention is also suitable for single channel and direct sequence spread spectrum systems. The consistent timing of channel access, and the relative freedom from collisions due to channel contention, provide desirable benefits in systems that support portable, battery powered devices regardless of modulation type or channelization. Functions that are unique to frequency hopping may be omitted if other channelization approaches are used.

FIGS. 3a and 3b illustrate the frequency of operation periodically changing corresponding to Access Interval boundaries in a frequency hopping system. Frequency hopping systems use a hopping sequence, which is a repeating list of frequencies of length (n) selected in a pseudo random order and is known to all devices within a coverage area. FIG. 3a illustrates a frequency hopping system having one Access Interval 301 per frequency hop (the hop occurring every 10 milliseconds) and a length of 79. FIG. 3b illustrates a frequency hopping system having one Access Interval 303 per frequency hop (the hop occurring every 20 milliseconds) and a length of 79. The 20 ms time frame is preferred for a protocol stack that uses a maximum network layer frame of up to 1536 bytes payload while maintaining two real time voice communications channels. Access interval duration may be optimized for other conditions. Access Interval length is communicated to the NET during the SYNC portion of the Access Interval. This allows Access Interval duration, and other NET parameters to be adjusted without reprogramming every device within the NET.

The Access Interval is a building block. The length of the Access Interval can be optimized based on network layer packet size, expected mix of Bandwidth on Demand ("BWOD") and Scheduled Access traffic, expected velocities of devices within the NET, acceptable duration of channel outages, latency or delay for scheduled services, etc. The preferred Access Interval duration of 20 ms (and maximum packet length of 256 Bytes at 1 MBIT/sec) represents a value chosen for systems with device velocities up to 15 MPH, and a mix between Bandwidth On Demand and scheduled service traffic.

Within a frequency hopping network, one or more Access Intervals may be used during each dwell in a frequency hopping system. A dwell is the length of time (d) each frequency in the hopping sequence is occupied by the system. For example, FIGS. 4a and 4b show illustrations of cases where more than one 20 ms Access Interval 401 is used per hop. This may be appropriate for some instances where it is undesirable to hop at higher rates because of relatively long frequency switching times of the radio hardware, where import, export, or regulatory restrictions disallow hopping at a faster rate, or in some applications where it is desirable to maintain operation on each channel for a longer period. An example of the latter is the case where larger files or data records are transferred routinely.

In a frequency hopping operation, the Access Interval 200 of FIG. 2 begins with a SYNC header 201. As mentioned above, the SYNC is generated by the Control Point (CP) device of the NET. The SYNC is used by constituents of the NET to attain and maintain hopping synchronization. Included in the SYNC are the following.

1. The address of the Control Point device.
2. Identification of the Hopping Sequence, and index of the current frequency within the hop table.
3. Identification of the hop rate, number of Access Intervals per hop, and Access Intervals before next hop.
4. A timing character for synchronization of device local clocks to the NET clock contained within the Control Point device.

5. Status field indicating reduced SYNC transmissions due to low NET activity (Priority SYNC Indicator).
6. Status field indicating if the Access Interval will contain a broadcast message to all devices within the NET.
7. Status field indicating premises or spontaneous LAN operation.
8. The SYNC field information is optionally encrypted using a block encryption algorithm, with a key provided by the network user. A random character is added to each SYNC message to provide scrambling.

However, there are two circumstances during which a SYNC message is not transmitted: 1) co-channel interference; and 2) low NET utilization. With regard to co-channel interference, before issuing a SYNC message, the Control Point device performs channel monitoring for a brief interval. If the Received Signal Strength Indicator (RSSI) level indicates an ON channel signal greater than the system defer threshold, then the Access Interval is skipped. Alternatively, a strong ON channel signal may dictate a reduction in Control Point device power to limit the interference distance of the net for the duration of the Access Interval. A system defer threshold 30 dB above the receiver sensitivity is a preferred choice. Communication within the NET is deferred for the duration of the Access Interval if SYNC is not transmitted due to co-channel interference.

In times of low system utilization, SYNC and Reservation Poll messages are reduced to every third Access Interval. The SYNC message includes a status field indicating this mode of operation. This allows devices to access the NET, even during Access Intervals where SYNC is skipped, by using an Implicit Idle Sense algorithm. If the hopping sequence is 79 frequencies in length as shown in FIGS. 3a and 3b, use of every third Access Interval guarantees that a SYNC message will be transmitted on each frequency within the hopping sequence once each three cycles of the sequence, regardless of whether 1, 2 or 4 Access Intervals occur each hop dwell. This addresses US and European regulatory requirements for uniform channel occupancy, and improves the prospects for synchronization of new units coming into the NET during periods when the NET is otherwise inactive. SYNC messages that are on multiples of 3 Access intervals are labeled as priority SYNC messages. "Sleeping" terminals use priority SYNCs to manage their internal sleep algorithms. Sleeping terminals and Implicit Idle Sense are discussed in more detail below.

It should be noted that SYNC messages are preceded by dead time, which must be allocated to account for timing uncertainty between NET clocks and local clocks within NET constituents. In frequency hopping systems, the dead time must also include frequency switching time for the RF modem.

The Reservation Poll frame 203 immediately follows the SYNC header 201. The two messages are concatenated High-Level Data Link Control frames separated by one or more Flags. The reservation poll provides NET constituents an opportunity to gain access to the media. It includes the following.

1. A field specifying one or more access slots.
2. A field specifying a probability factor between 0 and 1.
3. A list of addresses for which the access points have pending messages in queue.
4. Allocation of Time Division Multiple Access slots for scheduled services by address.
5. Control Point device Transmitted Power level for SYNC and Reservation Polls.

The number of access slots, n, and the access probability factor, p, are used by the Control Point device to manage contention on the channel. They may each be increased or decreased from Access Interval to Access Interval to optimize access opportunity versus overhead.

If the NET is lightly loaded, the pending message list is short, and the NET is not subject to significant interference from other nearby NETs, the control point device will generally specify a single slot 501 as shown in FIG. 5a, with a p factor <1. In this case, the reservation phase is Idle Sense Multiple Access ("ISMA"). Devices with transmission requirements that successfully detect the Reservation Poll will transmit a Request for Poll ("RFP") with probability p and defer transmission with probability 1-p. Fig. b shows a device response address 65 503 following the reservation poll.

In cases when the transmission density is higher, n multiple reservation slots will be specified, generally with a probability factor p of 1. In this case a device will randomly choose one of n slots for transmission of their Request for Poll. The slotted reservation approach is particularly appropriate in instances where many NETs are operating in near proximity, since it diminishes reliance on listen before talk ("LBT") (explained more fully below). The number of slots n is determined by a slot allocation algorithm that allocates additional slots as system loading increases. FIG. 6a shows multiple slots 601.

In cases where NET loading is extreme, the Control Point may indicate a number of slots, e.g., not more than 6, and a probability less than 1. This will cause some number of devices to defer responding with a Request for Poll in any of the slots. This prevents the control point device from introducing the overhead of a large number of slots in response to heavy demand for communications, by dictating that some units back off until demand diminishes.

A pending message list is included in the Reservation Poll. The pending message list includes the addresses of devices for which the Control Point device has messages in queue. Devices receiving their address may contend for the channel by responding with a Request For Poll (RFP) in the slot response phase. FIG. 6b shows several devices 603, 605 and 607 contending for channel access. Messages that the Control Point device receives through the wired infrastructure that are destined for Type 1 devices, and inactive Type 3 devices whose awake window has expired, are immediately buffered, and the device addresses are added to the pending message list. When a message is received through the infrastructure for a Type 2 device, or an active Type 3 device, their address is prioritized at the top of the polling queue. (Device Types and the polling queue are described below.) The pending message list is aged over a period of several seconds. If pending messages are not accessed within this period, they are dropped.

Devices with transmission requirements respond in slots with a Request for Poll. This message type includes the addresses of the Control Point device and requesting device, the type and length of the message it has to transmit, and a field that identifies the type of device. Devices that detect their address in the pending message list also contend for access in this manner.

As mentioned above, devices may be Type 1, Type 2, or Type 3. Type 1 devices are those which require critical battery management. These may be in a power saving, non-operational mode much of the time, only occasionally "waking" to receive sufficient numbers of SYNC and Reservation Poll messages to maintain connectivity to the NET. Type 2 devices are those that are typically powered up and monitoring the NET at all times. Type 3 units are devices that will remain awake for a window period following their last transmission in anticipation of a response. Other device types employing different power management schemes may be added.

Slot responses are subject to collision in both the single and multiple slot cases. Collisions may occur when two or more devices attempt to send Request for Polls in the same slot. However, if the signal strength of one device is significantly stronger than the others, it is likely to capture the slot, and be serviced as if it were the only responding unit. FIG. 6b shows two devices 605, address 111, and 607, address 02, that may be subject to collision or capture.

The Control Point device may or may not be able to detect collisions by detecting evidence of recovered clock or data in a slot, or by detecting an increase in RF energy in the receiver (using the Received Signal Strength Indicator, ("RSSI")) corresponding to the slot interval. Collision detection is used in the slot allocation algorithm for determining addition or deletion of slots in upcoming Reservation Polls.

As an optional feature to improve collision detection in the multiple slot case, devices that respond in later slots may transmit the addresses of devices they detect in earlier slots as part of their Request for Poll. Request for Polls which result in collisions at the Control Point device often are captured at other remote devices, since the spatial relationship between devices that created the collision at the base does not exist for other device locations within the NET. The duration of the response slots must be increased slightly to provide this capability.

If the Control Point device receives one or more valid Request for Polls following a Reservation Poll, it issues a Reservation Resolution ("RR") Poll and places the addresses of the identified devices in a polling queue. The Reservation Resolution message also serves as a poll of the first unit in the queue. Addresses from previous Access Intervals and addresses of intended recipients of outbound messages are also in the queue.

If the Polling Queue is empty, then no valid Request for Polls were received or collision detected and no Reservation Resolution poll is issued. If within this scenario a collision is detected, a CLEAR message indicating an Explicit Idle Sense (explained more fully below) is transmitted containing a reduced probability factor to allow colliding units to immediately reattempt NET access.

Outbound messages obtained through the network infrastructure may result in recipient addresses being prioritized in the queue, that is, if the recipients are active devices—Type 2 devices or Type 3 devices whose awake window has not expired. This eliminates the need for channel contention for many outbound messages, improving efficiency. Messages for Type 1 devices are buffered, and the recipient address is placed in the pending message list for the next Access Interval.

Generally the queue is polled on a first in first out (FIFO) basis. The polling order is as follows:
  a. addresses of active units with outbound messages;
  b. addresses from previous Access Intervals; and
  c. addresses from the current Access Interval.

Since propagation characteristics vary with time and operating frequency, it is counterproductive to attempt retries if Poll responses are not received. If a response to a Poll is not received, the next address in the queue is polled after a short response timeout period. Addresses of unsuccessful Polls remain in the queue for Polling during the next Access Interval. Addresses are aged, so that after several unsuccessful Polls they are dropped from the queue. Addresses linked to outbound messages are added to the pending message list. Devices with inbound requirements must reenter the queue through the next reservation phase.

Data is transferred in fragments. A maximum fragment payload of 256 bytes is used in the preferred implementation. If transfer of network packets larger than of 256 bytes is required, two or more fragments are transferred. Fragments may be any length up to the maximum, eliminating the inefficiency that results when messages that are not integer multiples of the fragment length are transmitted in systems that employ fixed sizes.

Figure 7A:
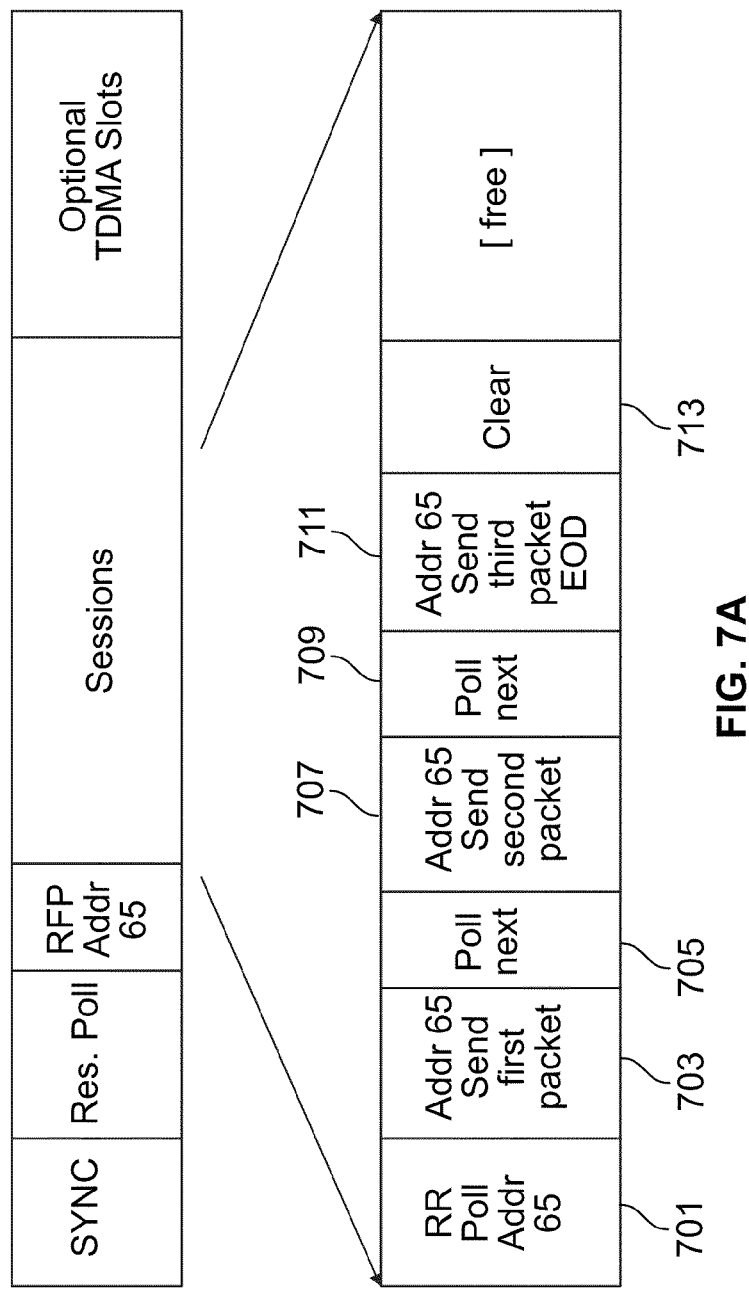
FIG. 7A illustrates a sequence in an access interval used by the hierarchical network of the present invention for transferring data from a remote device to a control point device.

The sequence for transferring data from a remote device to the control point device is illustrated in FIG. 7a. It is assumed that address 65 is the first address in the polling queue. The Reservation Resolution poll 701 from the control point device includes the device address and the message length that device 65 provided in its initial Request for Poll. A first fragment 703 transmitted back from device 65 is a full length fragment. Its header includes a fragment identifier and a field providing indication of the total length of the message. Length information is included in most message types during the sessions period to provide reservation information to devices that may wish to attempt to access the NET following an Explicit Idle Sense (explained more fully below).

Following successful receipt of the first fragment, the Control Point device sends a second poll 705, which both acknowledges the first fragment, and initiates transmission of the second. The length parameter is decremented to reflect that the time required for completion of the message transfer is reduced. A second fragment 707 is transmitted in response, and also contains a decremented length field. Following receipt of the second fragment 707, the Control Point device sends a third poll 709. This pattern is continued until a final fragment 711 containing an End of Data (EOD) indication is received. In FIG. 7, the final fragment is shorter than a maximum length fragment. The Control Point device sends a final Acknowledge (ACK), and the device sends a final CLEAR 713 to indicate conclusion of the transmission. The CLEAR message contains a probability factor p for Explicit Idle Sense (explained more fully below). The value of p is determined by the Control Point device in the ACK and echoed by the device termination communication. A p of zero indicates that the control point device will be initiating other communications immediately following receipt of the CLEAR message. A probability other than 0 indicates an Explicit Idle Sense.

If for some reason a fragment is not successfully received, the next poll from the Control Point device would indicate a REJECT, and request re-transmission of the same fragment. The length field would remain fixed at the previous value, prolonging reservation of the channel for the duration of the message. After a fragment is transmitted more than once without successful reception, the Control Point device may suspend attempts to communicate with the device based upon a retry limit, and begin polling of the next address in the queue.

Figure 19A:
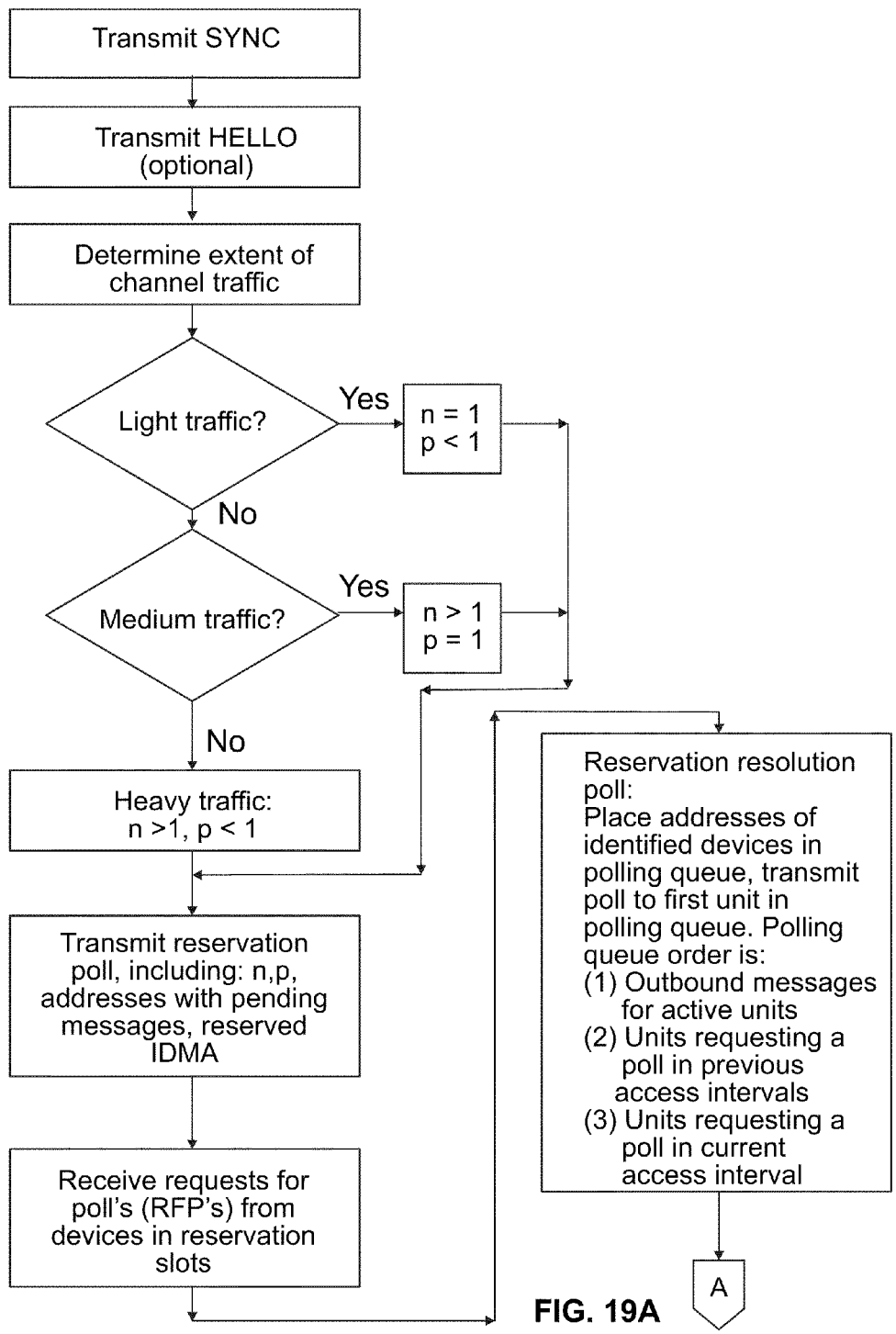
FIGS. 19A and 19B are flow charts illustrating an access interval during inbound communication.
Figures 1, 19B:
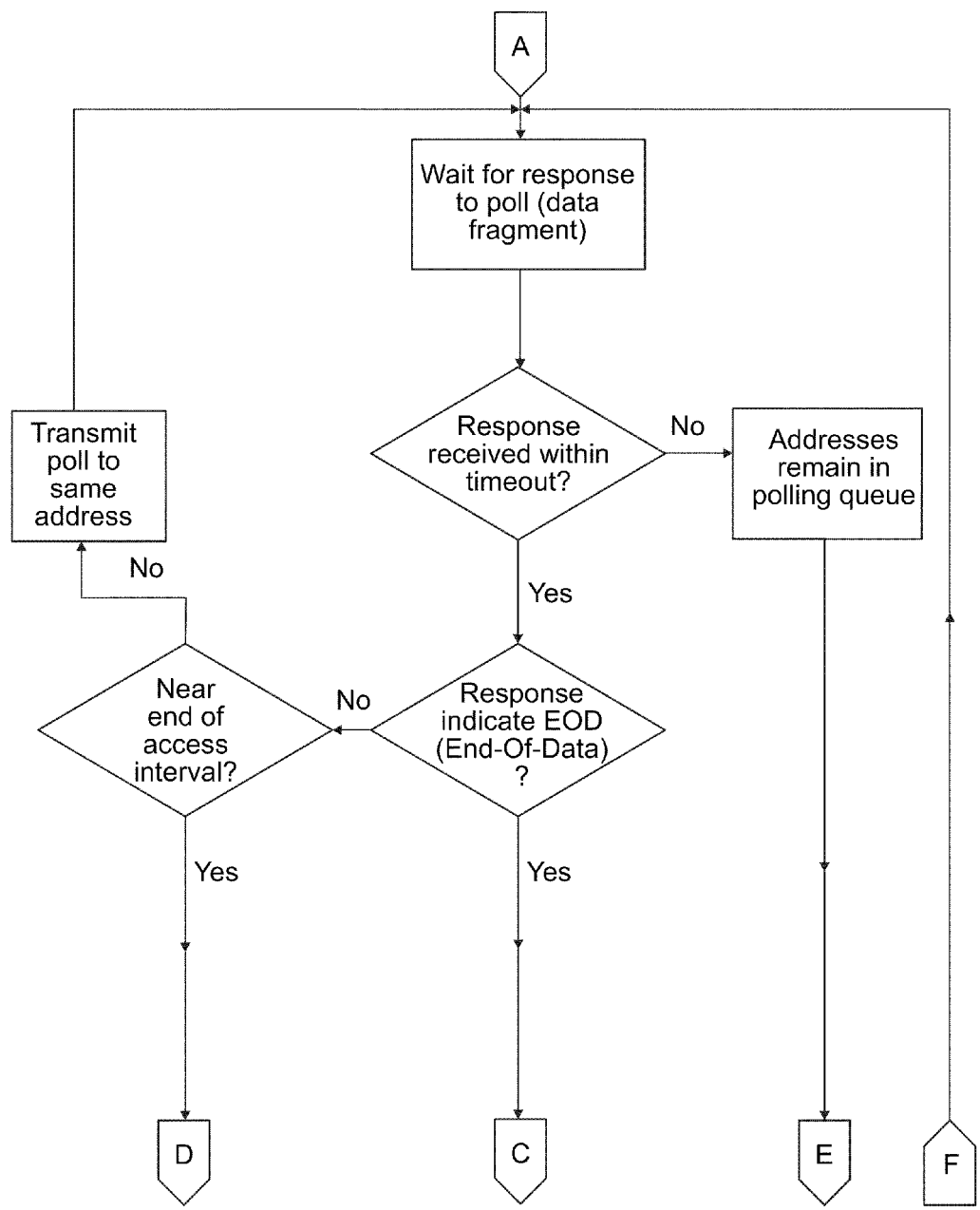
Figures 2, 19B:
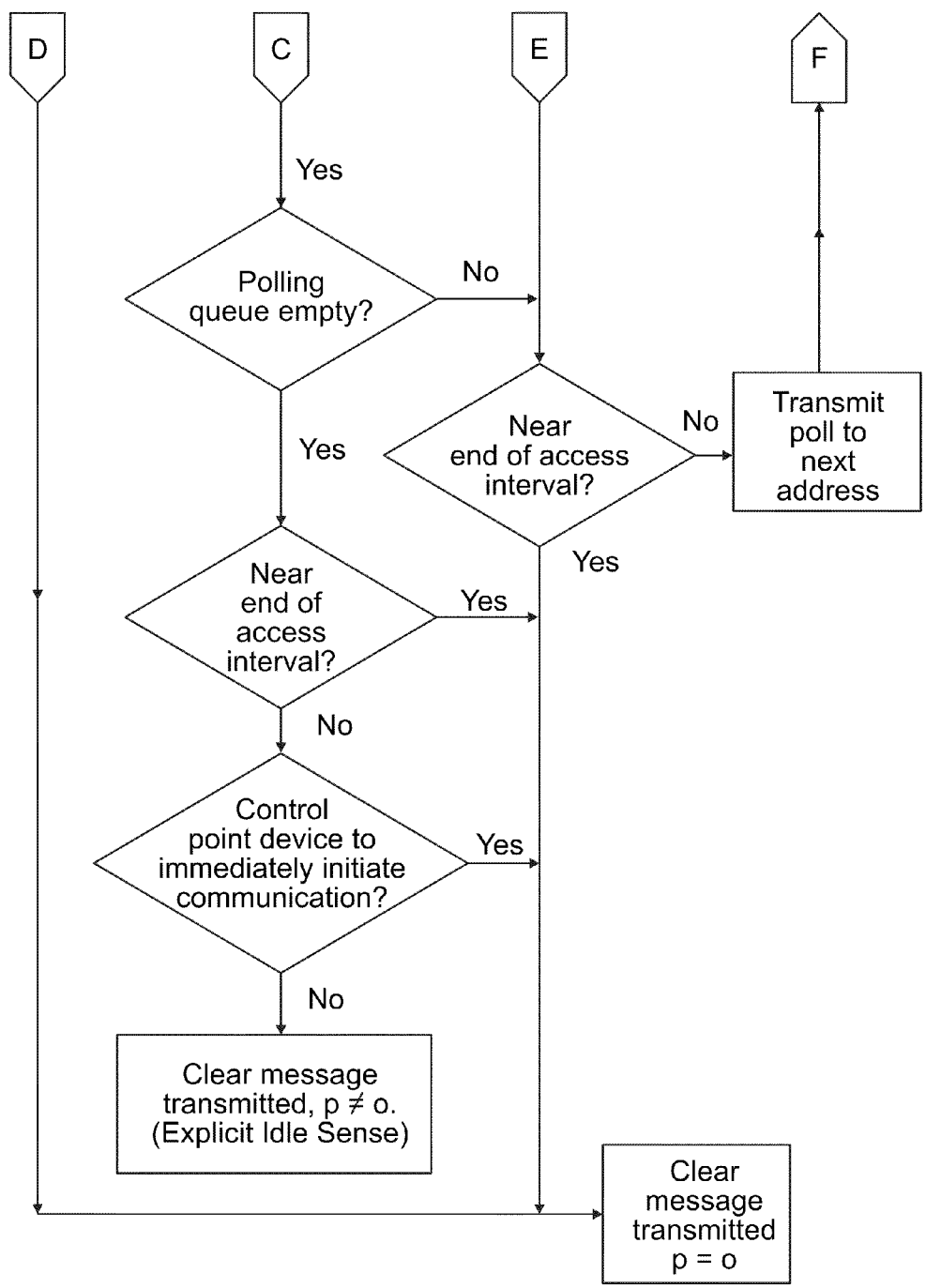
Figure 20A:
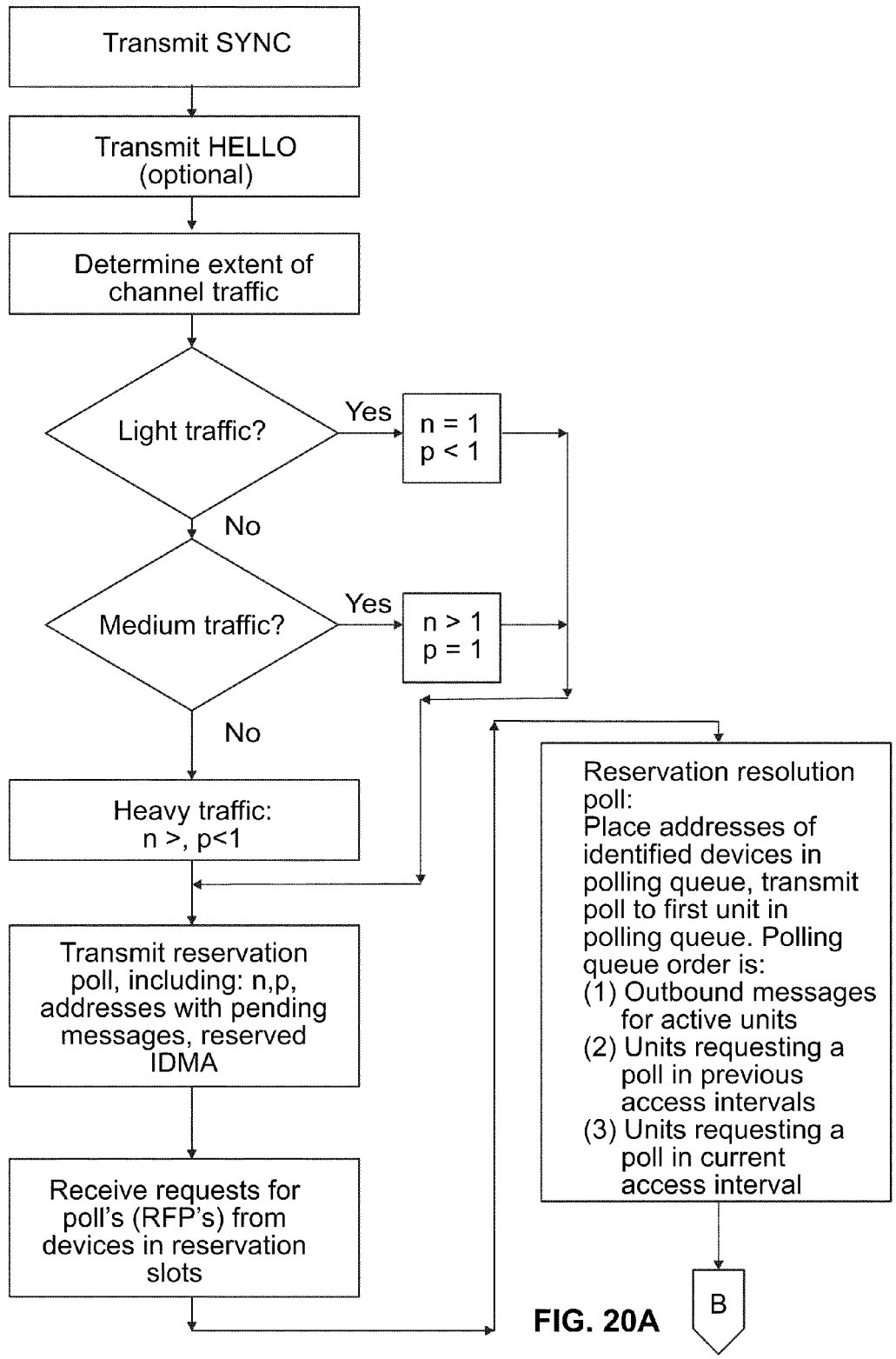
FIGS. 20A and 20B are flow charts illustrating an access interval during outbound communication.
Figures 1, 20B:
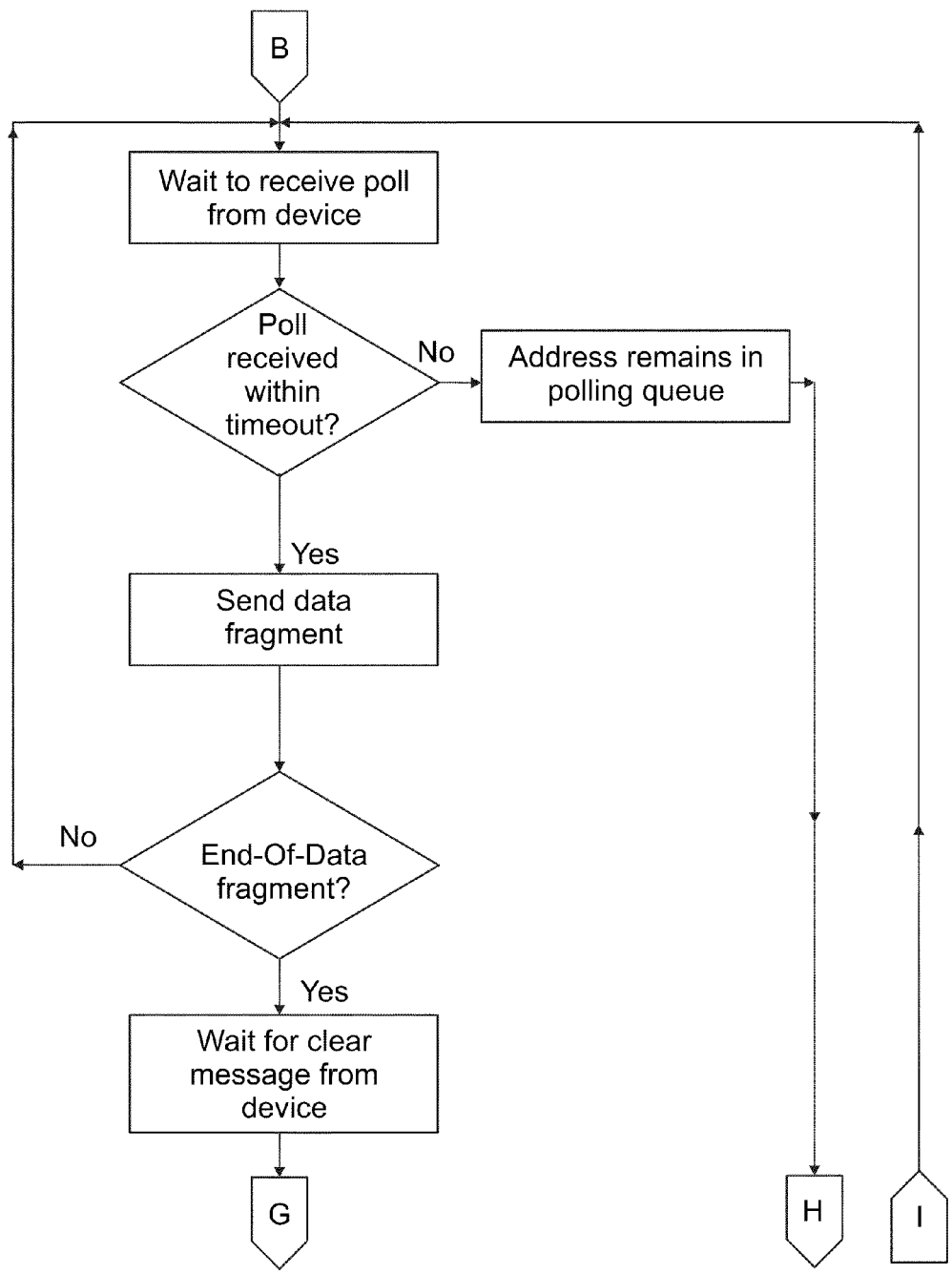
Figures 2, 20B:
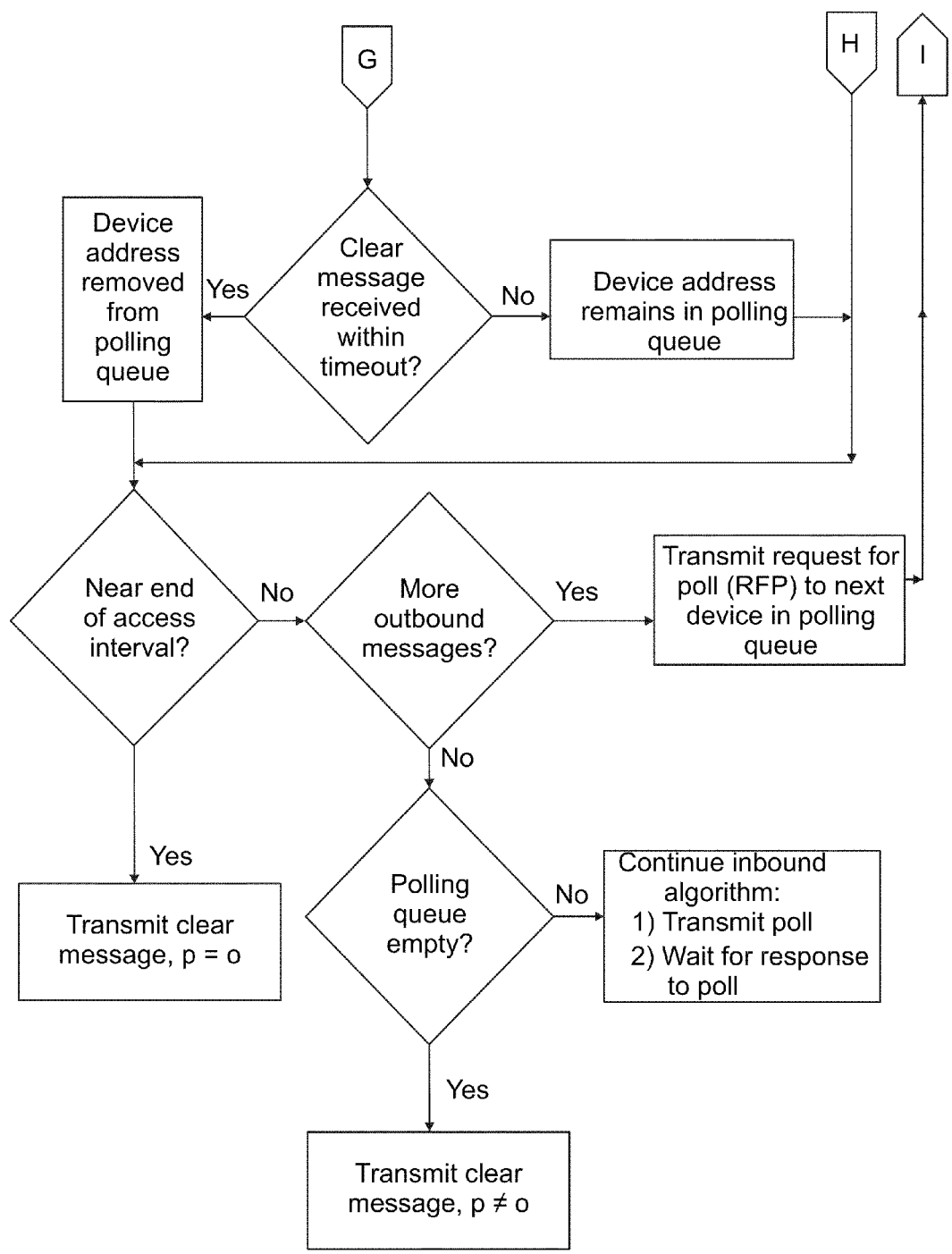

A flow chart depicting how inbound messages are received during an access interval is shown in FIGS. 19A and 19B. A flow chart depicting how outbound messages are transmitted during an access interval is shown in FIGS. 20A and 20B.

Figure 7B:
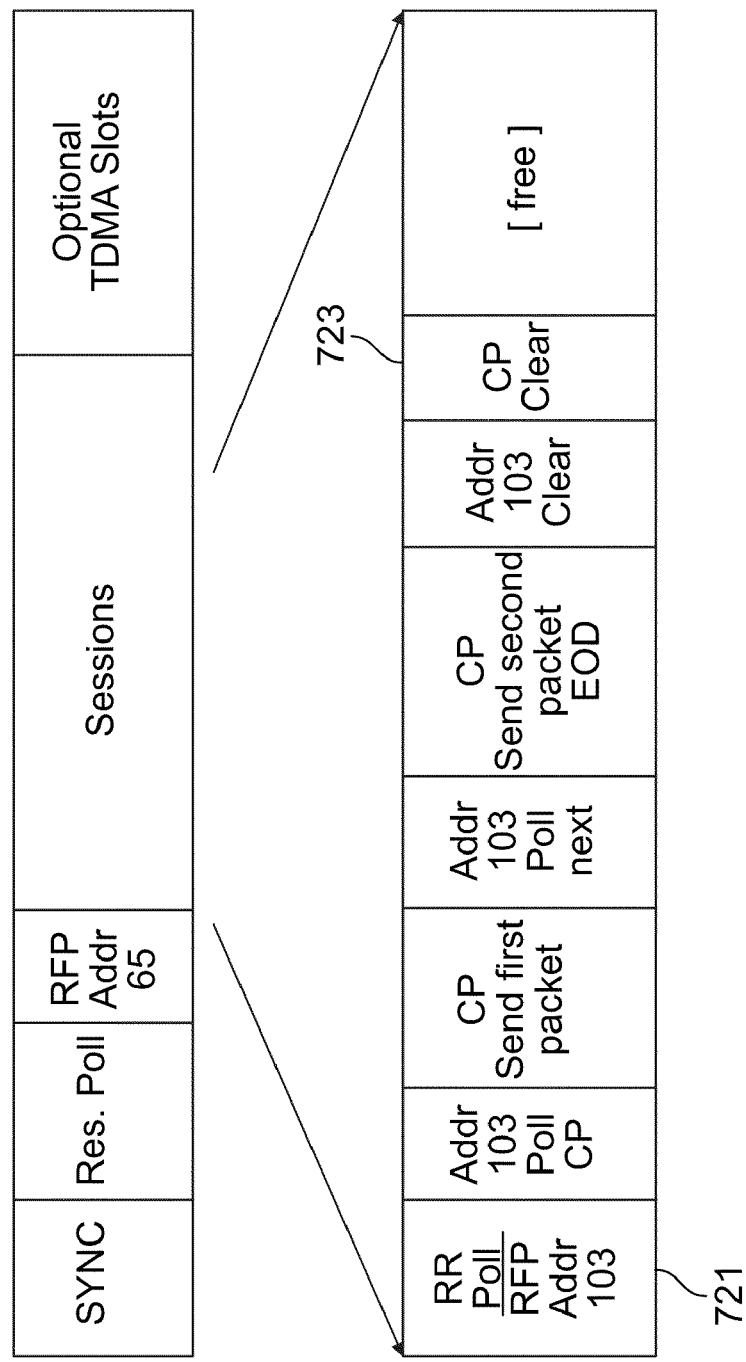
FIG. 7B illustrates a sequence in an access interval used by the hierarchical network of the present invention for transferring data from a control point device to a remote device.

Outbound messages are transmitted in a similar fashion as inbound messages, with the Control Point and device roles largely reversed as illustrated in FIG. 7b. When the Control Point reaches an address in the queue for which it has an outbound message, the Control Point transmits a Request for Poll 721 identifying the address of the device and the length of the message. The response back from the device would be a poll with an embedded length field. The same POLL/FRAGMENT/ACK/CLEAR structure and retry mechanisms as described above with regard to inbound messages in reference to FIG. 7a are maintained. The CLEAR from the device indicates a probability p of zero. If the polling queue is empty, the Control Point may send a final or terminating CLEAR 723 containing a probability for Explicit Idle Sense.

All terminating ACK or CLEAR messages contain fields to aid in synchronization of new units to the NET. The content of these fields is identical to that in the SYNC message, except that the timing character is deleted. Synchronization is discussed more fully below.

Broadcast Messages intended for groups of addresses, or all addresses within a NET may be transmitted during the sessions period. Broadcast messages are not individually acknowledged. These messages may be communicated at intervals over the course of several Access Intervals to provide reliable communication. Messages such as SYNC and Reservation Polls are specialized broadcast messages, with dedicated bandwidth in the Access Interval structure.

Security of payload data is left to the higher protocol layers. Application programs resident in portable/mobile devices may employ encryption or other means of providing protection against undesired use of transmitted data.

Portable/mobile devices may employ transmitter power control during the sessions period to reduce potential interference with other NETs that may occasionally be on the same or adjacent channels. These devices will use Received Signal Strength Indicator readings from outbound messages to determine if transmitter power may be reduced for their inbound transmission. Because of the need to maintain channel reservations and Listen Before Talk capabilities, the Control Point device does not use transmitter power control. Since Control Point devices are generally part of an installed system infrastructure, they are likely to be physically separated from devices operating in other NETs. They are therefore less likely to cause interference to devices in other NETs than portable devices, which may operate in proximity to devices in other NETs.

Often, control point devices will empty the polling queue before the conclusion of the access interval. Two mechanisms within the Access Control Protocol, Explicit and Implicit Idle Sense, are provided to improve bandwidth utilization. These supplemental access mechanisms often provide means for devices that failed to gain reservations during the reservation phase to gain access to the NET within the Access Interval. To assume an Explicit or Implicit Idle Sense, a device must have detected a valid SYNC and Reservation Poll in the current Access Interval.

The incorporation of a probability factor $p \neq 0$ in the final (terminating) ACK or CLEAR from the control point device provides the function of an Explicit Idle. Sense (mentioned above). Devices with transmission requirements solicit Request for Polls using the same rules normally used for a single slot Reservation Poll. Successfully identified addresses are placed in the polling queue, and are polled immediately or in the next Access Interval depending on the time remaining in the current Access Interval. The p factor for Explicit Idle Sense is subject to the same optimization algorithm as the Reservation Poll probability.

Communication of channel reservations, in the form of the length fields in Polls and Message Fragments is useful to units seeking to access the NET through Explicit Idle Sense. Reservations allow devices to predictably power down during the period that another device has reserved the NET to conserve battery power, without losing the ability to gain access to the NET.

Implicit Idle Sense provides an additional means of channel access. An Implicit Idle Sense is assumed whenever a device detects a quiet interval period greater than or equal to the duration of a Poll plus the maximum fragment length after a channel reservation has expired. Detection based upon simple physical metrics, such as a change in Received Signal Strength Indicator or lack of receiver clock recovery during the quiet interval, are preferred methods of ascertaining channel activity. Algorithms based upon these types of indicators are generally less likely to provide a false indication of an inactive channel than those that require successful decoding of transmissions to determine channel activity. False invocation of an Implicit Idle Sense is the only mechanism by which data transmissions are subject to collision within the NET. Thus, the Implicit Algorithm must be conservative.

Quiet interval sensing may begin at the following times within the Access Interval:
  a. any time after the last reservation slot following a Reservation Poll;
  b. any time after a terminating ACK or CLEAR indicating an Explicit Idle Sense;
  c. following an unsuccessful response to a single Slot Reservation Poll; or
  d. any time prior to reserved Time Division Multiple Access time slots at the end of the Access Interval.

It is preferable that devices detecting a quiet interval use a p persistent algorithm for channel access to avoid collisions. The probability factor for Implicit Idle Sense Access will generally be less than or equal to the factor in Explicit Idle Sense.

A device must receive the SYNC and Reservation Polls at the beginning of an Access Interval to use Implicit Idle Sense. The Reservation Poll provides indication of guaranteed bandwidth allocation to scheduled services at the end of the Access Interval, which may shorten the period available for Bandwidth On Demand communications.

Devices that require scheduled services must contend for the channel in the same fashion as those requiring Bandwidth On Demand access. When polled, these initiating devices will initiate a connection request that indicates the number of inbound and outbound Time Division Multiple Access slots required for communication, and the address of the target device with which communication is desired. The network infrastructure will then attempt to establish the connection to the target device. Once the connection is established, the Control Point device will signal the allocation of slots to the initiating device. Time Division Multiple Access slots are relinquished by transmitting a disconnect message to the control point device in the Time Division Multiple Access slot until the disconnect is confirmed in the next Reservation Poll.

The transmission requirements of speech and slow scan video (scheduled services) are similar. In one embodiment, Time Division Multiple Access slots are allocated as multiples of 160 bits payload at 1 MBIT/sec, plus overhead for a total of 300 µs. For 10 ms access intervals, acceptable voice communication can be obtained by allocating 1 Time Division Multiple Access slot each for inbound and outbound communication per access interval. For 20 ms access intervals, two slots each way is required. A system employing 10 ms access intervals at 100 hops per second may improve transmission quality by using two or three slots each Access Interval and sending information redundantly over two or three access intervals using interleaved block codes. Scheduled transmissions are generally not subject to processing or validation by the control point device, and are passed through from source to destination. Use of interleaved error correction coding or other measures to improve reliability is transparent to the NET.

The selection of certain system parameters is important when considering scheduled services. As an example, since speech is quantized over the duration of the access interval and transmitted as a burst, the length of the access interval translates directly into a transport delay perceptible to the recipient of that speech. In real time "full-duplex" voice communications, delays longer than 20 ms are perceptible, and delays longer than 30 ms may be unacceptable. For real time "half-duplex" voice communications, much longer delays often prove acceptable.

Real time full-duplex voice communication delays sometimes prove too excessive where the premises LAN is interconnected with the public switched telephone network ("PSTN"), which introduces its own delays. Two way services (i.e., full-duplex services) such as voice communications are the most sensitive to transport delay because delay impacts the interaction of the communicating parties. One way services (i.e., half-duplex services) are less sensitive to transport delay. One way services are good candidates for interleaving or other forms of redundant transmission.

Similarly, the selection of hop rate is important, as hop rate determines the duration of outages that may occur. If one or more frequencies in the hop sequence are subject to interference, for instance, scheduled transmissions during those hops will be disrupted. In a system that hops slowly, detrimental outages of hundreds of milliseconds will occur resulting in poor transmission quality. Occasional losses of smaller durations, e.g., 10 ms or 20 ms, are generally less perceptible, indicating that faster hop rates are desirable if the NET is to offer real time voice transport.

Scheduled service intervals may also be used for data transport on a scheduled or priority basis. Telemetry, data logging, print spooling, modem replacement, or other functions are possible. For these activities, a few Time Division Multiple Access slots scheduled for example every fourth, eighth, or sixteenth AI are necessary.

Because of multipath and dispersion issues with 2.4 GHz transmission at relatively high data rates, the ability of the NET to adaptively switch between two or more data rates is desirable.

In one embodiment, implementation of data rate switching may be accomplished by selecting a standard rate of communications, e.g., 250 KBPS and a high rate of communications of 1 Mbit/sec. Messages that contain system status information, including SYNC, Reservation Polls, Reservation Resolution Polls (Request for Polls), Polls, ACKs and CLEARS are transmitted at the standard rate. These messages are generally short, and the time required for transmission is largely determined by hardware overhead, e.g., transmitter receiver switching time. The incremental overhead introduced by transmitting these messages at the lower rate is therefore small in comparison to the total length of an access interval. The reliability of reception of these messages will increase, which will eliminate unnecessary retries in some instances where fragments are received successfully, but acknowledgments or polls are missed.

A test pattern at the higher data rate is inserted in each Poll (not in Reservation Polls, however). The Poll recipient evaluates signal quality based on the high data rate test pattern, Received Signal Strength Indicator, and other parameters to determine whether to transmit a fragment at the high rate or the low rate. Fragment lengths are selected such that high and low rate maximum fragment lengths are the same duration. In other words, a fragment at the low rate conveys approximately ¼ the payload of a fragment for the case where the data rate is four times greater. This method is generally suitable for transaction oriented communications, which frequently require short message transmissions. Alternatively, the length field in Polls and messages can be used to allow different fragment lengths for the two data rates while still providing channel reservation information to other devices in the NET. This method also provides for forward migration. As modulation and demodulation methods improve, newer products can be added to old networks by upgrading Control Points devices. Both new and old devices share the ability to communicate at a common low data rate.

An alternate embodiment uses signaling messages such as SYNC, Reservation Polls, Request for Polls, etc., at the higher rate with fall back operation to the standard rate for the communications sessions only. SYNC and Reservation Polls at the high rate constitute a high data rate test message. The Request for Poll response to the Reservation Poll at the high rate may include a field indicating that sessions communications should take place at the fall back, standard rate. Signal quality measures such as signal strength and clock jitter are appropriate. Data rate selection information is included with the device address in the polling queue. When the device is polled, it will be polled at the rate indicated in the Request for Poll. Channel reservation information in the Reservation Resolution Poll will indicate the reservation duration based upon the data rate indicated.

In this alternate embodiment, the fact that SYNC and Reservation Polls must be detectable at the high data rate prioritizes access to the NET for those devices that have acceptable connectivity during the current access interval. This general approach has desirable characteristics in a frequency hopping system, as the propagation characteristics between devices may change significantly as the NET changes from frequency to frequency within the hopping sequence, or over several Access Intervals during the dwell time on a single frequency. Reduction in data rate in this system is primarily intended to remedy the data smearing (inter-symbol interference) effects of dispersion due to excess delay, rather than temporarily poor signal to noise ratio due to frequency selective fading. Devices that receive high data rate transmissions with acceptable signal strength but high jitter are likely to be experiencing the effect of dispersion.

The concept of allowing Polls and message fragments to occur at an either high or low data rate could create difficulties for other NET constituents that need to be able to monitor the channel for reservation information. Two embodiments for solving this problem are the use of auto-discriminating receivers or the use of fixed data rate headers for system communications.

Auto discrimination requires the receiver to process messages sent at either data rate, without necessarily having prior knowledge of the rate.

Given a high rate of 1 MBIT/SEC, and a low Rate of 250 KBPS, i.e., one being a binary multiple of the other, it is possible to devise preambles that can be received at either rate. Consider that 01 and 110 sent at the low rate correspond to 00001111 and 111111110000 at the high rate. These preambles are transmitted continuously before the transmission of the High-Level Data Link Control FLAG character at the correct data rate indicating the start of a message. In this example, a preamble of 20 bits of 01 at the low rate indicates operation at the high rate. A preamble of 30 bits of 110 indicates operation at the low rate. A receiver tuned to either rate is capable of receiving both types of preambles and initiating the proper decoding mechanisms for the intended rate of transmission.

This general technique, with appropriate selection of preamble content, is applicable to binary modulation schemes, for example, a frequency modulated system where a common frequency deviation value is used for both data rates. It is also applicable to systems where switching occurs between binary and multilevel modulation, such as disclosed in pending U.S. application Ser. No. 07/910,865, filed Jul. 6, 1992.

Figure 25:
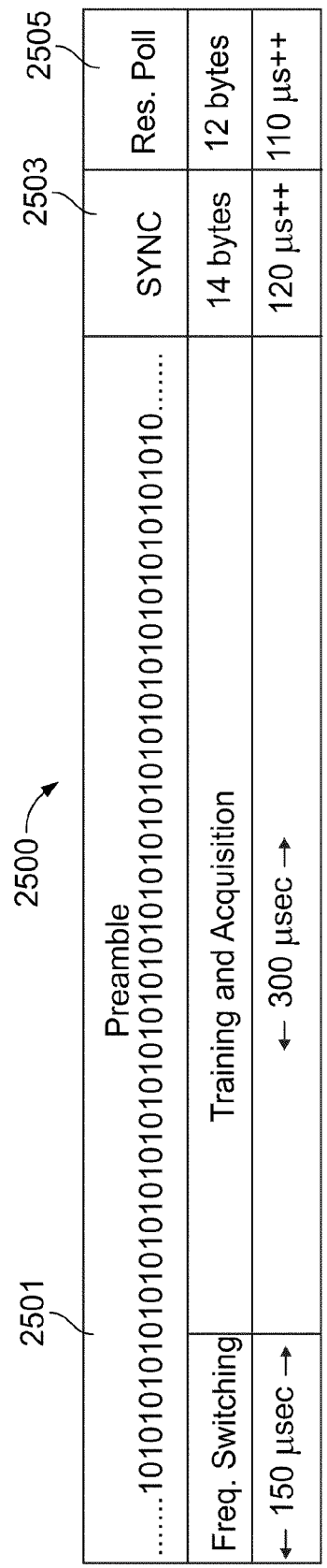
FIG. 25 illustrates a portion of an access interval including the preamble, SYNC and Reservation Poll.

Referring now to FIG. 25, a preamble 2501, a SYNC 2503 and a Reservation Poll 2505 are illustrated. The preamble 2501 starts at the beginning of the Access Interval 2500 and applied to an RF modem while it is switching frequencies. Since the switching time is a worst case, this causes the preamble 2501 to be present and detectable prior to the allocated 150 μsec period in some instances. It would be equally appropriate to begin preamble transmission 50 or 100 μsec into the switching period if that would be more convenient. The timing has been selected to allow 100 μsec.

Figure 27:
FIG. 27 illustrates the information contained in a sample Reservation Poll.

Referring to FIG. 26, a sample SYNC message 2600 is shown. Referring to FIG. 27, a sample Reservation Poll 2700 is shown. In these examples, the hopping synchronization information has been positioned in the Reservation Poll 2700.

With auto-discrimination, it is possible to change data rates on a per-poll basis, thereby adjusting for channel temporal dynamics. Since all devices in the NET have auto discrimination capabilities, and channel reservation information is included in message headers as a length field, the bandwidth reservation features of the NET are preserved. The maximum fragment duration may be maintained at a fixed value, meaning that low data rate fragments convey less data than their high rate counterparts, or may be scaled in the ratio of the data rates to allow consistent fragment data payloads.

An alternative to auto-discrimination is the use of headers to communicate system information. This embodiment is less preferred, but may be appropriate if economics, size, or power constraints dictate a simpler design than that required for auto-discrimination. In this embodiment, any transmission at the lower data rate is preceded by a header at the high data rate that conveys NET management information, i.e., channel reservation status. Devices other than those directly involved in polling or fragment transmission need only monitor at the high rate for channel reservation information. The header at the high rate and the following transmission at the low rate are concatenated High-Level Data Link Control frames, with an appropriate preamble for low rate clock recovery synchronization inbetween.

For the communicating devices, the header can serve the additional purpose of acting as a test pattern at the high rate. For example, if a device is polled at the low rate, but successfully decodes the high rate header with adequate signal quality, it may indicate back to the polling unit to poll again at the high rate.

In a premises LAN as discussed in reference to FIG. 1, many NETs may be distributed geographically to provide enhanced coverage or additional system capacity. The wired portion of the network infrastructure, such as Ethernet or Token Ring, provides a means for coordination of NETs to achieve optimum system performance. An equally important role of the wired infrastructure is to allow resource sharing. Portable devices with limited memory capacities, processing power, and relatively small batteries may access large data bases on, or remotely initiate processing capabilities of, larger AC powered computer systems. Portable/mobile devices may also share communication with other like devices which are serviced by other NETs well beyond the radio coverage range of their own NET.

The basic method for communication of status information regarding the premises LAN is the HELLO message. HELLO messages are sent routinely, but relatively infrequently, for example, every 90 Access Intervals. The HELLO transmission interval is tied to the Priority SYNC interval, so that the HELLO interval corresponds to Access Intervals where SYNC is transmitted if the network is lightly utilized.

Figure 8:
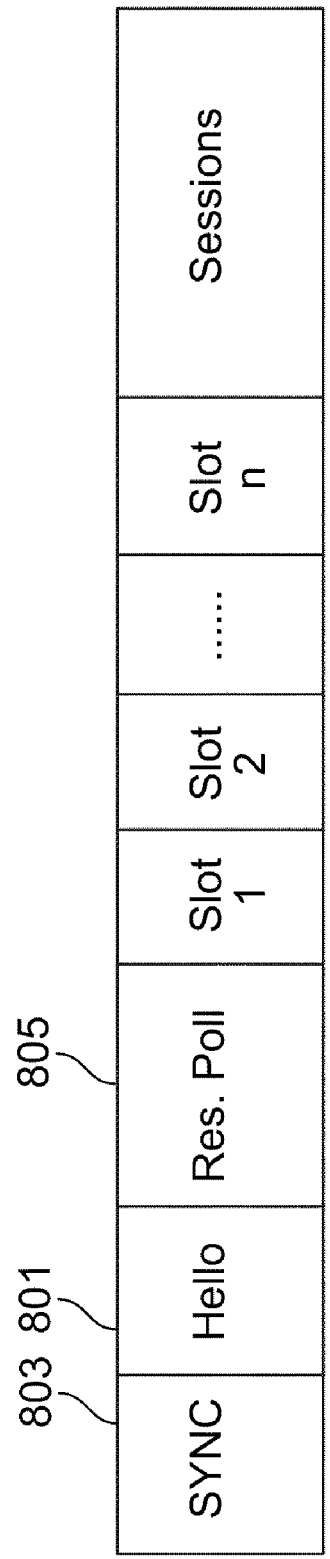
FIG. 8 illustrates a preferred embodiment of an access interval used by the hierarchical network of the present invention.

In an alternate embodiment, HELLOS could be inserted as a broadcast message at the beginning of the Sessions period. FIG. 8 illustrates a preferred Access Interval embodiment where a HELLO message 801 is inserted between a SYNC 803 and a Reservation Poll 805. The SYNC frame at the beginning of the Access Interval indicates that the Access Interval will contain a HELLO, allowing power managed devices to remain awake to receive the HELLO.

HELLO messages may also contain information regarding pending changes in the local NET. If the local NET is changing Access Interval durations or hop sequences, for instance, changes may be communicated in several consecutive HELLOs so that the information is reliably communicated to all NET constituents, permitting all devices to make the change in coordinated fashion. Further discussion of HELLO message content is provided below.

For purposes of channel management in the Access Interval structure, the maximum transmission duration by a device should be limited to the time that the device moving at a maximum expected velocity can traverse ¼ wavelength of the maximum carrier frequency. The duration may be further reduced to compensate for link bit error rate characteristics or expected duration or frequency of interference bursts. A maximum transmission duration of 2.5 ms is suitable for 1 MBIT/SEC transmission, with a device velocity of 15 mph, in a multiple NET environment.

Use of spatial or polarization antenna selection diversity is also desirable in indoor propagation environments. First, the receiving unit makes an antenna diversity decision during the preamble portion of each transmission. The antenna used for reception for each device address is then recorded in memory so that the correct antenna will be used for response messages to each address. While diversity selection is only valid for a short time, it is not necessary to age this information, because antenna selection is equi-probable even after diversity information is no longer valid.

The Access Interval structure of the present invention also inherently provides routine channel sounding for each hop. This is important in a frequency hopping system, as channel conditions will vary considerably from frequency to frequency within the hopping sequence. NET constituents must, in most cases, be able to receive SYNC and Reservation Poll transmissions from the Control Point device to attempt inbound access in an Access Interval. This provides a positive indication that the device is not experiencing a channel outage, allowing power saving and eliminating possible channel contention. Channel sounding does not need to be employed during periods where the NET is not busy since contention is unlikely in this situation.

Channel sounding for Outbound messages is accomplished through a Request for Poll/Poll cycle where handshaking messages with short time out periods must be successfully communicated before longer message transmissions may be attempted.

As discussed above with regard to FIG. 1, a premises LAN consists of several access points 15 located throughout an environment requiring wireless communications, e.g., a building or other facility, or a campus comprising several buildings. The access points 15 are placed to provide coverage of intended usage areas for the roaming portable or mobile computing devices 20. Coverage areas must overlap to eliminate dead spots between coverage areas.

The access points 15 may be interconnected via industry standard wired LANs, such as IEEE 802.3 Ethernet, or IEEE 802.5 Token Ring. Access points may be added to an existing LAN without the need to install additional LAN cable. Alternatively, it may be desirable to install access points on dedicated LAN segments to maximize performance of both the radio network and other collocated computer devices.

Access points within the premises LAN provide Control Point functions for individual NETs. NETs employ different hopping sequences to minimize potential interference between NETs. Regulatory restrictions generally preclude synchronization of multiple NETs to a single master clock, requiring that individual NETs operate independently from one another. The lack of the ability to coordinate timing or frequency usage between NETs introduces the potential for collisions between independent NETs with overlapping coverage areas.

Figure 9:
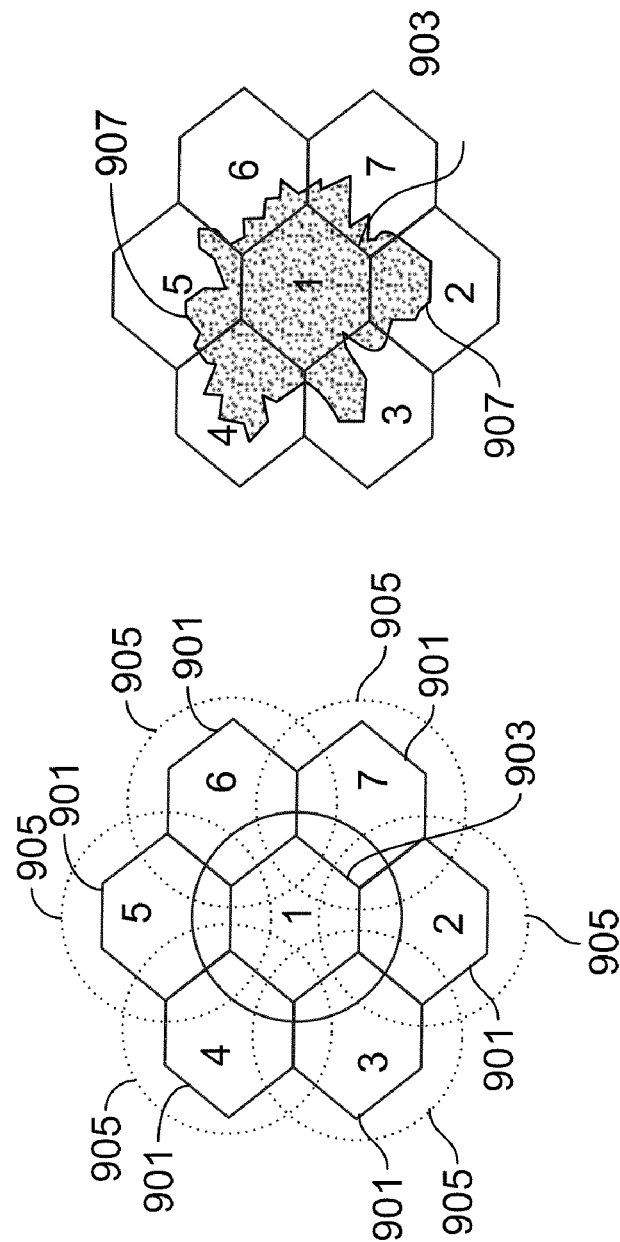
FIGS. 9A and 9B conceptually illustrate how multiple NETs may be employed in an idealized cellular-type installation according to the present invention.

FIGS. 9a and b conceptually illustrate how multiple NETs may be employed in an idealized "cellular" type installation. Each hexagon 901 and 903 in FIG. 9a represents the primary coverage area of a given NET. Coverage areas are modeled as circles 905 based upon some reliability criterion, for example a 5% mean fragment retry rate (on average 95% of fragments are successfully communicated on the first attempt). Typical coverage areas are determined by physical attributes of the area in which the NET operates. As illustrated in FIG. 9b for the hexagon (NET) 903 of FIG. 9a, an actual coverage area 907 meeting the reliability criterion is likely to be irregular. This may require access points to be offset significantly from the hexagonal grid.

Figure 10:
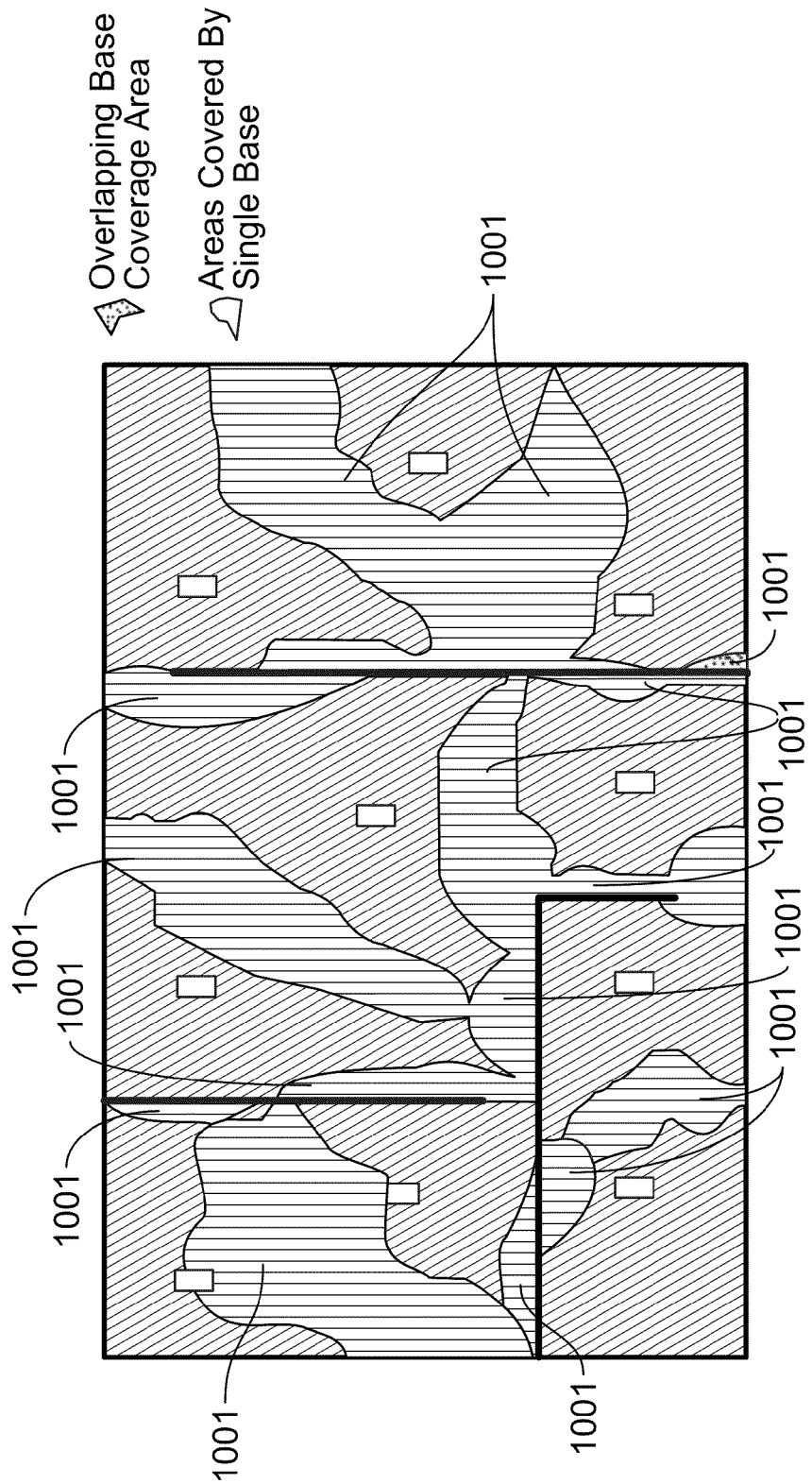
FIG. 10 illustrates an access point coverage contour overlap for the multiple NETs Infrastructured Network of FIG. 1.

FIG. 10 illustrates a coverage contour overlap for the multiple NETs in the premises LAN of FIG. 1. Darken shaded areas 1001 indicate areas where access point coverage overlaps. Because the coverage distance of a radio system on an instantaneous basis greatly exceeds the coverage that can be provided on average to sustain a given quality of service, the overlap at any instant may be significantly greater than the coverage contours indicate.

Figure 11:
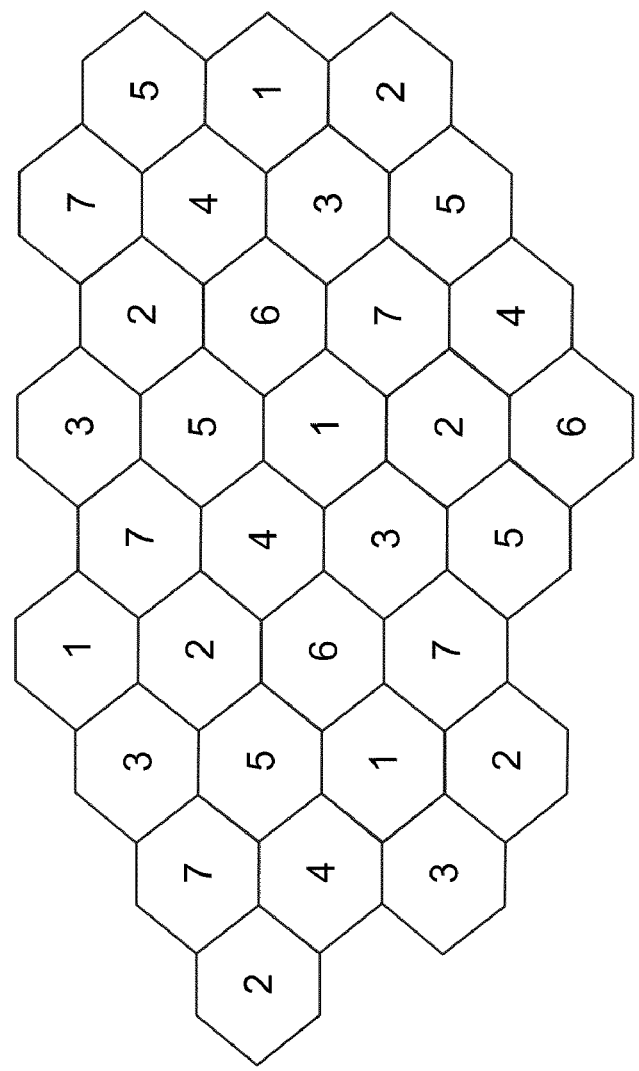
FIG. 11 illustrates hopping sequence reuse in a multiple NET configuration of the present invention.
Figure 12:
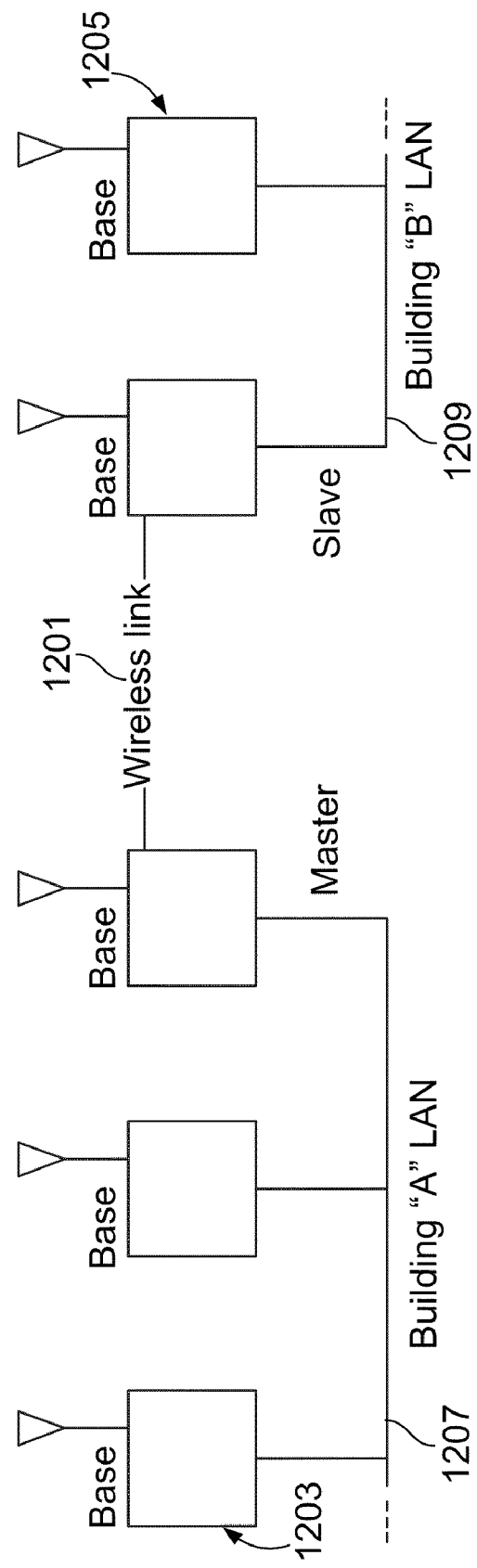
FIG. 12 illustrates a hierarchical infrastructured network of the present invention wherein a wireless link connects access points on separate hard wired LANs.

FIG. 11 illustrates hopping sequence reuse in a multiple NET configuration. Hopping sequence reuse may be necessary if there are physical constraints on the number of hopping sequences that can be supported. For example, devices may have limited memory available for hopping sequence storage. Use of a smaller set of sequences also simplifies the task of determining sets of sequences that have acceptable cross correlation properties. In FIG. 12, 7 hopping sequences 1 through 7 are used throughout the coverage area. Other NETs may reuse the same hopping sequence at some distance removed. While 7 NETs are illustrated, larger numbers, such as 9 or 15 may provide a better compromise between minimizing the number of hopping sequences used, and reuse distance between NETs using the same sequence. Reuse requires coordination of hopping sequence assignment—either the system installer can coordinate the installation, or the system may include automated management features to assign hopping sequences to individual NETs.

Since NETs are not synchronized, different NETs that use the same hopping sequence are likely to interfere during periods where oscillator drift causes them to be temporarily synchronized. At other times, they may only interfere due to imperfect channelization. For example, for a worst case 100 ppm frequency error between two NETs using the same 79 frequency sequence at one Access Interval per hop and 50 hops per second, NETs will partially or fully overlap for a duration of 10 minutes every 4.3 hours. Typically the frequency error will be 25% to 50% of the worst case, leading to longer overlap periods occurring less frequently.

NETs using the same hopping sequence must be physically isolated from one another to reduce interference to an acceptable level. Extensive hopping sequence reuse generally requires site engineering and optimization of access point placement. Using more hopping sequences reduces the need for critical system engineering during installation. Fifteen hopping sequences is a preferred number for hopping sequence reuse, allowing simplified installation and minimal coordination.

NETs that use different hopping sequences will also temporarily synchronize in timing relationships that cause mutual co-channel interference on common channel frequencies. Since the number of channels that must be used in a sequence is a significant fraction of the total number of channels available, all sequences will share some number of frequencies in common. When sequences are time aligned so that a common frequency is used simultaneously, interference can occur. Optimization of sets of sequences for low cross correlation is necessary to prevent various time alignments of sequences from having more than one or two frequencies in common.

Optimization of hopping sequences for multiple NETs must also include analysis of imperfect channelization. The performance characteristics of the RF modems may not, for economic or power consumption reasons, provide sufficient transmitter spectral containment, receiver dynamic range, or receiver selectivity to guarantee that devices operating on different frequencies in proximity to one another will not interfere. In selecting hopping sequences for desirable cross correlation properties, adjacent and alternate adjacent channel interference must be considered. Protocol retry mechanisms for fragments lost to adjacent channel interference or limited dynamic range may be randomized to prevent continued disruption of communications in the affected NET.

Often in campus environments where systems must provide coverage in several buildings, the cost of wiring LAN cable between access points is prohibitive. To establish connectivity between access points in a premises LAN, it may be necessary to provide wireless links between groups of access points connected to separate LAN segments. FIG. 12 illustrates a wireless link 1201 connecting groups of access points 1203 and 1205. The access points 1203 and 1205 are connected on separate LAN segments 1207 and 1209.

In one embodiment, the access points 1203 and 1205 may be configured in a wireless point to point mode, wherein one access point serves as a control point device while the others operate in a slave mode dedicated to point to point data transfer. Slave access points are configured to operate as portable/mobile devices, and forward communications to master bases by sending Request for Polls during reservation opportunities or Implicit Idle Sense periods. Because of the potential high traffic of point to point links, separate NETs may be allocated for this purpose, with a master communicating with one or more slave units. Master units may also communicate with other portable/mobile devices. The COST weighing (discussed below) in a slave's HELLO transmission is preferably set to a high value, to force portable/mobile devices which can connect to another NET to do so.

Figure 13:
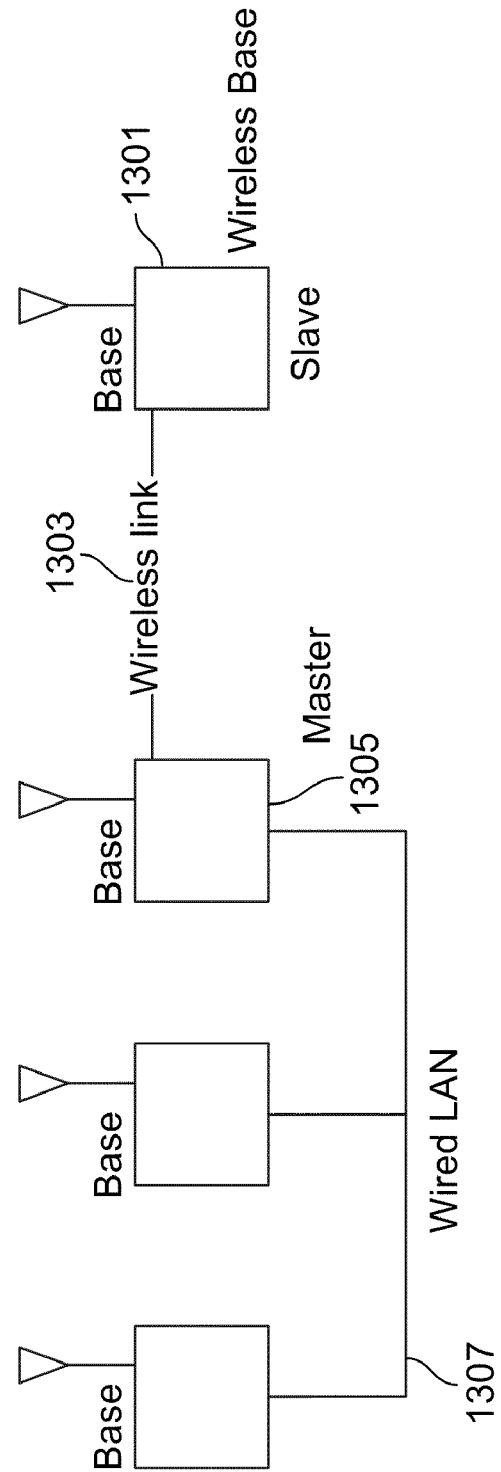
FIG. 13 illustrates a hierarchical infrastructured network of the present invention including a wireless access point.

In another embodiment, it may also be desirable to support wireless access points. Wireless access points serve as control points, but are not connected to the infrastructure through a LAN cable. As illustrated in FIG. 13, a wireless access point 1301 participates in the premises LAN through a wireless link 1303 to an access point 1305 that is connected to a LAN 1307.

Wireless access points operate as slave devices to master access points which are connected to the wired infrastructure. The wired and wireless access points share the same hopping sequence, and are synchronized as a common NET. Because they are not connected to the Infrastructure, wireless access points must be used as store and forward devices. Each transmission to a wireless base must be retransmitted to the intended destination device, doubling the number of transmissions occurring in the NET. Wireless access points are preferably used for supplementing coverage area of the premises LAN. For example, a wireless access point might provide spot coverage of isolated "dead spots" where data traffic is limited or where providing a wired LAN connection is difficult. Wireless access points may also serve as emergency spares to provide coverage in the event of a failure of a primary access point. In this role, the wireless access point may be either permanently installed in selected locations, or stored in a maintenance area and quickly positioned and connected to AC or battery power to provide communications while repairs are made to the primary wired access point. Moreover, permanently installed wireless access points might also be used for redundancy, i.e., to monitor an associated access point and to take over when a breakdown is detected.

The preferred wireless access point embodiment uses interleaved access intervals. The parent wired access point and secondary wireless access point coordinate Access Intervals, the wired access point deferring every third or sixth access interval to the wireless base. Since the wired access point transmits priority SYNC messages every third Access Interval, the wireless access point may routinely be allocated one of the two intervening Access Intervals for priority SYNC communications with devices that are attached to it. Communication between the wired and wireless access points may occur during Access Intervals initiated by either access point. Wireless access points may also communicate with devices during an Access Interval using Implicit or Explicit Idle Sense.

This embodiment provides predictable access for devices attached to the wireless NET, and allows the same power management algorithms to be used regardless of whether the access point is wired or wireless. The wireless access point may transmit its own priority SYNC and HELLO messages. Also, devices seeking communications with the wireless access point will automatically be synchronized with the wired base as well, allowing immediate improved access to the network if their mobility has put them within range of the wired base.

Because of the constraint of sharing bandwidth with a wired access point, connectivity of wireless access points is normally limited to one per wired access point. However, in cases where system loading is predictably and consistently light, multiple wireless access points could share a single wired base, e.g., each transmitting in turn in the Access Intervals between the Wired Base Priority SYNC Access Intervals.

Wireless access points are capable of supporting scheduled traffic. However, since each transmission to a wireless access point must be forwarded, scheduled transmissions through wireless access points use twice the bandwidth as those through wired access points. In other words, twice the number of Time Division Multiple Access slots must be allocated. To avoid introducing excessive delay, communications must be forwarded during the same Access Interval that they are received, or shorter Access Intervals must be used. Scheduled traffic slot assignments must be common to all wireless bases operating within a single NET.

Wireless access points require reliable communication with their wired counterparts. This dictates smaller coverage contours for wireless access points. If a wired access point provides 80,000 square feet of coverage area, a wireless base can be predicted to provide only an additional forty percent coverage improvement, due to overlap with the wired access point. Frequently, access points are mounted at ceiling level, providing a relatively clearer transmission path between access points than exists between bases and portable/mobile devices located in more obstructed areas near the floor. With careful site engineering and installation, a wireless access point can provide somewhat better than the forty percent predicted improvement, but still less than the coverage of an additional wired base.

As discussed above, HELLO messages are used to communicate NET and premises LAN status messages. They facilitate load leveling and roaming within the premises LAN and allow sequence maintenance to improve security and performance within the NET. HELLO messages occur periodically in Access Intervals that contain priority SYNC messages. HELLOs are sent periodically relative to the sequence length, for instance, every 90 Access Intervals. HELLOs, like SYNC information, are optionally encrypted to provide greater security.

Each HELLO message includes a field for COST. COST is a measure of the access point to handle additional traffic. A device determining which of two or more access points having adequate signal strength to register which will select the base with the lowest COST factor.

The base computes COST on the basis of how many devices are attached to the NET, the degree of bandwidth utilization, whether the base is wired or wireless, the number of frequencies experiencing consistent interference within the sequence, and the quality of the connection the base has within the premises LAN.

Figure 14:
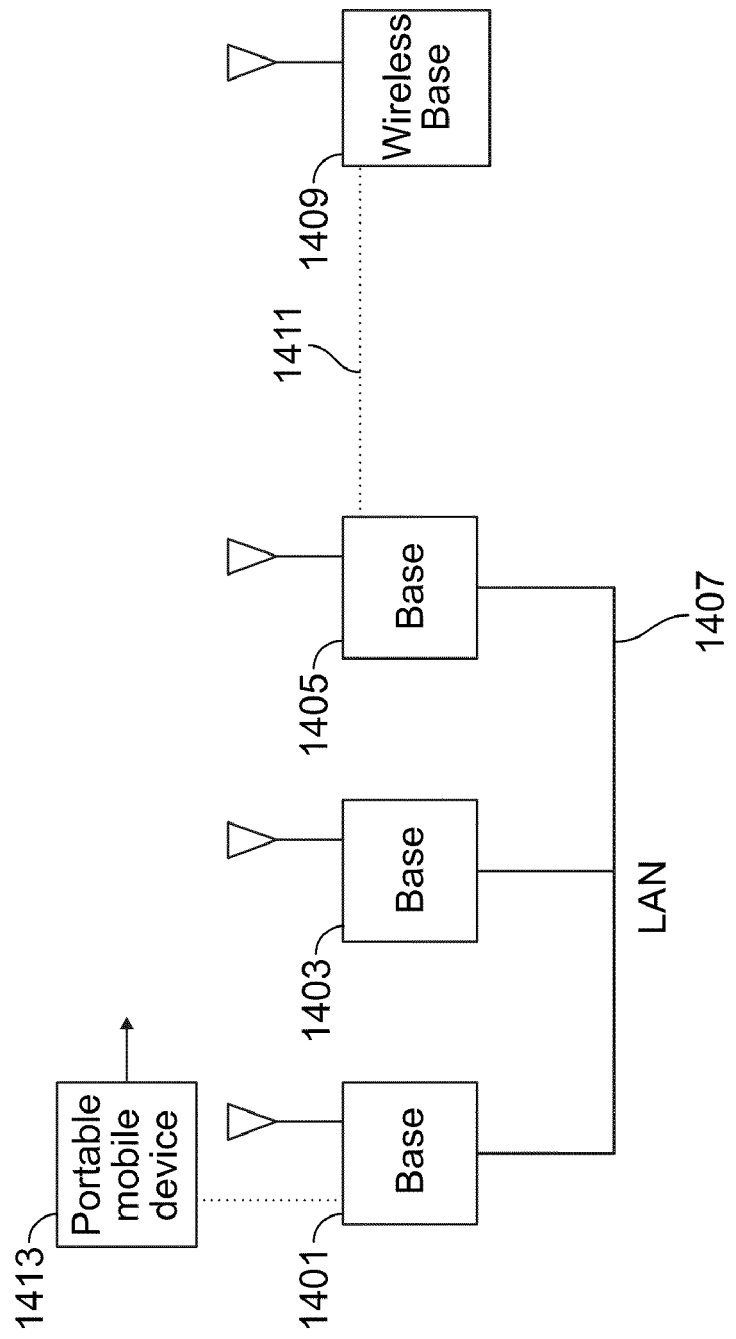
FIG. 14 illustrates conceptually access points communicating neighboring access point information to facilitate roaming of portable/mobile devices.

FIG. 14 illustrates the concept of access points communicating neighboring access point information through HELLO messages to facilitate roaming of portable/mobile devices. In a premises LAN, access points 1401, 1403 and 1405 communicate SYNC information amongst themselves via wired backbone (LAN) 1407. In addition, a wireless access point 1409 (discussed above) similarly communicates with the access points 1401, 1403 and 1405 via a wireless link 1411. A portable/mobile device 1413 is initially registered with access point 1401, which acts as a control point for the portable/mobile device 1413. HELLO messages transmitted by access point 1401 to portable/mobile device 1413 contain fields for neighboring access points 1403, 1405 and 1409. These fields may indicate, for example, addresses of the neighboring bases, their COST, the hopping sequences, hopping sequence indices, number of Access Intervals per hop, and NET clock. The portable/mobile device 1413 detects the HELLOs transmitted from access point 1401 and uses the information for coarse synchronization with the other access points 1403, 1405 and 1409. This permits the portable/mobile device to roam between access point coverage areas (i.e., between different NETS) without going through a full acquisition phase. Roaming of portable/mobile devices is discussed in more detail below.

Simply put, communication of neighbors' information permits each access point to advise its associated portable/mobile devices (i.e., those having common communication parameters) on how to capture HELLO messages from neighboring access points having different communication parameters. Such communication parameters may include, for example, hopping sequences, spreading codes, or channel frequencies.

For example, neighbors' information transmission is appropriate in any case where the system uses more than a single channel. For instance, in a direct sequence architecture, a single spreading code is often used. Capacity can be added to such a network by employing different spreading codes at each access point. The neighbors' information included in the HELLO message from a given access point would include the spreading sequences of access points providing coverage in adjacent coverage areas. Likewise, in a multiple frequency channelized system, HELLO messages would include the channel frequencies of adjacent access points.

In addition to facilitating roaming, communication of neighbors' information may also facilitate the initial selection of an access point by a portable/mobile device attaching to the premises LAN for the first time.

Access point HELLO messages may also facilitate adaptive access point transmitter power control. For example, each access point HELLO transmission could specify the transmitter power level being used by the access point. If a given attached portable/mobile device notes that the current access point transmitter power level is unnecessarily high (creating the possibility of interference with other access points), the portable/mobile unit could send a message to the access point indicating as such, and the access point could adjust the transmitter power level accordingly.

HELLO messages also enable communication of information indicating to all devices that certain changes in the NET are required. For example, the NET may switch hopping sequences periodically to improve security, or to avoid interference sources that consistently interfere with one or two frequencies within a given sequence. Interference may result from outside sources, or from other NETs. Changes to the NET are communicated over the course of several HELLO messages (with a countdown) before the change occurs, so that all devices are likely to be aware of changes and synchronize at the instant of change.

In addition, if encryption is used, the encryption key may be periodically changed in HELLOs. Like hopping sequence changes, KEY changes are sent over several HELLOS, and are encrypted using the existing key until the change goes into effect.

As mentioned above, roaming portable and mobile computing devices operating in the premises LAN will routinely move between access point coverage areas. At the maximum device velocity and expected coverage area per access point, a mobile device may be expected to cross a NET coverage contour in several seconds. Because of the use of multiple, non-synchronized frequency hopping NETs, it is more difficult to provide for simple hand-off between access points than it would be in a system that used cellular techniques with a single frequency per cell. The premises LAN makes special provisions for roaming by transmitting coarse frequency hopping synchronization information in HELLO messages.

The premises LAN uses a spanning tree algorithm to maintain current information regarding the general location of mobile devices within the network. When a device changes registration from one NET Control Point to another, routing information is updated throughout the infrastructure. Wired access points may broadcast spanning tree updates to attached wireless access points.

In the premises LAN, roaming portable and mobile devices initially select and register with an access point Control Point on the basis of link quality, i.e., signal quality, signal strength and COST information transmitted within HELLO messages. A device will remain attached to a particular access point until the link quality degrades below an acceptable level, then it will attempt to determine if an alternative NET is available. Different device operating scenarios dictate different roaming strategies, discussed below.

An idle device monitors SYNC and HELLO messages from the Control Point device to maintain NET connectivity. Type 2 devices do not employ power management, and always maintain their receivers in an active state. They monitor all SYNC messages. Type 1 and Type 3 devices typically employ power management, operating in standby or sleep modes of operation for many Access Intervals before activating their receivers for monitoring SYNC and HELLO messages. Control Points are guaranteed to send Priority SYNC frames every third Access Interval. HELLOs occur every 30th Priority SYNC frame. Power managed devices employ sleep algorithms synchronized to wake for the minimum period necessary to guarantee receipt of priority SYNC, HELLO, and Pending Message transmissions before resuming SLEEP.

Type 2 devices are typically operated from high capacity vehicular power systems, eliminating the need for power management. These devices may travel at velocities near the maximum system design specification, dictating more frequent roaming. Type 2 devices will initiate a search for an alternative NET if SYNC messages are consistently received at signal strengths below a Roaming Threshold or if reception errors are consistently detected. Because of the effects of frequency selective fading, signal strength information is averaged over the course of several hops within the hopping sequence.

If roaming is indicated, the device initiates a Roaming Algorithm, using Neighbors' information from the most recent HELLO to attempt synchronization with another candidate NET. If SYNC is not detected within 6 hops, another candidate from the Neighbors list will be selected, and the process repeated. Once SYNC is attained on an alternative NET, the device will monitor signal strength and data errors for several hops to determine link quality. If link quality is acceptable, the device will continue monitoring until a HELLO is received. If COST is acceptable, it will then register with the new NET. The Control Point device will update the spanning tree over the wired backbone (or by RF if a wireless base). If link quality or COST is unacceptable, another candidate from the Neighbors list is selected and the process repeated. This continues until an acceptable connection is established. If a connection cannot be established, the device must return to the original NET or employ the initial acquisition algorithm.

Type 2 devices also have the option of monitoring other NETs before degradation of their NET connection. They may do so by monitoring their own NET for the SYNC and pending message list transmissions, then scanning other candidate NETs during the Sessions period of their NET. Other type devices may do so less frequently.

Type 1 and Type 3 devices may sleep extensively when idle, preferably activating every nine Access Intervals to resynchronize and check pending messages. Successful reception of at least one SYNC during three monitoring periods is necessary to maintain fine synchronization to the NET clock. Failure to receive two of three SYNC frames, or receipt of two or three SYNC messages with poor signal strength are possible indications of the need to further test link quality by remaining active for several consecutive SYNC transmissions. If signal strength or data errors over several hops indicates that link quality is poor, or if a received HELLO message indicates high COST, the roaming algorithm is initiated, and alternative NETs are evaluated, as in the case of Type 2 devices.

Some battery powered devices may sleep for periods of time more than nine Access Intervals. For example, devices with extremely limited battery capacity may sleep between HELLOs, or several HELLO periods, after which they must remain active for several consecutive Access Intervals to regain fine synchronization and assess whether to initiate roaming.

A Type 1, Type 2, or Type 3 device that has inbound message requirements immediately activates its receiver and waits for a SYNC and subsequent Reservation Opportunities.

A device that does not detect SYNC messages over the course of six Access Intervals immediately initiates the Roaming Algorithm.

Outbound messages for devices that have changed coverage areas, but which have not yet registered with a new Control Point device, are problematic. For example, in the premises LAN, messages will be forwarded to the access point that the device had previously been attached to. The access point may attempt to poll the device during one or more Access Intervals, then transmit the unit address in the pending message list periodically for several seconds before disregarding it. Once the unit attaches to a base, the message must be transferred from the previous access point for delivery to the unit. All of these activities require transmission bandwidth on either the backbone or RF media, waste processing resources within the premise LAN, and result in delayed delivery.

As this premises LAN embodiment is designed, the network has no means of distinguishing messages it cannot deliver due to roaming from messages that should be retried due to signal propagation characteristics, interference, or sleeping devices. For this reason, the roaming algorithm may be designed to allow devices to quickly detect that they have lost connectivity within their current NET, and re-attach to a more favorably located access point.

Some improvement in delivering pending messages to roaming terminals can be obtained by routinely propagating pending message lists over the wired backbone. When a device attaches to an access point, that base is able to immediately ascertain that the device has a pending message, and initiate forwarding of the message for delivery to the device.

In the preferred frequency hopping embodiment of the present invention, the hopping sequence consists of 3 m±1 frequencies, where m is an integer. 79 frequencies are preferred. This embodiment will support hopping rates of 100, 50 hops per second at 1 Access Interval per dwell, 25 hops per second at 2 frames per dwell, and 12.5 hops per second at 4 frames per dwell. Other rates can be supported for other Access Interval Durations. For example, if the Access Interval is optimized to 25 ms, hop rates of 80, 40, 20, and 10 hops per second would be supported.

All devices within the NET may have one or more hopping tables that contain potential hopping sequences that may be used. Up to 64 sequences may be stored in each device. Each sequence has an identifier, and each frequency in each sequence has an index. The sequence identifier and index are communicated in the SYNC transmission.

All SYNC transmissions may be block encrypted to prevent unauthorized devices from readily acquiring hopping synchronization information. To facilitate encryption, the encryption key may initially be factory set to a universal value in all devices. Users would then have the option of changing this key, by providing a new key to each device in the system. This may be accomplished through keyboard entry or other secure means. Keys may also be changed through the NET.

To facilitate hopping management, a hopping control portion of a protocol controller will download a hopping table to a radio modem, and will signal the radio modem when to hop. This approach consolidates timing functions in the protocol controller, while not requiring the controller to be concerned with conveying frequency selection data to the modem each hop.

The NET may switch hopping sequences periodically to improve security, or to avoid interference sources that consistently interfere with one or two frequencies within a given sequence. As mentioned above, changes to the NET are communicated over the course of several HELLO messages before the change occurs so that all devices are likely to be aware of changes.

Initial synchronization requires devices to ascertain the hopping sequence, the hop rate, and the specific frequency from the hopping sequence currently in use. Synchronization information is contained in two types of routine messages. The SYNC field at the beginning of an Access Interval contains synchronization information including the hopping sequence, the index of the current frequency within the sequence, the number of Access Intervals per hop, and the length of the Access Interval. It also contains a timing character that communicates the NET master clock to all listening devices. Termination messages in the Sessions period, ACK and CLEAR, contain the same information, but do not contain the timing character.

The simplest method for attaining synchronization is to Camp—select a quiet frequency that is likely to be within a sequence in use—and listen for valid synchronization information. If a SYNC message is detected, the listening device immediately has both coarse and fine synchronization, and can begin the registration process.

If SYNC is not detected, but a termination message is, then the device has acquired coarse synchronization. The particulars of the hopping sequence are known, but the boundaries of the dwells are not. To acquire fine synchronization, it begins hopping at the indicated hopping rate, listening for SYNC. If SYNC is not detected after a reasonable number of hops, preferably 12 or 15, the device reverts to camping.

The worst case scenario for synchronization is to synchronize to a single NET that is idle. Given a 79 frequency hopping sequence, one Access Interval per hop, and SYNC transmissions every third Access Interval if the NET is idle, it may take nine cycle times to guarantee that a SYNC transmission will be detected with 99.5% probability. At 50 hops per second, synchronization could require as long as 14 seconds. At 100 hops per second, 7 seconds is required.

At 2 Access Intervals per hop, a SYNC transmission is guaranteed to occur every frequency over 2 cycles of the hopping sequence. Six cycles are required for 99.5% probability of acquisition, corresponding to 19 seconds at 25 hops per second.

At 4 Access Intervals per hop, at least one SYNC is guaranteed to occur each hop. Three cycles of the hopping sequence are required for 99.5% acquisition probability. At 12.5 hops per second, this also requires 19 seconds.

This illustrates the advantage of scalability. A device that uses an acquisition algorithm suitable for 2 or 4 Access Intervals per hop will also acquire a NET that hops at 1 Access Interval per hop. The algorithm may be as follows:

1. The device scans candidate frequencies until it finds one with no Received Signal Strength Indicator indication.
2. The device remains on the frequency for 6.32 seconds 2 Access Interval/hop @ 25 Hops/second×2, or 4 Access Interval/hop @ 12.5 hops/second×1, or until it detects a SYNC message or a valid termination message.
3. If SYNC is detected, the device synchronizes its internal clock to the SYNC, and begins hopping with the NET for the next 11 hops. It may attempt registration after detecting valid SYNC and any Reservation Opportunity. If synchronization is not verified by detection of SYNC within the 11 hops, the acquisition algorithm is reinitialized.
4. If a message termination (either an ACK or CLEAR) is detected, the device immediately hops to the next frequency in the sequence and waits for the SYNC. It is coarsely synchronized to the NET but has a timing offset from the NET clock.

When the next SYNC is received, the device synchronizes its clock to the NET clock and initiates registration. If SYNC is not received within a dwell time, the device hops to the next frequency in sequence. This continues until SYNC is attained, or until 15 hops have passed without receiving SYNC, after which the acquisition sequence is restarted.

5. If coarse acquisition is not obtained within 6.3 seconds, the device selects another frequency and repeats the process beginning with step 2.

Camping provides a worst case acquisition performance that is perceptibly slow to the human user of a portable device. The preferred approach has the receiver scan all potential frequencies in ascending order, at 125 μsec increments. When the highest frequency is reached, the search begins again at the lowest frequency. The 125 μs sampling rate is much faster than the 250 μsec channel switching time specification of the RF modem. This is possible because the overall switching time specification applies to worst case frequency switching intervals, i.e., from the highest to the lowest operating frequency. By switching a single channel at a time, switching may be maintained over frequency intervals very near a synthesizer phase detectors' phase lock range, allowing nearly instantaneous frequency switching. The change from highest to lowest frequency at the end of the scan requires the standard 250 μsec.

The 125 μsec monitoring interval allows 85 μs to ascertain if receive clock has been detected prior to switching to the next frequency. The monitoring interval should be selected to be non-periodic with respect to the access interval. For example, the 125 μsec interval allows the entire hopping sequence to be scanned 2(n+1) times in a 20 ms access interval.

If clock is recovered at any frequency, the receiver remains on frequency for a Reservation Opportunity and initiates channel access through the procedure described above. The scanning approach is less deterministic in terms of acquisition probability than camping, but the search time required for 99.5% acquisition probability is about 80 Access Intervals, or three times faster than that for camping.

A hybrid approach that scans only three or four consecutive frequencies incorporates the deterministic aspects of camping with some of the improved performance of the scanning algorithm. For scanning over a small number of frequencies an up/down scan is preferred, i.e., 1, 2, 3, 2, 1, 2, 3 since all frequency changes can be accomplished at the faster switching rate. The end frequencies are visited less often than those in the center. The number of frequencies used, e.g., 3 or 4, is selected so that all can be scanned during the preamble duration of a minimum length transmission.

All devices are required to have unique 48 bit global addresses. Local 16 bit addresses will be assigned for reduced overhead in communications. Local addresses will not be assigned to devices whose global addresses are not on an authentication list maintained in each access point and routinely updated over the infrastructure.

Once a device has attained synchronization, it must register with the control point to be connected with the NET. It initiates this by sending a Request for Poll indicating a registration request, and including its global address. The control point will register the device, and provide a short Network Address as an outbound message. The Control point will generate the short address if it is a single NET, or exchange the global address for a short Network Address with a Network Address Server if the NET is part of a larger infrastructured network of a premises LAN.

Once a device is synchronized to a NET, it must periodically update its local clock to the NET clock communicated in the SYNC message. The SYNC message contains a character designated as the SYNC character that transfers the NET clock synchronization. This may be the beginning or ending FLAG in the SYNC message, or a specific character within the message.

The maximum expected frequency error between NET and device local clocks is 100 parts per million. To maintain a 50 μs maximum clock error, the local device clock must be re-synchronized at 500 ms intervals. At 20 ms per access interval, a non-sleeping device has up to 26 SYNC opportunities within that period in which to re-synchronize and maintain required accuracy.

As mentioned above, it is desirable that battery powered devices have the capability to sleep, or power off, for extended periods of time to conserve power. The term sleeping terminal in this instance may refer to a device that powers down its radio communication hardware to save power while maintaining other functions in an operational state, or a device that power manages those functions as well. In the power managed state, the device must maintain its hop clock so that full acquisition is not required every time power management is invoked.

Devices that must sleep to manage their power consumption use Priority SYNC Messages to maintain synchronization. Priority SYNC Messages occur every three Access Intervals. In times of low NET activity, non-priority SYNC messages are omitted. By coordinating power management with Priority SYNC Messages, power managed devices can be guaranteed to wake up for Access Intervals where SYNCs will be present, even if the NET activity is low during the sleep period.

Figure 17:
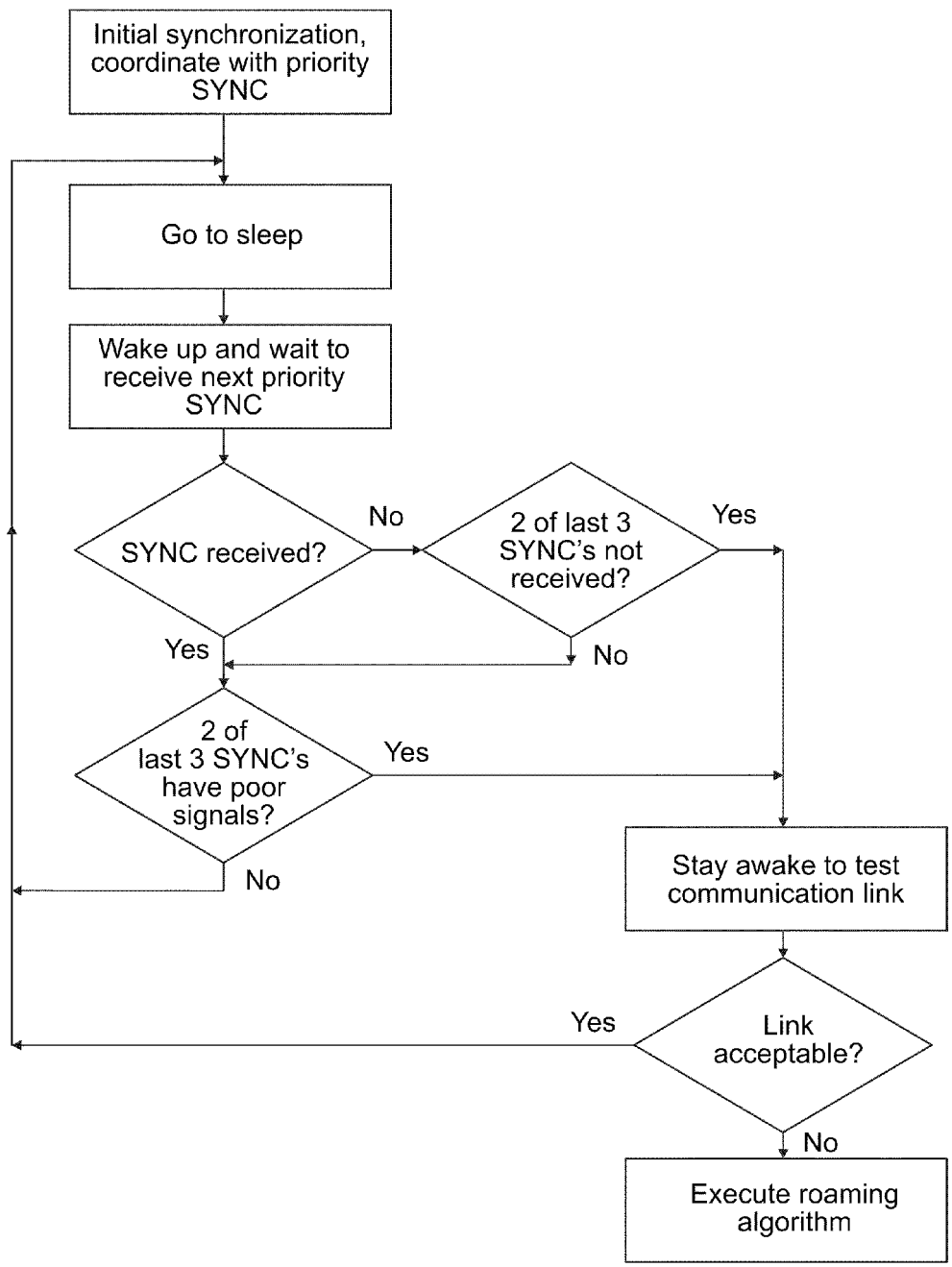
FIG. 17 is a flow chart illustrating a terminal maintaining synchronization with the network after it has gone to sleep for several access intervals.

A sleeping device with no transmission requirements may sleep for eight 20 ms access intervals, and wake only for the SYNC and Reservation Poll at the beginning of the ninth Access Interval to monitor pending messages before returning to the sleep state, for a duty cycle of less than 5%. This provides three opportunities to synchronize to the NET clock within a 540 ms window. A flow chart depicting a device sleeping for several access intervals is shown in FIG. 17.

Figure 18:
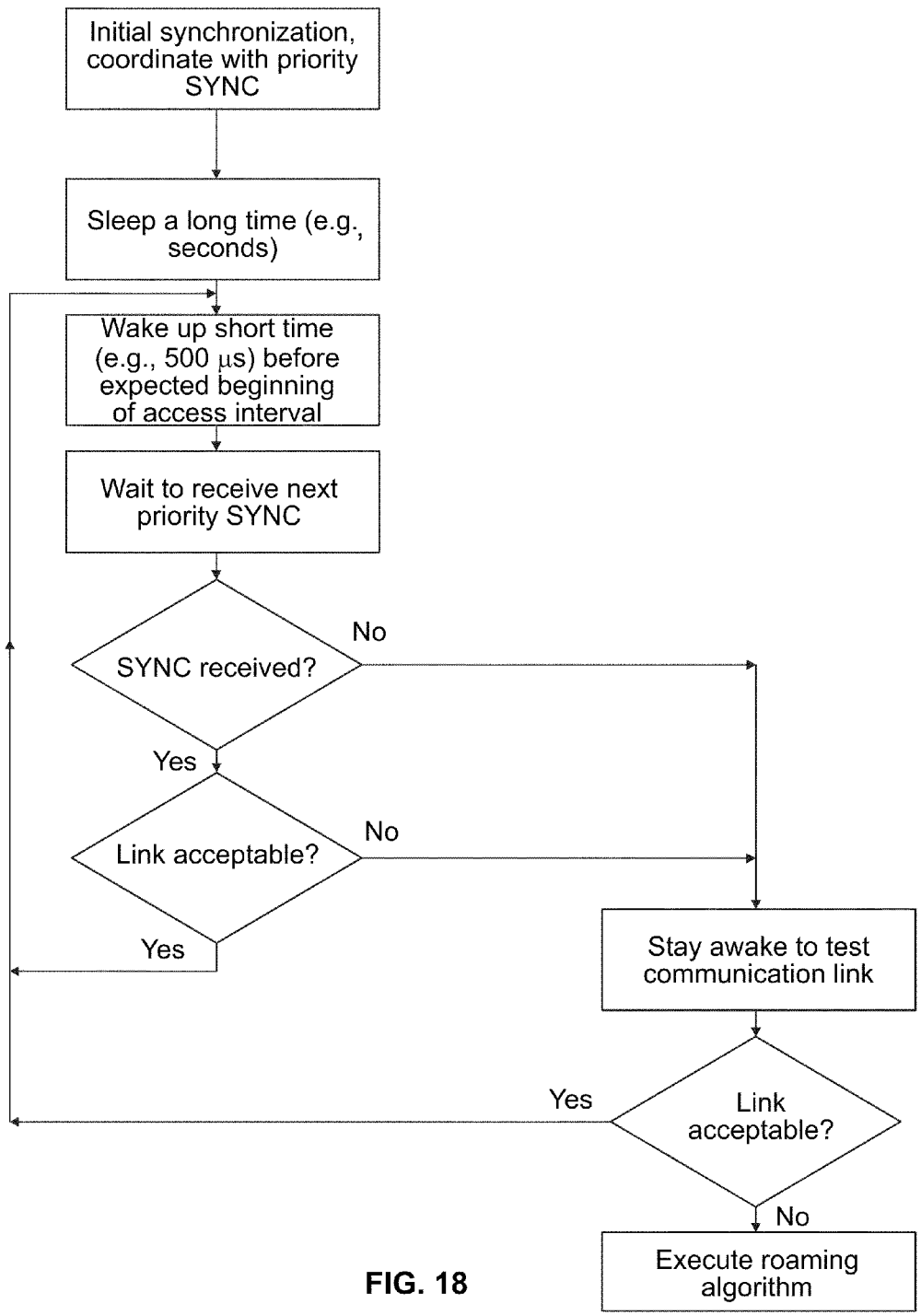
FIG. 18 is a flow chart illustrating a terminal that maintains or achieves synchronization with the network after it has gone to sleep for several seconds.

Devices may also sleep for longer periods of time, at the risk of losing fine synchronization. They may compensate by advancing their local clocks to account for the maximum timing uncertainty. For example, a terminal could sleep for 5 seconds without re-synchronizing by waking up 500 microseconds before it expects an Access Interval to begin, and successfully receive SYNC messages. This technique is valid for extended periods of time, up to the point where the maximum timing error approaches 50% of an Access Interval. A flow chart depicting a device sleeping for several seconds is shown in FIG. 18.

A power managed device that requires communication during a sleep period may immediately wake and attempt access to the NET at the next available Reservation Opportunity.

A device that requires communications may be able to register with one of several NETs operating in its vicinity, with transmissions occurring on many frequencies simultaneously. A good strategy is to synchronize to a NET that provides an acceptable communication link, then monitor HELLO messages to determine other candidate NETs before attaching to a particular NET by registering with the control point device.

As described above, a spontaneous wireless local area network or spontaneous LAN is one that is established for a limited time for a specific purpose, and which does not use the premises LAN to facilitate communications between devices or provide access to outside resources. Use of spontaneous LAN allows portable devices to share information, files, data, etc., in environments where communication via the premises LAN is not economically justifiable or physically possible. A spontaneous LAN capability also allows portable/mobile devices to have an equally portable network. Peripheral and vehicular LANs are examples of such spontaneous LANs.

Requirements for spontaneous LAN differ from an infrastructured premises LAN in several significant areas. The number of devices in a spontaneous LAN is likely to be smaller than the number that a single NET in a premises LAN must be capable of supporting. In addition, coverage areas for spontaneous LANs are typically smaller than coverage areas for an access point participating in the premises LAN. In a spontaneous LAN, communication often takes place over relatively short distances, where devices are within line of sight of each other.

In an premises LAN, the majority of communications are likely to involve accessing communication network resources. For example, portable devices with limited processing capabilities, memory, and power supplies are able to access large databases or powerful computing engines connected to the AC power grid. Access points within the premises LAN are well suited to the role of Control Points for managing synchronization and media access within each NET.

In a spontaneous LAN, however, communications are limited to exchanges with spontaneous NET constituents. Additionally, NET constituents may potentially leave at any time, making it difficult to assign control point responsibilities to a single device. A shared mechanism for synchronization and media access is preferable in most cases.

In a spontaneous LAN, battery power limitations may preclude assignment of a single device as a control point. The routine transmission of SYNC and access control messages places a significant power drain on a portable, battery powered device. Also, the control point architecture dictates that transmissions intended for devices other than the control point be stored and forwarded to the destination device, further increasing battery drain, and reducing system throughput.

Moreover, the use of scheduled transmission in a premises LAN is likely to differ from use in a spontaneous LAN. For example, unlike the premises LAN, in the spontaneous LAN, applications such as massaging and two way (i.e., full-duplex) voice communications may only occasionally be used, whereas video transmission and telemetry exchange may be prevalent.

To promote compatibility and integration with the premises LAN, operational differences required by multiple participating devices should be minimized. For example, selecting relatively close frequency bands for each LAN assists the design of a multiple LAN-transceiver, reducing circuitry, cost, power, weight and size while increasing reliability. Similarly, selecting communication protocols so that the spontaneous LAN protocol constitutes a subset or superset of premises LAN may enable a given device to more effectively communication in both LANs, while minimizing both the overall protocol complexity and potentially limited memory and processing power.

Use of frequency hopping is desirable in premises LAN because of its ability to mitigate the effects of interference and frequency selective fading. In the case of the latter, frequency hopping allows systems to be installed with less fade margin than single frequency systems with otherwise identical radio modem characteristics, providing improved coverage.

The potentially smaller coverage area requirement of spontaneous LANs, however, allows single frequency operation to be considered for some applications, e.g., such as a peripheral LAN. Regulatory structures are in place in some countries to allow single frequency operation in the same bands as frequency hopping systems, providing that single frequency devices operate at reduced power levels. The lower transmit power of single frequency operation and elimination of periodic channel switching are desirable methods of reducing battery drain. The choice of single frequency or frequency hopped operation is dictated by the coverage requirements of the network, and may be left as an option to device users.

As noted earlier, the basic Access Interval structure is suited to single frequency operation as well as to frequency hopping. SYNC messages in a single frequency system substitute a single frequency indication in the hopping sequence identifier field.

A spontaneous LAN comes into existence when two or more devices establish communications, and ceases when its population falls to less than two. Before a spontaneous LAN can be established, at least two devices must agree upon a set of operating parameters for the network. Such agreement may be preprogrammed else exchanged and acknowledged prior to establishing the spontaneous LAN. Once the spontaneous LAN is established, other devices coming into the network must be able to obtain the operating parameters and acquire access.

More specifically, to establish a spontaneous LAN, a computing device must first identify at least one other network device with which spontaneous LAN communication is desired. To identify another network device, the computing device may play an active or passive role. In an active role, the computing device periodically broadcasts a request to form spontaneous LAN with either a specific network device or, more likely, a specific type of network device. If a network device fitting the description of the request happens to be in range or happens into range and is available, it responds to the periodic requests to bind with the computing device, establishing the spontaneous LAN. Alternately, the network device may take a passive role in establishing the spontaneous LAN. In a passive role, the computing device merely listens for a request to form a spontaneous LAN transmitted by the appropriate network device. Once such a network device comes into range, the computing device responds to bind with the network device, establishing the spontaneous LAN.

The choice of whether a device should take a passive or active role is a matter of design choice. For example, in one embodiment where peripheral devices have access to AC power, the roaming computer terminals take a passive role, while the peripheral devices take a more active role. Similarly, in another embodiment where a vehicle terminal has access to a relatively larger battery source, an active role is taken when attempting to form a spontaneous LAN, i.e., a vehicular LAN, with a hand-held computing device.

Binding, a process carried out pursuant to a binding protocol stored in each network device, may constitute a very simple process such as might exist when creating a spontaneous LANs that operates on a single frequency channel. Under such a scenario, a simple acknowledge handshake between the computing terminal and the other network device may be sufficient to establish a spontaneous LAN pursuant to commonly stored, preprogrammed operating parameters. However, more complex binding schemes may also be implemented so as to support correspondingly more complex spontaneous LANs as proves necessary. An example of a more complex binding scheme is described below.

It is desirable in some large spontaneous LANs for one device to be designated as a fully functional control point, providing identical NET operation to a single NET in the premises LAN. Providing that all devices share a hopping table and encryption key, the designated device would initiate control point activities, and other devices would synchronize to the designated unit. A device with greater battery capacity, or one that can be temporarily connected to AC power is best suited to the dedicated control point function. This architecture is applicable to Client-Server applications (where the server assumes the control point function), or to other applications where a single device is the predominant source or destination of communications. A portable device used as a dedicated control point is required to have additional programming and memory capacity to manage reservation based media access, pending message lists, and scheduled service slot allocations.

In embodiments where communication requirements of a spontaneous LAN are largely peer to peer, there may be no overwhelming candidate for a dedicated Control Point. Thus, in such cases, the Control Point function is either distributed among some or all the devices within the spontaneous LAN. In such scenarios, the interleaved Access Interval approach used for wireless access points is employed. Initially, control point responsibilities are determined during the binding process. Users may designate or redesignate a Control Point device when several candidates are available.

For spontaneous LANs, access intervals may be simplified to reduce power consumption, program storage and processing power requirements for portable devices used as control points. Control Point devices transmit SYNC, pending message lists, and Time Division Multiple Access slot reservations normally, but only use the single slot reservation Poll (Idle Sense Multiple Access). The reservation poll contains a field indicating reduced control point functionality. This places other devices in a point-to-point communication mode, using the Implicit Idle Sense Algorithm. The probability factor p communicated in the reservation poll is used for the Implicit Idle Sense algorithm. Control point devices may use the deferred SYNC mechanism for light system loading, transmitting Priority SYNC every third Access Interval to further decrease their transmission requirements. Control point devices must monitor the reservation slot for messages addressed to them, but may sleep afterwards.

Request for Polls initiated under Implicit Idle Sense use point-to-point addressing, indicating the address of the destination device directly, rather than the control point device. This eliminates the need for the Control Point device to store and forward transmissions within the spontaneous LAN. The device detecting its address in a Request for Poll begins a session, after employing the Implicit Idle Sense algorithm, by Polling the source address identified in the Request for Poll. The terminating ACK and CLEAR messages contain an Explicit Idle Sense probability factor equal to that in the original reservation poll.

To allow for power managed devices, the Control Point device maintains a pending message list. Devices that have been unable to establish communication with a sleeping device initiate a session with the Control Point device to register the pending message. Upon becoming active, the sleeping device will initiate a Poll to the device originating the pending message. The Control Point device will eliminate the pending message indication by aging, or by receipt of communication from the destination device clearing the pending message. Control point devices are not required to store pending messages, only addresses.

As mentioned above, HELLO messages are broadcast to indicate changes in NET parameters. HELLO messages may be omitted to simplify the Control Point function in spontaneous LANs.

Devices are assigned local addresses upon registration with the Control Point device. Devices may communicate an alias that identifies the device user to other users to the Control Point device where it is stored in an address table. The address table may be obtained by other network constituents by querying the Control Point device. A peripheral LAN is a type of spontaneous LAN which serves as a short range interconnect between a portable or mobile computing device (MCD) and peripheral devices.

Designers of portable products are constantly challenged with reducing size, weight, and power consumption of these devices, while at the same time increasing their functionality and improving user ergonomics. Functions that may be used infrequently, or which are too large to fit within the constraints of good ergonomic design may be provided in peripheral devices, including printers, measurement and data acquisition units, optical scanners, etc. When cabled or otherwise physically connected to a portable product, these peripherals often encumber the user, preventing freedom of movement or mobility. This becomes more problematic when use of more than one peripheral is required.

A second consideration for portable product design is communication docking. A communication dock is a device that holsters or houses a portable unit, and provides for communication interconnection for such tasks as program downloading, data uploading, or communication with large printers, such as those used for printing full sized invoices in vehicular applications. Communication docking of a portable unit may also involve power supply sharing and/or charging.

The requirement for communication docking capability forces newer portable product designs to be mechanically compatible with older docking schemes, or may require that new docks, or adapters, be developed for each new generation of portable device. Product specific docking approaches eliminate compatibility between devices manufactured by different suppliers. This has hindered development of uniform standards for Electronic Data Interchange between portable devices and fixed computing systems.

Physical connection between a portable device with a peripheral or communication dock also hinders user efficiency. Peripheral devices are generally attached with cable. If a peripheral is small enough to be carried or worn on a belt, the mobility of the user may be maintained. If a user must carry a hand-held portable device that is connected to a belt mounted peripheral, the assembly cannot be set down while a task that requires movement to a location several feet away is undertaken unless the portable device and peripheral are disconnected. Likewise, connection to peripherals too large to be portable requires the user to frequently connect and disconnect the device and the peripheral.

Use of wireless peripheral LAN interconnection greatly simplifies the task of portable devices communicating with peripherals. In doing so, wireless connectivity allows improved ergonomics in portable product design, flexibility in interconnection to one or more peripherals, freedom of movement over a radius of operation, forward and backward compatibility between portable units and peripherals, and potential communications among products manufactured by different vendors.

Constituents within a peripheral LAN generally number six or fewer devices. One roaming computing device and one or two peripherals comprise a typical configuration. Operating range is typically less than fifty feet.

Because the computing devices generally control the operation of peripheral devices, in a peripheral LAN a master/slave type protocol is appropriate. Moreover, roaming computing devices serving as master are well suited to the role of Control Points for managing synchronization and media access within each peripheral LAN. All peripheral communications are slaved to the master.

In a peripheral LAN, roaming mobile or portable computing devices and wireless peripherals may all operate from battery power. Operating cycles between charging dictate use of power management techniques.

Although all participants in a peripheral LAN might also be configured to directly participate in the premises LAN, the tradeoff in cost, power usage and added complexity often weighs against such configuration. Even so, participants within a peripheral LAN can be expected to function in a hierarchical manner, through a multiple participating device, with the premises LAN. Thus, the use of a much simpler, lower-power transceiver and associated protocol may be used in the peripheral LAN.

As previously described, a roaming computing device serving as a master device may itself be simultaneously attempting to participate in other networks such as the premises or vehicular LANs. Considerable benefits arise if the radio and processing hardware that supports operation within the wireless network can also support such operation. For example, a device that is capable of frequency hopping is inherently suited to single frequency operation. If it can adjust transmitter power level and data rate to be compatible with the requirements of the peripheral LAN, it can function in both systems. The major benefits of common transceiver hardware across LANs include smaller product size, improved ergonomics, and lower cost.

Specifically, in one embodiment, radio communication on the premises LAN, as described herein, takes place using radio transceivers capable of performing frequency-hopping. To communicate on a peripheral LAN, such transceivers could also utilize frequency-hopping at a lower power. However, such transceivers are relatively expensive in comparison to a lower power, narrow-band, single frequency transceivers. Because of the cost differential, it proves desirable to use the single frequency transceivers for all peripheral devices which will not participate in the premises LAN. Therefore, the more expensive, frequency-hopping transceivers which are fitted into roaming computing devices are further designed to stop hopping and lock into the frequency of the single frequency transceiver, allowing the establishment of peripheral LANs.

Instead of frequency hopping, the peripheral LAN may also use narrow-band, single frequency communication, further simplifying the radio transceiver design for commonality. In another embodiment of the peripheral LAN transceivers, operation using one of a plurality of single frequency channels is provided. Thus, to overcome interference on one channel, the transceiver might select from the remaining of the plurality an alternate, single operating frequency with lesser channel interference. To accommodate the plurality of single frequency channels, the peripheral LAN transceivers may either communicate an upcoming frequency change so that corresponding peripheral LAN participants can also change frequency, or the transceivers may be configured to use frequency synthesis techniques to determine which of the plurality a current transmission happens to be.

The Access Interval structure is also an appropriate choice for peripheral LAN operations. In one embodiment, to provide for simplicity and tighter integration, the Access Interval for the peripheral LAN is a subset of the Access Interval used in the premises LAN. HELLO messages, Implicit Idle Sense, Data Rate Switching, and scheduled services are not implemented. Peripheral devices normally sleep, activate their receivers for SYNC transmissions from the participating master device, and resume sleeping if no pending messages are indicated and they have no inbound transmission requirements. Access Intervals occur at regular intervals, allowing for power management. Access Intervals may be skipped if the master has other priority tasks to complete.

To initialize the peripheral LAN, a device desiring initialization, a master device, selects a single operating frequency by scanning the available frequencies for one with no activity. A typical master device might be a roaming computing device desiring access to a local peripheral. Default values for other parameters, including Access Interval duration, are contained within each participant's memory. Such parameters may be preadjusted in each participant to yield specific performance characteristics in the peripheral LAN.

Once a master device identifies a single frequency, slaves, which are generally peripherals, are brought into the peripheral LAN through a process called binding. Binding is initiated by the master device by invoking a binding program contained therein. Slaves, such as peripherals, are generally programmed to enter a receptive state when idle. Thus, in one embodiment, the master device accomplishes binding by transmitting Access Intervals of known duration sequentially on a series of four frequencies spread throughout the available frequency range. The specific frequencies and Access Interval durations used are stored as parameters in all potential participating devices. A 250 KBPS transfer rate is appropriate in some embodiments of the peripheral LAN, reflecting a balance between performance and complexity in peripheral devices.

A slave, e.g., a peripheral, responds to the binding attempts by the master device on a given frequency until the slave successfully receives and establishes communication with the master device. If they do not establish communication after four Access Intervals, the slave switches to the next frequency for four Access Interval periods. Once communication is established, the slave registers with the master and obtains the master device's selected operating frequency and related communication parameters. When all slave devices have been bound, the master terminates the binding program and normal operation at the selected single frequency may begin.

Figure 15:
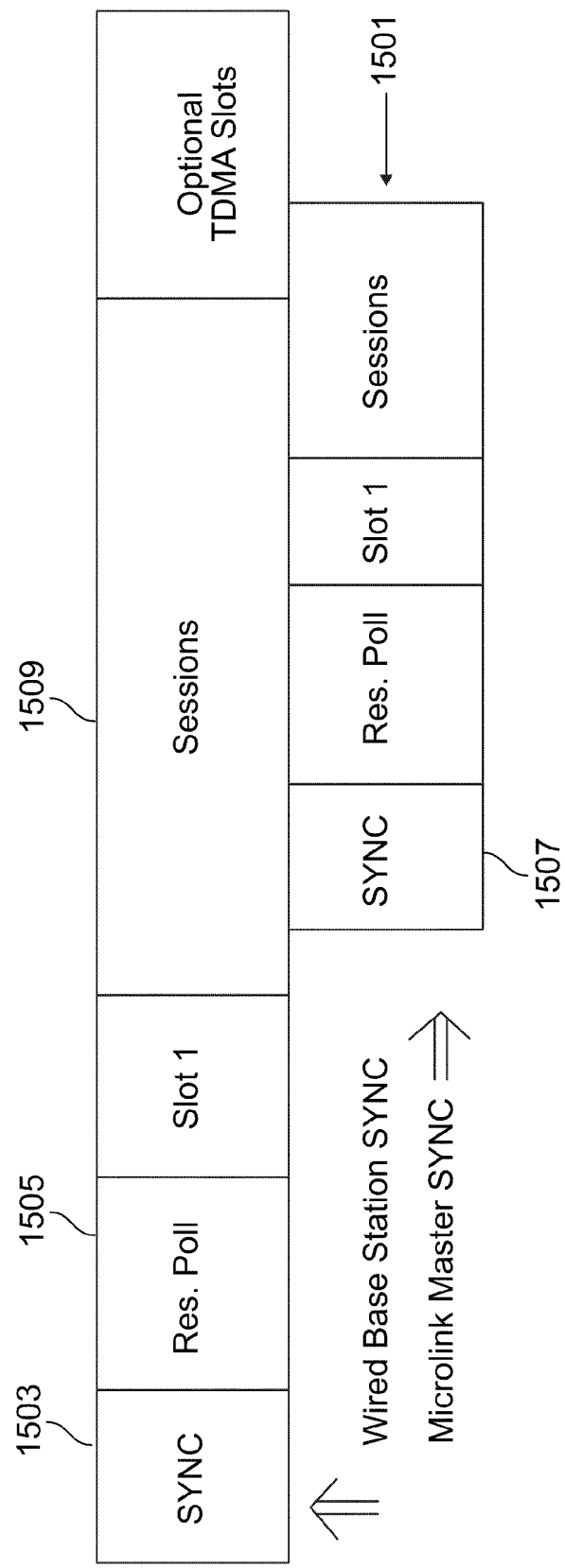
FIG. 15 illustrates a secondary access interval used in the MicroLAN or peripheral LAN in the hierarchical communication network according to the present invention.

Referring to FIG. 15, in a hierarchical network, peripheral LAN masters use a secondary access interval 1501 that is synchronized to the Access Interval of a parent (premises) LAN control point. Peripheral LAN Access Intervals occur less frequently than premises LAN Access Intervals, e.g., every other or every third Priority SYNC Access Interval.

During the premises LAN Access Interval, the peripheral LAN master device monitors the premises LAN control point for SYNC 1503 reservation poll 1505 and exchanges inbound and outbound message according to the normal rules of the access protocol. The master switches to the peripheral LAN frequency, and transmits its own SYNC frame 1507 during the session period 1509 of its parent control point allowing communication with its peripherals. The peripheral LAN Access Interval is generally shorter than the premises LAN Access Interval, so that it does not extend beyond the premises LAN Access Interval boundary. At the end of the peripheral LAN Access Interval 1501, the master switches to the premises LAN frequency for the next SYNC 1503.

The secondary SYNC 1507 may only be transmitted if the peripheral LAN master is not busy communicating through the premises LAN. If a communication session is occurring, the master must defer SYNC, preventing communication with its peripherals during that Access Interval. The master must also defer SYNC if the current frequency in the LAN is prone to interference from the peripheral LAN frequency, i.e., they are the same frequency or adjacent frequencies. If two consecutive SYNCs are deferred, peripherals will activate their receivers continuously for a period of time, allowing the master to transmit during any Access Interval. This approach is also applicable when the master roams between frequency hopping NETs. Since NETs are not synchronized to one another, the devices in the peripheral LAN adjust Access Interval boundaries each time the master roams. If peripherals do not detect SYNC within a timeout period, they may duty cycle their reception to conserve battery power.

Figure 16A:
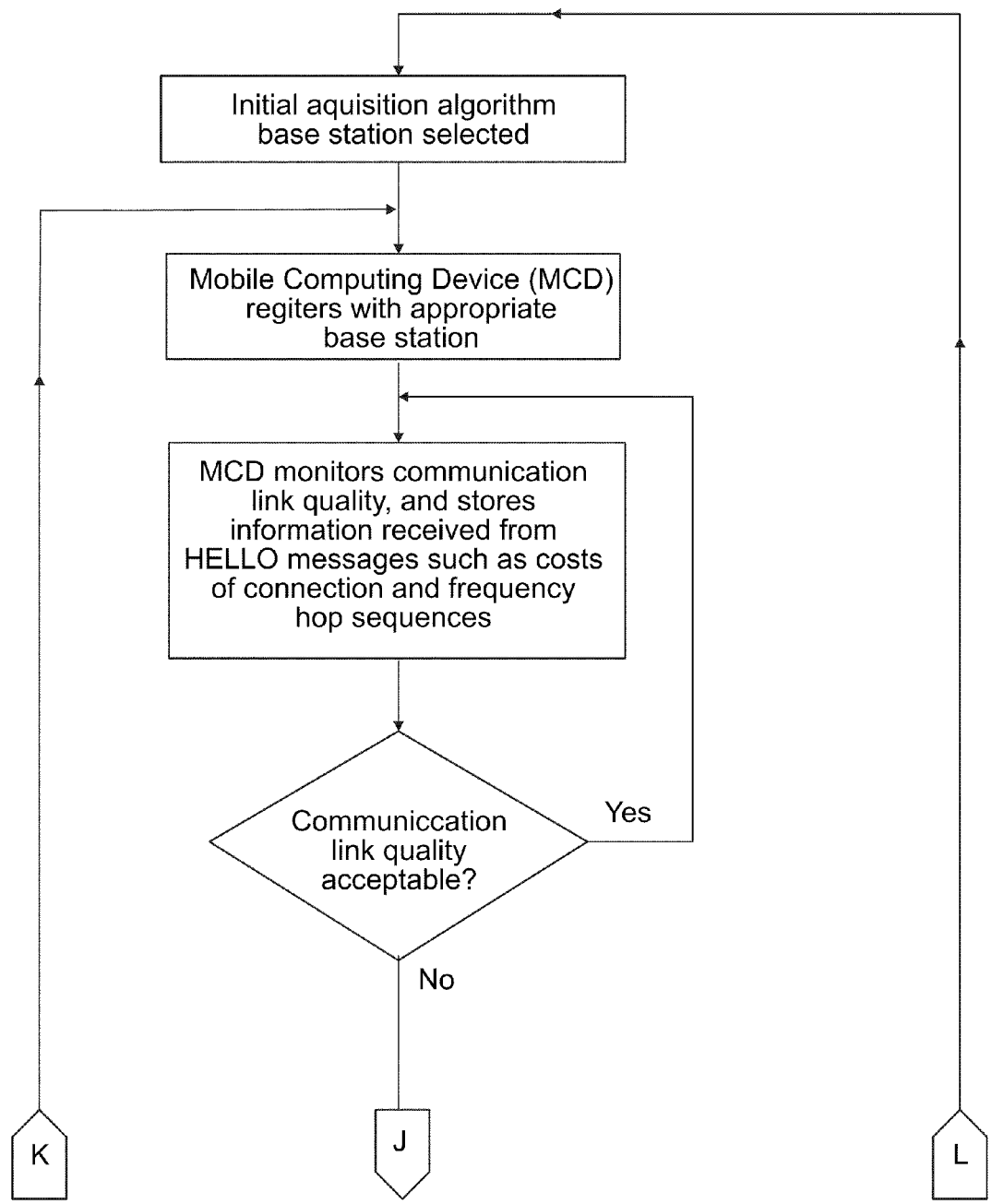
FIG. 16 is a flow chart illustrating the selection of an access point by a mobile computing device for communication exchange.
Figure 16B:
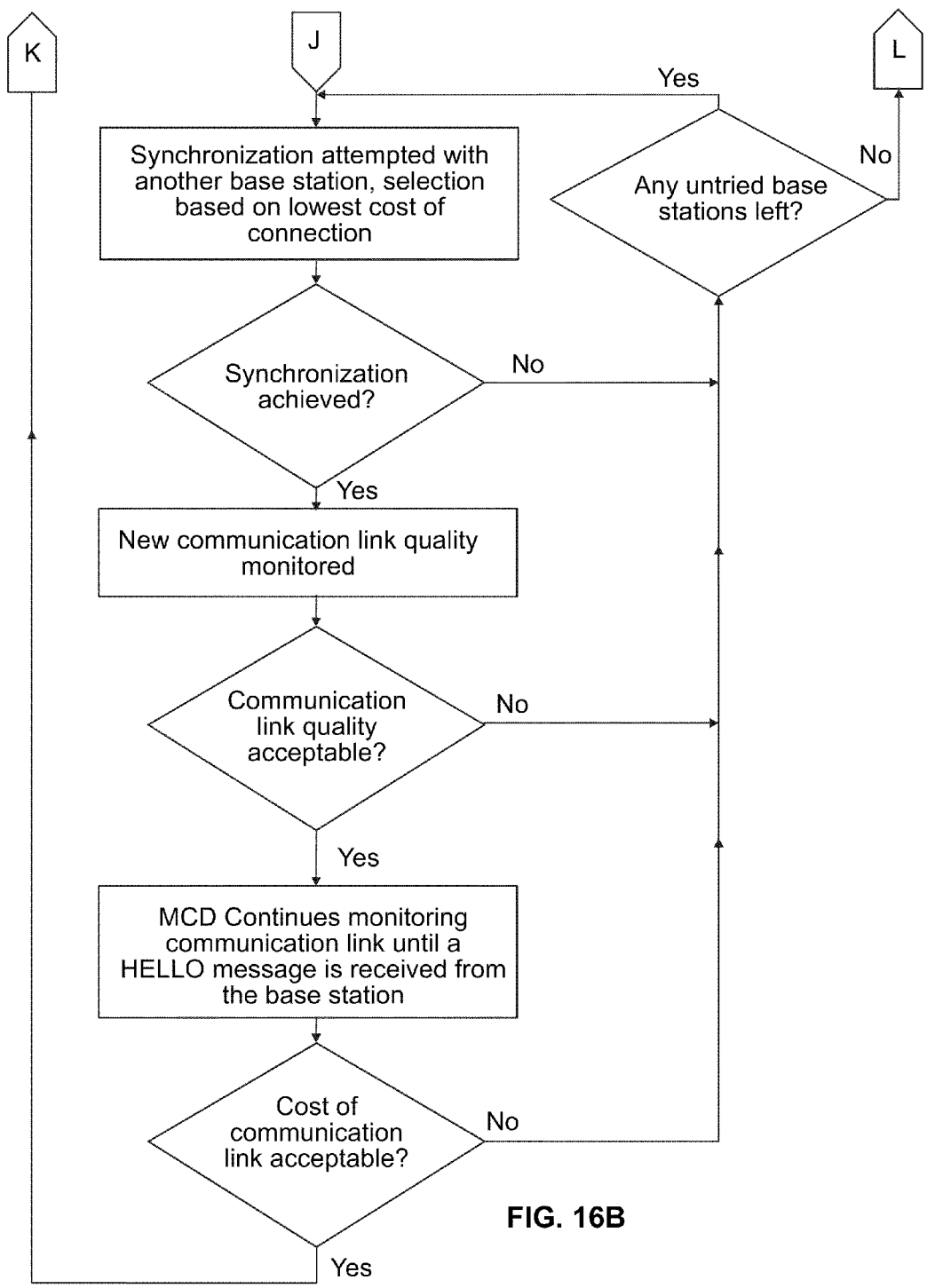

Referring to FIG. 16, a Roaming Algorithm Flow Diagram illustrates how a roaming computing device will select a suitable access point. Roaming computing devices operating in the infrastructured network environment formed by the access points will routinely move between access point coverage areas. The roaming computing devices are able to disconnect from their current access point communication link and reconnect a communication link to a different access point, as necessitated by device roaming.

Access points transmit HELLO messages to devices in their coverage area. These HELLO messages communicate to roaming computing devices the cost of connection through the access point, addresses of neighboring access points, and the cost of connection through these neighboring access points. This information allows roaming computing devices to determine the lowest cost connection available and to connect to the access point with the lowest cost.

In addition, access point HELLO message may include communication parameters of neighboring access points, such as frequency hopping sequences and indices, spread spectrum spreading codes, or FM carrier channel frequencies. This information allows roaming computing devices to roam and change access point connections without going through a full acquisition phase of the new access point's parameters.

Roaming computing devices initially select and register with an access point control point on the basis of link quality: signal strength and cost information transmitted within HELLO messages. A device will remain attached to a particular access point until the link quality degrades below an acceptable level; then it will attempt to determine if an alternative access point connection is available. The device initiates a roaming algorithm, using neighbors information from the most recent HELLO message to attempt connection with another candidate access point. If connection fails, another candidate from the neighbors list will be selected, and the process repeated. Once connection is made with an alternative access point, the device will monitor signal strength and data errors to determine link quality. If link quality is acceptable, the device will continue monitoring until a HELLO message is received. If the cost is acceptable, it will register with the new access point, and the access point will update the spanning tree over the infrastructure. If link quality or cost is unacceptable, another candidate from the neighbors list is selected and the process repeated. This continues until an acceptable connection is established. If one cannot be established, the device must return to the original access point connection or employ the initial acquisition algorithm.

Figure 28A:
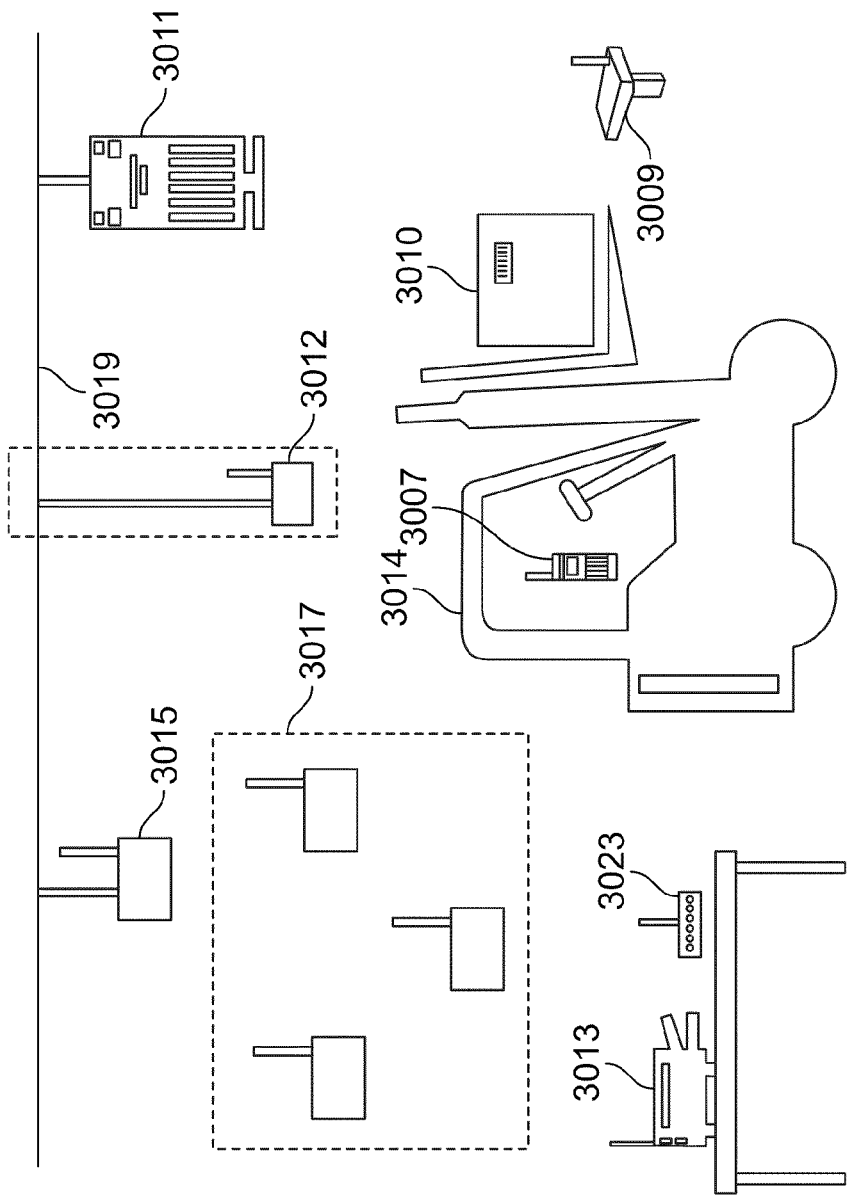
FIG. 28A illustrates a warehouse environment incorporating a communication network which maintains communication connectivity between the various network devices according to the present invention.

FIG. 28a illustrates an embodiment of the hierarchical communication system according to the present invention communication is maintained in a warehouse environment. Specifically, a worker utilizes a roaming computing device, a computer terminal 3007, and a code reader 3009 to collect data such as identifying numbers or codes on warehoused goods, such as the box 3010. As the numbers and codes are collected, they are forwarded through the network to a host computer 3011 for storage and cross-referencing. In addition, the host computer 3011 may, for example, forward cross-referenced information relating to the collected numbers or codes back through the network for display on the terminal 3007 or for printing on a printer 3013. The host computer 3011 can be configured as a file server to perform such functions. Similarly, the collected information may be printed from the computer terminal 3007 directly on the printer 3013. Other exemplary communication pathways supported include message exchanges between the computer terminal 3007 and other computer terminals (not shown) or the host computer 3011.

The host computer 3011 provides the terminal 3007 with remote database storage, access and processing. However, the terminal 3007 also provides for local processing within its architecture to minimize the need to access the remote host computer 3011. For example, the terminal 3007 may store a local database for local processing. Similarly, the terminal 3007 may run a variety of application programs which never, occasionally or often need access to the remote host computer 3011.

Many of the devices found in the illustrative network are battery powered and therefore must conservatively utilize their radio transceivers. For example, the hand-held computer terminal 3007 receives its power from either an enclosed battery or a forklift battery (not shown) via a communication dock within the forklift 3014. Similarly, the code reader 3009 operates on portable battery power as may the printer 3013. The arrangement of the communication network, communication protocols used, and data rate and power level adjustments help to optimize battery conservation without substantially degrading network performance.

In the illustrated embodiment shown in FIG. 28a, the hierarchical communication system of the present invention consists of a premises LAN covering a building or group of buildings. The premises LAN in the illustrated embodiment includes a hardwired backbone LAN 3019 and access points 3015 and 3017. A host computer 3011 and any other non-mobile network device located in the vicinity of the backbone LAN 3019 can be directly attached to the backbone LAN 3019. However, mobile devices and remotely located devices must maintain connectivity to the backbone LAN 3019 through either a single access point such as the access point 3015, a multi-hop network of access points such as is illustrated by the access points 3015 and 3017. The access points 3015 and 3017 contain a relatively higher power transmitter, and provide coverage over the entire warehouse floor. Although a single access point may be sufficient, if the warehouse is too large or contains interfering physical barriers, the multi-hop plurality of access points 3017 may be desirable. Otherwise, the backbone LAN 3019 must be extended to connect all of the access points 3017 directly to provide sufficient radio coverage. Through the premises LAN, relatively stable, longer range wireless and hardwired communication is maintained.

Because roaming computing devices, such as the hand-held computer terminal 3007, cannot be directly hardwired to the backbone LAN 3019, they are fitted with RF transceivers. To guarantee that such a network device can directly communicate on the premises LAN with at least one of the access points 3015 and 3017, the fitted transceiver is selected to yield approximately the same transmission power as do the access points 3015 and 3017. However, not all roaming network devices require a direct RF link to the access points 3015 and 3017, and some may not require any link at all. Instead, with such devices, communication exchange is generally localized to a small area and, as such, only requires the use of relatively lower power, short range transceivers. The devices which participate in such localized, shorter range communication form spontaneous LANs.

For example, the desire by a roaming terminal to access peripheral devices such as the printer 3013 and modem 3023, results in the roaming terminal establishing a peripheral LAN with the peripheral devices. Similarly, a peripheral LAN might be established when needed to maintain local communication between a code scanner 3009 and the terminal 3007. In an exemplary embodiment, the printer 3013 are located in a warehouse dock with the sole assignment of printing out forms based on the code information gathered from boxes delivered to the dock. In particular, as soon as the code reader gathers information, it relays the information along a peripheral LAN to the terminal 3007. Upon receipt, the terminal 3007 communicates via the premises LAN to the host computer 3011 to gather related information regarding a given box. Upon receipt of the related information, the terminal 3007 determines that printing is desired with the printer 3013 located at the dock. When the forklift 3014 enters the vicinity of the dock, the terminal 3007 establishes a peripheral LAN with the printer 3013 which begins printing the collected code information.

To carry out the previous communication exchange, the printer 3013 and code reader 3009 are fitted with a lower power peripheral LAN transceivers for short range communication. The computer terminal 3007 transceiver is not only capable of peripheral LAN communication, but also with the capability of maintaining premises LAN communication. In an alternate exchange however, the code reader 3009 might be configured to participate on both LANs, so that the code reader 3009 participates in the premises LAN to request associated code information from the host computer 3011. In such a configuration, either the code reader 3009 or terminal 3007 could act as the control point of the peripheral LAN. Alternately, both could share the task.

With capability to participate in the peripheral LAN only, the code reader 3009, or any other peripheral LAN participant, might still gain access to the premises LAN indirectly through the terminal 3007 acting as a relaying device. For example, to reach the host computer 3011, the code reader 3009 first transmits to the computer terminal 3007 via the peripheral LAN. Upon receipt, the computer terminal 3007 relays the transmission to one of the access points 3015 and 3017 for forwarding to the host 3011. Communication from the host 3011 to the code reader 3009 is accomplished via the same pathway.

It is also possible for any two devices with no access to the premises LAN to communicate to each other. For example, the modem 3023 could receive data and directly transmit it for printing to the printer 3013 via a peripheral LAN established between the two. Similarly, the code reader 3009 might choose to directly communicate code signals through a peripheral LAN to other network devices via the modem 3023.

In an alternate configuration, a peripheral LAN access point 3021 is provided which may be directly connected to the backbone LAN 3019 (as shown), acting as a direct access point to the backbone LAN 3019, or indirectly connected via the access points 3015 and 3017. The peripheral LAN access point 3021 is positioned in the vicinity of other peripheral LAN devices and thereafter becomes a control point participant. Thus, peripheral LAN communication flowing to or from the premises LAN avoids high power radio transmissions altogether. However, it can be appreciated that a stationary peripheral LAN access point may not always be an option when all of the peripheral LAN participants are mobile. In such cases, a high power transmission to reach the premises LAN may be required.

Figure 28B:
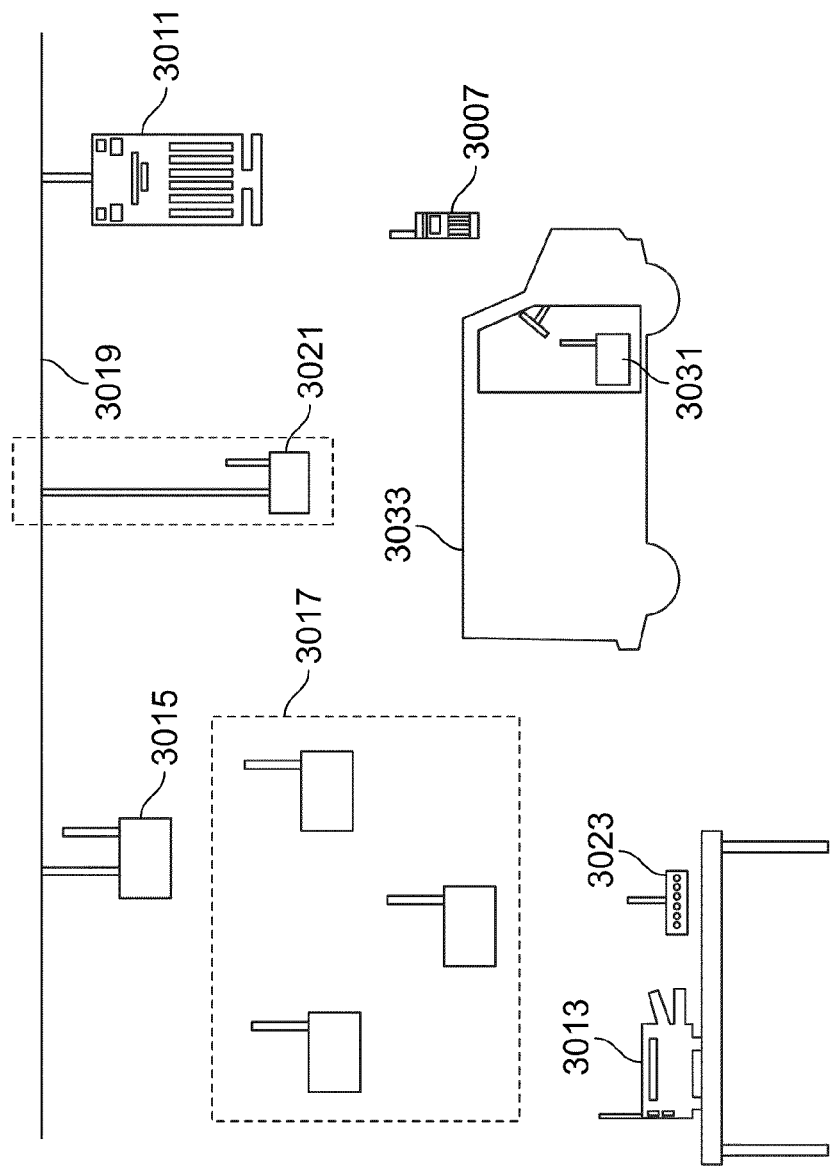
FIG. 28B illustrates other features of the present invention in the use of a vehicular LAN which is capable of detaching from the premises LAN when moving out of radio range of the premises LAN to perform a service, and reattaching to the premises LAN when moving within range to automatically report on the services rendered.

FIG. 28b illustrates other features of the present invention in the use of spontaneous LANs in association with a vehicle which illustrate the capability of automatically establishing a premises and a peripheral LAN when moving in and out of range to perform services and report on services rendered. In particular, like the forklift 3014 of FIG. 28a, a delivery truck 3033 provides a focal point for a spontaneous LAN utilization. Within the truck 3033, a storage terminal 3031 is docked so as to draw power from the truck 3033's battery supply. Similarly, a computer terminal 3007 may either be docked or ported. Because of greater battery access, the storage terminal 3031 need only be configured for multiple participation in the premises, peripheral and vehicular LANs and in a radio WAN, such as RAM Mobile Data, CDPD, MTEL, ARDIS, satellite communication, etc. The storage terminal 3031, although also capable of premises and peripheral LAN participation, need only be configured for vehicular LAN participation.

Prior to making a delivery, the truck enters a docking area for loading. As goods are loaded into the truck, the information regarding the goods is down-loaded into the storage terminal 3031 via the terminal 3007 or code reader 3009 (FIG. 28a) via the premises or peripheral LAN communications. This loading might also be accomplished automatically as the forklift 3014 comes into range of the delivery truck 3033, establishes or joins the peripheral LAN, and transmits the previously collected data as described above in relation to FIG. 28a. Alternately, loading might also be accomplished via the premises LAN.

As information regarding a good is received and stored, the storage terminal 3031 might also request further information regarding any or all of the goods via the peripheral LAN's link to the host computer 3011 through the premises LAN. More likely however, the storage terminal 3031 if appropriately configured would participate on the premises LAN to communicate directly with the host computer 3011 to retrieve such information.

The peripheral LAN access point 3021 if located on the dock could provide a direct low power peripheral LAN connection to the backbone LAN 3019 and to the host computer 3011. Specifically, in one embodiment, the access point 3021 is located on the dock and comprises a low power ("short hop") radio operating in a frequency hopping mode over a 902-928 MHz frequency band. However, the access point 3021 can instead be configured to communicate using, for example, infrared, UHF, 2.4 GHz or 902 MHz spread spectrum direct sequence frequencies.

Once fully loaded and prior to leaving the dock, the storage device 3031 may generate a printout of the information relating to the loaded goods via a peripheral LAN established with the printer 3013 on the dock. In addition, the information may be transmitted via the peripheral LAN modem 3023 to a given destination site.

Figure 28C:
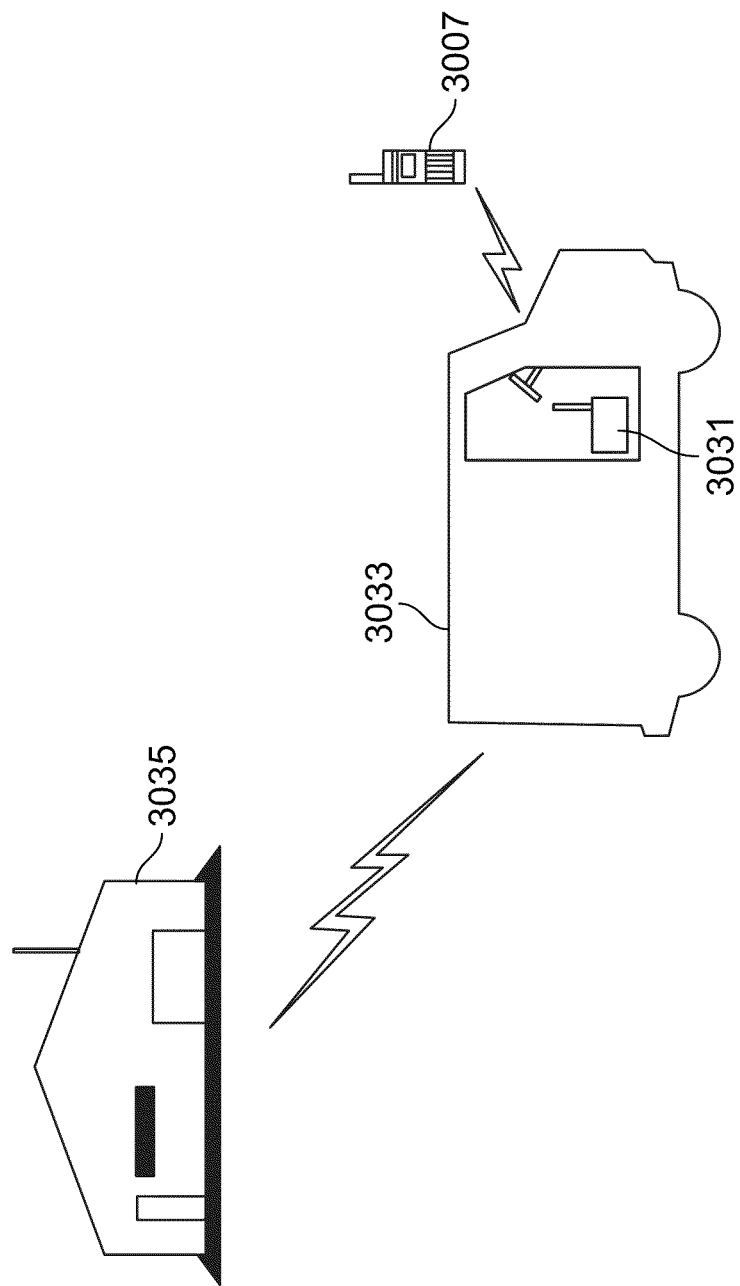
FIG. 28C illustrate other features of the present invention in the use of a vehicular LAN which, when out of range of the premises LAN, is still capable gaining access to the premises LAN via radio WAN communication.

As illustrated in FIG. 28c, once the storage terminal 3031 and hand-held terminal 3007 moves out of range of the premises and peripheral LANs, i.e., the truck 3033 drives away from the dock, the vehicular LAN can only gain access to the premises LAN via the more costly radio WAN communication. Thus, although the storage terminal 3031 might only be configured with relaying control point functionality, to minimize radio WAN communication, the storage terminal 3031 can be configured to store relatively large amounts of information and to provide processing power. Thus, the terminal 3007 can access such information and processing power without having to access devices on the premises LAN via the radio WAN.

Upon reaching the destination, the storage terminal 3031 may participate in any in range peripheral and premises LAN at the delivery site dock. Specifically, as specific goods are unloaded, they are scanned for delivery verification, preventing delivery of unwanted goods. The driver is also informed if goods that should have been delivered are still in the truck. As this process takes place, a report can also be generated via a peripheral or premises LAN printer at the destination dock for receipt signature. Similarly, the peripheral LAN modem on the destination dock can relay the delivery information back to the host computer 3011 for billing information or gather additional information needed, avoiding use of the radio WAN.

If the truck 3033 is used for service purposes, the truck 3033 leaves the dock in the morning with the addresses and directions of the service destinations, technical manuals, and service notes which have been selectively downloaded from the host computer 3011 via either the premises or peripheral LAN to the storage terminal 3031 which may be configured with a hard drive and substantial processing power. Upon pulling out of range, the storage terminal 3031 and the computer terminal 3007 automatically form an independent, detached vehicular LAN. Alternately, the terminals 3007 and 3031 may have previously formed the vehicular LAN before leaving dock. In one embodiment, the vehicular LAN operates using frequency hopping protocol much the same as that of the premises LAN, with the storage terminal 3031 acting much like the premises LAN access points. Thus, the radio transceiver circuitry for the premises LAN participation may also be used for the vehicular LAN and, as detailed above, a peripheral LAN. Similarly, if the radio WAN chosen has similar characteristics, it may to be incorporated into a single radio transceiver.

At each service address, the driver collects information using the terminal 3007 either as the data is collected, if within vehicular LAN transmission range of the storage terminal 3031, or as soon as the terminal 3007 comes within range. Any stored information within storage terminal 3031 may be requested via the vehicular LAN by the hand-held terminal 3007. Information not stored within the vehicular LAN may be communicated via a radio WAN as described above.

Referring again to FIG. 28*b*, upon returning to the dock, the storage terminal 3031, also referred to herein as a vehicle terminal, joins in or establishes a peripheral LAN with the peripheral LAN devices on the dock, if necessary. Communication is also established via the premises LAN. Thereafter, the storage terminal 3031 automatically transfers the service information to the host computer 3011 which uses the information for billing and in formulating service destinations for automatic downloading the next day.

FIG. 29*a* is a diagrammatic illustration of another embodiment using a peripheral LAN to supporting roaming data collection by an operator according to the present invention. As an operator 3061 roams the warehouse floor, he carries a peripheral LAN comprising the terminal 3007, code reader 3009 and a portable printer 3058 with him. The operator collects information regarding goods, such as the box 3010, with the code reader 3009 and the terminal 3007. If the power resources are equal, the terminal 3007 may be configured and designated to also participate in the premises LAN.

Corresponding information to the code data must be retrieved from the host computer 3011. The collected code information and retrieved corresponding information can be displayed on the terminal 3007. After viewing for verification, the information can be printed on the printer 3058. Because of this data flow requirement, the computer terminal 3007 is selected as the peripheral LAN device which must also carry the responsibility of communicating with the premises LAN.

If during collection, the operator decides to power down the computer terminal 3007 because it is not needed, the peripheral LAN becomes detached from the premises LAN. Although it might be possible for the detached peripheral LAN to function, all communication with the host computer 3011 through the premises LAN is placed in a queue awaiting reattachment. As soon as the detached peripheral LAN comes within range of an attached peripheral LAN device, i.e., a device attached to the premises LAN, the queued communications are relayed to the host. It should be clear from this description that the peripheral LAN may roam in relation to a device attached to the premises LAN ("premises LAN device"). Similarly, the premises LAN device may roam in relation to the peripheral LAN. The roaming constitutes a relative positioning. Moreover, whenever a peripheral LAN and a master device move out of range of each other, the peripheral LAN may either poll for or scan for another master device for attachment. The master device may constitute a premises LAN device, yet need not be.

To avoid detachment when the terminal 3007 is powered down, the code reader 3009 may be designated as a backup to the terminal 3007 for performing the higher power communication with the premises LAN. As described in more detail below in reference to FIG. 33*c* regarding the idle sense protocol, whenever the code reader 3009 determines that the terminal 3007 has stopped providing access to the premises LAN, the code reader 3009 will take over the role if it is next in line to perform the backup service. Thereafter, when the computer terminal 3007 is powered up, it monitors the peripheral LAN channel, requests and regains from the code reader 3009 the role of providing an interface with the premises LAN. This, however, does not restrict the code reader 3009 from accessing the premises LAN although the reader 3009 may choose to use the computer terminal 3007 for power conservation reasons.

In addition, if the computer terminal 3007 reaches a predetermined low battery threshold level, the terminal 3007 will attempt to pass the burden of providing premises LAN access to other peripheral LAN backup devices. If no backup device exists in the current peripheral LAN, the computer terminal 3007 may refuse all high power transmissions to the premises LAN. Alternatively, the computer terminal 3007 may either refuse predetermined select types of requests, or prompt the operator before performing any transmission to the premises LAN. However, the computer terminal 3007 may still listen to the communications from the premises LAN and inform peripheral LAN members of waiting messages.

Figure 29B:
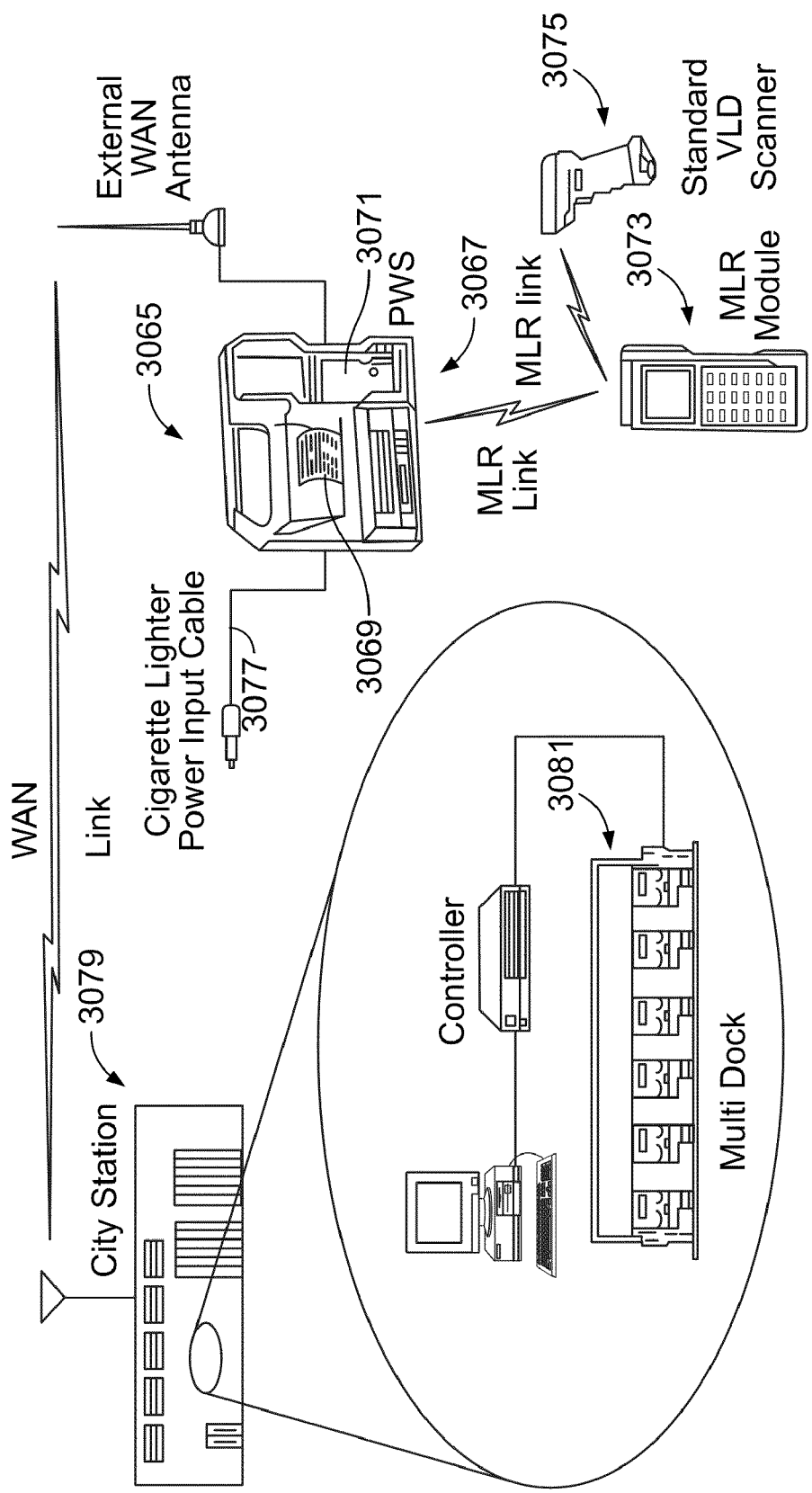
FIG. 29B is a diagrammatic illustration of another embodiment of a peripheral LAN which supports roaming data collection by an operator according to the present invention.

FIG. 29*b* is a diagrammatic illustration of another embodiment of a peripheral LAN which supports roaming data collection by an operator according to the present invention. An operator is equipped with a peripheral LAN 3065 comprising a housing 3067, which incorporates a printer 3069 and a dock 3071, a roaming computing terminal 3073, and a code reader 3075. The operator may roam a warehouse floor or a shipping dock and collect and retrieve data using the peripheral LAN 3065 as discussed above with respect to FIG. 29a. In this embodiment, the operator may elect to leave the housing 3067, and hence the printer, in one area of the warehouse, or on the truck, and carry only the code reader 3075 and terminal 3073. In addition, the operator may also elect to dock the terminal 3073 in the dock 3071 and carry only the code reader 3075. In any event, the terminal is capable of communicating data to the printer 3069 via RF signals or via the dock 3071.

The housing 3067 may optionally include a cigarette lighter power input cable 3077 to power the printer 3069, and recharge the battery of the terminal 3073 via the dock 3071. The housing 3067 may also optionally include a wide area network radio to permit communication with a remote warehouse or station 3079. In addition, the housing 3067 may also be configured to include the functionality of the storage terminal 3031 discussed above with respect to FIGS. 28b and 28c.

The peripheral LAN embodiments of FIGS. 29a and 29b may, of course, function when detached from the premises LAN. This feature is particularly desirable in situations where attachment to the premises LAN may be more costly, such as, for example, during the remote pickup or delivery of goods by a driver. In the situation where a driver is picking up goods, the driver may, for example, use the code reader and terminal to collect and/or enter information regarding the goods, such as their origin, destination, weight, etc. The terminal may then encode the information, and transmit it to the printer so that the driver can label each box appropriately with a bar or other type of code for later identification and routing of the goods.

Once information regarding a particular pickup has been stored, either in the terminal or storage terminal, the driver may download the stored data using the WAN radio to the premises LAN host computer at the remote warehouse or station 3079 so that the information may be used to pre-schedule further routing of the goods before the driver even arrives. Because WAN communication is costly, however, the information may instead be automatically transferred wirelessly to the premises LAN host once the driver comes into range of the premises LAN, as discussed above with respect to FIG. 28b. Alternatively, or as a check to verify information previously transmitted to the premises LAN wirelessly, the information may be downloaded from the terminal to the premises LAN host via a docking system 3081 located at the warehouse or station 3079. The docking system 3081 may also be used to recharge the terminals 3073.

Once the host computer has the information regarding the goods picked up by the driver(s), the host can download the data via RF or the docking system 3081 to any number of terminals 3073 used by warehouse personnel who unload the trucks. While unloading, these personnel can, for example, use a terminal 3073 and a code reader 3075 to build containers for further distribution of the goods to various destinations. Specifically, as a container is unloaded, the label previously placed on the container by the driver is scanned by the code reader 3075, and destination information is displayed on the terminal 3073. The box may then be taken to and loaded into the container headed for the same destination. Each container may also have a label which can be scanned to verify the destination of that particular container.

Figure 30:
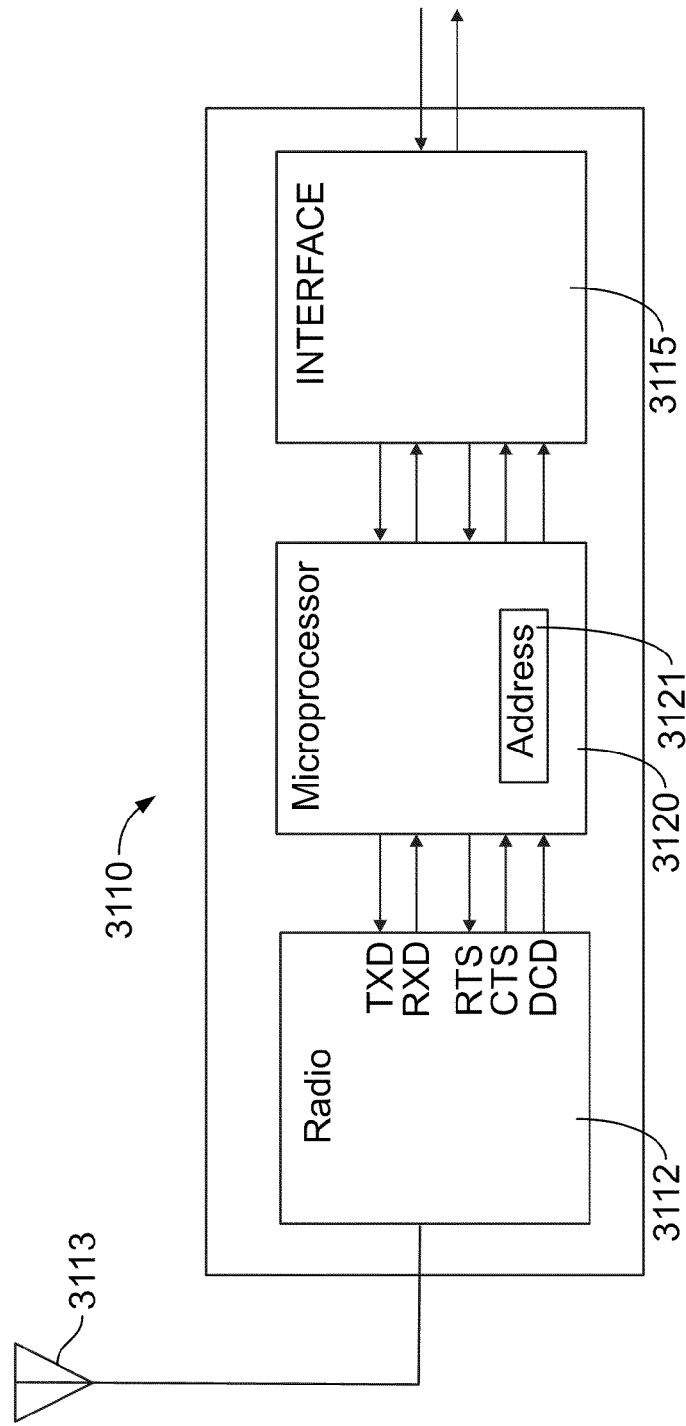
FIG. 30 is a block diagram illustrating the functionality of RF transceivers built in accordance with the present invention.

FIG. 30 is a block diagram illustrating the functionality of RF transceivers built in accordance with the present invention. Although preferably plugging into PCMCIA slots of the computer terminals and peripherals, the transceiver 3110 may also be built-in or externally attached via available serial, parallel or ethernet connectors for example. Although the transceivers used by potential peripheral LAN master devices may vary from those used by peripheral LAN slave devices (as detailed below), they all contain the illustrated functional blocks.

In particular, the transceiver 3110 contains a radio unit 3112 which attaches to an attached antenna 3113. The radio unit 3112 used in peripheral LAN slave devices need only provide reliable low power transmissions, and are designed to conserve cost, weight and size. Potential peripheral LAN master devices not only require the ability to communicate with peripheral LAN slave devices, but also require higher power radios to also communicate with the premises LAN. Thus, potential peripheral LAN master devices and other non-peripheral LAN slave devices might contain two radio units 3112 or two transceivers 3110—one serving the premises LAN and the other serving the peripheral LAN—else only contain a single radio unit to service both networks.

In embodiments where cost and additional weight is not an issue, a dual radio unit configuration for potential peripheral LAN master devices may provide several advantages. For example, simultaneous transceiver operation is possible by choosing a different operating band for each radio. In such embodiments, a 2.4 GHz radio is included for premises LAN communication while a 27 MHz radio supports the peripheral LAN. Peripheral LAN slave devices receive only the 27 MHz radio, while the non-potential peripheral LAN participants from the premises LAN are fitted with only the 2.4 GHz radios. Potential peripheral LAN master devices receive both radios. The low power 27 MHz peripheral LAN radio is capable of reliably transferring information at a range of approximately 40 to 100 feet asynchronously at 19.2 KBPS. An additional benefit of using the 27 MHz frequency is that it is an unlicensed frequency band. The 2.4 GHz radio provides sufficient power (up to 1 Watt) to communicate with other premises LAN devices. Another benefit of choosing 2.4 GHz or 27 MHz bands is that neither requires FCC licensing. Many different frequency choices could also be made such as the 900 MHz band, UHF, etc. Alternatively, infrared communication may be used in situations where line of sight may be achieved between devices on the network.

In embodiments where cost and additional weight are at issue, a single radio unit configuration is used for potential peripheral LAN master devices. Specifically, in such embodiments, a dual mode 2.4 GHz radio supports both the peripheral LAN and premises LANs. In a peripheral LAN mode, the 2.4 GHz radio operates at a single frequency, low power level (sub-milliwatt) to support peripheral LAN communication at relatively close distances 20-30 feet). In a high power (up to 1 Watt) or main mode, the 2.4 GHz radio provides for frequency-hopping communication over relatively long distance communication connectivity with the premises LAN. Although all network devices might be fitted with such a dual mode radio, only peripheral LAN master devices use both modes. Peripheral LAN slave devices would only use the low power mode while all other premises LAN devices would use only the high power mode. Because of this, to save cost, peripheral LAN slave devices are fitted with a single mode radio operating in the peripheral LAN mode. Non-peripheral LAN participants are also fitted with a single mode (main mode) radio unit for cost savings.

Connected between the radio unit 3112 and an interface 3110, a microprocessor 3120 controls the information flow between through the transceiver 3110. Specifically, the interface 3115 connects the transceiver 3110 to a selected computer terminal, a peripheral device or other network device. Many different interfaces 3115 are used and the choice will depend upon the connection port of the device to which the transceiver 3110 will be attached. Virtually any type of interface 3110 could be adapted for use with the transceiver 3110 of the present invention. Common industry interface standards include RS-232, RS-422, RS-485, 10BASE2 Ethernet, 10BASE5 Ethernet, 10BASE-T Ethernet, fiber optics, IBM 4/16 Token Ring, V.11, V.24, V.35, Apple Localtalk and telephone interfaces. In addition, via the interface 3115, the microprocessor 3120 maintains a radio independent, interface protocol with the attached network device, isolating the attached device from the variations in radios being used.

The microprocessor 3120 also controls the radio unit 3112 to accommodate communication with the premises LAN, the peripheral LAN, or both (for dual mode radios). Moreover, the same radio might also be used for vehicular LAN and radio WAN communication as described above. For example, a radio located in a vehicle or in a hand held terminal can be configured to communicate not only within a local network, but might also be capable of receiving paging messages.

More specifically, in a main mode transceiver, the microprocessor 3120 utilizes a premises LAN protocol to communicate with the premises LAN. Similarly, in a peripheral LAN mode transceiver, the microprocessor 3120 operates pursuant to a peripheral LAN protocol to communicate in the peripheral LAN. In the dual mode transceiver, the microprocessor 3120 manages the use of and potential conflicts between both the premises and peripheral LAN protocols. Detail regarding the premises and peripheral LAN protocols can be found in reference to FIGS. 33-36 below.

In addition, as directed by the corresponding communication protocol, the microprocessor 3120 controls the power consumption of the radio 3112, itself and the interface 3115 for power conservation. This is accomplished in two ways. First, the peripheral LAN and premises protocols are designed to provide for a low power mode or sleep mode during periods when no communication involving the subject transmitter is desired as described below in relation to FIGS. 33-34. Second, both protocols are designed to adapt in both data rate and transmission power based on power supply (i.e., battery) parameters and range information as described in reference to FIGS. 35-36.

In order to insure that the proper device is receiving the information transmitted, each device is assigned a unique address. Specifically, the transceiver 3110 can either have a unique address of its own or can use the unique address of the device to which it is attached. The unique address of the transceiver can either be one selected by the operator or system designer or one which is permanently assigned at the factory such as an IEEE address. The address 3121 of the particular transceiver 3110 is stored with the microprocessor 3120.

In the illustrated embodiments of FIGS. 28-29*b*, the peripheral LAN master device is shown as being either a peripheral LAN access point or a mobile or portable computer terminal. From a data flow viewpoint, in considering the fastest access through the network, such choices for the peripheral LAN master devices appear optimal. However, any peripheral LAN device might be assigned the role of the master, even those that do not seem to provide an optimal data flow pathway but may provide for optimal battery usage. For example, in the personal peripheral LAN of FIG. 29*a*, because of the support from the belt 3059, the printer might contain the greatest battery capacity of the personal peripheral LAN devices. As such, the printer might be designated the peripheral LAN master device and be fitted with either a dual mode radio or two radios as master devices require. The printer, or other peripheral LAN slave devices, might also be fitted with such required radios to serve only as a peripheral LAN master backup. If the battery power on the actual peripheral LAN master, i.e., the hand-held terminal 3007 (FIG. 29*a*) drops below a preset threshold, the backup master takes over.

Figure 31:
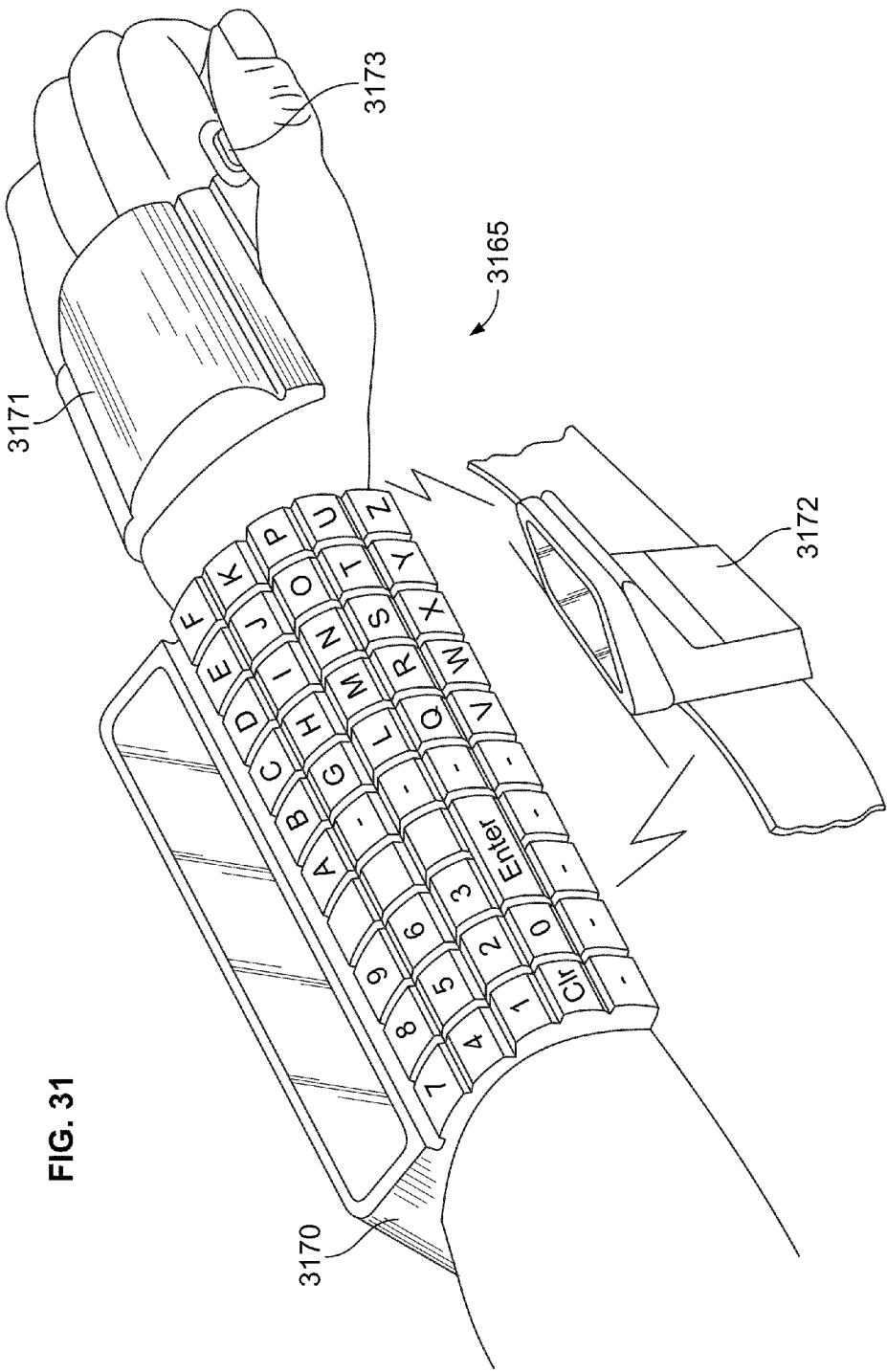
FIG. 31 is a diagrammatic illustration of an alternate embodiment of the peripheral LAN shown in FIG. 2.

FIG. 31 is a drawing which illustrates an embodiment of the personal peripheral LAN shown in FIG. 29*a* which designates a printer as the peripheral LAN master device. Specifically, in a personal peripheral LAN 3165, a computer terminal 3170 is strapped to the forearm of the operator. A code reader 3171 straps to the back of the hand of the user, and is triggered by pressing a button 3173 with the thumb. Because of their relatively low battery energy, the computer terminal 3170 and code reader 3171 are designated peripheral LAN slave devices and each contains a peripheral LAN transceiver having a broadcast range of two meters or less. Because of its greater battery energy, the printer 3172 contains a dual mode radio, and is designated the peripheral LAN master device.

Figure 32:
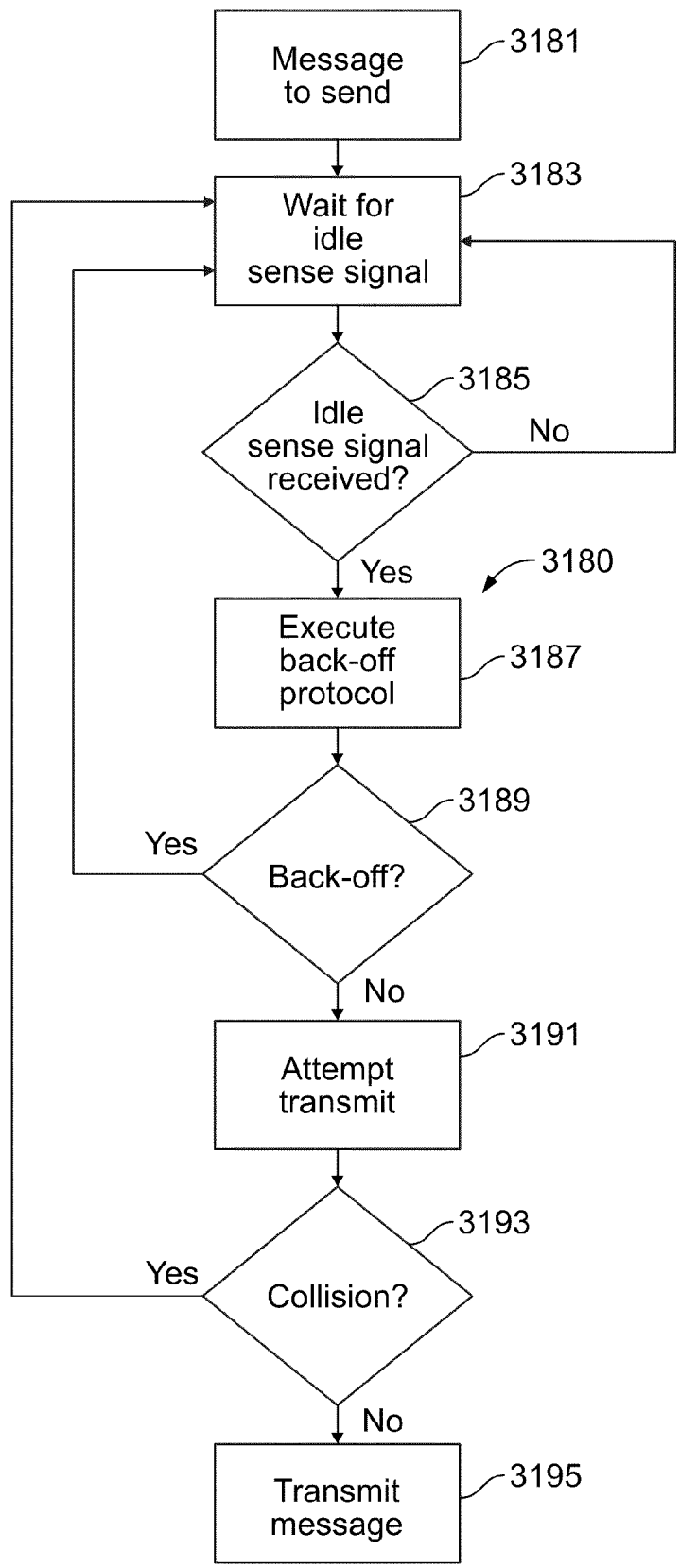
FIG. 32 is a block diagram illustrating a channel access algorithm used by peripheral LAN slave devices in accordance with the present invention.

FIG. 32 is a block diagram illustrating a channel access algorithm used by peripheral LAN slave devices according to the present invention. At a block 3181, when a slave device has a message to send, it waits for an idle sense message to be received from the peripheral LAN master device at a block 3183. When an idle sense message is received, the slave device executes a back-off protocol at a block 3187 in an attempt to avoid collisions with other slave devices waiting to transmit. Basically, instead of permitting every slave device from repeatedly transmitting immediately after an idle sense message is received, each waiting slave is required to first wait for a pseudo-random time period before attempting a transmission. The pseudo-random back-off time period is generated and the waiting takes place at a block 3187. At a block 3189, the channel is sensed to determine whether it is clear for transmission. If not, a branch is made back to the block 3183 to attempt a transmission upon receipt of the next idle sense message. If the channel is still clear, at a block 3191, a relatively small "request to send" type packet is transmitted indicating the desire to send a message. If no responsive "clear to send" type message is received from the master device, the slave device assumes that a collision occurred at a block 3193 and branches back to the block 3183 to try again. If the "clear to send" message is received, the slave device transmits the message at a block 3195.

Several alternate channel access strategies have been developed for carrier sense multiple access (CSMA) systems and include 1-persistent, non-persistent and p-persistent. Such strategies or variations thereof could easily be adapted to work with the present invention.

Figure 33A:
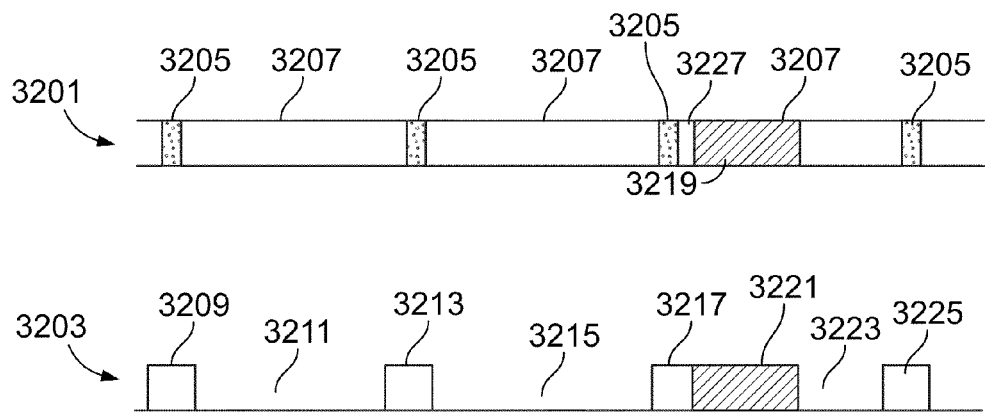
FIG. 33A is a timing diagram of the protocol used according to the present invention illustrating a typical communication exchange between a peripheral LAN master device having virtually unlimited power resources and a peripheral LAN slave device.

FIG. 33*a* is a timing diagram of the protocol used according to one embodiment the present invention illustrating a typical communication exchange between a peripheral LAN master device having virtually unlimited power resources and a peripheral LAN slave device. Time line 3201 represents communication activity by the peripheral LAN master device while time line 3203 represents the corresponding activity by the peripheral LAN slave device. The master periodically transmits an idle sense message 3205 indicating that it is available for communication or that it has data for transmission to a slave device. Because the master has virtually unlimited power resources, it "stays awake" for the entire time period 3207 between the idle sense messages 3205. In other words, the master does not enter a power conserving mode during the time periods 3207.

The slave device uses a binding protocol (discussed below with regard to FIG. 33*c*) to synchronize to the master device so that the slave may enter a power conserving mode and still monitor the idle sense messages of the master to determine if the master requires servicing. For example, referring to FIG. 33*a*, the slave device monitors an idle sense message of the master during a time period 3209, determines that no servicing is required, and enters a power conserving mode during the time period 3211. The slave then activates during a time period 3213 to monitor the next idle sense message of the master. Again, the slave determines that no servicing is required and enters a power conserving mode during a time period 3215. When the slave activates again during a time period 3217 to monitor the next idle sense message, it determines from a "request to send" type message from the master that the master has data for transmission to the slave. The slave responds by sending a "clear to send" type message during the time period 3217 and stays activated in order to receive transmission of the data. The master is thus able to transmit the data to the slave during a time period 3219. Once the data is received by the slave at the end of the time period 3221, the slave again enters a power conserving mode during a time period 3223 and activates again during the time period 3225 to monitor the next idle sense message.

Alternatively, the slave may have data for transfer to the master. If so, the slave indicates as such to the master by transmitting a message during the time period 3217 and then executes a backoff algorithm to determine how long it must wait before transmitting the data. The slave determines from the backoff algorithm that it must wait the time period 3227 before transmitting the data during the time period 3221. The slave devices use the backoff algorithm in an attempt to avoid the collision of data with that from other slave devices which are also trying to communicate with the master. The backoff algorithm is discussed more fully above in reference to FIG. 32.

The idle sense messages of the master may also aid in scheduling communication between two slave devices. For example, if a first slave device has data for transfer to a second slave device, the first slave sends a message to the master during the time period 3209 requesting communication with the second slave. The master then broadcasts the request during the next idle sense message. Because the second slave is monitoring the idle sense message, the second slave receives the request and stays activated at the end of the idle sense message in order to receive the communication. Likewise, because the first slave is also monitoring the idle sense message, it too receives the request and stays activated during the time period 3215 to send the communication.

Figure 33B:
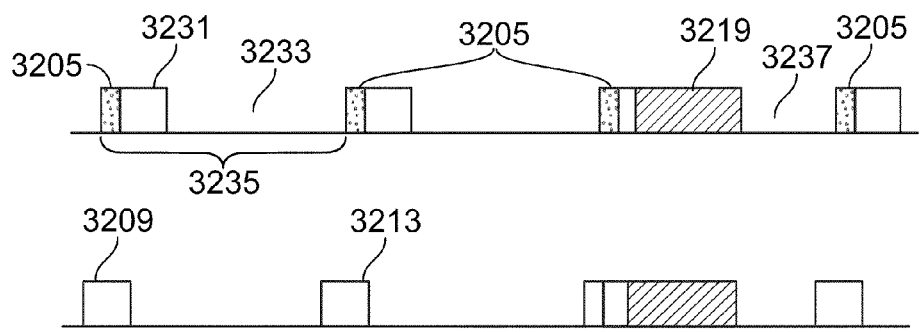
FIG. 33B is a timing diagram of the protocol used according to the present invention illustrating a typical communication exchange between a peripheral LAN master device having limited power resources and a peripheral LAN slave device.

FIG. 33*b* is a timing diagram of the protocol used according to one embodiment of the present invention illustrating a typical communication exchange between a peripheral LAN master having limited power resources and a peripheral LAN slave device. This exchange is similar to that illustrated in FIG. 33*a* except that, because it has limited power resources, the master enters a power conserving mode. Before transmitting an idle sense message, the master listens to determine if the channel is idle. If the channel is idle, the master transmits an idle sense message 3205 and then waits a time period 3231 to determine if any devices desire communication. If no communication is desired, the master enters a power conserving mode during a time period 3233 before activating again to listen to the channel. If the channel is not idle, the master does not send the idle sense message and enters a power saving mode for a time period 3235 before activating again to listen to the channel.

Communication between the master and slave devices is the same as that discussed above in reference to FIG. 33*a* except that, after sending or receiving data during the time period 3219, the master device enters a power conserving mode during the time period 3237.

Figure 33C:
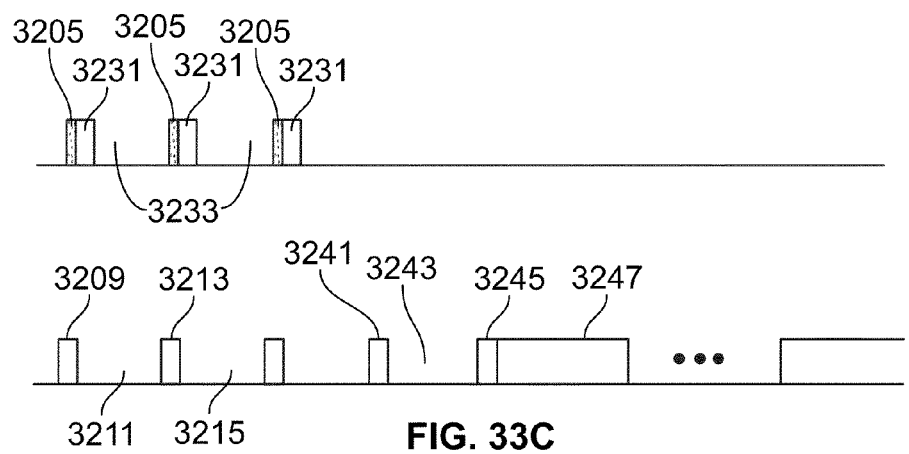
FIG. 33C is also a timing diagram of the protocol used which illustrates a scenario wherein the peripheral LAN master device fails to service the peripheral LAN slave devices.

FIG. 33*c* is also a timing diagram of one embodiment of the protocol used according to the present invention which illustrates a scenario wherein the peripheral LAN master device fails to service peripheral LAN slave devices. The master device periodically sends an idle sense message 3205, waits a time period 3231, and enters a power conserving mode during a time period 3233 as discussed above in reference to FIG. 33*b*. Similarly, the slave device monitors the idle sense messages during time periods 3209 and 3213 and enters a power conserving mode during time periods 3211 and 3215. For some reason, however, the master stops transmitting idle sense messages. Such a situation may occur, for example, if the master device is portable and is carried outside the range of the slave's radio. During a time period 3241, the slave unsuccessfully attempts to monitor an idle sense message. The slave then goes to sleep for a time period 3243 and activates to attempt to monitor a next idle sense message during a time period 3245, but is again unsuccessful.

The slave device thereafter initiates a binding protocol to attempt to regain synchronization with the master. While two time periods 3241 and 3245 are shown, the slave may initiate such a protocol after any number of unsuccessful attempts to locate an idle sense message. With this protocol, the slave stays active for a time period 3247, which is equal to the time period from one idle sense message to the next, in an attempt to locate a next idle sense message. If the slave is again unsuccessful, it may stay active until it locates an idle sense message from the master, or, if power consumption is a concern, the slave may enter a power conserving mode at the end of the time period 3247 and activate at a later time to monitor for an idle sense message.

In the event the master device remains outside the range of the slave devices in the peripheral LAN for a period long enough such that communication is hindered, one of the slave devices may take over the functionality of the master device. Such a situation is useful when the slave devices need to communicate with each other in the absence of the master. Preferably, such a backup device has the ability to communicate with devices on the premises LAN. If the original master returns, it listens to the channel to determine idle sense messages from the backup, indicates to the backup that it has returned and then begins idle sense transmissions when it reestablishes dominance over the peripheral LAN.

Figure 34:
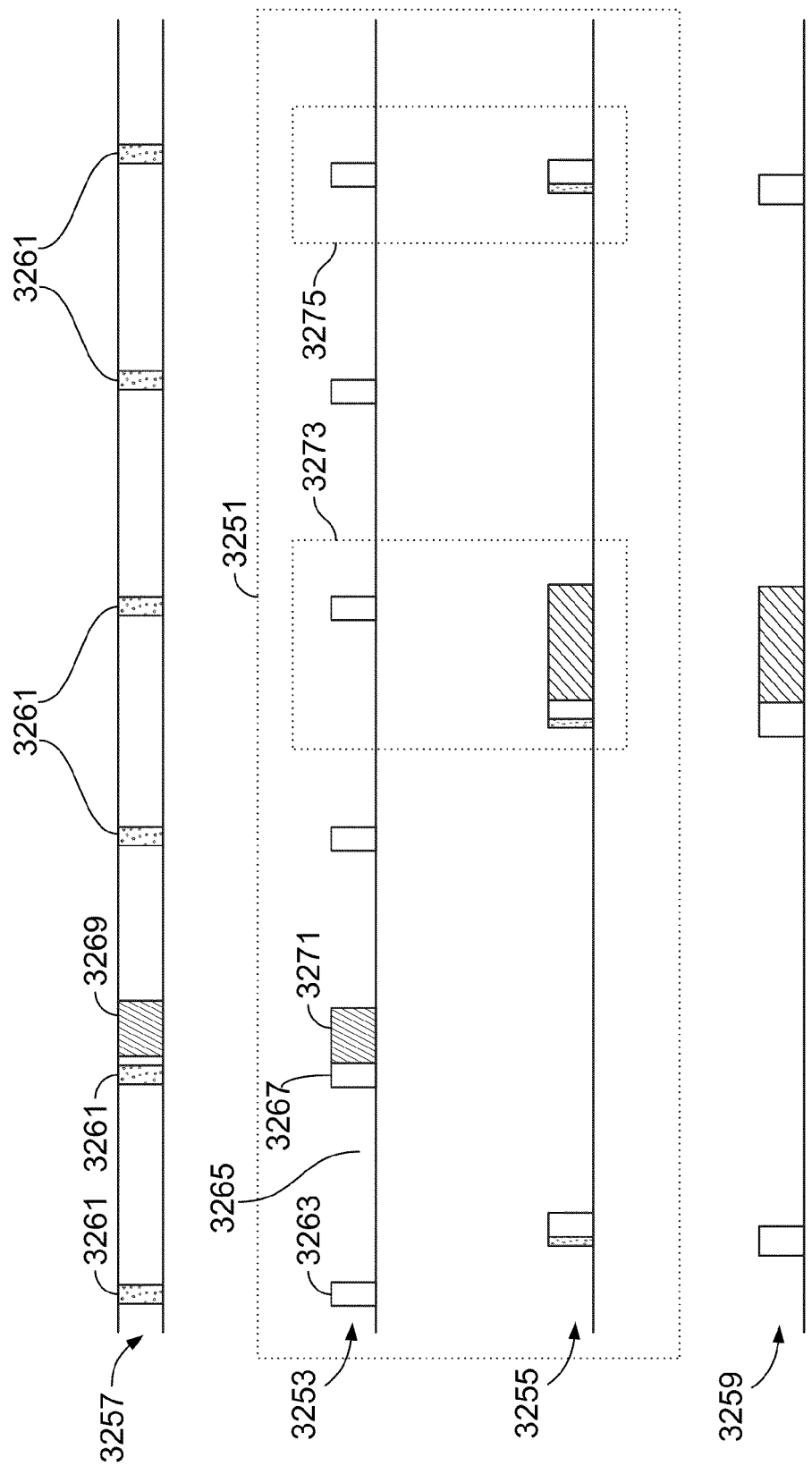
FIG. 34 is a timing diagram illustrating the peripheral LAN master device's servicing of both the higher power portion of the premises LAN as well as the lower power peripheral LAN subnetwork with a single or plural radio transceivers.

FIG. 34 is a timing diagram illustrating one embodiment of the peripheral LAN master device's servicing of both the high powered premises LAN and the low powered peripheral LAN subnetwork, with a single or plural radio transceivers, in accordance with present invention. Block 3251 represents typical communication activity of the master device. Line 3253 illustrates the master's communication with an access point on the premises LAN while line 3255 illustrates the master's communication with a slave device on the peripheral LAN. Lines 3257 and 3259 illustrate corresponding communication by the access point and slave device, respectively.

The access point periodically broadcasts HELLO messages 3261 indicating that it is available for communication. The master device monitors the HELLO messages during a time period 3263, and, upon determining that the base does not need servicing, enters a power conserving mode during a time period 3265. The master then activates for a time period to monitor the next HELLO message from the base. If the master has data to send to the base, it transmits the data during a time period 3271. Likewise, if the base has data to send to the master, the base transmits the data during a time period 3269. Once the data is received or sent by the master, it may again enter a power conserving mode. While HELLO message protocol is discussed, a number of communication protocols may be used for communication between the base and the master device. As may be appreciated, the peripheral LAN master device acts as a slave to access points in the premises LAN.

Generally, the communication exchange between the master and the slave is similar to that described above in reference to FIG. 33b. Block 3273, however, illustrates a situation where the master encounters a communication conflict, i.e., it has data to send to or receive from the slave on the peripheral LAN at the same time it will monitor the premises LAN for HELLO messages from the base. If the master has two radio transceivers, the master can service both networks. If, however, the master only has one radio transceiver, the master chooses to service one network based on network priority considerations. For example, in block 3273, it may be desirable to service the slave because of the presence of data rather than monitor the premises LAN for HELLO messages from the base. On the other hand, in block 3275, it may be more desirable to monitor the premises LAN for HELLO messages rather than transmit an idle sense message on the peripheral LAN.

Figure 35:
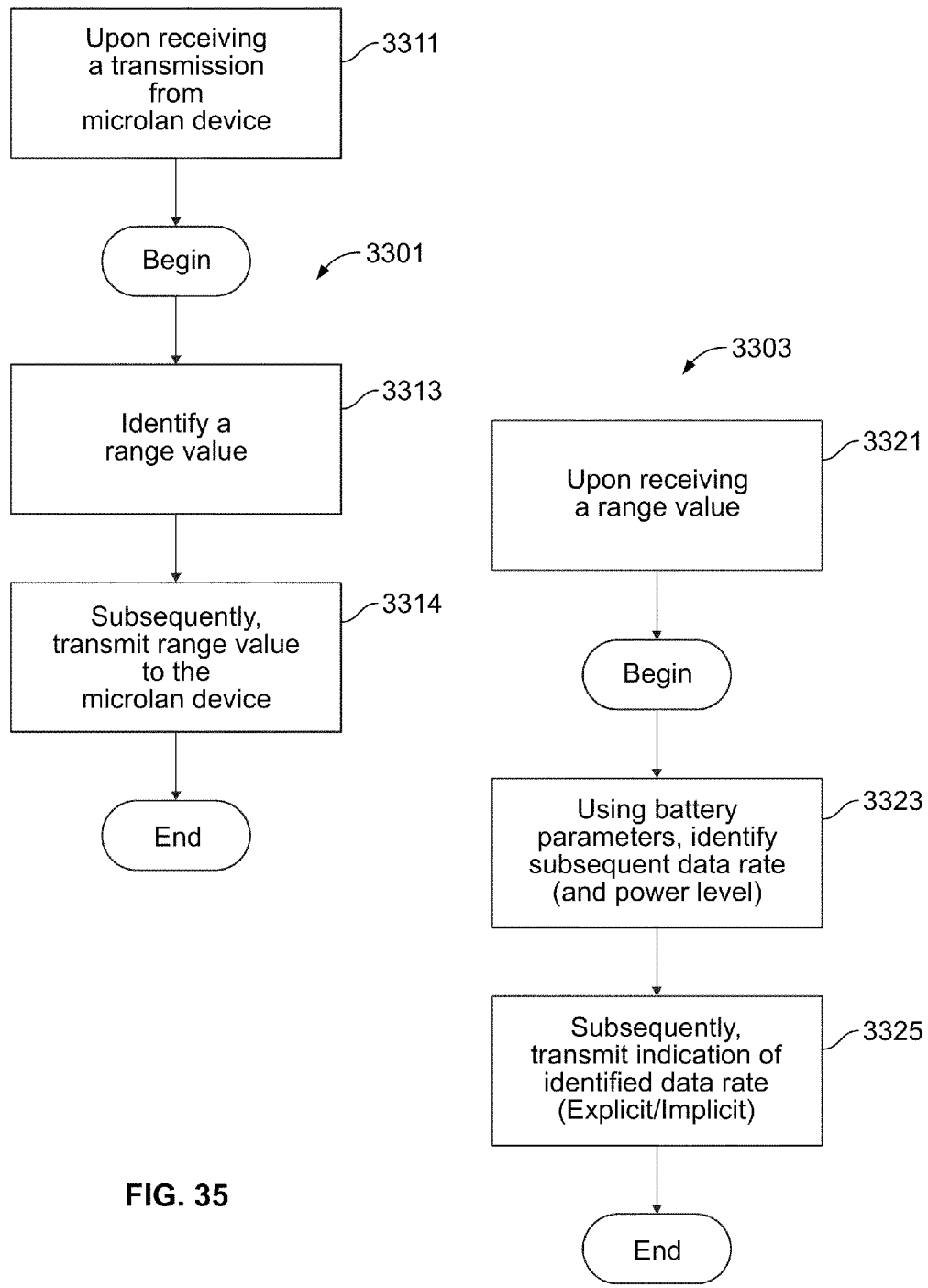
FIGS. 35 and 36 are block diagrams illustrating additional power saving features according to the present invention wherein ranging and battery parameters are used to optimally select the appropriate data rate and power level of subsequent transmissions.
Figure 36:
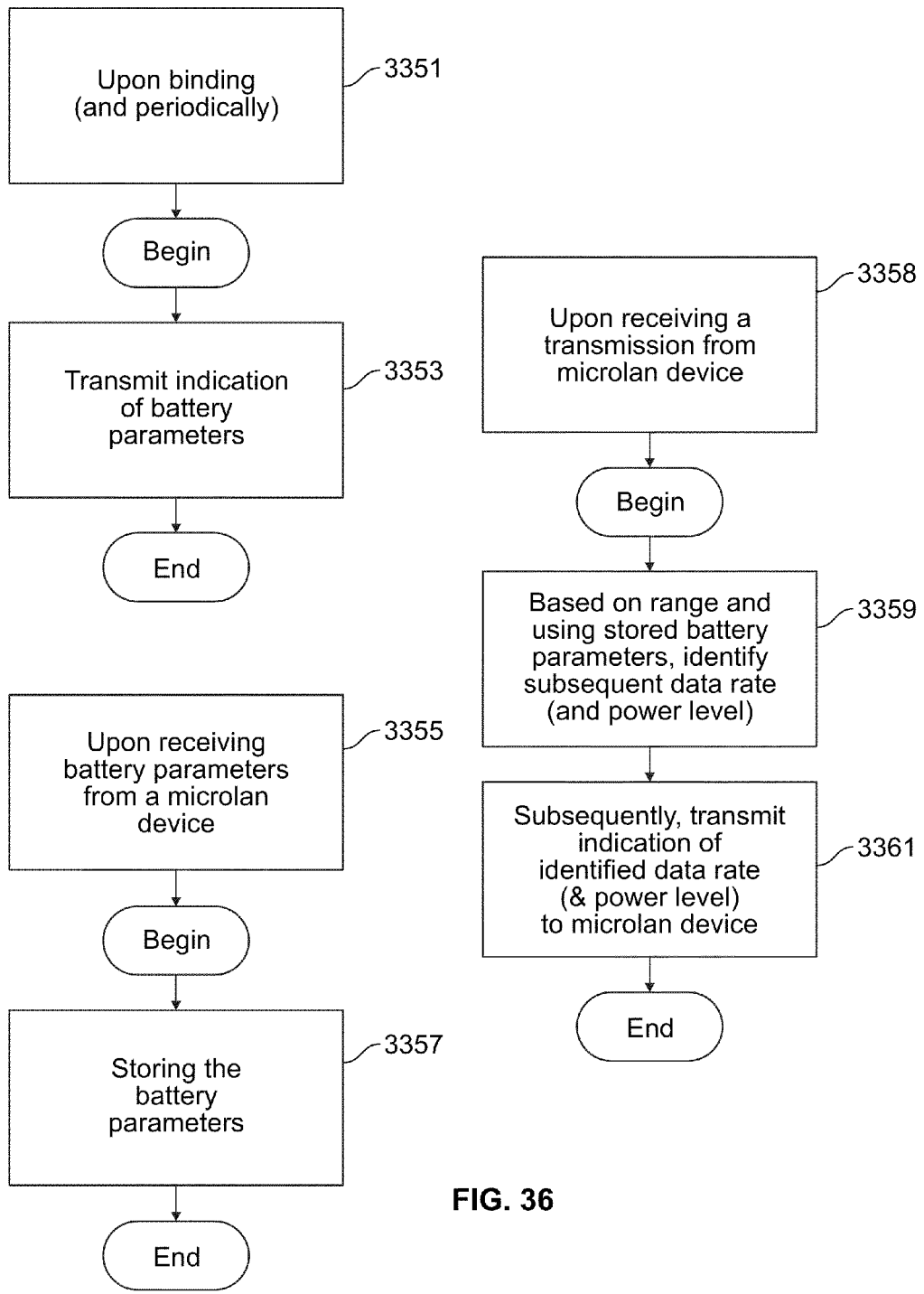

FIGS. 35 and 36 are block diagrams illustrating additional power saving features according to the present invention, wherein ranging and battery parameters are used to optimally select the appropriate data rate and power level for subsequent transmissions. Specifically, even though network devices such as the computer terminal 3007 in FIGS. 28-29b have the capability of performing high power transmissions, because of battery power concerns, such devices are configured to utilize minimum transmission energy. Adjustments are made based on ranging information and on battery parameters. Similarly, within the peripheral LAN, even though lower power transceivers are used, battery conservation issues also justify the use of such data rate and power adjustments. This process is described in more detail below in reference to FIGS. 35 and 36.

More specifically, FIG. 35; is a block diagram which illustrates a protocol 3301 used by a destination peripheral LAN device and a corresponding protocol 3303 used by a source peripheral LAN device to adjust the data rate and possibly the power level for future transmission between the two devices. At a block 3311, upon receiving a transmission from a source device, the destination device identifies a range value at a block 3313. In a low cost embodiment, the range value is identified by considering the received signal strength indications (RSSI) of the incoming transmission. Although RSSI circuitry might be placed in all peripheral LAN radios, the added expense may require that only peripheral LAN master devices receive the circuitry. This would mean that only peripheral LAN master devices would perform the function of the destination device. Other ranging techniques or signal quality assessments can also be used, such as measuring jitter in received signals, by adding additional functionality to the radios. Finally, after identifying the range value at the block 3313, the destination device subsequently transmits the range value to the slave device from which the transmission was received, at a block 3314.

Upon receipt of the range value from the destination device at a block 3321, the source peripheral LAN device evaluates its battery parameters to identify a subsequent data rate for transmission at a block 3323. If range value indicates that the destination peripheral LAN device is very near, the source peripheral LAN device selects a faster data rate. When the range value indicates a distant master, the source device selects a slower rate. In this way, even without adjusting the power level, the total energy dissipated can be controlled to utilize only that necessary to carry out the transmission. However, if constraints are placed on the maximum or minimum data rates, the transmission power may also need to be modified. For example, to further minimize the complexity associated with a fully random range of data rate values, a standard range and set of several data rates may be used. Under such a scenario, a transmission power adjustment might also need to supplement the data rate adjustment. Similarly, any adjustment of power must take into consideration maximum and minimum operable levels. Data rate adjustment may supplement such limitations. Any attempted modification of the power and data rate might take into consideration any available battery parameters such as those that might indicate a normal or current battery capacity, the drain on the battery under normal conditions and during transmission, or the fact that the battery is currently being charged. The latter parameter proves to be very significant in that when the battery is being charged, the peripheral LAN slave device has access to a much greater power source for transmission, which may justify the highest power transmission and possibly the slowest data rate under certain circumstances.

Finally, at a block 3325, an indication of the identified data rate is transmitted back to the destination device so that future transmissions may take place at the newly selected rate. The indication of data rate may be explicit in that a message is transmitted designating the specific rate. Alternately, the data rate may be transferred implicitly in that the new rate is chose and used by the source, requiring the destination to adapt to the change. This might also be done using a predefined header for synchronization.

In addition, at the block 3325, in another embodiment, along with the indication of the identified data rate, priority indications are also communicated. Whenever battery power is detected as being low, a radio transmits a higher priority indication, and each receiver thereafter treats the radio as having a higher protocol priority than other such radios that exhibit normal power supply energy. Thus, the remaining battery life is optimized. For example, in a non-polling network, the low power device might be directly polled periodically so to allow scheduled wake-ups and contention free access to a receiver. Similarly, in an alternate embodiment, priority indications not need to be sent. Instead, the low battery power device itself exercises protocol priority. For example, for channel access after detecting that the channel is clear at the end of an ongoing transmission, devices with normal energy levels are required to undergo a pseudo-random back-off before attempting a transmission (to avoid collision). The low power device may either minimize the back-off period or ignore the back-off period completely. Thus, the low power device gains channel access easier than other normal power level devices. Other protocol priority schemes may also be assigned by the receivers to the low power device (via the indication), else may be taken directly by the low power device.

FIG. 36 illustrates an alternate embodiment for carrying out the data rate and possibly power level adjustment. At a block 3351 upon binding and possibly periodically, the source peripheral LAN device sends an indication of its current battery parameters to the destination peripheral LAN device. This indication may be each of the parameters or may be an averaged indication of all of the parameters together. At a block 3355, upon receipt, the destination peripheral LAN device 355 stores the battery parameters (or indication). Finally, at a block 3358, upon receiving a transmission from the source device, based on range determinations and the stored battery parameters, the destination terminal identifies the subsequent data rate (and possibly power level). Thereafter, the new data rate and power level are communicated to the source device either explicitly or implicitly for future transmissions.

Figure 37:
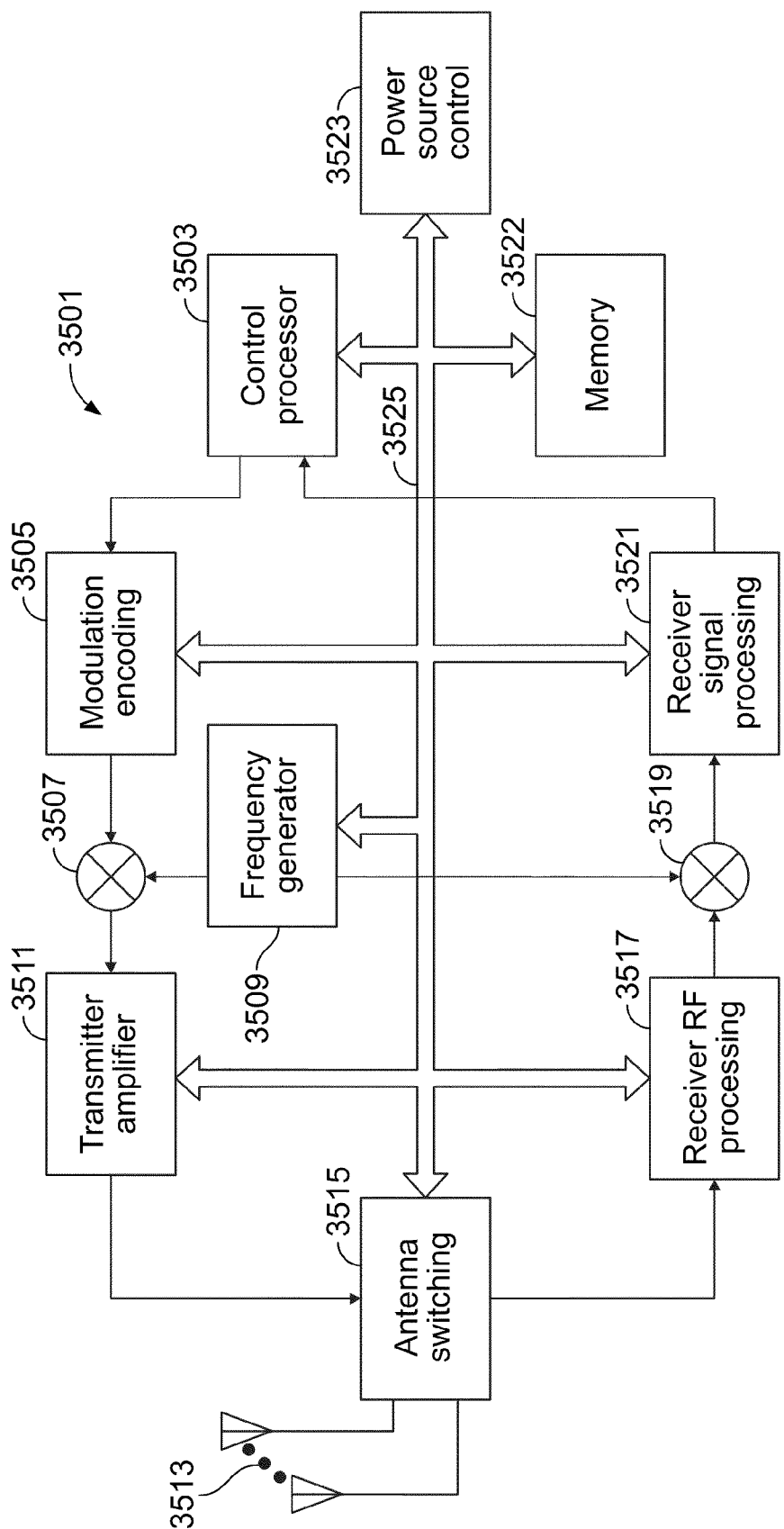
FIG. 37 illustrates an exemplary block diagram of a radio unit capable of current participation on multiple LANs according to the present invention.

FIG. 37 illustrates an exemplary block diagram of a radio unit 3501 capable of concurrent participation on multiple LAN's. To transmit, a control processor 3503 sends a digital data stream to a modulation encoding circuit 3505. The modulation encoding circuit 3505 encodes the data stream in preparation for modulation by frequency translation circuit 3507. The carrier frequency used to translate the data stream is provided by a frequency generator circuit 3509. Thereafter, the modulated data stream is amplified by a transmitter amplifier circuit 3511 and then radiated via the one of a plurality of antennas 3513 that has been selected via an antenna switching circuit 3515. Together, the modulation encoding circuitry 3505, translator 3507, amplifier 3511 and associated support circuitry constitute the transmitter circuitry.

Similarly, to receive data, the RF signal received by the selected one of the plurality of antennas 3513 is communicated to a receiver RF processing circuit 3517. After performing a rather coarse frequency selection, the receiver RF processing circuit 3517 amplifies the RF signal received. The amplified received signal undergoes a frequency shift to an IF range via a frequency translation circuit 3519. The frequency translation circuit 3519 provides the center frequency for the frequency shift. Thereafter, a receiver signal processing circuit receives the IF signal, performs a more exact channel filtering and demodulation, and forwards the received data to the control processor 3503, ending the process. Together, the receiver signal processing 3521, translator 3517, receiver RF processing 3517 and associated support circuitry constitute the receiver circuitry.

The control processor 3503 operates pursuant to a set of software routines stored in memory 3522 which may also store incoming and outgoing data. Specifically, the memory 3522 contains routines which define a series of protocols for concurrent communication on a plurality of LANs. As part of such operation, the control processor 3503 provides for power savings via a power source control circuit 3523, i.e., whenever the participating protocols permit, the control processor 3503 causes selective power down of the radio transceiver circuitry via a control bus 3525. Also, via the bus 3525, the control processor sets the frequency of the frequency generator 3509 so as to select the appropriate band and channel of operation required by a correspondingly selected protocol. Similarly, the control processor 3503 selects the appropriate antenna (via the antenna switching circuitry 3515) and channel filtering in preparation for operation on a selected LAN. Responding to the software routines stored in the memory 3522, the control processor 3503 selects the appropriate LANs to establish participation, detaches from those of the selected LANs in which participation is no longer needed, identifies from the selected LANs a current priority LAN in which to actively participate, maintains a time-shared servicing of the participating LANs. Further detail regarding this process follows below.

In one embodiment, the control processor 3503 constitutes a typical microprocessor on an independent integrated circuit. In another embodiment, the control processor 3503 comprises a combination of distributed processing circuitry which could be included in a single integrated circuit as is a typical microprocessor. Similarly, the memory 3522 could be any type of memory unit(s) or device(s) capable of software storage.

The radio circuitry illustrated is designed with the frequency nimble frequency generator 3509 so as to be capable of operation on a plurality of LANs/WANs. Because each of the plurality may be allocated a different frequency band, more than one antenna may be desirable (although a single antenna could be used, antenna bandwidth limitations might result in an unacceptable transmission-reception inefficiency). Thus, to select the appropriate configuration, the control processor 3503 first identifies the LAN/WAN on which to participate and selects the corresponding radio configuration parameters from the memory 3521. Thereafter, using the configuration parameters and pursuant to control routines stored in the memory 3522, the control processor 3503 sets the frequency of the generator 3509, selects the appropriate antenna via the antenna switching circuit 3515, and configures the receiver RF and signal processing circuits 3517 and 3521 for the desired LAN/WAN.

More particularly, the antenna switching circuit 3515 comprises a plurality of digitally controlled switches, each of which is associated with one of the plurality of antennas 3513 so as to permit selective connection by the control processor 3503 of any available antenna to the transceiver circuitry.

Figure 38:
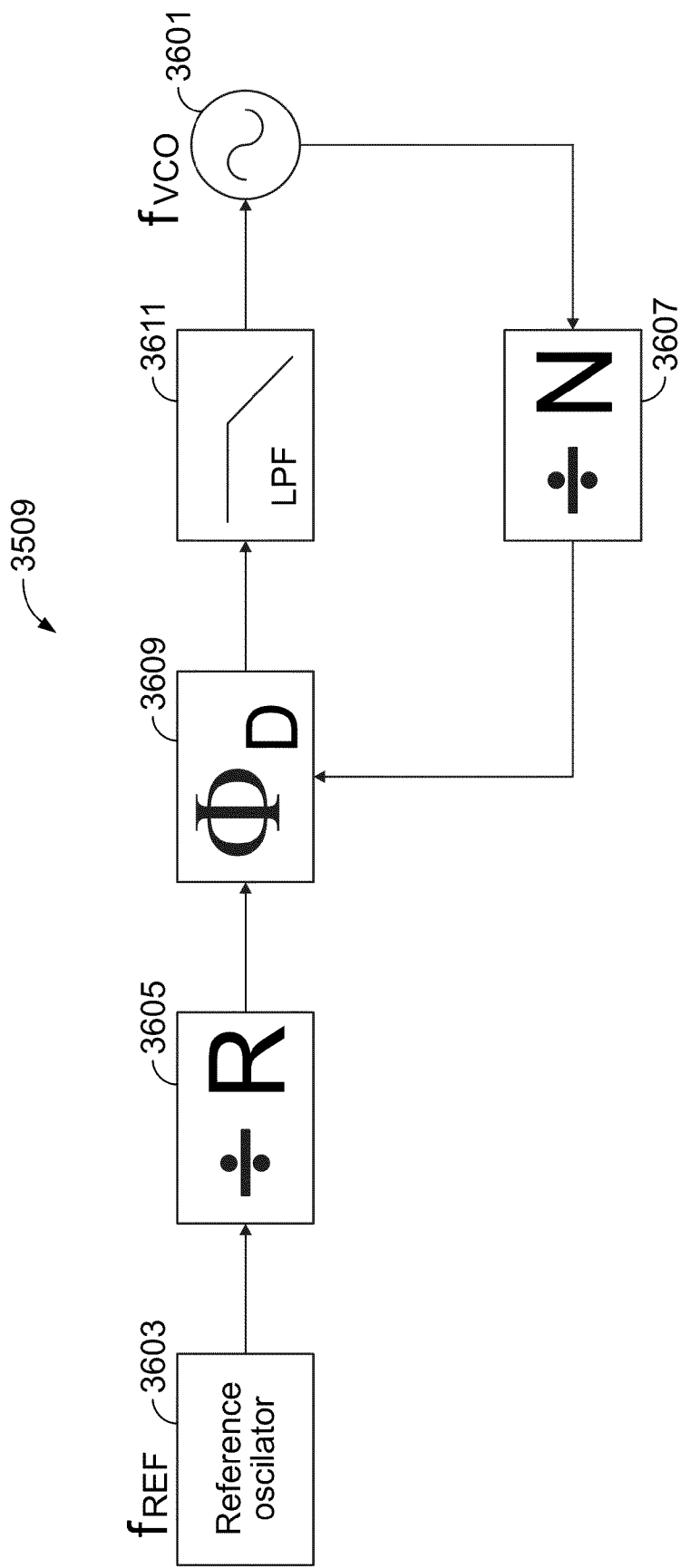
FIG. 38 illustrates an exemplary functional layout of the frequency generator of FIG. 37 according to one embodiment of the present invention.

FIG. 38 illustrates an exemplary functional layout of the frequency generator 3509 of FIG. 37 according to one embodiment of the present invention. Basically, the frequency generator 3509 responds to the control processor 3503 by producing the translation frequency necessary for a selected LAN/WAN. The illustrated frequency generator comprises a voltage controlled oscillator (VCO) 3601. As is commonly known, for a VCO, the center frequency $F_{VCO}$ tracks the input voltage. However, because typical VCO's are subject to drift, the VCO is stabilized by connecting it in a phase locked loop to a narrowband reference, such as a crystal reference oscillator 3603. The oscillator 3603 outputs a signal of a fixed or reference frequency $F_{REF}$ to a divide-by-R circuit 3605, which divides as its name implies the reference frequency $F_{REF}$ by the known number R. A phase detector 3609 receives the divided-by-R output of the circuit 3609 and the feedback from the output of the VCO 3601 via a divide-by-N circuit 3607. Upon receipt, the phase detector 3609 compares the phase of the outputs from the circuits 3605 and 3607. Based on the comparison, a phase error signal is generated and applied to a lowpass loop filter 3611. The output of the filter 3611 is applied to the input of the VCO 3601 causing the center frequency of the VCO 3601 to lock-in. Therefore, if the output of the VCO 3601 begins to drift out of phase of the reference frequency, the phase detector 3609 responds with a corrective output so as to adjust the center frequency of the VCO 3601 back in phase.

With the illustrated configuration, the center frequency of the VCO 3601 is a function of the reference frequency as follows:

$$F_{VCO}=(F_{REF}*N)/R$$

Thus, to vary the center frequency of the VCO 3601 to correspond to a band of a selected LAN/WAN in which active participation is desired, the control processor 3503 (FIG. 37) need only vary the variables "R" and "N" and perhaps the frequency of the reference oscillator. Because the output $F_{REF}$ of the reference oscillator 3603 is quite stable, the phase lock loop as shown also keeps the output frequency $F_{VCO}$ of the VCO 3601 stable.

More specifically, although any other scheme might be implemented, the value R in the divide-by-R circuit 3605 is chosen so as to generate an output equal to the channel spacing of a desired LAN/WAN, while the value N is selected as a multiplying factor for stepping up the center frequency of the VCO 3601 to the actual frequency of a given channel. Moreover, the frequency of the reference oscillator is chosen so as to be divisible by values of R to yield the channel spacing frequencies of all potential LANs and WANs. For example, to participate on both MTEL Corporation's Two Way Paging WAN (operating at 900 MHz with 25 KHz and 50 KHz channel spacings) and ARDIS Corporation's 800 MHz specialized mobile radio (SMR) WAN (operating at 25 KHz channel spacings centered at multiples of 12.5 KHz), a single reference frequency may be chosen to be a whole multiple of 12.5 KHz. Alternately, multiple reference frequencies may be chosen. Moreover, the value N is chosen to effectively multiply the output of the divide-by-R circuit 3605 to the base frequency of a given channel in the selected WAN.

For frequency hopping protocols, the value of R is chosen so as to yield the spacing between frequency hops. Thus, as N is incremented, each hopping frequency can be selected. Randomizing the sequence of such values of N provides a hopping sequence for use by an access point as described above. Pluralities of hopping sequences (values of N) may be stored in the memory 3522 (FIG. 37) for operation on the premises LAN, for example.

In addition to the single port phase locked loop configuration for the frequency generator 3509, other configurations might also be implemented. Exemplary circuitry for such configurations can be found in U.S. patent application Ser. No. 08/205,639, filed Mar. 4, 1994 by Mahany et al., entitled "Method of and Apparatus For Controlling Modulation of Digital Signals in Frequency-Modulated Transmissions". This application is incorporated herein in its entirety.

Figure 39:
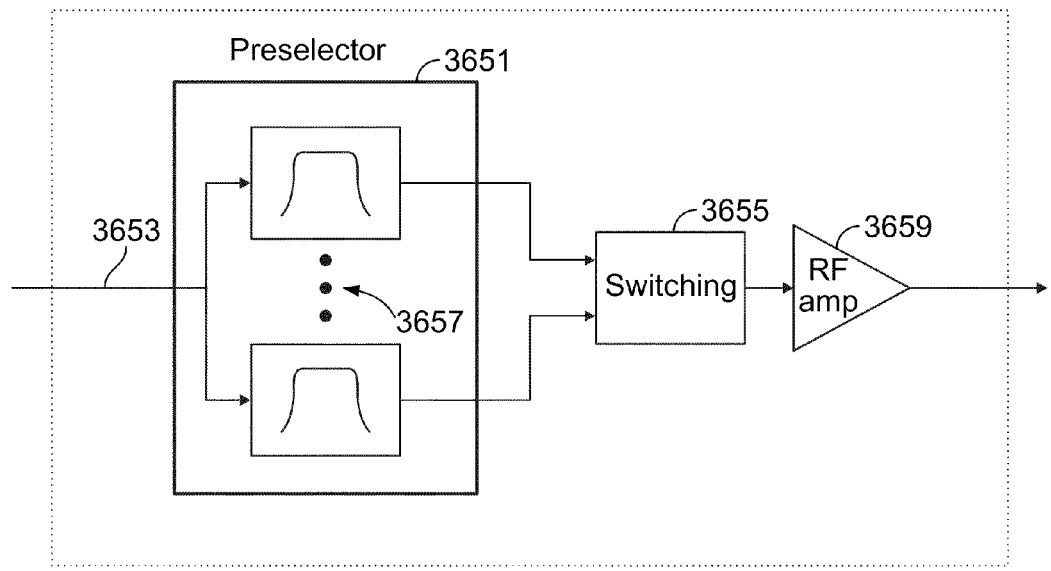
FIG. 39 illustrates further detail of the receiver RF processing circuit of FIG. 37 according to one embodiment of the present invention.

FIG. 39 illustrates further detail of the receiver RF processing circuit 3517 of FIG. 37 according to one embodiment of the present invention. Specifically, a preselector 3651 receives an incoming RF data signal from a selected one of the plurality of antennas 3513 (FIG. 37) via an input line 3653. The preselector 3651 provides a bank of passive filters 3657, such as ceramic or dielectric resonator filters, each of which provides a coarse filtering for one of the LAN/WAN frequencies to which it is tuned. One of the outputs from the bank of passive filters 3657 is selected by the control processor 3503 via a switching circuit 3655 so as to monitor the desired one of the available LANs/WANs. Thereafter, the selected LAN/WAN RF signal is amplified by an RF amplifier 3659 before translation by the frequency translation circuit 3519 (FIG. 37).

Figure 40:
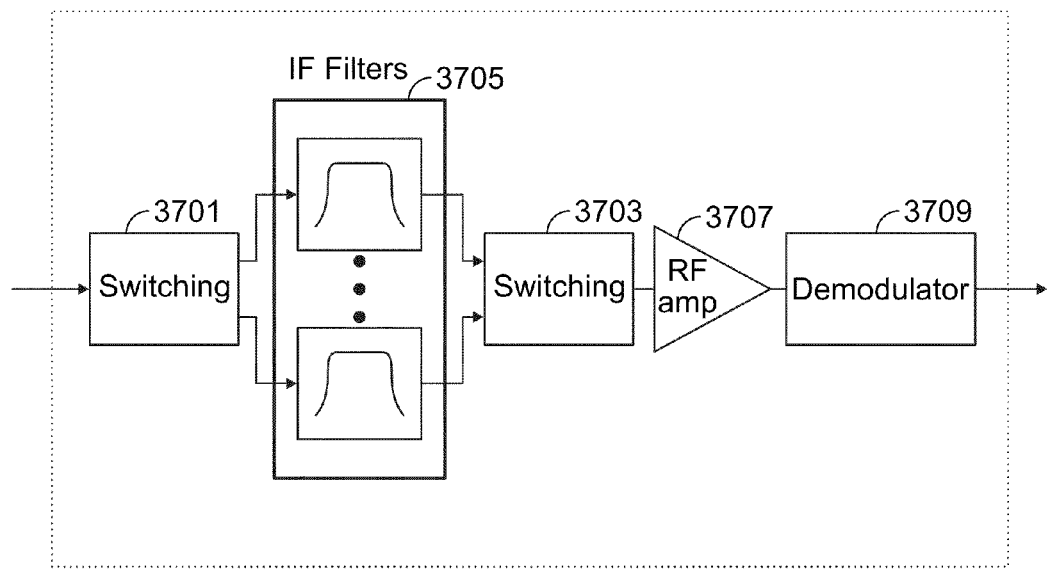
FIG. 40 illustrates further detail of the receiver signal processing circuit of FIG. 37 according to one embodiment of the present invention.

FIG. 40 illustrates further detail of the receiver signal processing circuit 3521 of FIG. 37 according to one embodiment of the present invention. In particular, digitally controlled switching circuits 3701 and 3703 respond to the control processor 3503 by selecting an appropriate pathway for the translated IF data signal through one of a bank of IF filters 3705. Each IF filter is an analog crystal filter, although other types of filters such as a saw filter might be used. The IF filters 3705 provide rather precise tuning to select the specific channel of a given LAN/WAN.

After passing through the switching circuit 3703, the filtered IF data signal is then amplified by an IF amplifier 3707. The amplified IF signal is then communicated to a demodulator 3709 for demodulation. The control processor retrieves the incoming demodulated data signal for processing and potential storage in the memory 3522 (FIG. 37).

Figure 41:
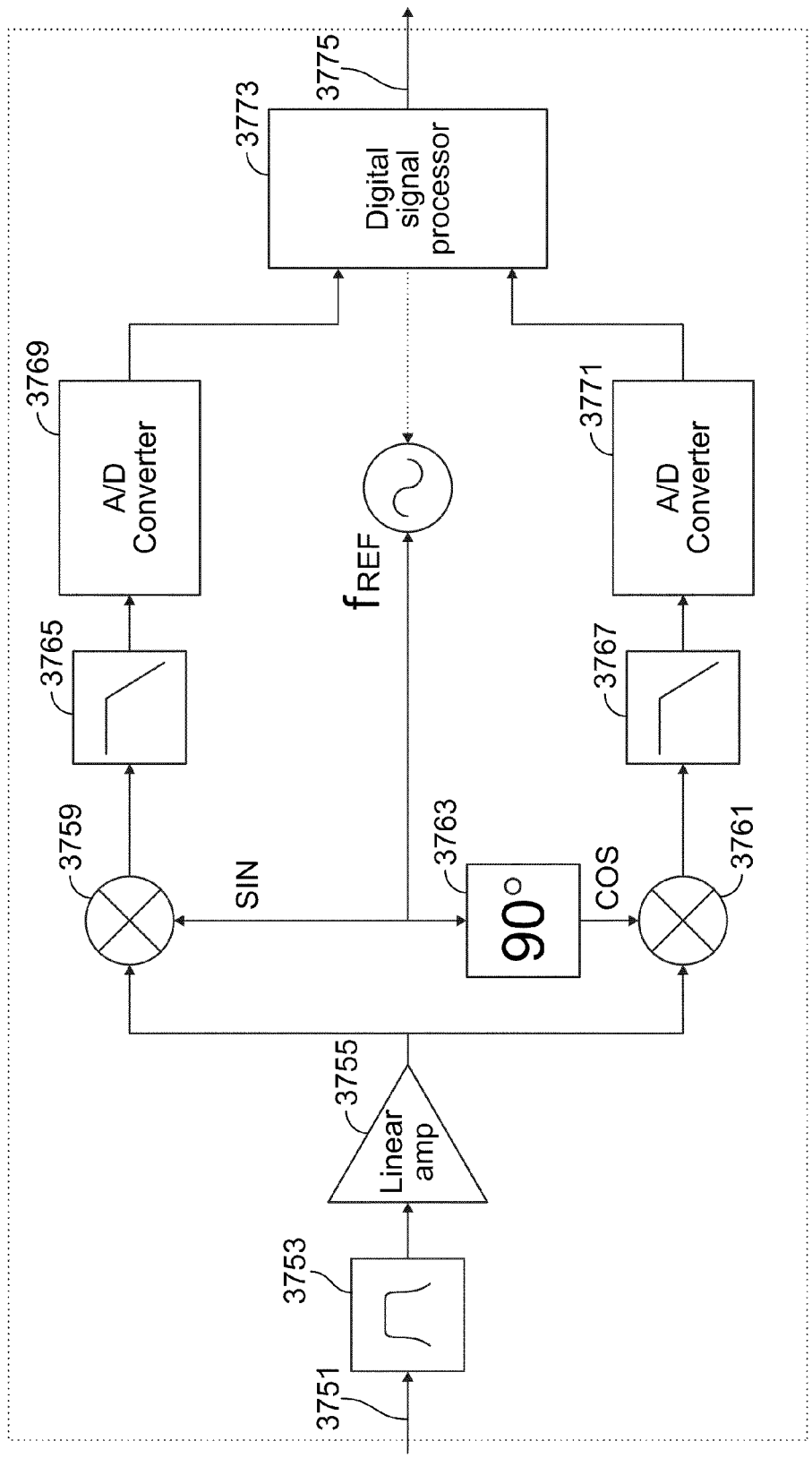
FIG. 41 illustrates further detail of the receiver signal processing circuit of FIG. 37 according to another embodiment of the present invention.

FIG. 41 illustrates further detail of the receiver signal processing circuit 3521 of FIG. 37 according to another embodiment of the present invention. Specifically, the IF signal resulting from the translation by the frequency translator circuitry 3519, enters the receiver signal processing circuit via an input 3751. Thereafter, the IF signal passes through an anti-aliasing filter 3753, and is amplified by a linear amplifier 3755. An IF oscillator 3757 supplies a reference signal $f_{REF}$ for translation of the incoming IF signal at frequency translation circuits 3759 and 3761. A phase shift circuit 3763 provides for a 90-degree shift of $f_{REF}$, i.e., if $f_{REF}$ is considered a SINE wave, then the output of the circuit 3763 is the COSINE of $f_{REF}$. Both the SINE and COSINE frequency translation pathways provide for channel selection of the incoming data signal. Thereafter the data signals are passed through corresponding low pass filters 3765 and 3767 in preparation for sampling by analog to digital (A/D) converters 3769 and 3771. Each A/D converter forwards the sampled data to a digital signal processor 3773 which provides for further filtering and demodulation. The digital signal processor 3773 thereafter forwards the incoming data signal to the control processor 3503 (FIG. 37) via an output line 3775. Moreover, although the digital signal processor 3773 and the control processor 3507 are discrete components in the illustrated example, they may also be combined into a single integrated circuit.

Figure 42:
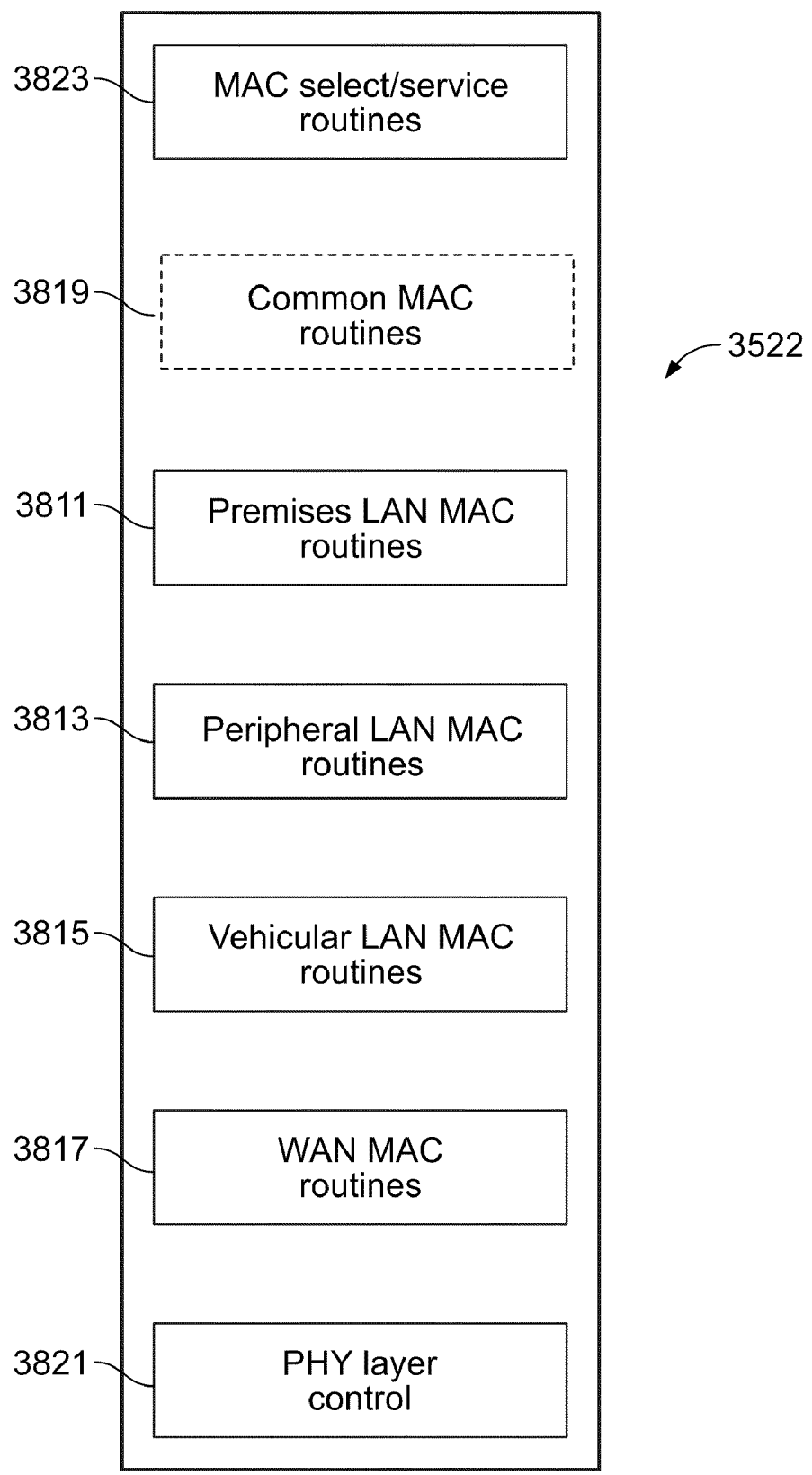
FIG. 42 illustrates further detail of the memory unit of FIG. 37 according to one embodiment of the present invention.

FIG. 42 illustrates further detail of some of the storage requirements of the memory 3522 of FIG. 37 according to one embodiment of the present invention. To control the radio, the control processor 3503 (FIG. 37) accesses the information in the memory 3522 needed for radio setup and operation on a plurality of LANs/WANs. Among other information, the memory 3522 stores: 1) a plurality of software protocols, one for each LAN/WAN to be supported, which define how the radio is to participate on the corresponding LAN; and 2) an overriding control set of routines which govern the selection, use and interaction of the plurality of protocols for participation on desired LANs/WANs.

Specifically, in the memory unit 3522, among other information and routines, software routines relating to the media access control (MAC) sublayer of the communication protocol layers can be found. In general, a MAC sublayer provides detail regarding how communication generally flows through a corresponding LAN or WAN. Specifically, the MAC sublayer handles functions such as media access control, acknowledge, error detection and retransmission. The MAC layer is fairly independent of the specific radio circuitry and channel characteristics of the LAN or WAN.

As illustrated, premises LAN, peripheral LAN, vehicular LAN and WAN MAC routines 3811, 3813, 3815 and 3817 provide definition as to how the control processor 3503 (FIG. 37) should operate while actively participating on each LAN or WAN. Although only the several sets of MAC routines are shown, many other sets might also be stored or down-loaded into the memory 3522. Moreover, the sets of MAC routines 3811-17 might also share a set of common routines 3819. In fact, the sets of MAC routines 3811-17 might be considered a subset of an overall MAC which shares the common MAC routines 3819.

Below the MAC layer in the communication hierarchy, hardware and channel related software routines and parameters are necessary for radio control. For example, such routines govern the specific switching for channel filtering and antenna selection required by a given LAN or WAN. Similarly, these routines govern the control processor 3503's selection of parameters such as for R and N for the frequency generator 3509 (FIG. 38), or the selective power-down (via the power source control circuitry 3503—FIG. 37) of portions or all of the radio circuitry whenever possible to conserve battery power. As illustrated, such routines and parameters are referred to as physical (PHY) layer control software 3821. Each of the sets of MAC routines 3811-17 and 3819 provide specific interaction with the PHY layer control software 3821.

A set of MAC select/service routines 3823 govern the management of the overall operation of the radio in the network. For example, if participation on the premises LAN is desired, the MAC select/service routines 3823 direct the control processor 3503 (FIG. 37) to the common and premises MAC routines 3819 and 3811 respectively. Thereafter, if concurrent participation with a peripheral LAN is desired, the select/service routines 3823 direct the control processor 3503 to enter a sleep mode (if available). The control processor 3503 refers to the premises LAN MAC routines 3811, and follows the protocol necessary to establish sleep mode on the premises LAN. Thereafter, the select/service routines 3823 directs the control processor 3503 to the peripheral LAN MAC routines 3813 to establish and begin servicing the peripheral LAN. Whenever the peripheral LAN is no longer needed, the select/service routines 3823 direct a detachment from the peripheral LAN (if required) as specified in the peripheral LAN MAC routines 3813. Similarly, if, during the servicing of the peripheral LAN, an overriding need to service the premises LAN arises, the processor 3503 is directed to enter a sleep mode via the peripheral LAN MAC routines 3813, and to return to servicing the premises LAN.

Although not shown, additional protocol layers as well as incoming and outgoing data are also stored with the memory 3522, which, as previously articulated, may be a distributed plurality of storage devices.

Figure 43:
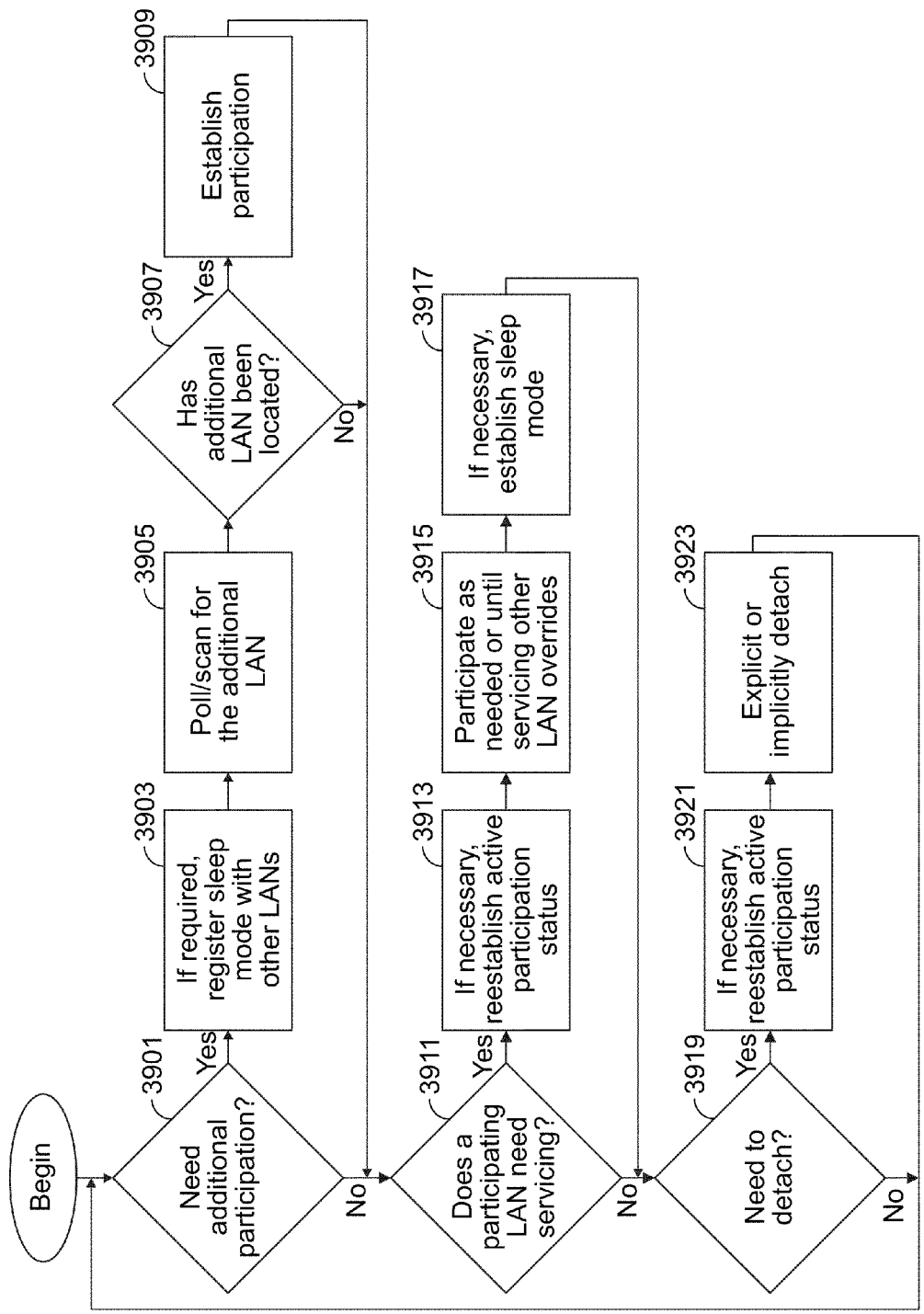
FIG. 43 illustrates a software flow chart describing the operation of the control processor in controlling the battery powered radio unit to participate on multiple LANS.

FIG. 43 illustrates a software flow chart describing the operation of the control processor 3503 (FIG. 37) in controlling the radio unit to participate on multiple LANs according to one embodiment of the present invention. Specifically, at a block 3901, the control processor first determines whether the radio unit needs to participate on an additional LAN (or WAN). If such additional participation is needed, at a block 3903, the radio unit may register sleep mode operation with other participating LANs if the protocols of those LANs so require and the radio unit has not already done so. Next, at a block 3905, the control processor causes the radio unit to poll or scan to locate the desired additional LAN. If the additional LAN is located at a block 3907, participation of the radio unit on the additional LAN is established at a block 3909.

If additional participation is not needed at block 3901, or if the additional LAN has not been located at block 3907, or once participation of the radio unit on the additional LAN has been established at block 3909, the control processor next determines at a block 3911 whether any of the participating LANs require servicing. If any given participating LAN requires servicing, at a block 3913, the radio unit may be required by the protocol of the given LAN to reestablish an active participation status on that LAN, i.e., indicate to the given LAN that the radio unit has ended the sleep mode. Next, at a block 3915, the radio unit services the given LAN as needed or until the servicing of another LAN takes priority over that of the given LAN. At a block 3917, the radio unit may then be required to register sleep mode operation with the given LAN if the LAN's protocol so requires.

At that point, or if no participating LAN needs servicing at block 3911, the control processor determines at a block 3919 whether the radio needs to detach from any given participating LAN. If so, the radio unit may implicitly detach at a block 3923 if the protocol of the LAN from which the radio wishes to detach requires no action by the radio unit. However, at a block 3921, the radio unit may be required to establish active participation on the LAN in order to explicitly detach at block 3923. For example, such a situation may arise when a portable terminal desires to operate on a shorter range vehicular LAN and detaches from a premises LAN. The portable terminal may be required by the protocol of the premises LAN to establish active communication on the premises LAN to permit the radio unit to inform the premises LAN that it is detaching and can only be accessed through the vehicular LAN.

Once the radio unit is detached at block 3923, or if the radio unit does not need to detach from any participating LANs at block 3919, the control processor returns to block 3901 to again determine whether the radio unit needs to participate on an additional LAN, and repeats the process.

Figure 44:
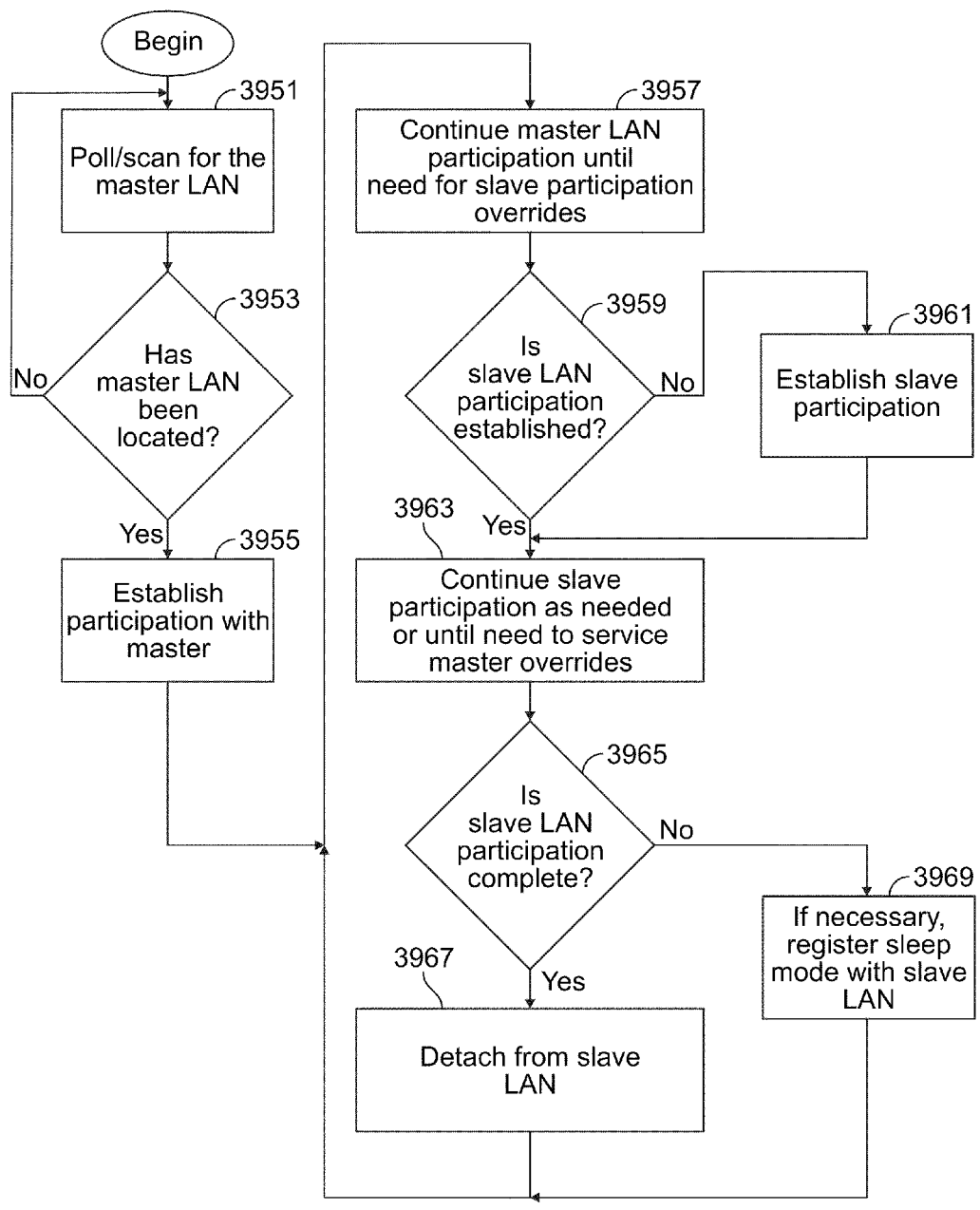
FIG. 44 is an alternate embodiment of the software flow chart wherein the control processor participates on a master LAN and, when needed, on a slave LAN.

FIG. 44 is an alternate embodiment of the software flow chart wherein the control processor participates on a master LAN and, when needed, on a slave LAN. Specifically, at a block 3951, the control processor causes the radio unit to poll or scan in order to locate the master LAN. If the master LAN has not been located at a block 3953, polling or scanning for the master LAN continues. Once the master LAN is located, participation with the master is established at a block 3955. At a block 3957, the radio unit participates with the master LAN until the need for the radio unit to participate on the slave LAN takes precedence. When that condition occurs, the control processor determines at a block 3959 whether participation of the radio unit on the slave network is established. If not, such participation is established at a block 3961. Next, at a block 3963, the radio unit services the slave LAN as needed or until the servicing of the master LAN takes priority. If the control processor determines at a block 3965 that servicing of the slave LAN has been completed, the radio unit detaches from the slave LAN at a block 3967 and returns to block 3957 to continue participation on the master LAN.

However, if the control processor determines at block 3965 that servicing has not been, or may not be, completed, the radio unit does not detach from the slave LAN. In that case, before returning to block 3957 to service the master LAN, the radio unit may be required by the protocol of the slave LAN to register sleep mode operation with the slave LAN at a block 3969.

Figure 45:
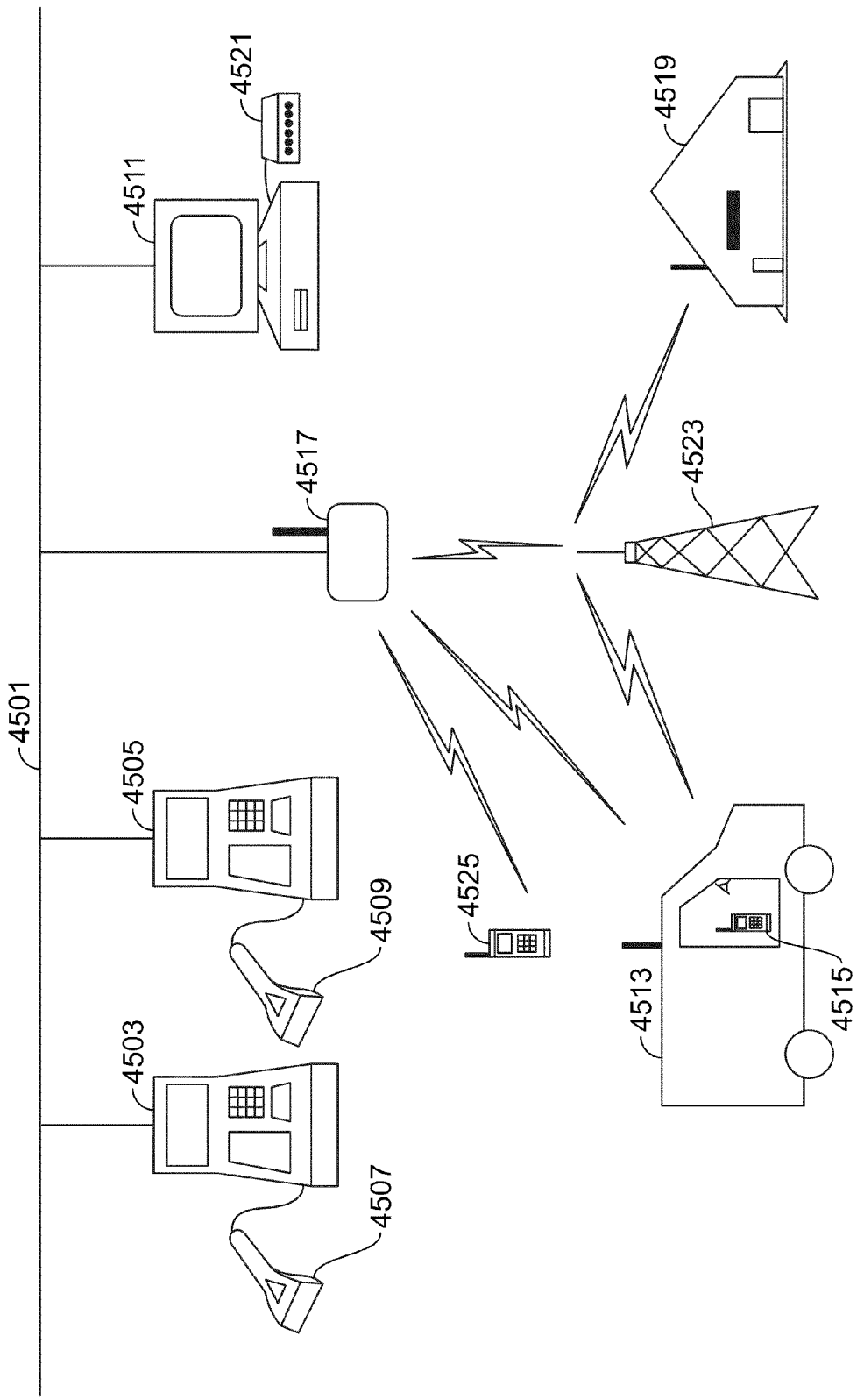
FIG. 45 illustrates another embodiment of the communication system of the present invention as adapted for servicing a retail store environment.

In another embodiment, shown in FIG. 45, the overall communication system of the present invention has been adapted to service the environment found, for example, in a retail store. As illustrated, the premises of the retail store are configured with a communication network to provide for inventory control. Specifically, the communication network includes a backbone LAN 4501, an inventory computer 4511, and a plurality of cash registers located throughout the store, such as cash registers 4503 and 4505. As illustrated, the backbone LAN 4501 is a single wired link, such as Ethernet. However, it may comprise multiple sections of wired links with or without wireless link interconnects. For example, in another embodiment, each cash register 4503 and 4505 is communicatively interconnected with the inventory computer via an infrared link.

The inventory computer 4511, which can range from a personal to main frame computer, provides central control over the retail inventory by monitoring the inventory status. Thus, the inventory computer 4511 must monitor both sales and delivery information regarding inventoried goods. To monitor sales information, the cash registers 4503 and 4505 include code scanners, such as tethered code scanners 4507 and 4509, which read codes on product labels or tags as goods are purchased. After receiving the code information read from the scanners 4507 and 4509, the cash registers 4503 and 4505 communicate sales information to the inventory computer 4511 via the backbone LAN 4501. To monitor delivery information, when the truck 4513 makes a delivery, the information regarding the goods delivered is communicated to the inventory computer 4511 via the access point 4517. As illustrated, the access point 4517 acts as a direct access point to the backbone LAN 4501, even though a series of wireless hops might actually be required.

Upon receiving the sales information from the cash registers 4503 and 4505, the inventory computer 4511 automatically debits the inventory count of the goods sold. Similarly, upon receiving the delivery information, the inventory computer 4511 automatically credits the inventory count of the goods delivered. With both the sales and delivery information, the inventory computer 4511 accurately monitors the inventory of all goods stocked by the retail store. From the inventory information, the inventory computer 4511 generates purchase orders for subsequent delivery, automating the entire process.

In particular, the inventory computer 4511 receives sales information from the cash registers 4503 and 4505 as detailed above. Whenever the restocking process is initiated, the inventory computer 4511 checks the retail inventory for each item sold to determine if restocking is needed. If restocking proves necessary, the inventory computer 4511, evaluating recent sales history, determines the quantity of the goods needed. From this information, an "inventory request" is automatically generated by the inventory computer 4511. Once verified (as modified if needed), the inventory request is automatically forwarded by the inventory computer 4511 to the warehouse 4519. This forwarding occurs via either a telephone link using a modem 4521, or a WAN link using the backbone LAN 4501, access point 4517, and an antenna tower 4523.

At the remote warehouse 4519, the delivery truck 4513 is loaded pursuant to the inventory request received from the inventory computer 4511. After loading, the truck 4513 travels to the premises of the retail store. When within range of the access point 4517, the radio terminal 4515 in the truck 4513 automatically gains access to the retail premises LAN via the access point 4517 (as detailed above), and communicates an anticipated delivery list (a "preliminary invoice"), responsive to the inventory request, to the inventory computer 4511. In response, dock workers can be notified to prepare for the arrival of the delivery truck 4513. In addition, any rerouting information can be communicated to the terminal 4515 in the delivery truck 4513. If a complete rerouting is indicated, the truck 4513 may be redirected without ever having reached the dock.

While unloading the delivery truck 4513, codes are read from all goods as they are unloaded using portable code readers, which may be built into or otherwise communicatively attached to the radio terminal 4515. The codes read are compared with and debited against the preliminary invoice as the goods are unloaded. This comparing and debiting occur either solely within the terminal 4515 or jointly within the terminal 4515 and the inventory computer 4511. If the codes read do not correspond to goods on the inventory request, or if the codes read do correspond but are in excess of what was required by the inventory request, the goods are rejected. Rejection, therefore, occurs prior to the actual unloading of the goods from the delivery truck 4513.

At the dock, the goods received from the delivery truck 4513 undergo a confirmation process by a dock worker who, using a radio terminal 4525 configured with a code reader, reads the codes from the goods on the dock to guarantee that the proper goods, i.e., those requested pursuant to the inventory request, were actually unloaded. This extra step of confirmation can be eliminated, however, where the dock worker directly participates in the code reading during the unloading process in the delivery truck 4513. Similarly, the code reading within the delivery truck 4513 could be eliminated in favor of the above described on-dock confirmation process, but, reloading of any wrongly unloaded goods would be required.

Upon confirmation of the delivery by the dock worker, a verified invoice is automatically generated by the radio terminal 4515 and routed to the inventory computer 4511 for inventory and billing purposes. In addition, the verified invoice is routed to the warehouse 4519. Such routing may occur as soon as the delivery truck returns to the warehouse 4519. However, to accommodate rerouting in situations where goods have been turned away at the retail store, the radio terminal 4515 communicates the final invoice immediately to the warehouse 4519. The warehouse 4519, upon receiving the final invoice, checks the final invoice with the list of goods loaded in the delivery truck 4513, and determines whether delivery of the remaining goods is possible. If so, the warehouse 4519 reroutes the truck 4513 to the next delivery site.

The communication of the final invoice and the rerouting information between the warehouse 4519 and the terminal 4515 may utilize a low cost communication pathway through the telephone link in the premises network of the retail store. In particular, the pathway for such communication utilizes the access point 4517, backbone LAN 4501, inventory computer 4511 and modem 4521. Alternately, the communication pathway might also utilize the WAN directly from the radio terminal 4515 to the warehouse 4519 via the antenna tower 4523. Moreover, the antenna tower 4523 is merely representative of a backbone network for the WAN. Depending on the specific WAN used, the tower 4523 may actually comprise a plurality of towers using microwave links to span the distance between the retail premises and the warehouse 4519. Similarly, satellite relaying of the communications might also be used.

Figure 46A:
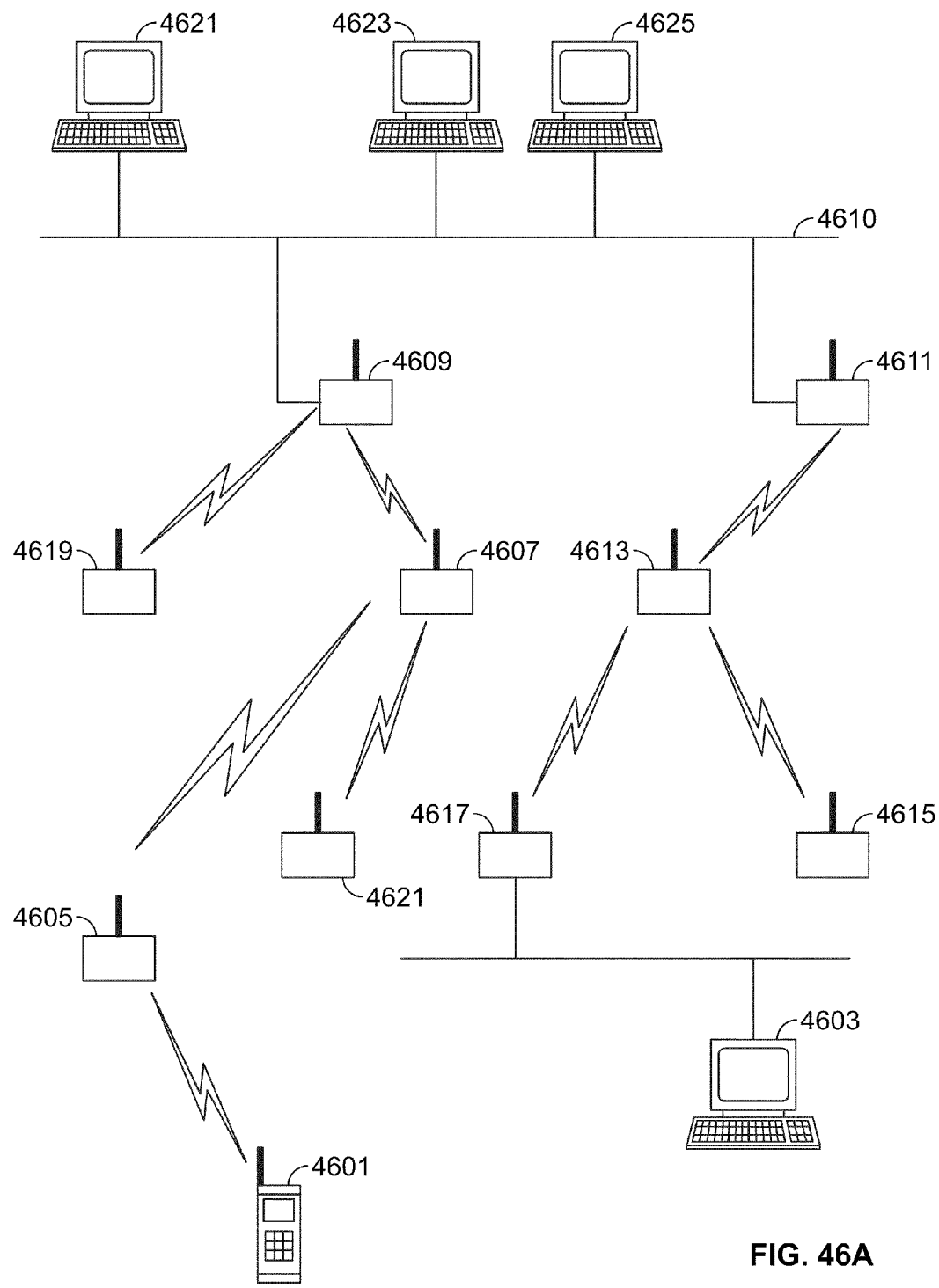
FIGS. 46a-b illustrate a further embodiment of the communication system of the present invention which illustrate the use of access servers that support local processing and provide both data and program migration.
Figure 46B:
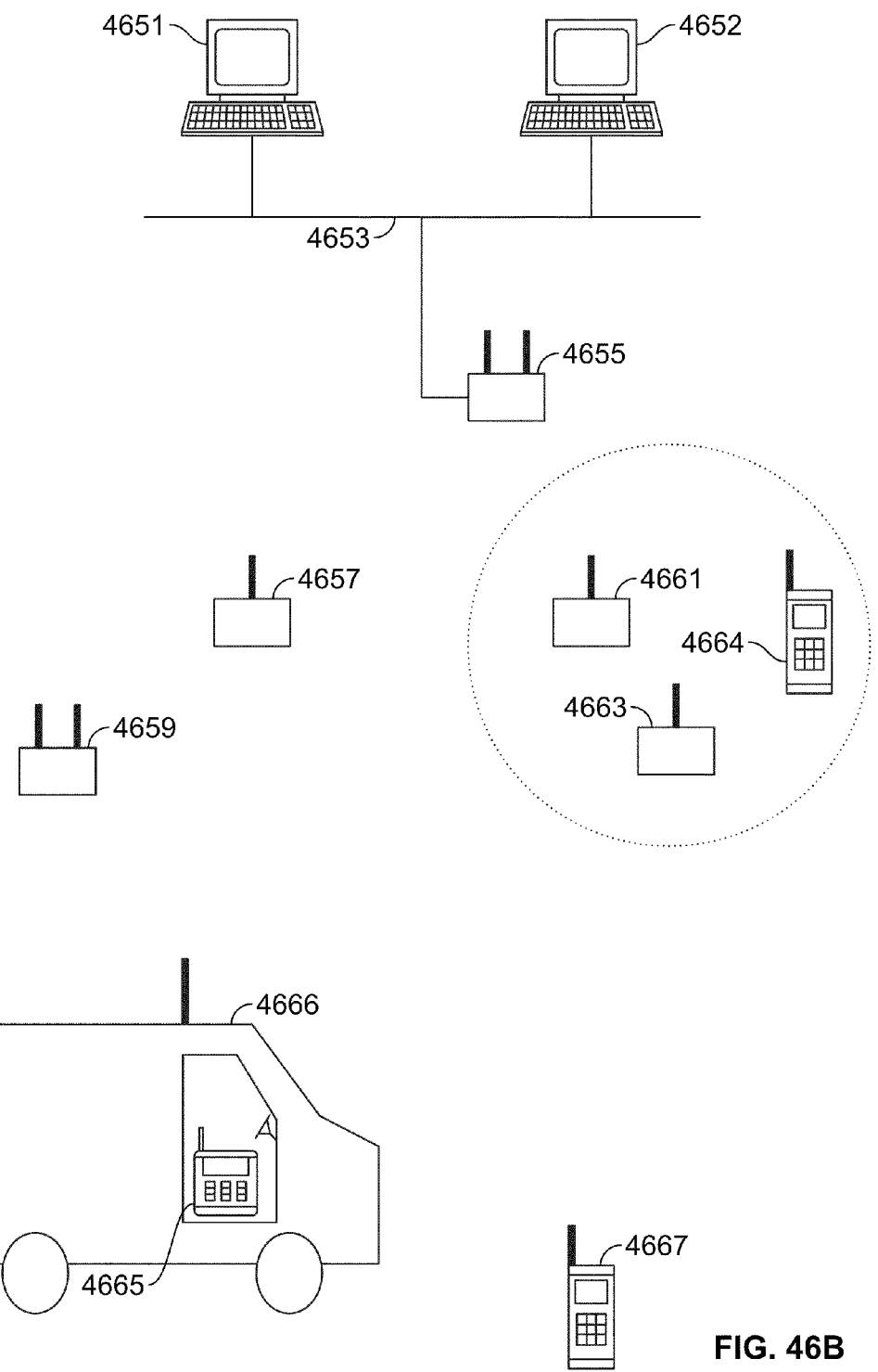

FIGS. 46*a-b* illustrate a further embodiment of the communication system of the present invention which illustrate the use of access servers that support local processing and provide both data and program migration. Specifically, as with the previous figures, FIG. 46*a* illustrates a wireless and hardwired communication network which uses a spanning tree protocol to provide ubiquitous coverage throughout a premises.

For example, if any network device, e.g., an end-point device such as a wireless, hand-held computer terminal 4601, desires to communicate with another network device, e.g., a hardwired computer 4603, a routing request is constructed which specifically identifies the destination device. After construction, the routing request is transmitted through a spanning tree pathway to the destination device.

In particular, the terminal 4601 formulates a routing request identifying the computer 4603. The routing request may also contain, for example, a message or data to be delivered or a request for data or program code. The terminal 4601 transmits the routing request downstream (toward the root of the spanning tree) to an access device 4605. The access device 4605 examines its spanning tree routing table entries, attempting to locate an upstream path to the destination device identified by the request. Because no entry exists, the access device 4605 transmits the routing request downstream to an access device 4607. After finding no routing table entry, the access device 4607 routes the request to a root access device 4609. Finding no routing table entry for the computer 4603, the access device 4609 transmits the routing request onto a wired LAN 4610. Using its routing table which has an entry for the computer 4603, a root access device 4611 fields the routing request and transmits the request upstream to an access device 4613. Likewise, the access device 4613, having an entry, sends the routing request to an access device 4617. Upon receipt, the access device 4617 forwards the routing request to the computer 4603.

When a network device, an end-point device for example, has a need for remotely stored program code (i.e., program objects) or data (i.e., data objects) such as a schematic diagram, delivery address or repair manual, the end-point device formulates a code or data request and sends it in a downstream spanning tree pathway. Unlike a routing request, data and code requests do not have a specific destination designated. Instead, data/code requests (data requests and/or code request) only identify the specific data or code needed. This is because the requesting device need not know the destination of the data or code needed, promoting dynamic, spanning tree migration—as will become apparent below.

In addition, where possible, program code will be reduced to an interpretive form. Common libraries of program objects (in an object code form, i.e., executable form) are stored at each network terminal, computer or access server. Upon any request for an application program, for example, first, the sequence of calls to each program object is delivered along with a list of all program objects that are needed to fully execute the application program. Thereafter, if the specific underlying code for any of the delivered objects is not found locally, a renewed request for the executable code for those program objects is made. Upon delivery, the application program may be executed. Moreover, the movement of the program application and other specific program objects are tracked and migrated as described above in relation to generic data.

For example, the terminal 4667 typically operates using an application program directed to an exemplary installation and service industry. A driver of a vehicle 4666 enters the premises via a dock. Upon establishing a link with the network, the terminal 4667 reports its status. In response, the terminal 4667 receives a command to load a docking application from the computer 4652 via the premises network. After determining that it does not have the docking application stored locally, the terminal 4667 transmits a program code request specifying the application. Because of previous activity, for example, the access device 4659 (which receives the transmission) happens to have the program code stored locally. It fields the request, sending the list of program objects along with the "interpretive" program object sequence. Upon receipt, the terminal 4667 might identify that all program object executable code is stored locally, and, therefore, begins to execute the application program. Otherwise, if certain program object executable is not locally stored, the terminal 4667 transmits a subsequent request. This time, the access device 4659 might not currently store the executable program object code. Thus, the access server 4659 routes the request downstream toward a device which does store the code. Once located, the code is delivered upstream to the terminal 4667 for execution.

Requested data or program code may reside in one or more of those of the access devices 4605, 4607, 4609, 4611, 4613, 4615, 4617, 4619 and 4621 which happen to be configured as access servers. Otherwise, the data or code may be residing in one or more of the computers 4603, 4621, 4623 or 4625, if they are configured as servers.

For example, assuming that the access device 4619 has been configured as an access server and happens to store data needed by the terminal 4601, the terminal 4601 would begin the process of retrieving the data by formulating a data request. As previously mentioned, the data request does not identify the access device 4619, but only identifies the needed data. After formulation, the terminal 4601 routes the request downstream to the access device 4605. Upon receipt, the access device 4605 determines that it does not store the requested data, and fails to identify the requested data in a routing table entry. Thus, the access device 4605 forwards the data request to the access device 4607. As with device 4605, the access device 4607 cannot identify the requested data and routes the request to the access device 4609. Upon receipt, the access device 4609 consults its routing table and identifies an entry for the requested data. The entry lists the next device in an upstream path to the data, i.e., the access device 4619 is listed. Thus, the access device 4609 forwards the data request upstream to the access device 4619. The access device 4619 responds to the data request by: 1) locating the stored data; 2) formulating a routing request (containing the data) destined for the requesting device, the terminal 4601; and 3) sending the routing request downstream to the access device 4609. Using its routing table, the access device 4609 identifies the terminal 4601, and sends the routing request (with attached data) upstream to the access device 4607. Likewise, the access device 4607 sends the routing request upstream to the access device 4605. Finally, the access device 4607 sends the routing request to the destination, the terminal 4601, completing the process. Program code (e.g., program objects) may be similarly stored, requested and delivered.

Similarly, when remote processing is required, a network device formulates a processing request which identifies the specific remote processing needed, yet need not identify a processing destination. After formulation, the processing request is transmitted downstream toward an access server or computer server capable of performing the requested processing. For example, the access device 4617 fields processing requests from the computer 4603. After determining that it cannot perform the processing, the access device 4617 consults its spanning tree routing table, yet finds no upstream entry for any network device capable of performing the processing. Thus, the access device 4617 routes the processing request downstream to the access server 4613. Although the access device 4613 has not been configured for such processing, the access device 4613 does find an entry identifying a first network device, the access device 4615, in an upstream pathway to a location where such processing is handled. The access device 4613 forwards the processing request to the access device 4615 which is configured as an access server to handle the processing. Thereafter, the requested processing is carried out by the access device 4615, with any associated intercommunication with the computer 4603 needed via the same pathway using routing requests.

Thus, each spanning tree routing table not only includes entries for all upstream network devices, each also includes entries for all upstream data, program code and processing resources. Moreover, each such entry only identifies the next network device through which forwarded requests are to made in the pathway to the request destination. Each spanning tree table also contains an entry designating a downstream route for use when no upstream entry can be located.

In the communication network of the present invention, program code, data and local processing capabilities dynamically migrate through the network to optimize network performance. Specifically, each of the access devices 4605, 4607, 4609, 4611, 4613, 4615, 4617, 4619 and 4621 is configured as an access server. However, a specific data object in high demand is not initially stored in any of the access devices. Instead, the data object in high demand is originally stored on the computer 4623, configured as a server.

Upon encountering a first data request by the terminal 4601 for the data object in high demand, each of the intermediate access servers, the access devices 4605, 4607 and 4609, fail to identify the data object which results in the sequential forwarding of the data request to the computer 4623. However, each of the intermediate access servers record entries for the data in their routing tables with a downstream destination. Thereafter, each time that a network device, such as the terminal 4601, requests the data object, the intermediate access servers which receive the request bump up a count stored in the routing table entry.

To make a determination of whether to migrate the data object or not, upon encountering a data request, each intermediate access server considers: 1) the associated count entry; 2) the duration of time over which the count entry has accumulated; 3) the cost of retrieving the data from the downstream source; 4) the size of the data object; and 5) its own resource availability (e.g., remaining storage space).

For example, after receiving a high number of recent requests for the data object and having a relatively high cost in extracting the downstream object, the access device 4605 determines that migration of a copy of the data object into its own available storage could improve network performance. Thus, instead of sending the data request downstream to the access device 4607, the access device 4605 substitutes and forwards a migration request instead of the data request.

Upon receiving the migration request, the remaining intermediate access servers, the access devices 4607 and 4609 merely forward the migration request to the computer 4623. In response, the computer 4623 records the migration event, i.e., the data object migrated and the migration destination (the access device 4605), for future updating control.

The computer 4623 also forwards a copy of the data object to the access device 4609 for relaying to the access device 4605 via the access device 4607. Upon receipt, the access device 4605 stores the data object locally, and forwards a further copy back to the requesting network device, the terminal 4601. Thereafter, instead of relaying each data request for that data object downstream, the access device 4605 responds by sending a copy of the locally stored data object toward the requesting device. In other words, the access device 4605 has effectively intercepted a copy of the data for local storage, and, thereafter, forwards a copy of the locally stored copy to service any incoming requests.

In addition, upon forwarding the data object from the source, the computer 4623, to the destination, the terminal 4601, the data object size and link cost associated with reaching a given intermediate access device is recorded. For example, if a wired communication link between the computer 4623 and the access device 4609 is assigned a cost of "1", after fielding the data request, the computer 4623 constructs a data response which not only includes the requested data object, but also includes a link cost entry of "1" and an indication of the data object size. In turn, the access device 4609 identifies the cost to the access device 4607, for example a cost of "3", the access device adds the "3" to the pending cost entry in the data response, and forwards the response to the access device 4607. Similarly, the access device 4607 assesses a cost of "3" for the communication link to the access device 4605, adds the "3" to the pending cost entry of "4", and forwards the data response to the access device 4605. After assessing a cost for the link to the terminal 4601, for example a cost of "4", the data response is delivered to the terminal 4601. Thus, the terminal 4601 sees that to access the data again, it will most likely result in "11" units of communication cost. Moreover, for example, the terminal 4607 considers the cost of "3" when determining whether to migrate the data object or not.

Similarly, when a migration of a data object occurs, all intermediate access devices record the cost of the upstream link to the copy of the data object. Thereafter, upon receiving a data request for the data object, an intermediate access device can compare the cost of the upstream pathway to the copy with the downstream pathway to the original data object to choose the pathway with the lesser cost. A notification of deletion of a copy of a data object destined for a downstream source is also noted by each intermediate access devices, requiring deletions of the entries for the "copied then deleted" data object.

For example, if a locally stored copy of the data fails to be used for a period of time determined by the access device 4605 to be too long to justify local storage (in view of the communication link costs back to the original source, the size of the data object, and potentially dwindling local resources), the access device 4605 deletes the locally stored copy of the data, and routes to the computer 4623 an indication that the local copy of the data object has been deleted. Upon receiving the indication for relaying, the intermediate access devices 4607 and 4609, in turn, remove from their routing tables the entries to the recently deleted upstream copy. Upon receipt of the indication, the computer 4623 records the deletion, completing the purging process.

Although data objects were used above to describe the migration process, program code (or program objects) are similarly migrated to and deleted from local storage. In addition, to prevent instability, a certain amount of hysteresis must be built in to prevent vacillating migration and purging decisions.

In assigning cost units to the various communication links, comparisons between factors such as actual monetary costs, bandwidths, delays, loading and power consumption are taken into consideration. Moreover, such costs are stored as sub-entries in the spanning tree routing tables.

Although only migration of a copy from a source to a single destination was previously described, if a data or program object proves to be in high enough demand, several, or even all, access devices in the network might store a copy. All that is required is that each access device experience a significant and sustained quantity of requests for a common data object (or program code/object) to justify the storage of a local copy in view of communication link costs and available local resources.

Processing resources are similarly migrated and purged. To service a processing request, an access device must be configured not only with sufficient hardware resources but must also store the programming code and associated data necessary to perform the requested processing.

For example, if the terminal 4601 desires to search prior sales information but can store neither the information nor the necessary search program routines because of limited local resources, the terminal 4601 formulates a processing request which it routes downstream to the access device 4605. In the illustrated embodiment, the access device 4609 is originally configured with the hardware and software necessary to perform the processing request. In particular, the access device 4609 uses bulk storage devices to store past sales data, and executes a search program in response to received processing requests.

Although the intermediate access server 4607 is configured with appropriate processing and storage resources, originally, it does not store the search program or the past sales data. Thus, while receiving repeated processing requests from the terminal 4601 via the intermediate access device 4605, the access device 4607 initially logs the request in its routing table and forwards the request downstream to the access device 4609 which fields, processes and responds to the requests.

Because the frequency of the requests, costs and available local resources, when not busy, the access device 4607 sends a migration inquiry downstream to the access device 4609. Upon receipt, the access device 4609 responds by sending an indication of the volume of the potential transfer upstream, to the access device 4607. Based on the indication along with the aforementioned other migration factors, the access device 4607 may or may not pursue the migration.

If migration is chosen, the access device 4607 assembles a migration request identifying the desired processing, and routes the request downstream to the access device 4609. In response, the access device 4609, records the migration (for future updating) and begins to transfer a copy of the program (or programming object(s)) and the past sales information to the access device 4607, preferably occurs during periods of low network traffic.

Although intermediate access devices between the source and destination of the processing migration are not shown in the exemplary illustration above, any intermediate access devices that do occur follow the same procedures previously set forth in reference to data object migration, recording and purging routing table entries to upstream and downstream processing devices.

As may be appreciated in view of the foregoing, in many instances, migration does not always flow immediately to the access device nearest a requesting network device. Instead, for example, an access device which receives the same data or program code requests from a plurality of different terminals will perform migration before any upstream access device unless upstream link costs are comparatively much higher.

FIG. 46b is a diagram which further illustrates the migration and purging process. In particular, a premises network consists of computers 4651 and 4652—configured as servers, a wired LAN 4653, and access devices 4655, 4657, 4659, 4661 and 4663—configured as access servers. A portable computer terminal 4664 participates in the premises network which exhibits migration and purging as described above in reference to FIG. 46a. In addition, a vehicular network is shown which consists of a mobile access server 4665 and a portable computer terminal 4667.

As illustrated, each of the access devices 4655 and 4659 are configured for long distance, wireless communication with the access server 4665 via a second higher power radio and associated antenna, e.g., WAN, paging, cellular, etc. The corresponding first radio and associated antenna are used for relatively lower power premises network communication.

Because of the much higher cost associated with the communication link between the access server 4665 and the access device 4659, the access servers 4665 is much more likely to engage in the dynamic migration of data/code objects or processing resources than the other access servers located within the premises network. With a link cost assessed at "20" for example, the mobile access server 4665 rapidly decides to migrate, while slowly deciding to purge migrated data. The migration/purging process used is the same as that described above in reference to the premises network of FIG. 46a.

In addition, because of the high link cost, the mobile access server 4665 is also configured to provide anticipatory migration, and responds to direct migration commands from the terminal 4667 or other controlling network devices. Specifically, anticipatory migration may occur in two ways. First, if a driver is preparing to leave the premises to service a specific appliance, for example, the schematic diagram of the appliance may be migrated to the mobile access server 4665 in anticipation of future use. This form of anticipatory migration may be directed from a controlling device downstream in the premises network, e.g., the computer 4652 which also stores the schematic diagram, from the terminal 4667 upstream, or from the access server 4665 itself upon analysis of the work order.

A second form of anticipatory migration originates at the access server 4665 (although the resulting migration control could originate either up or downstream). The access server 4665 anticipates future migration needs through the storage and analysis of previous requests for data/code objects or processing resources. For example, if the access server 4665 determines that nearly every time the terminal 4667 requests a given program code or program object, the terminal 4667 follows that request a short time thereafter with further requests for specific data objects. In such circumstances, instead of repeatedly initiating, requesting and delivering portions of data over the communication the higher cost link, the requested and anticipated requests are all handled in one communication session, saving money and time.

Similarly, the terminal 4667, through program design or through request monitoring, can also participate in anticipatory migration. For example, the terminal 4667 can be programmed to make all upcoming requests at one time, and often in advance of leaving the low power radio range of the premises network. The terminal 4667 can also be specifically programmed to issue direct migration and purging commands to the access server 4665, permitting further control of the migration process and system resources of the mobile access server 4665. Moreover, the terminal 4667 may be configured to historically monitor all requests so as to anticipate subsequent requests in the manner described above in reference to the access server 4665.

In addition, the terminals 4664 and 4667 are configured to receive keyed, voice and pen input. Other types of input such as video or thumbprint image capture might also be added. The terminals 4664 and 4667 can also be configured with code reading/image capturing devices, or be configured to receive input from external code reading/image capturing devices (via tethering or low power wireless links). Each terminal also provides voice and LCD (liquid crystal display) output for the user. Thus, it can be appreciated that there are many types of data to be delivered to and from the terminals 4664 and 4667. The data may take on the forms of keyed or penned in command information, penned images or signatures, captured images of 2-D codes, signatures, etc. and voice signals, for example.

Each type of data handled by the terminals 4664 and 4667 places specific requirements on the communication network. For example, when communicating voice information, a communication channel or link providing acceptable real time voice delivery may be required. Dedicated bandwidth may be reserved for such communications through the spanning tree network illustrated, or established via a cellular link with the access device 4655. Moreover, if the network conditions are favorable, dedicated bandwidth need not be provided at all (see, e.g., discussion regarding FIG. 55 below).

Cellular radios may be built into the terminals 4664 and 4667 (via PCMCIA slots, for example) or via tethered cellular phones. Similarly, an access device can be configured with a cellular radio to provided cellular service to mobile terminal devices via either dedicated or time-shared wireless bandwidth through the spanning tree, for example.

If postprocessed signature images require at most a delayed delivery of a plurality of such images over inexpensive and possibly slower or less convenient communication links. Alternately, such images may be delivered as a background task when network communication or channel traffic is low. Further, relatively small packages of one way communication to the terminal 4667 may travel through a lower cost paging network for delivery. They may also travel through the spanning tree network, cellular networks, or through other higher cost, two way WANs.

Because programs cannot always anticipate all of the available communication channels through which the different types of data may flow (availability which not only changes from one network installation to another, but also changes within a given installation due to terminal and device configurations and their locations within the network), the routing tables within each network device subdivide routing information based on the type of data to be forwarded.

For example, in an oversimplification of the process described in more detail below in reference to FIG. 55*a*, the access device 4665 receives a communication from the terminal 4667. The communication takes the form of a requested link for voice signal data destined for the computer 4651. In response, the access device 4665 consults its routing table, determines that voice data can take one of two pathways: through either a cellular radio or WAN route to the access device 4655. In response, the access device 4665 delivers the communication route options to the terminal 4667 for user and/or software consideration.

If the request is not aborted and the cellular route is selected, the access device 4665 establishes a cellular link with the access device 4655, and requests a voice session with the computer 4651. In response, the access point 4655 consults its routing table, and, for voice data to the computer 4651, it identifies the need to use the wired LAN 4653 to communicate with the computer 4651. In addition, the access point 4655 also determines whether dedicated bandwidth is needed (based on timing considerations), or whether packet based time-shared voice data delivery is sufficient.

Either way, the access device 4655 responds by placing the request on the wired LAN 4653. In response, the computer 4651 communicates an acknowledge message which is routed through the access device 4655 to the access device 4665. The access device 4665 delivers the acknowledge message to the terminal 4667. At that point, the terminal 4667 begins sending the voice data to the computer 4651 through the designated route.

If the cellular link to the access device 4655 is in use or the end-to-end link otherwise proves unavailable, the access device 4665 reports the status, again offering the remaining communication route via the WAN. If selected, the access device 4665 establishes the pathway to the access device 4659 via WAN communications. In turn, the pathway is established through the access device 4657, access device 4655 and the computer 4653. With a returned acknowledge from the computer 4653, the terminal 4667 begins voice communication.

Similarly, a communication pathway between any other two network devices, such as from the computer 4651 to the terminal 4664, can be established. For example, if the computer 4651 desires the user of the terminal 4664 to obtain and compare a penned signature image for comparison with an authenticated signature stored at the computer 4651, the computer 4651 first attempts to communicate the request and image data to the terminal 4664 via the premises network. If the terminal 4664 happens to be out of range of the premises network, the computer 4651 attempts to page the terminal 4664 with the comparison request. In response, the terminal 4664 considers the data type via its routing table, identifies the route(s) available, and offers the route options to the user and/or program at the terminal 4664. If selected, the terminal 4664 establishes the selected communication link for the delivery of the associated comparison image.

Moreover, because of the high cost associated with the communication link from the access device 4665 to the premises network, the access device 4665 stores several types of lower priority data until such time or data storage size justifies delivery. Such deliver may not occur until the vehicle returns to the premises network, e.g., to a dock at the premises.

In addition, requests for communication may also include specific limitations. For example, the need for voice data only in real time full-duplex (i.e., two-way) mode can be specified, and will result in no consideration by any intermediate network device of other half-duplex or pseudo real time link options. Lowest cost delayed delivery can alternatively be specified if delivery speed is not an issue. Requests specifying high priority result in the selection of the fastest communication link regardless of cost.

Moreover, the terminals 4664 and 4667 can be configured to operate running application software under the DOS, Windows or OS/2 operating system environments.

Communication between the terminal 4667 and the access device 4665 occurs via an infrared link if the terminal 4667 is docked within the vehicle. Routing tables within the access device 4665 and terminal 4667 both contain dual entries for communication exchange pathways. First, the infrared link is attempted, if available. Otherwise, a lower power RF communication transmission is used. Although a wired docking arrangement might be used instead of infrared, infrared is preferred inside the vehicle for ease of installation and to minimize wire clutter. Such infrared installations also provide support for communicating with printers, scanners and other peripheral devices within the vehicle, i.e., the vehicular LAN preferably operates via infrared except when communicating with a remotely located terminal 4667 or with other remotely located network devices.

In another embodiment illustrated by FIG. 46*b*, service personnel use the vehicle 4666 for visiting customer sites. At the site, the terminal 4667 is carried within the customer's premises. Ordinarily, communication with the premises network would take place via relatively low power radio transmissions between the terminal 4667 and the access device 4665. However, communication can be achieved via a telephone jack link at the customer site, if: 1) the customer site blocks such transmissions; 2) the transmission range is exceeded; or 3) link costs or channel speed so justify. Once plugged into the telephone jack, the terminal 4667 automatically activates inactive routing table entries (by setting a flag therein) corresponding to possible telephone jack links. Thereafter, communication attempts to either the vehicular or premises LAN will offer routes via the customer's telephone jack link.

Figure 47A:
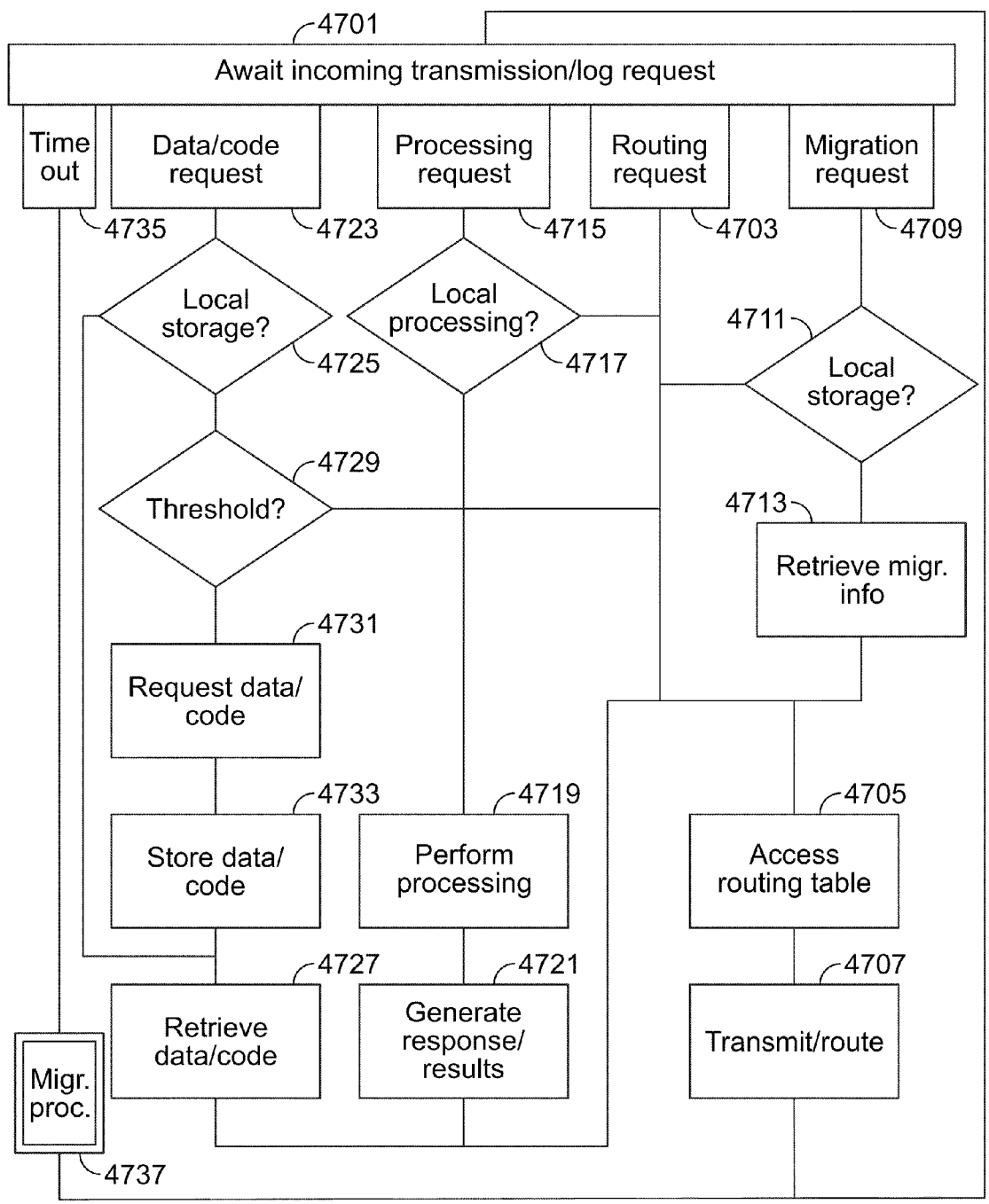
FIG. 47a is a flow diagram which illustrates the functionality of the access servers of FIGS. 46a-b in handling data, processing and direct routing requests.

FIG. 47*a* is a flow diagram which more specifically illustrates the functionality of the access servers of FIGS. 46*a-b* in handling data, processing and routing requests. At a block 4701, an access server awaits incoming communications which take the form of several types of previously mentioned requests such as data, object, processing, migration and routing requests. In addition at the block 4701, the access server awaits the need to perform migration evaluation and processing, i.e., a time out period to lapse which occurs once every fifteen (15) minutes. This period may be modified (lengthened or shortened) as proves necessary depending on channel loading conditions.

Upon receiving a routing request as indicated at the event block 4703, the access server accesses its routing table, at a block 4705, in an attempt to identify the destination of the routing request in an upstream path. If the destination is identified, the access server forwards the routing request to the next network device in the upstream path toward the destination, at a block 4707. Otherwise, if the destination is not identified in the routing table at the block 4705, at the block 4707 the access server transmits the routing request to the next network device in the downstream path. Thereafter, the access server returns to the block 4701 to await another event.

At the block 4701, upon receiving and logging a migration request, the access server vectors from an associated event block 4709 to determine whether it stores the requested migration information (e.g., the requested code or data or the program code and/or data associated with a processing resource migration request) locally or not at a block 4711. If not, the access point branches to the block 4705 to identify the closest (or any) network device in the spanning tree pathway. For example, if the routing table carries no entries for the migration information, the access server routes the migration request to the next downstream network device. Otherwise, if the routing table carries only an upstream or a downstream entry, the access server routes the request as specified by the routing table. However, if more than one entry exists for the requested migration information, the access server routes the migration request along the lowest cost spanning tree pathway (as indicated in the routing table).

However, if, at the block 4711, the access server determines that it stores the migration information locally, the access server: 1) retrieves the migration information and records the migration event for update control, at a block 4713; 2) accesses its routing table to identify the forwarding pathway, at the block 4705; 3) forwards the retrieved migration information, at the block 4707; and 4) returns to the block 4701 to await another event.

After receiving and logging (counting the occurrence of) a processing request at the block 4701, the access server branches via an event block 4715 to determine whether the requested processing can be performed locally or not at a block 4717. If not, the access server forwards the processing request at the block 4707 per routing table instruction at the block 4705. Afterwards, the access server returns to await another event at the block 4701.

However, if the access server determines that it can perform the requested processing at the block 4717, the access server performs the processing at a block 4719, generates a response at a block 4721, routes the response back to the requesting network device at the block 4707 per routing table instruction at the block 4705, and, finally, returns to the block 4701 to await another event.

Upon receiving and logging a data or code request at the block 4701, the access server vectors via an event block 4723 to determine whether the requested data or code is stored locally at a block 4725. If so, the access server branches to a block 4727 to retrieve the data or code from storage. Thereafter, the data or code is forwarded at the block 4707 per routing table instruction at the block 4705. Once forwarded, the access server branches to the block 4701 to await another event.

At the block 4725, if the access server determines that the requested data or code is not stored locally, the access server considers whether it should migrate the data at a block 4729. The access server analyzes the overall link cost, the size of the requested data or code, the frequency of such requests, available local storage resources (some of which it may determine to recapture by purging other locally stored data, code or processing resources).

Specifically, if sufficient local resources are (or can be made) available, the access server determines the weighted average frequency of the requests for that data or code. The frequency is then multiplied by a predetermined fraction (50%) of the overall link cost for retrieving the data or object to the access server from the current source. The resulting number is then compared to a migration threshold number, for example "10".

If, at the block 4729, the access server determines that the threshold number is greater than the resulting number, the access server, deciding not to migrate, branches to route the data/code request per routing table instruction at the blocks 4705 and 4707. Alternatively, if the access server determines that the threshold number is equal or less than the resulting number at the block 4729, the access server decides to migrate. Thus, at a block 4731, the access server creates and sends a migration request (instead of merely forwarding the data/code request) and awaits delivery of the requested code or data. Upon receipt, at a block 4733, the access server stores the data or code. Thereafter, the data/code is retrieved at the block 4727 for routing to the requesting network device via the blocks 4705 and 4707. Once routing is complete, the access server again returns to the block 4701 to await another event.

Finally, upon receiving a time out event signifying the periodic need to perform migration evaluation and processing, the access server branches to execute migration procedures at a block 4737, as described in more detail below.

Figure 47B:
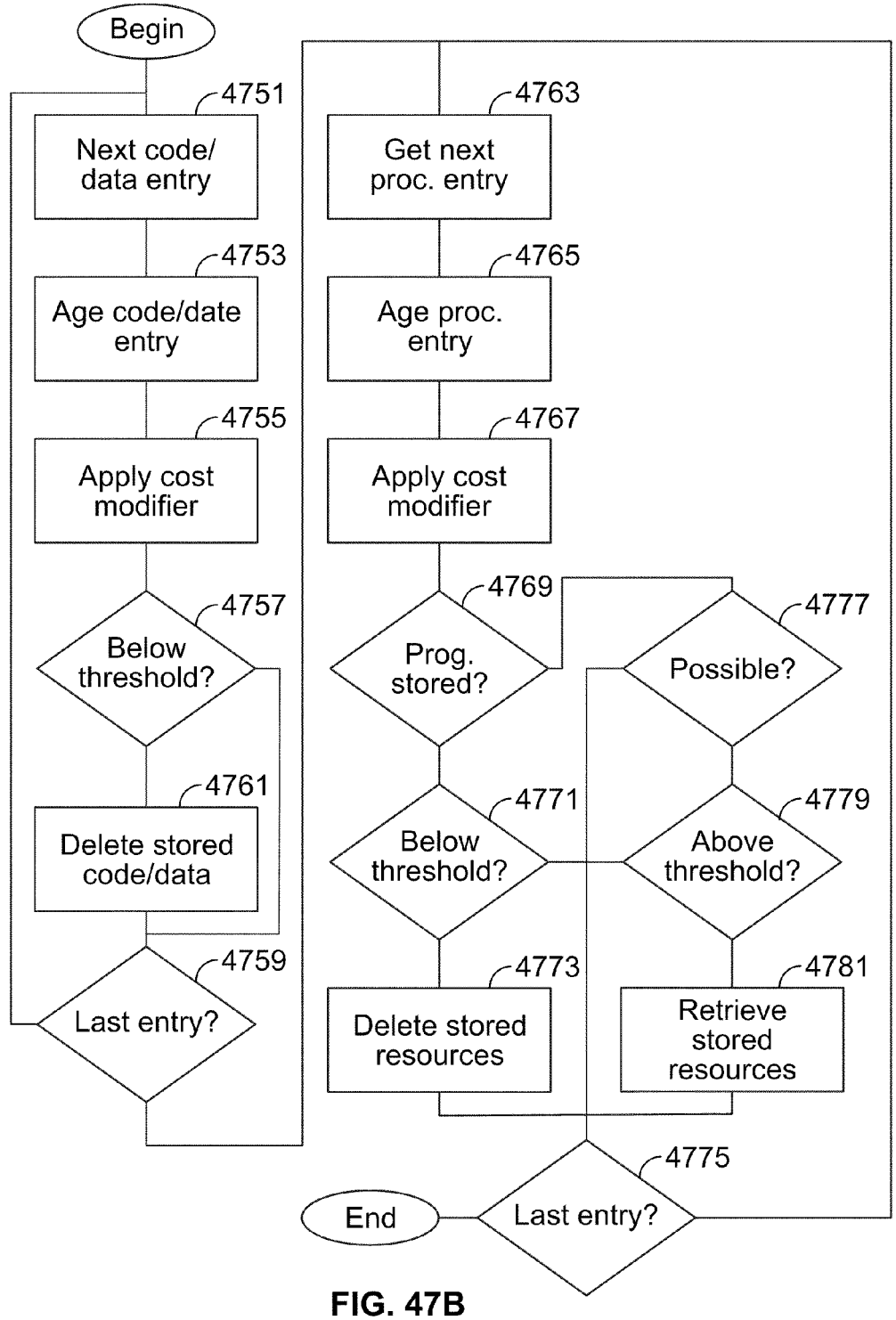
FIG. 47b is a flow diagram utilized by the access servers of FIGS. 46a-b to manage the migration of data and program code from a source storage and/or processing device toward an end-point device.

FIG. 47*b* is a flow diagram utilized by the access servers of FIGS. 46*a-b* to manage the migration of data and program code from a source storage and/or processing device toward an end-point device. More specifically, the exemplary flow diagram illustrates the migration and purging procedures represented by the block 4737 of FIG. 47*a*.

Upon encountering a timeout event (occurring every 15 minutes), an access server begins the illustrated procedure of FIG. 47*b*. At a block 4751, the access server retrieves a data/code entry from its routing table for which it provides local storage. At a block 4753, the current count recorded (indicating the number of requests for that data/code entry during the current time out interval) is multiplied by two thirds (⅔) and added to one third (⅓) the value of the previously recorded weighted frequency. The access server records the result as the new weighted frequency in the routing table entry. This weighting of frequency constitutes "aging" of the data/code routing table entry.

At a block 4755, fifty percent (50%) of the overall cost of the link, i.e., from the access server to another source of the locally stored data/code, is multiplied by the newly recorded weighted frequency. The access server compares the results of the multiplication with a hysteresis threshold at a block 4757. The hysteresis threshold is also referred to herein as a purging threshold. In premises network locations, for example, the hysteresis threshold is set at five (5) units below the migration threshold of the block 4729 in FIG. 47*a*. However, the migration and hysteresis thresholds may need be modified in alternate network embodiments, such as may be found in vehicular network installations.

If the hysteresis threshold is exceeded, the access server determines that it should continue to store the data/code, and branches to a block 4759 to determine whether there are any remaining entries for locally stored data/code which have not yet been considered for purging. Alternatively, if the hysteresis threshold is not exceeded, the access server determines that the data/code item should be purged, and does so at a block 4761. Thereafter, the access server branches to the block 4759.

If, at the block 4759, other data/code items which have not yet been considered for purging, the access server repeats the purging consideration of the blocks 4751 through 4759 until all locally stored data/code items have been considered. At that point, the access server branches to block 4763 to begin migration and purging consideration of processing resources.

First, the access server retrieves a routing table entry relating to processing resources, i.e., supporting program code and any associated data. At a block 4765, the access server ages the entry, i.e., performs the aforementioned weighted frequency averaging. Thereafter, fifty percent (50%) of the overall link cost is multiplied with the new weighted frequency at a block 4767. If the entry indicates local storage of the processing resources at a block 4769, the access server compares the results with the hysteresis threshold at a block 4771. If above the hysteresis threshold, the access server continues to store the processing resources, branching to consider any remaining processing resource entries at a block 4775. Otherwise, the access server purges the stored resources at a block 4773 before considering any remaining entries at the block 4775.

Alternately, if the routing table entry indicates that the processing resources are not stored locally, at a block 4777, the access server determines whether it has been configured with the hardware necessary to perform the processing. If not, the access server branches to the block 4775 to consider other entries. Otherwise, at a block 4779, the access server compares the migration threshold with the result, i.e., 50% of the link cost multiplied by the new weighted frequency. If the result does not exceed the migration threshold, the access server branches to the block 4775 to consider other entries. If the result exceeds the migration threshold, the access server formulates and routes a migration request for the processing resources, awaits the responsive delivery and stores the resources locally at a block 4781, before branching to the block 4775.

At the block 4775, if the access server determines that other processing resource entries have not been considered for purging or migration, it repeatedly branches back to the block 4763 to carry out the consideration cycle until complete. Thereafter, the migration/purging procedure ends, and the access point returns to the block 4701 of FIG. 47*a* to await the occurrence of another event.

Figure 48:
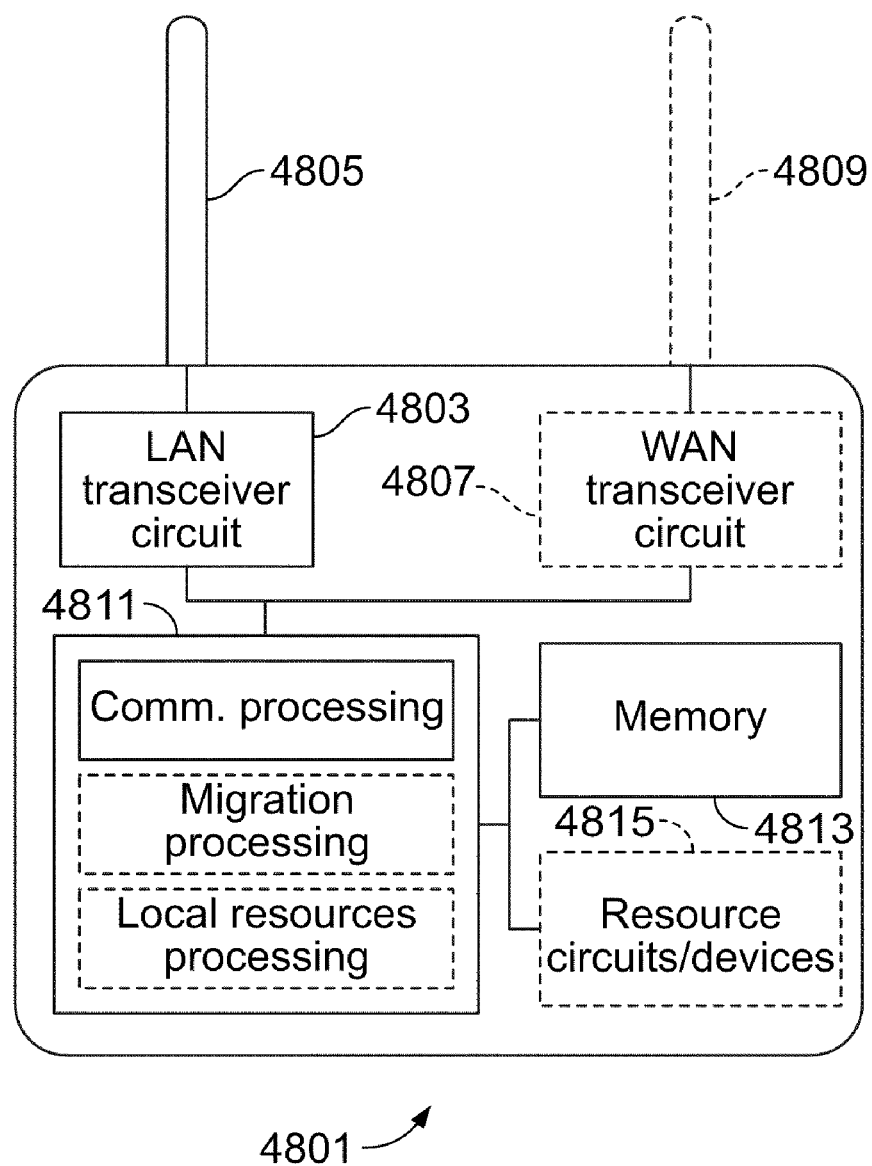
FIG. 48 is a schematic diagram of the access servers of FIGS. 46a-b illustrating an exemplary circuit layout which supports the functionality described in relation to FIGS. 47a-b.

FIG. 48 is a schematic diagram of the access servers of FIGS. 46*a-b* illustrating an exemplary circuit layout which supports the functionality described in reference to FIGS. 47*a-b*. In particular, a typical access server, an access server 4801, is configured with transceiver circuitry 4803 and associated antenna 4805 for participating in the premises, peripheral and/or wide area networks. In addition, another transceiver, a transceiver circuit 4807, and associated antenna 4809 might be added, for example, to support WAN or cellular communications. Although not shown, interface circuitry for other wireless or wired communication links may be included in the access server configuration when needed.

Processing circuitry 4811 provides at least three processing functions for the access server by managing or performing: 1) communication processing functionality; 2) migration and purging; and 3) local resource processing. Although in most embodiments, the processing circuitry 4811 comprises a single microprocessor, it may comprise several. Moreover, if the processing circuitry 4811 is not configured to perform migration and local resource processing, the illustrated access device operates as an access point.

The processing circuitry 4811 utilizes a memory 4813 for short term and long term bulk storage. The memory 4813 comprises hard drive storage, dynamic RAM (random access memory), flash memory, and ROM (read only memory). However, all other types of memory circuits or devices might alternately be used.

Specific hardware configurations needed to accommodate specialized processing requests are represented by a circuit/device block 4815. However, such hardware need not be present to service relatively basic processing requests. Additionally, access servers may either be battery powered although, if the network configuration permits, AC (alternating current) power is preferred.

Figure 49A:
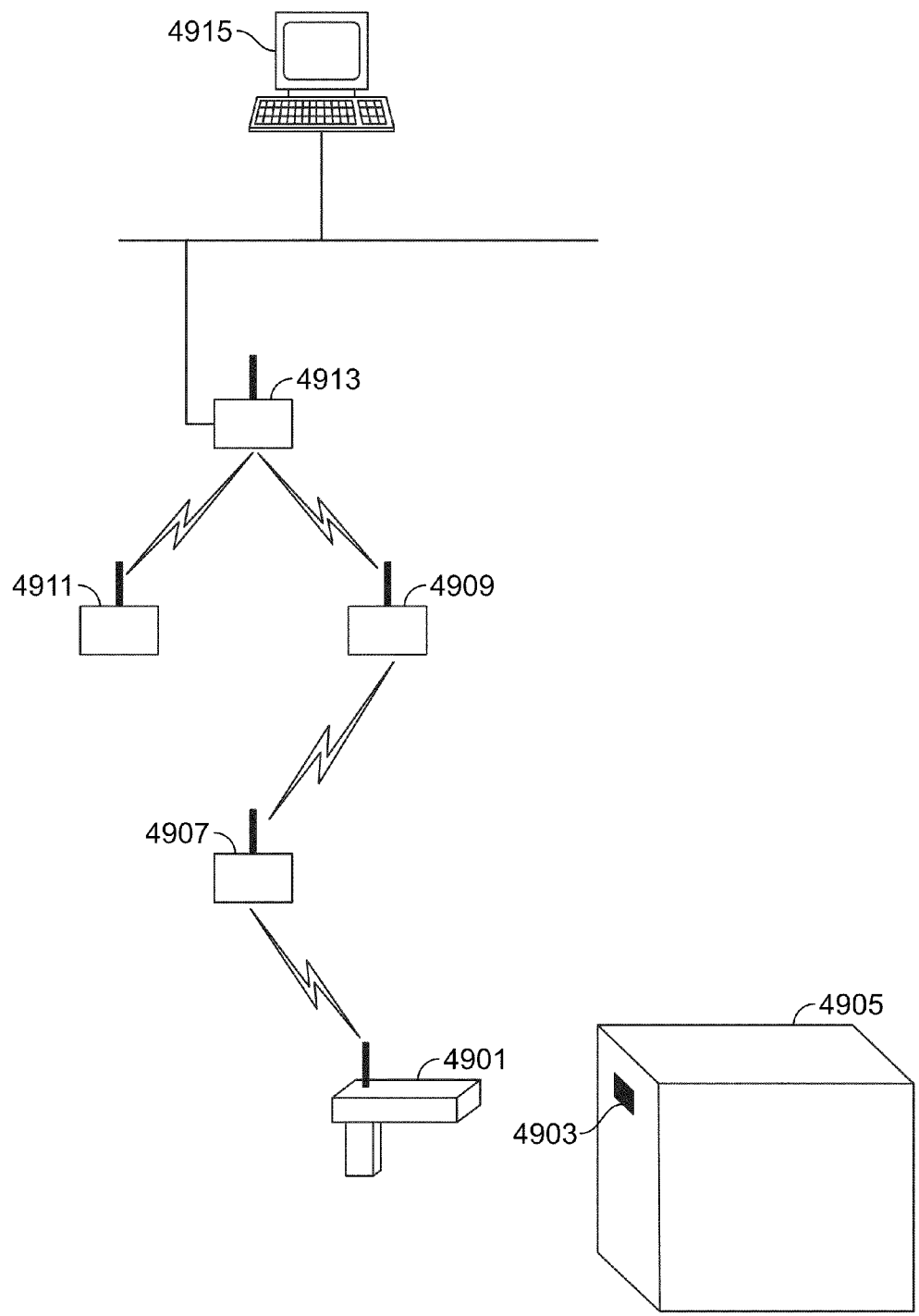
FIG. 49 is a specific exemplary embodiment of an access point in a multi-hop communication network utilized for remote processing of 2-D (two-dimension) code information.

FIG. 49*a* is a specific exemplary embodiment of an access server in a multi-hop communication network utilized for remote processing of 1-D (one dimensional) or 2-D (two-dimensional) code information. In this embodiment, a code reader 4901 is used to capture and transmit code information for further processing, including decoding, by a remote access server in a premises LAN. Specifically, a user brings the code reader 4901, which preferably is a CCD (charged coupled device) type reader, into a reading relationship with a 2-D code 4903 located on a container 4905. Light reflected from the code 4903 is received by the code reader 4901 and directed onto the CCD located within the reader to "capture" the code image.

To enable the CCD to operate properly, however, it may first be necessary for the reader to focus the image on the CCD. Such focusing can, for example, be performed by conventional techniques known in the camera art. As another example, one or more spotter beams are presently used to ensure that the user is holding the reader the proper distance from the code to enable the CCD to properly capture the image.

Once captured, the code image may then be digitized within the reader to create a digital signal representative of the code image, which is then transferred, via RF transmissions, to other network devices for further processing. Alternatively, the reader 4901 may transmit a modulated analog signal representative of the code image to other network devices for further processing.

In any event, the code reader 4901, an end-point device, forwards the code image signal downstream in the premises LAN to the first access server in the network that has the capability of decoding the signal into the usable information represented by the code 4903. As discussed above, any one or all of the access devices 4907-4913 may be an access server and contain the digital signal processing circuitry necessary to decode the code image signal. For example, the network may be designed such that the access device 4907 is an access server which performs decoding for all code readers, such as the code reader 4901, being used in a designated area. If, however, the access device 4907 is merely an access point, or is an access server but does not have decoding capability, then the access device 4907 relays the code image signal downstream.

More specifically, and as discussed more completely above, the code reader 4901 sends a processing request downstream to the access device 4907. If the access device 4907 is an access point, the processing request is simply relayed downstream to the access device 4909. If the access device 4907 is an access server, it looks up in its table to determine whether it has the capability to perform the type of processing requested, i.e., decoding. If it does, the access device 4907 sends an acknowledge and the code reader 4901 forwards the code image signal to the access device 4907 for decoding. Once decoded, the information may be re-transmitted to the code reader 4901 for display on a screen (not shown). In addition, or alternatively, the access device 4907 may send a good read signal to the code reader 4901 to indicate to the user that the reading operation has resulted in a valid reading. The decoded information may also be transmitted to a host computer 4915 or other network device for further processing.

If the access device 4907 does not find decode capability listed in its table, it forwards the processing request downstream to access device 4909. Likewise, if access device 4909 is an access point or an access server without decode capability, the processing request is forwarded downstream to the access device 4913. Once access device 4913 receives the processing request, it also examines its table to determine whether it, or any device upstream of it (such as, for example, access device 4911), has the capability to service the processing request. If it does locate such capability, it sends an acknowledge upstream to the code reader 4901 which forwards the code image signal to the access device 4913 for decoding thereby or for routing to the upstream access device having that capability.

If the access device 4913 does not locate decode capability in its table, it forwards the processing request to host computer 4915 for decoding thereby or so that the host computer 4915 can locate a device having the capability to service the processing request. Of course, as mentioned above, the network could be configured such that each one of the access devices 4907-4913 is an access server having the circuitry necessary for decoding.

While a CCD type code reader is preferred with respect to the embodiment of FIG. 49a, other types of code readers, including laser scanners, are also contemplated. Furthermore, while the above description places the decoding circuitry in a device external to the code reader 4901, the code reader 4901 may house such decoding circuitry and may transmit decoded data to external network devices for further processing. However, there are many advantages to placing the decoding circuitry external to the code reader 4901. For example, because the code reader is a portable device and likely battery-powered, power conservation as well as reader size and weight become important design considerations. By placing the decoding circuitry in a device external to the reader 4901, the reader uses less power and may be smaller and lighter than if the decode circuitry is placed in the code reader 4901. Further, in an environment where numerous code readers are used, placing the decode circuitry in one or a few external devices rather than all readers, which are often dropped by users, reduces the chances that the decode circuitry will be damaged. In addition, such a configuration reduces the amount of circuitry used and consequently results in lower reader manufacturing costs.

In addition, the code reader 4929 is configured to collect signature, printed text and handwriting images for further processing. Although further processing can be performed onboard within the reader 4929, in one embodiment it occurs within an access server.

Either way, such processing first involves the identification of the type of information contained within the image. If the user does not simplify the process by identifying the type of image captured, automatic identification is invoked. This occurs by first attempting to identify the image as a 2-D code. If this fails, the processing involves an attempt at character recognition to identify any printed text that might exist within the image. If no text is found, an analysis is performed to determine whether the image is a handwritten signature. Finally, if all else fails, the image is generically classified as a picture. Several examples of pictures include: a) images of bakery shelf space in a given store for subsequent collection and evaluation of ones competition; b) images of broken equipment for transmission to remote experts for service advice; and c) images of metering or monitoring displays for billing or usage verification.

After identification, each type of data receives yet further processing. Decoded 2-D code information is forwarded and acknowledged. Handwritten signatures are compared with known authentic counterparts. Other types of images may be associatively forwarded, stored, displayed and/or acknowledged.

Figure 49B:
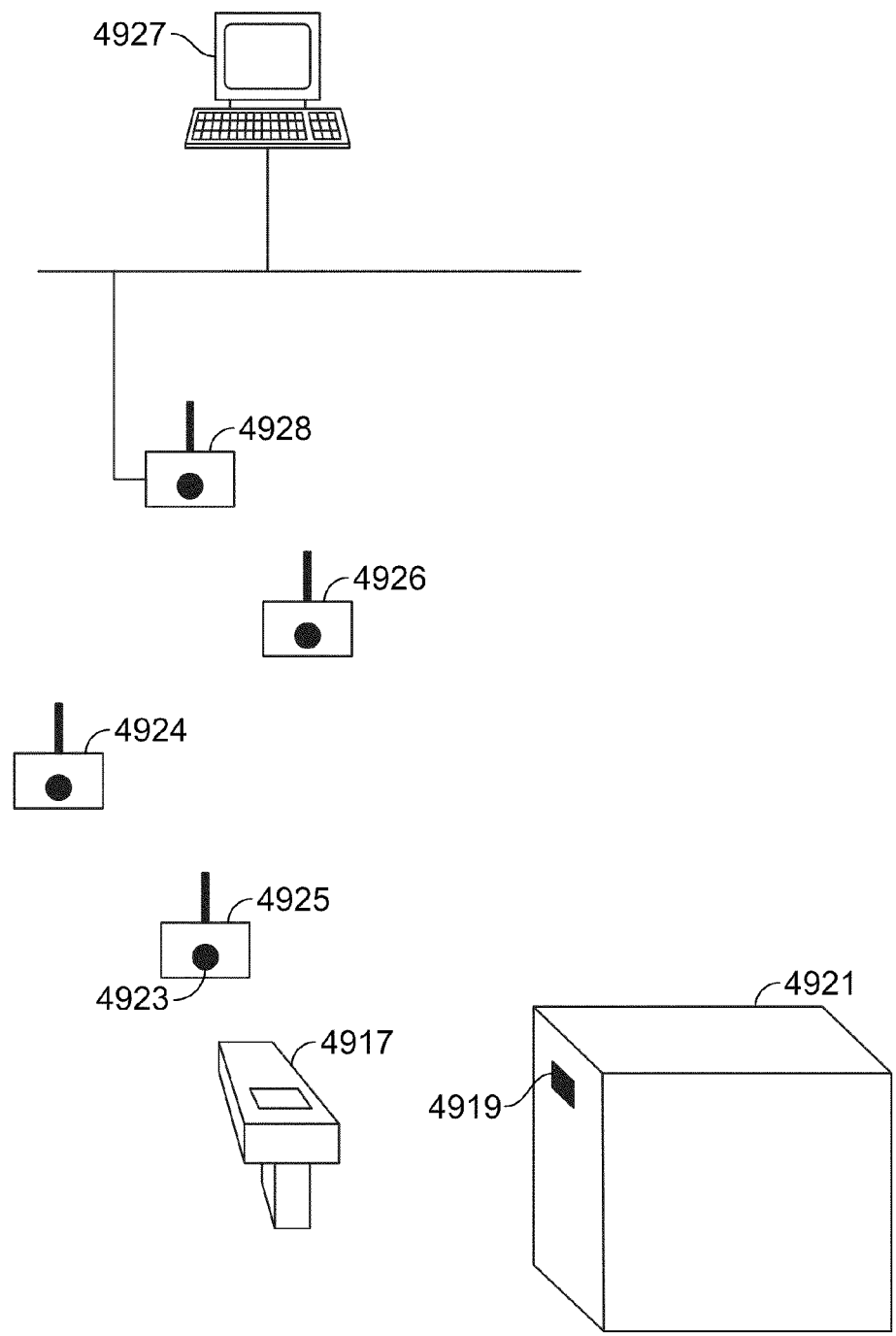

FIG. 49b is an alternate embodiment of FIG. 49a wherein communication between the 2-D code reader and the access devices takes the form of modulated infrared transmissions. Specifically, as discussed above with respect to FIG. 49a, a user uses a code reader 4917 to read a 2-D code 4919 on a container 4921. The user then points the code reader 4917 at an infrared transceiver 4923 of an access device 4925 and transmits a processing request to the access device 4925 using infrared transmissions. To facilitate receipt of the infrared transmissions by the infrared transceiver 4923, the reader may disperse its transmissions, say, for example, four inches over a distance of ten feet. Such dispersion allows a user to be less accurate in aiming the code reader 4917 at the infrared transceiver 4923. The infrared transceiver 4923 may be, for example, a phototransistor/photodiode pair.

As above, if the access device 4925 is simply an access point, the processing request is simply relayed downstream, via either RF or infrared transmissions, to a further access device downstream. If the access device 4925 is an access server, it looks up in its table to determine whether it has the capability to perform the type of processing requested. If it does, the access device 4925 sends an acknowledge via infrared transmissions to the code reader 4917 and the code reader 4917 forwards the code image signal to the access device 4925 via infrared transmissions for decoding. The access device 4925 may then transmit the decoded information to the code reader 4917 for display on a screen and/or forward the decoded information to a host computer 4927 for further processing.

If the access device 4925 does not find decode capability listed in its table, the access device 4925 forwards the processing request to one of the access devices 4924, 4926, or 4928 to locate such decoding capability similarly as discussed above with respect to FIG. 49a. When such a device is located, the code reader, via infrared transmissions, performs a batch forwarding of the stored image data to the access device 4925 for eventual decoding by one of the access devices 4924, 4926, or 4928 or by a host computer 4927 or another device in the premises LAN (i.e., whichever is the first device located that has the decoding capability). In this embodiment, communication between access devices may be achieved using either RF or infrared transmissions. Furthermore, a user may choose to directly communicate with any specific access device in the network simply by pointing the code reader 4917 at that device and transmitting a processing request.

Figure 49C:
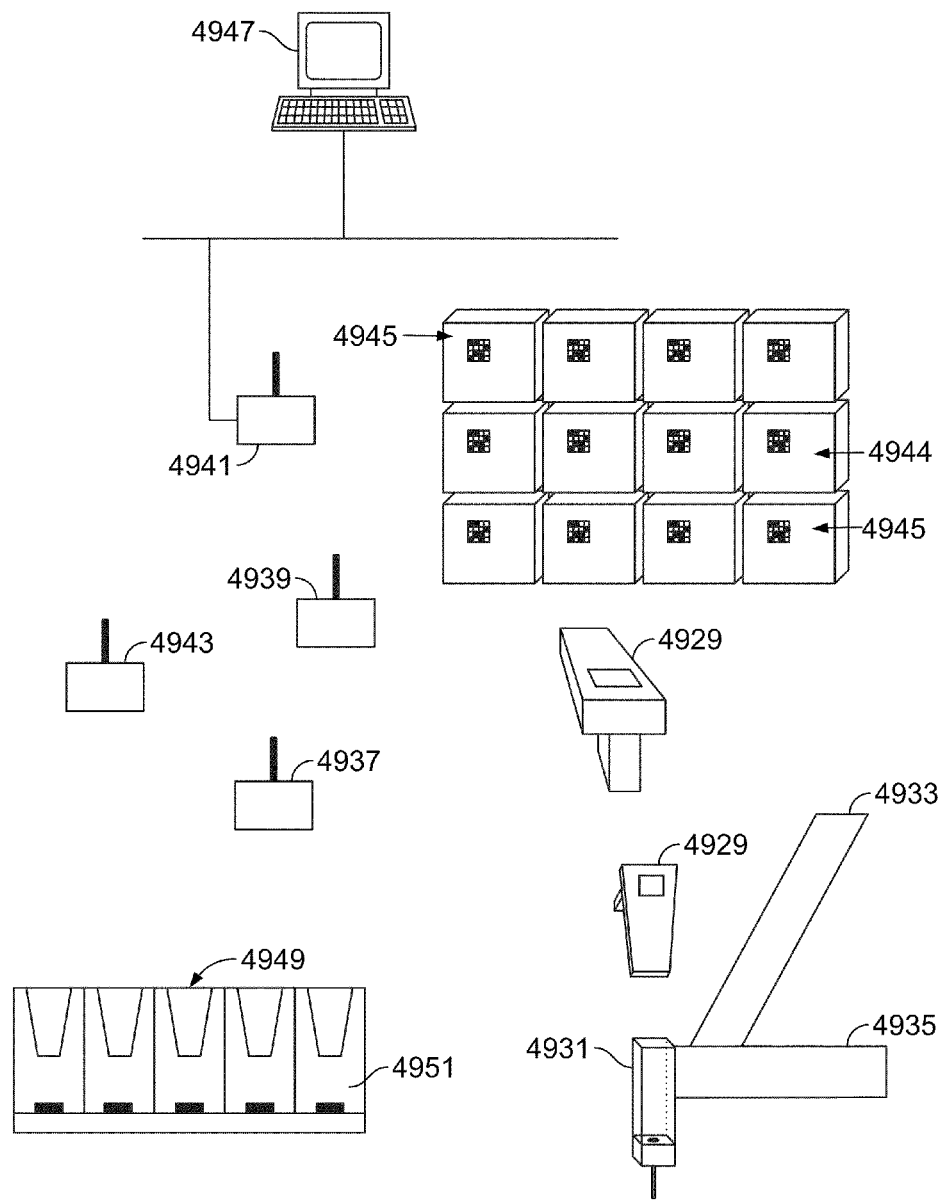

FIG. 49c is an alternate embodiment of FIG. 49a wherein indirect communication between the 2-D code reader and the access servers takes place via holstering or docking access servers. Specifically, as discussed above with respect to FIG. 49a, a user uses a code reader 4929 to read a 2-D code on a container. The user then places the reader 4929 in a holster access device 4931. The user may support the holster access device 4931 by a shoulder strap 4933 and belt 4935 to facilitate portability.

In one embodiment, the holster access device 4931 may be configured to perform decoding so that when the code reader 4929 is placed inside the holster access device 4931, the code reader 4929 may transmit the code image data to the holster access device 4931 for immediate decoding thereby. Alternatively, if the holster access device 4931 does not house the necessary decoding circuitry, the holster access device 4931 transmits a processing request downstream to one of access devices 4937-4943 to locate such decoding capability similarly as discussed above with respect to FIG. 49*a*.

In a scenario where numerous codes 4945 are to be read successively by the code reader 4929, the code reader 4929 may store the read image data and perform a batch transmission to the holster access device 4931 for immediate decoding thereby if the holster access device 4931 is configured with decoding circuitry. In another embodiment where the holster access device 4931 is not so configured, the code reader 4929 transmits a processing request to the holster access device 4931 via infrared transmissions. The holster access device 4931 in turn forwards the processing request downstream via RF transmission to one of the access devices 4937-4943 to locate such decoding capability similarly as discussed above with respect to FIG. 49*a*. When such a device is located, the code reader, via the holster access device 4931, performs a batch forwarding of the read image data for eventual decoding by one of the access devices 4937-4943 or by a host computer 4947 or another device in the premises LAN (i.e., whichever is the first device located that has the capability).

In an alternate embodiment, batch transmission of stored image data may be performed via a docking access server 4949. When a user has completed his code reading tasks, he docks the code reader 4929 in a bay 4951 of the docking access server 4949. Other users, when their tasks are completed, may similarly dock their code readers in other bays of the docking access server 4949. In one embodiment, similarly as discussed above with respect to the holster access device 4931, once a code reader is docked in the docking access server 4949, the code reader performs a batch transmission of its stored code image data to the docking access server 4949 for immediate decoding thereby if the docking access server 4949 is configured with decoding circuitry. In another embodiment where the docking access server 4949 is not so configured, the code reader 4929 transmits a processing request to the docking access server 4949 via infrared transmissions. The docking access server 4949 in turn forwards the processing request downstream via RF transmission to one of the access devices 4937-4943 to locate such decoding capability similarly as discussed above with respect to FIG. 49*a*. When such a device is located, the code reader, via the docking access server 4949, performs a batch forwarding of the stored image data for eventual decoding by one of the access devices 4937-4943 or by a host computer 4947 or another device in the premises LAN (i.e., whichever is the first device located that has the decoding capability).

In the embodiments of FIG. 49*b* or 49*c* wherein a number of codes are read and the captured image data is stored within the code reader for batch transmission at a later time, it may be desirable to configure the network such that decoding is performed first within the code reader. Specifically, when a user successively reads a plurality of codes, a user can ensure that each reading operation is successful or valid when the decoding is done immediately within the reader and the user is provided some sort of good read acknowledgment by the reader. On the other hand, if the image data is simply stored for later decoding by an off-site device, the user cannot be sure that each reading operation resulted in a valid read. Such a situation may not be a problem, however, if the code and reader are highly reliable or if simple information, such as a signature, is being read which may not require a validity determination.

Figure 50:
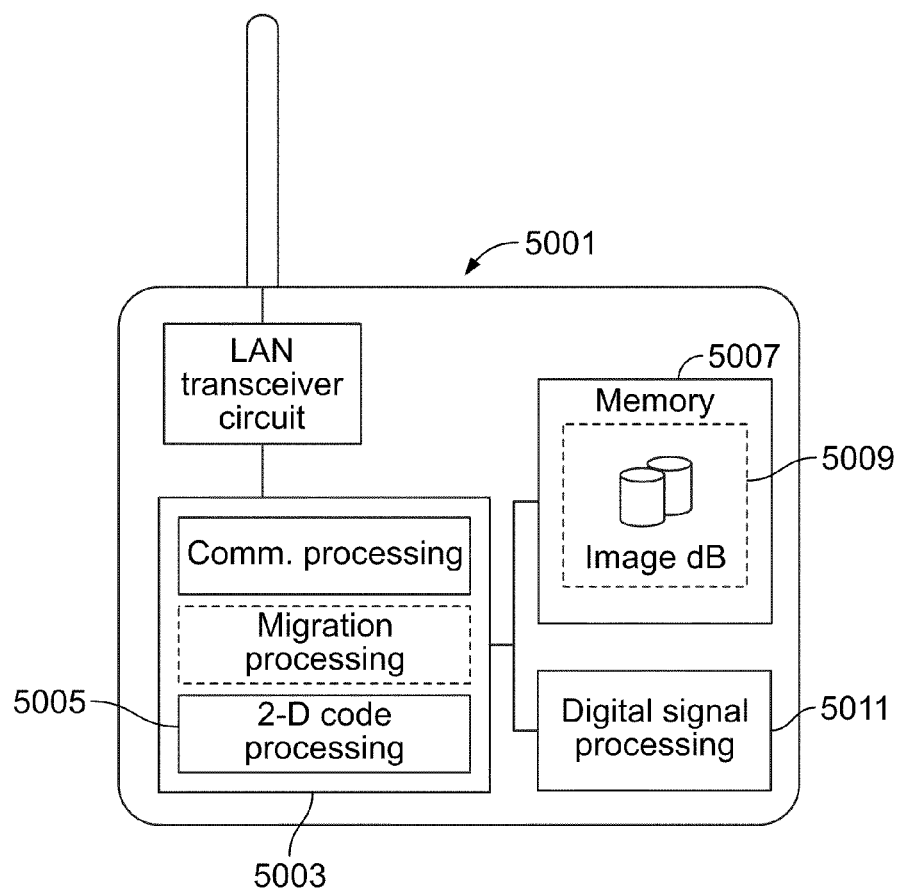
FIG. 50 is a schematic diagram similar to that shown in FIG. 48 which illustrates the circuit layout used in the access point of FIG. 49 to process the 2-D code information.

FIG. 50 is a schematic diagram similar to that shown in FIG. 48 which illustrates the circuit layout used in an access server of FIG. 49 to process the 2-D code information. Specifically, in an access point 5001, a processing circuitry 5003 manages 2-D code processing functionality as indicated by a block 5005. Although migration processing functionality is also present, in some embodiments such as those which use a single access server, the migration processing need not be present.

In a memory 5007, the access point 5001 also stores a database of known 2-D images in an image database 5009. To further support 2-D code processing, digital signal processing circuitry 5011 has been added.

As configured, the signal processing circuitry 5011 assists the exact decoding of 2-D images, and may also be used in the image comparison process of received 2-D images with the database 5009 of stored images.

Figure 51A:
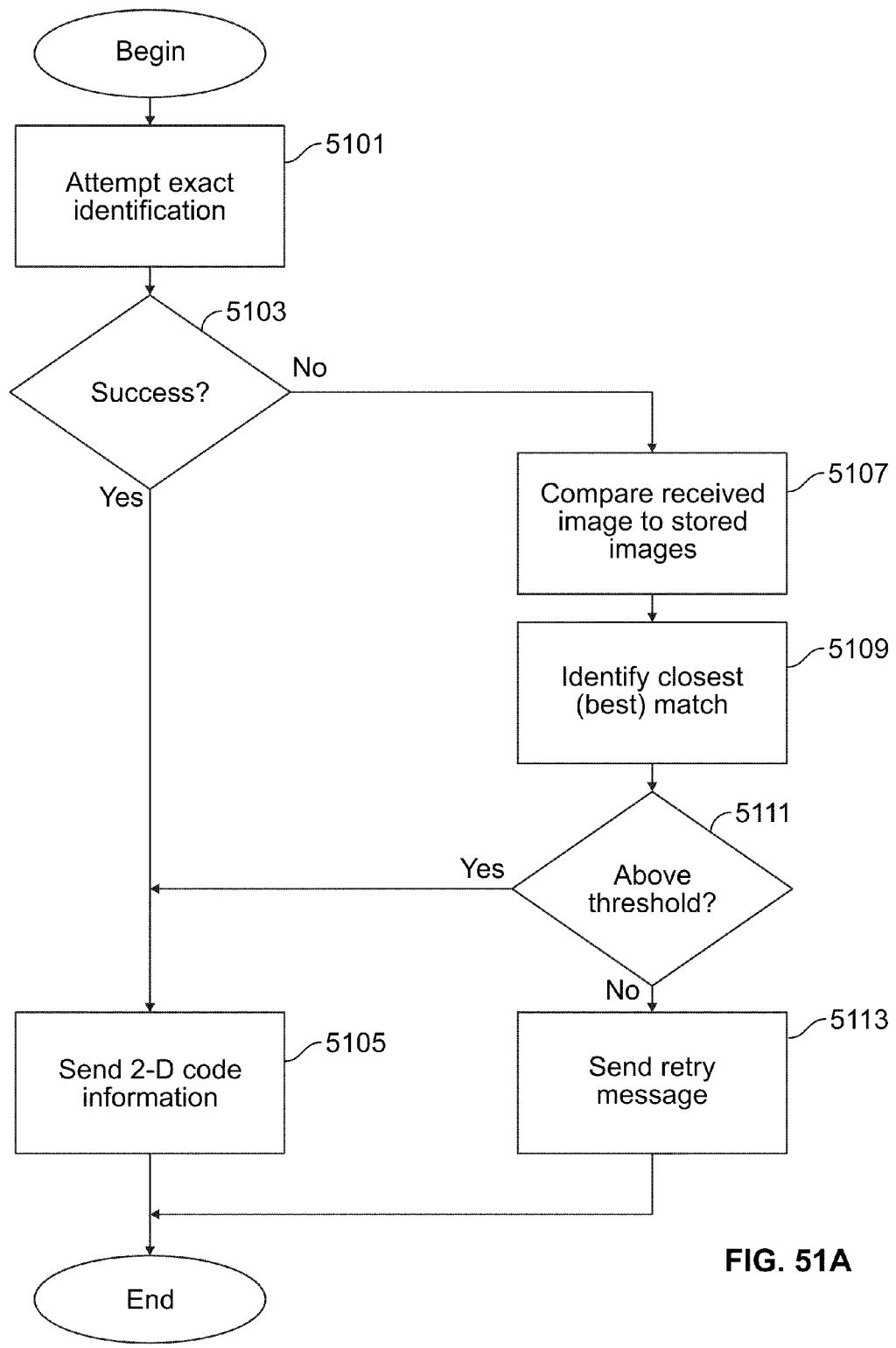
FIGS. 51a-b are flow diagrams illustrating the operation of the 2-D code processing access point of FIGS. 49-50.
Figure 51B:
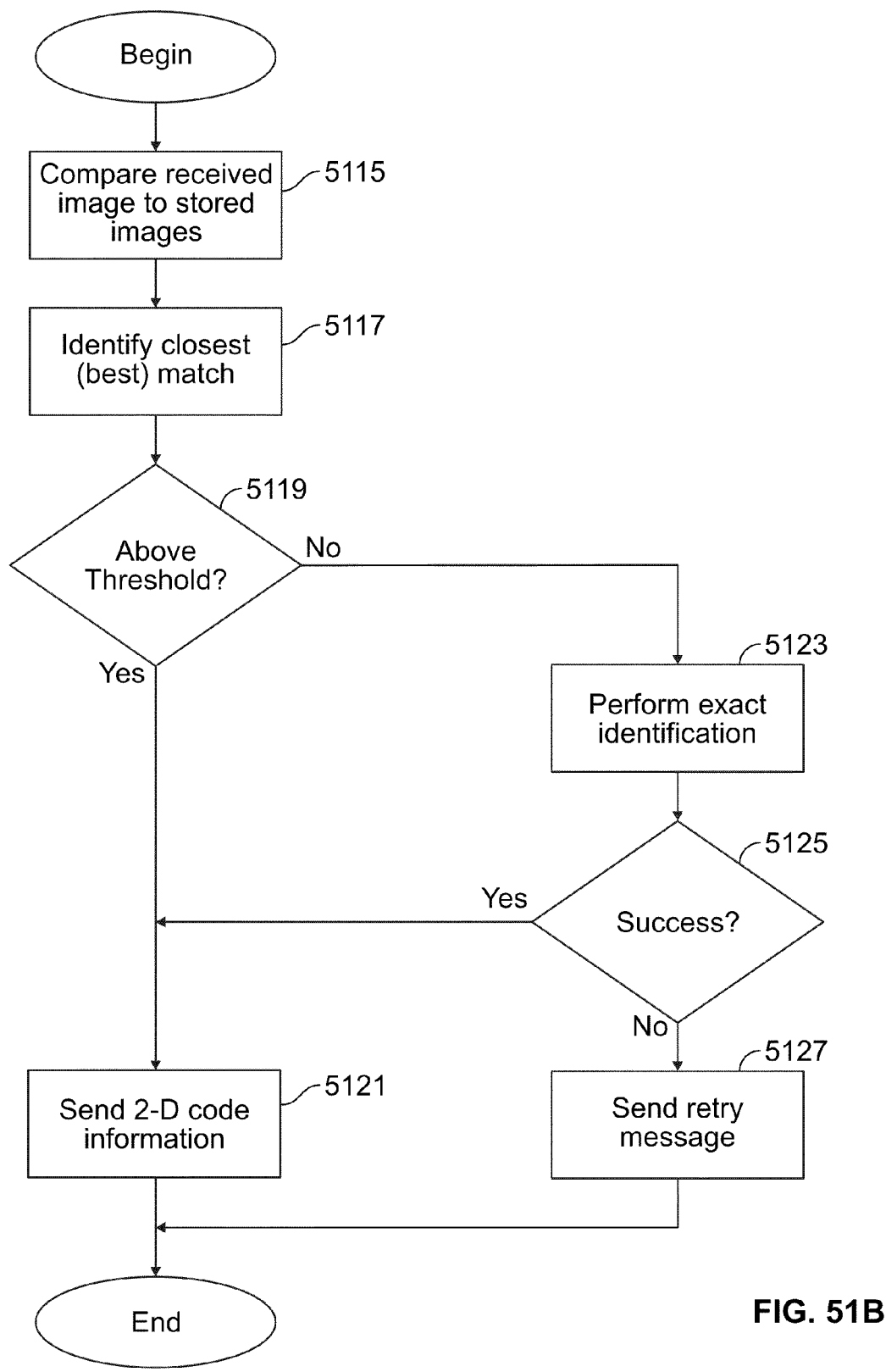

FIGS. 51*a-b* are flow diagrams illustrating the operation of the 2-D code processing access servers of FIGS. 49-50. In FIG. 51*a*, when the access server receives image data via its LAN transceiver, it first attempts at a block 5101 to exactly identify the code information from the received code image data. Specifically, the access server uses its code processing circuitry to perform an analysis of the received image data using a decoding algorithm specifically designed for decoding the type of code which was read. A number of 2-D code types exist, including, for example PDF-417, Maxicode, etc., which have specific corresponding decoding algorithms or rules.

After its analysis is complete, the access server next determines whether the exact identification was successful at a block 5103. Determining whether an identification was successful often depends on the type of code used. If enough redundancy is built into the code, then the loss of a number of bits of data resulting, for example, from a partially blurred image may not be fatal to a successful exact identification. If, on the other hand, the type of 2-D code being read is less "tolerant," then even the loss of a single bit might result in a failed exact identification.

In any event, if the exact identification is successful, at a block 5105, the access server sends the identified code information to a predetermined destination for further processing, and acknowledges the successful identification. If the exact identification is not successful, however, the access point performs a further analysis of the image data to attempt to identify the corresponding code information.

At blocks 5107 and 5109, the access server compares the received image to stored images located in its image database and attempts to locate the closest or best match. Although grey scale considerations and image-shifting correlation techniques are contemplated, in a relatively simple embodiment, such a comparison involves a process of scaling the received image to correspond to the stored images, then performing an "exclusive OR" of the received image with the stored images. More exact matches will yield an overall sum value nearer to zero.

After the access point completes its comparison and has identified the closest or best match between the received image data and the stored images, the access point then determines at a block 5111 if the overall value resulting from the best match comparison is above a predetermined accuracy threshold. Such an accuracy threshold may vary depending on, again, the type of code that was read, and the level of importance associated with a good read. If the overall value is below the predetermined threshold, the access server, as above, sends the identified code information (corresponding to the best match stored image) at a block 5105 to a predetermined destination for further processing, and acknowledges the successful decode.

If the overall value of the best match comparison is above the predetermined threshold, then, at a block 5113, the access server forwards a bad read or retry message to the code reader to indicate to the user to reread the code.

FIG. 51b is similar to FIG. 51a except that the comparison of the received image with stored images is performed before any exact identification is attempted. Specifically, the access server first compares the received image to the stored images at a block 5115, identifies the closest match at a block 5117, and determines whether the overall value of the comparison is above a predetermined accuracy threshold at a block 5119. If the overall value is below the threshold, the code information relating to the best match stored image is simply forwarded at a block 5121 to a predetermined destination for further processing.

If the overall value is below the threshold, then the access server attempts the exact identification and determines success at blocks 5123 and 5125. If such exact identification is successful, then the access device forwards the code information at block 5121. If it is not successful, the access device forwards a retry message to the code reader at block 5127.

Figure 52:
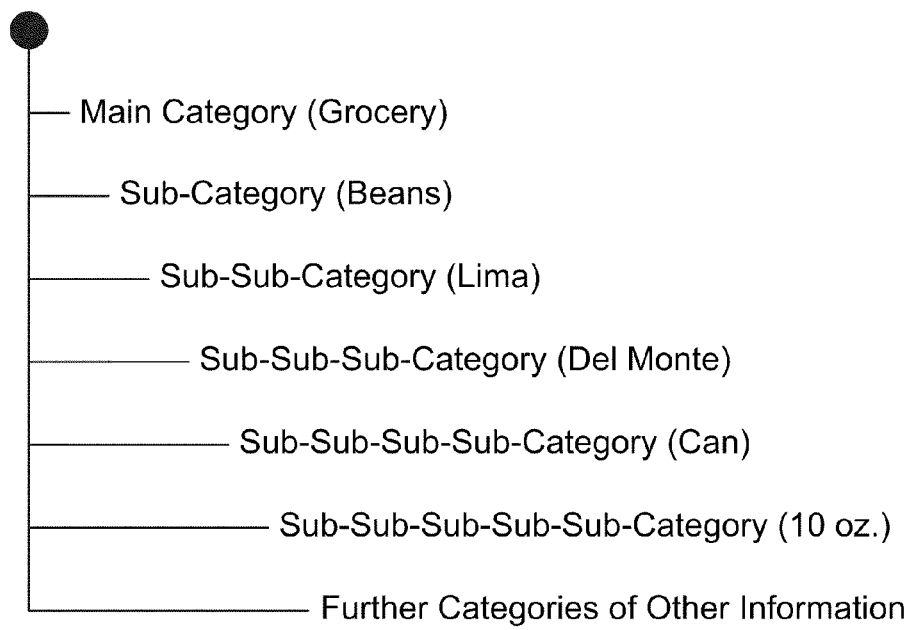
FIG. 52 illustrates the structuring of 2-D code information so as to support a hierarchical recognition strategy as used by the access point of FIGS. 49-50.

FIG. 52 illustrates the structuring of 2-D code information so as to support a hierarchical recognition strategy as used by the access server of FIGS. 49-50. In the image database of an access server, each known image is stored and hierarchically organized in sections. Each section of image contains information relating to a specific category of information. For example, as shown, images may include a main category followed by further and further subcategories. Thus, the image database stores all of the images in the main or first category at a top level in the hierarchy. Under each main category image, the image database stores only those subcategory images which coexist with the main category image on known complete 2-D code images. Similarly, under each subcategory image, the image database only stores sub-sub-category images which coexist with the main category image and the subcategory image.

Figure 53:
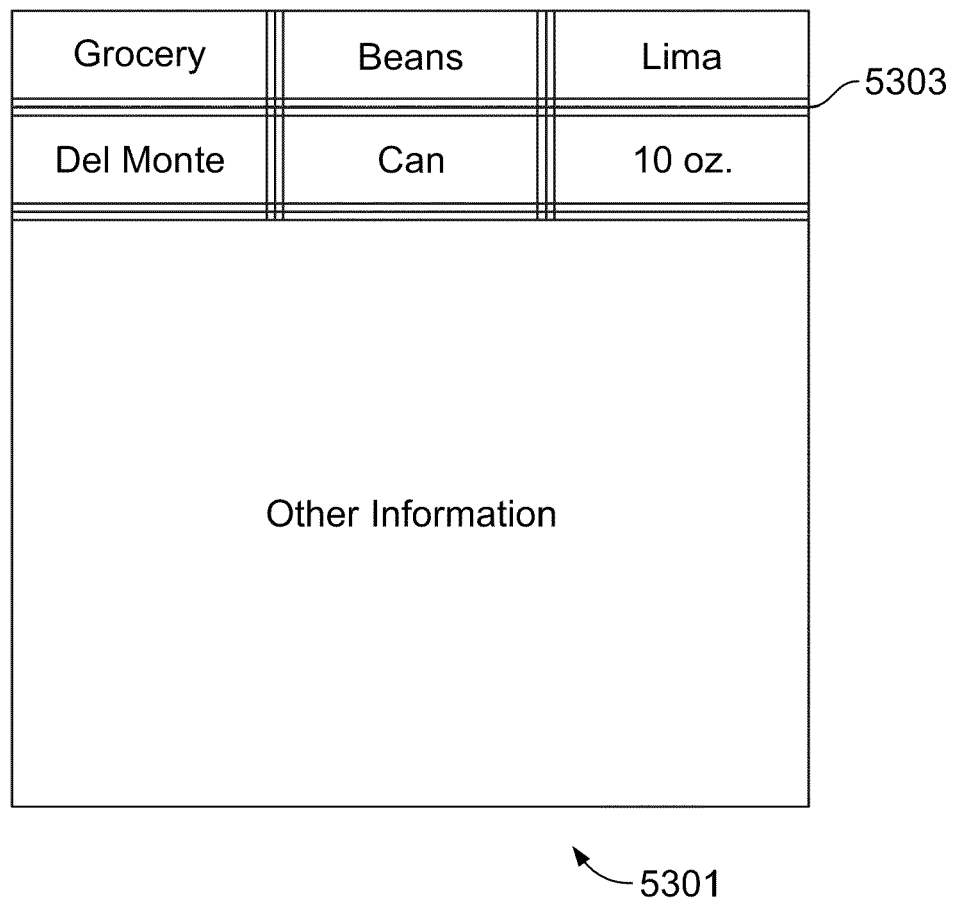
FIG. 53 is a diagram illustrating an exemplary 2-D code wherein the hierarchical structure of FIG. 52 is implemented.

FIG. 53 is a diagram illustrating an exemplary 2-D code 5301 wherein the hierarchical structure of FIG. 52 is implemented. From left to right, top to bottom, the illustrated 2-D code provides image portions of categories separated by five bit line borders, such as a border 5303. As shown, the main category image represents "grocery". The subcategory represents "beans", and so on for the further subcategories.

Using such a hierarchical categorization, the access server can more rapidly perform the process of image comparisons. For example, at a main category level in the hierarchy, a grocery image, an office supply image and general merchandize image might be the only three types of main category images known to the access point. If after comparing the received and the stored main categorization images, no acceptable match is found, the attempted comparison ends without ever having to compare the remainder of the potentially thousands of remaining images stored in the image database. Similarly, if a main level match is found with the stored office supply image, no comparison need be made with the plethora of remaining images under the grocery image main category.

Further detail of the efficiency of such a hierarchical organization can be found below in reference to FIG. 54. In addition, although the 2-D code illustrated in FIG. 53 is not necessarily a current 2-D code standard, the principle of hierarchical organization can be utilized in current 2-D code standards to take advantage of the image comparison efficiencies involved.

Figure 54:
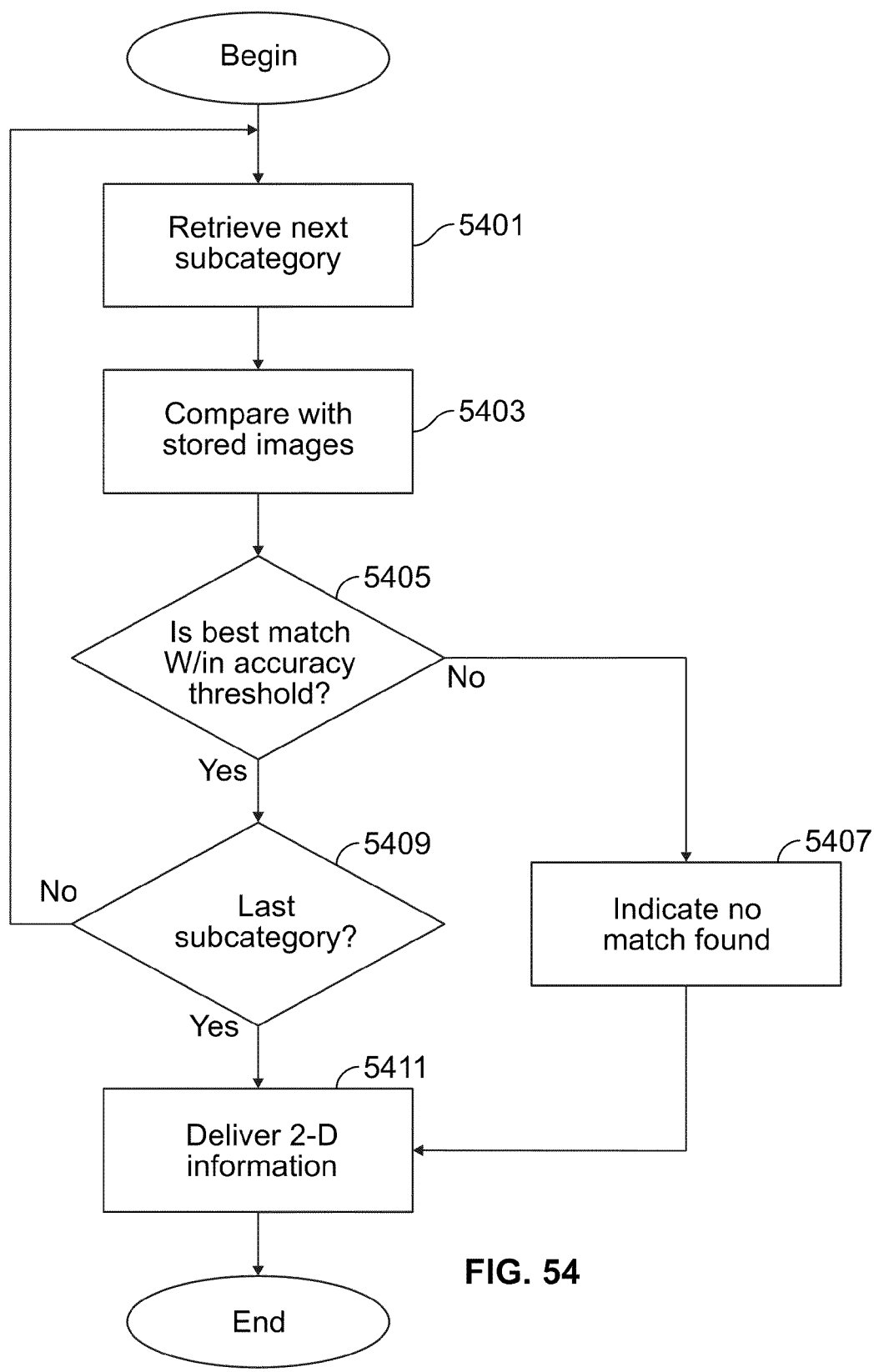
FIG. 54 is a flow diagram illustrating the functionality of the access point of FIGS. 49-50 in carrying out the hierarchical recognition strategy of FIG. 52.

FIG. 54 is a flow diagram illustrating the functionality of the access server of FIGS. 49-50 in carrying out the hierarchical recognition strategy of FIGS. 52 and 53. The access server begins the hierarchical image comparison process, and, at a block 5401, extracts from the received 2-D image a first subcategory image portion, i.e., the main category image indicating "grocery" for example. At a block 5403, the access server compares the extracted image with each of the main category images stored in the image database. If the closest comparison fails to fall within an accuracy threshold at a block 5405, the access server indicates that the comparison has failed at a block 5407, and ends the process.

Otherwise, if the comparison is within the accuracy threshold at the block 5405, the comparison process continues with the access server checking to see if there are any further subcategories at a block 5409. Because other subcategories exist, the access point branches to repeat the process beginning at the block 5401. This time, the access server extracts from the received image the image portion relating to the first subcategory (beans) for comparison at the block 5403 with only those first known subcategory images having "grocery" as the main category.

Again if no match within the threshold is found, the access point vectors to indicate failure at the block 5407, and terminates the process. However, if a subcategory match is found, the access point branches to handle the sub-sub-category in a similar way. If, at the block 5409 after successfully repeating the comparison a number of times, the access point concludes that there are no further subcategories to compare, the access point delivers the 2-D code information stored in the image database and associated with the matching stored image, and successfully ends the code identification process.

The known image database is supplemented by exact decoding as illustrated for example in FIG. 51b, wherein any successful exact decode is used to provide both categorized image and information portions for subsequent decoding through comparison. In addition, although the hierarchical structuring described herein offers many advantages, it need not be implemented to carry out the comparison process.

Figure 55A:
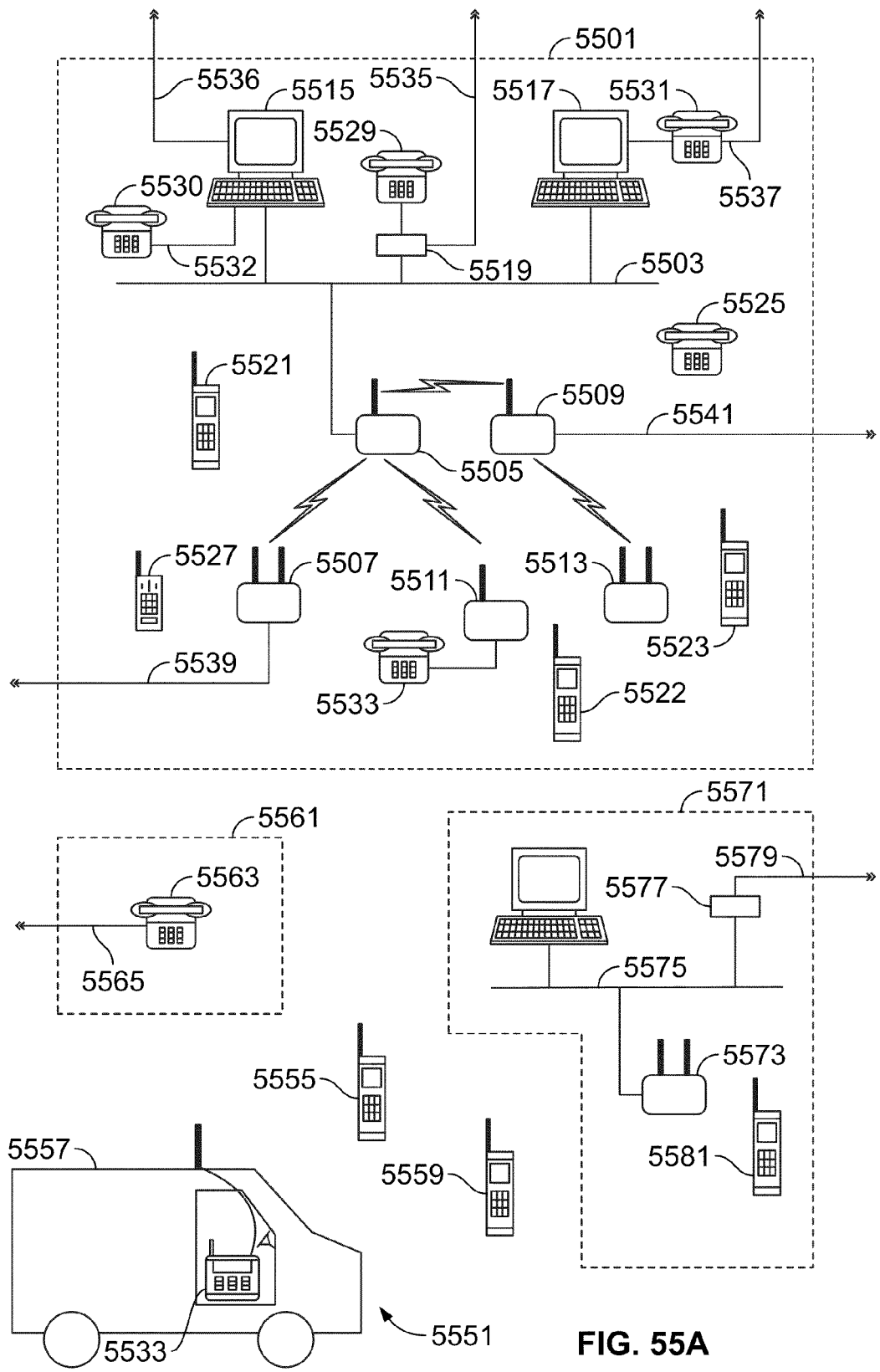
FIG. 55a is a diagram illustrating the overall flow of both data and voice through another embodiment of the hierarchical communication network of the present invention.

FIG. 55a is a diagram illustrating the overall flow of both data and voice through another embodiment of the hierarchical communication network of the present invention. Specifically, a premises network associated with a premises 5501 comprises a hardwired backbone LAN 5503 and a wireless network of access devices 5505, 5507, 5509, 5511 and 5513. While the backbone LAN 5503 preferably comprises a coaxial or twisted-pair ethernet link, it may alternately constitute, for example, a token ring, fiber optic, infrared, serial or parallel link.

A variety of network devices also participate in the premises network. Computers 5515 and 5517, the access device 5505 and a telephone access device 5519 directly participate in the backbone LAN 5503. Mobile terminals 5521, 5522 and 5523 and stationary phone 5525 also participate wirelessly via any of the access devices 5505, 5509, 5507, 5511 and 5513 which happen to be within range. A wireless phone 5527 is configured to communicate with an independent radio channel associated with the access device 5507. The access device 5507 is configured with a second radio transceiver for that purpose. Stationary phones 5529, 5530, 5531 and 5533 indirectly participate in the premises network via hardwired links to the telephone access device 5519, the computers 5515 and 5517 and the access device 5511, respectively.

Supporting both voice and data transport, telephone lines 5535, 5536, 5537, 5539 and 5541 provide dedicated communication links to conventional telephone switching networks for delivering voice or data to devices inside and outside of the premises 5501.

Associated with a vehicle 5557, a vehicular network 5551 comprises an access device 5553 and mobile terminals 5555 and 5559. Although not shown, other vehicular network devices such as printers, plotters, fax machines, etc., may also be located within the vehicle 5557. Such other devices participate directly or indirectly on the vehicular network 5551 via wireless or hardwired interconnection.

Devices within the vehicular network 5551 can communicate via a WAN having selective operation between the access device 5553 and the access device 5513. To support the WAN, both of the access devices 5553 and 5513 are configured with a higher power transceiver dedicated to WAN communications. In addition, communication between the vehicular and premises networks also occurs when the vehicle 5557 drives within range of the premises network. At that point, the vehicular network effectively merges with the premises network for free communication flow between the two networks. Thus, the devices within the vehicular and premises network store non-critical messages and information destined for devices within the other network until they are in range and merged. Critical messages and information may be immediately communicated via the relatively higher cost WAN.

Similarly, at a remote site 5561 located some distance away from the premises 5501, a stationary phone 5563 may communicate via a telephone line 5565 (and associated telephone switching network) to the various network devices participating in the premises or vehicular networks.

At a remote site 5571, a wired and wireless network also exists. An access device 5573 participates in a wireless network and in a hardwired backbone LAN 5575. A telephone access device 5577 participates on the backbone LAN 5575, providing access to and from a telephone line 5579. A mobile terminal 5581 participates in wireless communication with the access device 5573. Thus, through the telephone line 5579 and the associated telephone switching network (not shown), the network at the remote site 5571 can be communicatively coupled to the overall network at the premises 5501.

Data flows through the illustrated communication system in the same manner as described above in reference to FIGS. 1-54. To summarize, data is segmented into packets (herein "data packets") which are routed per spanning tree table specification through the wireless network and backbone LAN 5503. Data is also routed as need be through a conventional telephone switching network (not shown) via the telephone lines 5535, 55.36, 5537, 5539, 5541 and 5579. Data routed through the telephone switching network takes the form of a serial data stream using commonly known hardwired modem technology.

Voice signals are similarly routed. Voice or other audio signals (herein "voice signals") traveling through the wireless pathways of the premises network typically flow in a digital, packetized form (herein "voice packets"). However, voice signals in an analog form may also be modulated and transmitted in a non-packetized form such as with communication between the wireless phone 5527 and the access device 5507. Voice signals travel through the wired backbone LAN 5503 are also packetized, i.e., they travel in voice packets.

Voice signals traveling through the telephone switching network (not shown) may either remain in a continuous, non-packetized form (herein a "voice stream") as captured, for example, by a microphone, or be routed as voice packets using known modem technology. The option used here is dependent on the form of the voice signals upon entering the telephone switching network, and the desired form of the voice signals upon exiting the telephone switching network. For example, voice signals flowing between the telephones 5531 and 5563 take the form of a voice stream, because both of the telephones 5531 and 5563 capture voice in and attempt to reproduce voice from a voice stream form.

Alternately, for example, voice signals flowing between the mobile terminals 5521 and 5581 (between premises) take the form of voice packets while traveling through the telephone switching network via the telephone lines 5579 and 5539. Although a voice stream might be used, it is not preferred in this configuration because the mobile terminals 5581 and 5521 both communicate voice signals in a voice packet form. Converting between forms (and back again) along this pathway offers little value.

Conversion between forms along a communication path between, for example, the mobile terminal 5523 and the telephone 5563 does take place, however. Specifically, the mobile terminal 5523 transmits a call route request packet which includes the identity of the destination device, the telephone 5563. Upon receiving the route request packet, the access device, consulting its routing table, concludes that it does not have a telephone line pathway (or any other pathway) to the telephone 5563. Thus, the access device 5513 sends the request toward the root access device 5505, i.e., to the access device 5509. Upon receipt, the access device 5509 consults its routing table, discovers that it has access to the telephone line 5541 and records the availability of the telephone line 5541 in the route request packet. Thereafter, the access device 5509 transmits the route request packet toward (and to) the root access device 5505. Upon receiving the packet, the root device 5505 consults its routing table yet identifies no lower cost telephone line access than that provided by the access device 5509 as was previously recorded in the route request packet. Therefore, the root access device 5505 converts the route request packet into a reply packet and forwards it back to the terminal 5523 via the access devices 5509 and 5513.

Upon receipt of the reply packet, the terminal 5523 offers to the user and/or software of the terminal 5523 the telephone line routing pathways (in this case only one) identified in the reply packet. Upon selecting the offered pathway, the terminal 5523 sends a call setup packet to the access device 5513 which forwards the setup packet to the access device 5509. Upon receipt, the access device 5509 must determine from the setup packet whether the destination of the call expects a voice stream or voice packet transfer. If the setup packet indicates a destination identifier which is not the telephone number being dialed, the access device 5509 will use voice packet transfer. Alternatively, which is the case in this example, the setup packet indicates that the destination identifier is the telephone number being dialed, and the access device 5509 concludes that it must send a voice stream.

Thereafter, the access device 5509 interfaces between the mobile terminal 5523 and the telephone 5563. Particularly, the access device 5509 dials the telephone number of the telephone 5563. If a busy signal is detected, the access device 5509 hangs up, and delivers a busy message to the mobile terminal 5523 via the access device 5513. If a ringing signal is detected, the access device 5509 sends a ringing message to the mobile terminal via the access device 5513. Upon detecting a pickup, the access device 5509 delivers a connect message to the mobile terminal 5523. The mobile terminal 5523 may then begin sending voice packets to the access device 5509. Similarly, a voice stream from the telephone 5563 arrives at the access device 5509.

In addition to providing call setup assistance, the access device 5509 also assists in conversion between voice stream and voice packet forms. Specifically, the access device queues up the voice packets received from the mobile terminal 5523 then begins converting them through a digital to analog conversion process into a voice stream form which it delivers to the telephone 5563. Upon receiving the voice stream, the telephone 5563 reproduces the voice which originated from mobile terminal 5581.

The access device 5509 also receives the voice stream from the telephone 5563 and begins converting it through an analog to digital conversion process into a sequence of voice packets. As the voice packets are generated, they are routed toward the mobile terminal 5523. Upon receipt of the voice packets, the mobile terminal 5523 queues up the packets then performs a digital to analog conversion process to generate a voice stream. The mobile terminal uses the generated voice stream to reproduce (via a speaker) the voice which originated at the telephone 5525. Further detail regarding this process can be found below.

In the exemplary illustration of FIG. 55*a*, the circuitry for converting voice signals between the voice stream and voice packet forms, hereinafter "conversion circuitry", can be found in the telephone access devices 5519 and 5577, mobile terminals 5521, 5523, 5555 and 5581, computer 5517, telephone 5525 and access devices 5507, 5509, 5511 and 5553. Similarly, the circuitry for handling basic call setup and processing, hereinafter "call processing circuitry", can be found in the access devices 5507 and 5509 and the telephone access devices 5519 and 5577.

Because they are not configured with conversion circuitry, the mobile terminals 5522 and 5559 communicate in a manner similar to the wireless phone 5527, i.e., they communicate voice signals in a voice stream form (e.g., through microphone pickup, amplification, modulation and transmission without packetization) on a communication channel preferably independent of colocated packet-based communication channels. Thus, the access devices 5507, 5511 and 5553 are configured to not only participate on the packetized communication channel(s), but also to participate in voice stream exchanges with the mobile phone 5527, mobile terminals 5522 and 5559, respectively.

For example, voice communication with the mobile terminal 5559 typically requires assistance from the access device 5553. Such assistance involves packetizing voice streams received from the mobile terminal 5559, and converting voice packets to voice streams for delivery to the terminal 5559. Generally, the access device 5553 does not have to invoke its conversion circuitry when communicating voice to and from the terminal 5555 (unless, for example, the voice session involves communication between the mobile terminals 5555 and 5559).

Moreover, although the telephone switching network might change the form of the voice stream, such as through time multiplexing, modulation multiplexing or packetization, for example, such changes are transparent to the illustrated network and are ignored herein. Thus, whether such changes occur or not, a voice stream flowing through a telephone switching network is still referred to herein as a voice stream.

Figure 55B:
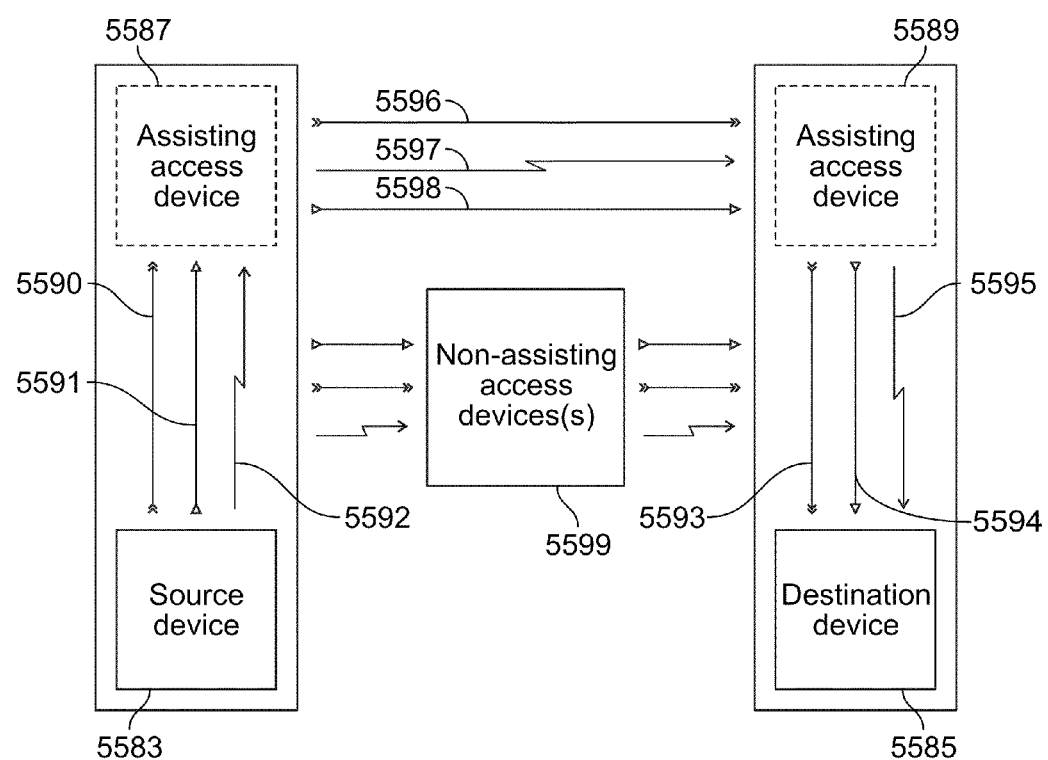
FIG. 55b is a diagram which illustrates a summary of the various types of communication pathways for setting up voice sessions between a source and destination network device.

FIG. 55*b* is a diagram which illustrates a summary of the various types of communication pathways that may be used for setting up voice sessions between a source and destination network device. For example, nearly all of the pathways shown in FIG. 55*a* can be summarized with reference to FIG. 55*b*.

Network devices, such as mobile terminals or telephones, are typically capable of operating as a source device (a call origination point) or a destination device (a call destination point). Thus, as illustrated, the "source" and "destination" designations merely identify which of the network devices originates the call and which device receives the call.

A source device 5583 may establish a voice session with a destination device 5585 via a variety of types of pathways should such pathways be available. However, many of the types of pathways require the assistance of conversion circuitry when conversion between voice packets and voice streams is required. Many types of pathways also require call processing circuitry for interfacing with telephone switching networks.

For example, a network device which only captures and transceives voice streams (such as a conventional telephone) can communicate with any other such device without assistance so long as the pathway between the two provides-voice stream transport, and the two devices have access to a protocol for establishing the voice session. Such is the case when the source and destination devices 5583 and 5585 are both conventional telephones that use the telephone switching network 5596 for call setup and voice stream routing.

However, should the pathway between the two telephones comprise a hardwired connection 5598, the telephones require assistance in, at a minimum, setting up the call. Such setup consists of simulating a connection with the telephone switching network by providing dial tones, busy signals, ring signals, etc., to each telephone. While the voice session is in progress, no assistance is needed and the telephones exchange voice streams over the hardwired link 5598.

Depending on the nature of the hardwired link 5598, however, such assistance may not be sufficient if the hardwired link 5598 also operates pursuant to another protocol, such as a packet-based TCP/IP, for example, which may or may not require the sharing of the hardwired link 5598 with other network devices. If such is the case, assistance to the two telephones also involves capturing full use of the hardwired link 5598 (through a request for a full bandwidth voice session), or adapting the voice stream into a form which may be transferred over the hardwired link 5598.

Any level of assistance needed by the source and destination devices 5583 and 5885 is provided by corresponding assisting access devices 5587 and 5589. For example, if the source device 5583 is a conventional device such as a typical telephone, it requires the assistance of an access device 5587 to establish a voice session via a packet-based wireless link (or network) 5597. Such assistance involves both the use of conversion circuitry in the access device for adapting to the packet-based requirements of the wireless link 5597, and use of call processing circuitry to establish the call through the wireless link 5597. If, however, the source device 5583 is configured with conversion and call processing circuitry, the assisting access device 5587 would not be needed. Similarly, if the destination device has conversion circuitry, the assisting access device 5589 is also not needed.

The dashed line borders surrounding the assisting access devices 5587 and 5589 are representative of the fact that they may or may not be needed depending on the nature of the pathway and the nature of the source and destination devices 5583 and 5585.

If assistance is required, the pathway for communicating between the source device 5583 and its assisting access device 5587 may involve: 1) a telephone switching network 5590; 2) a hardwired link 5591, such as an ethernet LAN, RS232, or telephone wire connection; or 3) a wireless link 5592, involving, for example, cellular phone transmissions or shorter range, relayed or point to point voice stream transmissions such as may be found in typical wireless phone transmissions to its base unit.

In addition, the assisting access device 5587 may assist in basic voice session setup and control. For example, to establish a voice session, the assisting access device 5587 may simulate a typical telephone switching system by delivering dial tones, performing touch tone detection and delivering destination ringing and busy signal indications to the source device 5583. Moreover, if necessary, the assisting access device 5587 will adapt the analog audio/voice signals captured by the source device 5583 (i.e., the voice stream) for transport toward the destination device 5585, and adapt received voice information for transport to the source device 5583 for playback.

No assisting access device 5587 is needed, for example, where the source device 5583 has been configured to: 1) capture and adapt a voice stream into a packet-based form (via conversion circuitry) for transport to the destination device 5585; 2) adapt incoming voice packets from the destination device 5585 into a voice stream form (via conversion circuitry) for playback; and 3) generate and respond to call setup and session processing control.

Similarly, if the assisting access device 5589 is required, the pathway for communicating between the destination device 5587 and the assisting access device 5589 may involve: 1) a telephone switching network 5593; 2) a hardwired link 5594; or 3) a wireless link 5592. The assisting access device 5589 may also assist in basic voice session setup and control by, for example, simulating a typical telephone switching system.

If necessary, the assisting access device 5589 will also adapt voice streams for packetized transport toward the source device 5583, and adapt voice packets received for transport to the destination device 5585 for playback. No assisting access device 5589 is needed, for example, where the destination device 5583 has been configured to perform the assisting functionality.

No assisting access device 5589 is needed, for example, where the destination device 5585 has been configured to: 1) adapt captured audio/voice signals for packet-based transport via the communication network toward the source device 5583; 2) adapt incoming audio/voice packets into an analog form for playback; and 3) generate and respond to call setup and processing control packets.

The source device 5583, with or without assistance from the assisting access device 5587, may establish a voice session with the data device 5585 (itself with or without assistance from the assisting access device 5589) through a variety of pathways. For example, the session may be established directly through a telephone line link to the telephone switching network 5596. The session may also be established through a wireless link 5597 or hardwired link 5598. Otherwise, the voice session pathway may require routing assistance via one or more "non-assisting" access devices 5599. For example, as illustrated in FIG. 55*a*, the non-assisting access devices are arranged in spanning tree configurations to route voice session packets back and forth between source and destination devices (via assisting access devices where necessary).

Links between the source device 5583 (via the assisting access device when needed) and the one or more non-assisting access devices 5599 may consist of a hardwired, telephone switching network or wireless link as illustrated. Similarly, links between the one or more non-assisting access devices 5599 and the destination device 5585 comprise a hardwired, telephone line or wireless link.

Figure 56A:
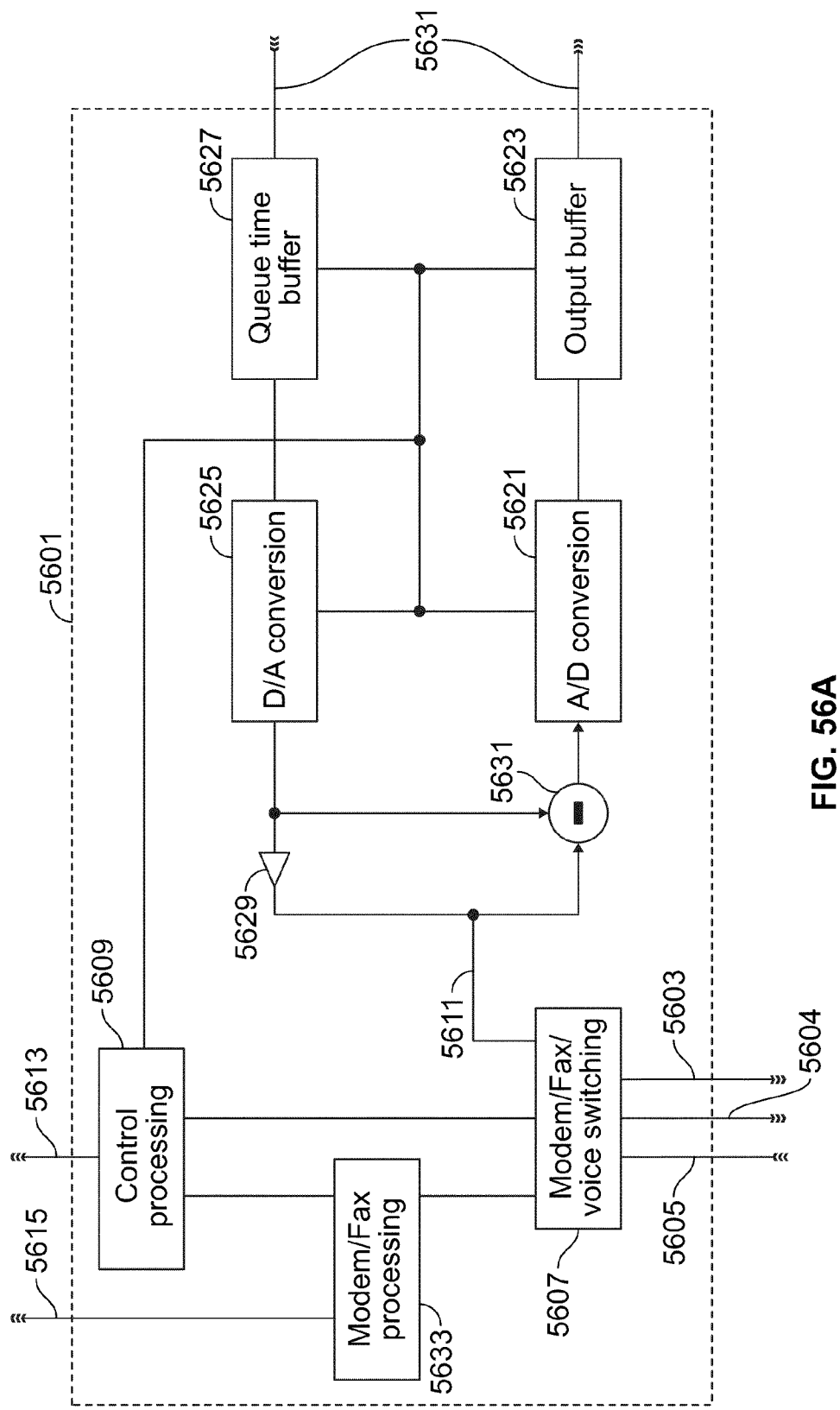

FIG. 56*a* illustrates an embodiment of the conversion and call processing circuitry contained within a computer card 5601 (preferably a PCMCIA card although IDE, PCI, etc. type cards might alternately be used). The computer card 5601 plugs into a host device such as an access device or computer. Through plugging the card 5601 into the host device, the control and data bus 5613 of the card becomes available to the host device's processing unit.

To complete installation of the card 5601, the host device is loaded with configuration, maintenance and device driver software. The configuration software is used to configure the card 5601 to operate in different configurations such as is illustrated in FIG. 55*a* or 55*b*. For example, when installed in the computer 5515, the computer card 5601 must be configured to function with a conventional telephone, the telephone 5530 of FIG. 55*a*, in a line sharing arrangement. The dual-line phone 5531 associated with the computer 5517 receives a similar software configuration but does not require a line sharing arrangement.

The maintenance software permits the user of the host device to add or modify instructional voice messages to be delivered, and (as will be discussed in reference to FIG. 63 below) various telephone numbers of remote sites with cross-referenced internet addresses in a cross-reference database.

The device driver software allows the host device and the computer card 5601 to selectively interact to perform various joint functionality. Thus, when needed, the computer card 5601 has access to the host device's processing unit, associated storage devices and other resources.

With reference to the specific configuration of the computer 5515 (FIG. 55*a*), the telephone 5530 (FIG. 55*a*) connects to a switching circuit 5607 via a phone input line 5603. A telephone switching network also attaches to a switching input line 5605 of the switching circuit 5607 via the telephone line 5536 (FIG. 55*a*).

The switching circuit 5607 senses a pickup of the telephone 5532 (FIG. 55*a*) by monitoring the phone input line 5603. Upon sensing the pickup event, the switching circuit 5607 communicates the event to a control processing circuit 5609. The control processing circuit 5609 responds by directing the delivery of a dial tone through the switching circuit 5607 to the telephone 5532 (FIG. 55*a*) attached to the phone input line 5603.

After delivering the dial tone, the switching circuit 5607 waits for a number to be dialed. The switching circuit 5607 forwards the received dialed digits to the control processing circuit 5609. Upon receiving the phone number and through activation of the device driver, the control processing circuit 5609 sends the number along the control and data bus 5613 to the host device in which the computer card 5601 is plugged, in this case the computer 5515 (FIG. 55*a*).

The host device compares the received telephone number with the cross-reference database it stores. If the telephone number has an entry in the database, the host device will look to see if the user has indicated therein the desire to: a) always use the telephone switching network; b) always use an internet routing path; c) always attempt an internal routing path; or d) prompt the user each time a call attempted made. Otherwise, if no entry is found, the host device adds the number to the database with a "d)" type cross-reference, permitting the user to later modify the setting. Thereafter, the host device responds to the computer card 5601 per the cross-reference entry identified.

If "a)" is identified, the host device directs the control processing circuit 5609 to automatically dial the number on the telephone switching network via the switching input line 5605, and then interconnect the lines 5605 and 5603 to permit a conventional telephone-based call setup and voice session to begin.

If the host identified "b", indicating that an internet pathway is required, the card 5601 attempts to establish an internet connection through the telephone switching network via the input line 5605. Alternately, in a preferred internet route embodiment, an auxiliary input line 5604 is used to maintain continuous internet connectivity via a dedicated line to the telephone switching network. Further detail regarding this configuration and process can be found in reference to FIG. 63 below.

If the host device identifies a "c)" type entry in its cross-reference database, the host device informs the control processing circuit 5609 to pursue a voice session through an internal route. The control processing circuit 5609 responds by attempting to setup a voice session with assistance from the host device. Specifically, upon identifying the need to gain access to the premises network on which the host device participates, the host device accesses the premises network to setup the call. The host device uses its own resources, i.e., its own ethernet card in the case of the computer 5515, to establish and maintain the internally routed call. The control processing circuit 5609 provides call setup simulation (busy, ringing, hang up, etc. signals to the telephone 5530) and conversion processing as needed to establish and maintain the voice session.

If the host device identifies a "d)" type entry for the telephone number, the host device delivers a voice message through the conversion circuitry of the computer card 5601 and to the user of the telephone 5530 (FIG. 55*a*) via the input line 5603. The message prompts the user to select a desired pathway via touch tone entry on the telephone 5530 (FIG. 55*a*), and permits the user to set that pathway as a permanent default. The user's selection is forwarded to the control processing unit 5609 which responds appropriately to the users request. For example, if the user selected the telephone switching network and requested that route be made a permanent option, the control processing circuit 5609 would route the call as described above as if the host identified an entry type "a)" in its cross-reference database. In addition, the control processing circuit 5609 forwards the request to the host device to change the entry to type "a)" for future calls.

In addition, if during setup the host device is informed that no conventional device such as a telephone is attached to the input line 5603 or that no switching network access is available, etc., the host device and computer card 5601 interact to provide for any alternate configurations such as those illustrated in FIG. 55*a*. For example, when a computer card 5601 is placed into the access device 5509, the access device 5509 and the control processing circuit 5609 coordinate to service the routing of voice packets in a voice stream form through the telephone switching network attached to the telephone line 5541. Likewise, they coordinate to service routing of voice stream information from the telephone line 5541 into the premises network in a packet-based form.

In addition, the host device and computer card 5601 can be merged into one package such as the telephone access device 5519. Therein, the functionality of the host processing and control processing unit 5609 are merged. The telephone access device 5519 is also configured with an ethernet (10base2 or 10baseT) interface providing for internal routing through the premises.

In the specific configuration of the computer 5515 of FIG. 55*a*, the computer 5515 (FIG. 55*a*) can use the dialed number to establish a voice session through the premises network. To do this, the computer 5515 (FIG. 55*a*) delivers a call setup request packet, which includes the dialed number, onto the backbone LAN 5503 (FIG. 55*a*). As previously discussed, the setup request packet is then routed through the spanning tree network to a destination device.

If the call cannot be established because the destination device cannot be found, the control processing circuit 5609 delivers (via its conversion processing circuits) to the telephone 5530 (FIG. 55*a*) a message indicating that the destination device is off-line and prompts for a voice mail message.

Similarly, if the call cannot be established because the destination is currently engaged in voice communication or has responded to the call setup request with a "do not disturb" indication, the control processing circuit 5609 delivers a message indicating the status and prompts for voice mail.

If a user hangs up prior to initiating a voice mail recording, the control processing and switching circuits 5609 and 5605 are reset to await another event. Otherwise, voice mail recording begins after a tone delivered at the end of the voice mail prompt. After delivering the tone, the control processing circuit 5609 directs the switching circuit 5607 to interconnect the lines 5603 and 5611. The control processing circuit 5609 also directs an A/D (analog to digital) conversion circuit 5621 to begin digitizing the voice message received via a subtraction circuit 5631. Because the control processing circuit 5609 disables a D/A (digital to analog) conversion circuit 5625 during the digitization process, the subtraction circuit 5631 subtracts nothing from the incoming voice message. Thus, the entire voice message captured by the telephone 5515 (FIG. 55*a*) is routed to the A/D conversion circuit 5621.

The A/D conversion circuit 5621 produces digital samples of the voice message, and delivers each sample to an output buffer 5623. The control processing circuit 5609 interfaces with the computer 5515 (FIG. 55*a*) via the loaded device driver to coordinate storage and delivery of the voice mail to the destination device as soon as delivery is warranted and possible.

If call setup proves successful, the control processing circuit 5609 directs the switching circuit 5607 to interconnect the lines 5603 and 5611, connecting the telephone with the conversion circuitry. Incoming voice signals from the destination device arrive at the computer 5515 via the backbone LAN 5503 (FIG. 55*a*) in a voice packet form.

In response, the computer 5515 (FIG. 55*a*) strips out routing information from the packets, and coordinates with the control processing circuit 5609 to deliver the remaining digitized voice information (hereinafter "voice data") to a queue time buffer 5627 via control and data bus 5613. The control processing circuit 5609 waits a predetermined queuing period of time before beginning playback of a group of voice data.

Groups of voice data are defined by a group identifier contained in each voice packet received. For example, conversion circuitry which converts voice streams into voice packets adds group identifiers after identifying a group. To identify a group, the conversion circuitry monitors incoming voice streams for gaps in voice input, i.e., it attempts to identify the difference between captured speech and background noise. Upon identifying the lack of speech for a predefined gap time of about one second, the conversion circuitry assigns a different (pseudo-random) group identifier to subsequent voice packets. Likewise, upon identifying another gap, the conversion circuitry assigns another group identifier to voice packets generated thereafter.

Thus, for each group of data (each group of voice data extracted from voice packets having a common group identifier), the control processing circuit 5609 begins to wait the predetermined queuing time before beginning conversion. Thereafter, no queuing time is required until the next group of voice packets begin.

By using the queuing time in such a manner, the control processing circuit 5609 can reasonably ensure continuous voice delivery of a voice group to the telephone 5530 (FIG. 55*a*) under most circumstances without, if possible, introducing a delay that is so long as to be noticeable.

When the buffer 5627 has sufficiently "queued up" a voice group, the control processing circuit 5609 directs the delivery of the digital voice data from the buffer 5627 to a D/A conversion circuit 5625 at the same sampling rate used to generate the voice packets. From the voice data, the D/A conversion circuit 5621 generates an analog voice signal, i.e., a voice stream, representing the voice captured by the destination device. The voice stream is then delivered to the telephone 5530 (via a buffer 5629, interconnect 5611, switching circuit 5611 and the input line 5603) for listening by the user.

The generated voice stream is also subtracted by a subtraction circuit 5631 from the combined voice stream signals on the interconnect 5611. In this way, the voice stream sampled by the A/D conversion circuit 5621 for delivery to the destination device consists only of the voice signals captured by the telephone 5530 (FIG. 55*a*). Supporting this process, the buffer 5629 isolates the incoming voice stream from the incoming voice stream combined with the outgoing voice stream so that the subtraction process can be realized. The A/D conversion circuit 5621 converts the voice stream captured by the telephone 5530 (FIG. 55*a*) into a digitally sampled form (voice data) which is packetized with routing information and a voice group identifier for delivery by the host device (the computer 1515 of FIG. 55*a*) to the destination device.

Specifics regarding packetization of the voice data are managed between the control processing circuit 5609 and the host device in view of the requirements of the delivery route at issue. In an exemplary embodiment, for internal network routing, each voice packet contains a 20 ms (millisecond) time period of compressed voice data samples. Thus, not considering routing delays, a received voice packet has a built-in 20 ms delay.

In that embodiment, upon receipt of a first of a group of such voice packets, a 200 ms queuing time is invoked before the first of such voice packets will be played back. This should ensure that 10 packets of a given group should be waiting at the destination for playback at any time, making it unlikely that any extraordinary delays associated with the routing of any one or several voice packets could result in an empty queue during attempted playback of the given group. So long as the overall delay, i.e., the voice packet delivery delay (as determined by round trip test packets sent during call setup) plus the 200 ms queuing time, do not exceed a predetermined threshold value of, for example, 500 ms, full duplex (two-way) voice communication should be possible with relatively unnoticeable delays.

If required queuing and delivery time delays prove too long, e.g., to a point where they might annoy a calling party, the control processing circuit 5609 can disable full duplex communication by selectively inhibiting the output of the D/A conversion circuit 5626 and the input of the A/D conversion circuit 5621 to provide communication connectivity to only one speaker at a time, i.e., half duplex connectivity.

Queuing times are identified during call setup and may be modified during the course of the call. Queuing should be as short as possible so that the parties involved cannot detect the overall delay. It should also be long enough to prevent detectable gaps in the reproduced voice signals during most channel loading conditions. The queuing time is generated from a combination of the maximum routing time expected between the source and destination devices less the nominal routing time, and that result plus a one hundred percent (100%) safety margin, i.e., twice the result.

In a first embodiment wherein packet routing times remain fairly constant, the maximum and nominal routing times are fixed and based on overall channel characteristics (routing delivery times and variations thereof) established during network setup. In an alternate embodiment wherein packet routing times exhibit relatively slow variation, as previously mentioned, routing times are calculated from round trip routing times of test signals transmitted between the source and destination during call setup (while the destination device is "ringing"). This embodiment is preferable where routing time shows little variation throughout a calling session. If routing times vary much over the course of a single calling session, in a third embodiment, round trip test signals are interspersed with voice packets and decisions made regarding queuing times and full or half duplex considerations are reevaluated for further voice session support.

Upon receiving an incoming call from the telephone switching network via the switching input line 5605, if not in use, the control processing circuit 5609 first attempts to identify the type of call incoming. If it is a facsimile or modem transmission destined for the host device, the control processing circuit 5609 directs the switching circuit 5607 to interconnect the line 5605 with a modem/fax processing circuit 5633.

If the incoming call on the line 5605 constitutes a voice packet transmission destined for the telephone 5530, the control processing circuit 5609 and switching circuit 5607 deliver a busy signal onto the line 5603, and deliver a ringing message packet along the line 5605. If the switching circuit 5607 detects a pickup on the line 5603, a connect message packet is delivered onto the line 5605 to the sending device. Thereafter, the voice stream delivered via the phone input line 5603 is converted as described above into a voice packet form for delivery via the switching input line 5606 to the source device. Similarly, the voice packets received along the line 5606 are processed by the conversion circuitry (as described above) and delivered onto the phone input line 5603.

If, however, the call designates a different destination device than the device attached to the phone input line 5603, the voice packets are relayed by the host device for further routing, e.g., the computer 5515 receives the voice packets to route them onto the backbone LAN 5503.

Alternately, if the incoming call on the switching input line 5605 is a voice stream call (e.g., a conventional phone call), the control processing device 5609 will direct the switching device to deliver a ring signal onto the line 5603. Upon detecting a pickup on the line 5603, the switching circuit is directed to interconnect the lines 5605 and 5603 for the duration of the voice session.

In addition, modem and facsimile transmissions originating from the host device (such as the computer 5515 of FIG. 55*a*) are received and processed by the modem/fax processing circuit 5633 for routing through the switching circuit 5607 to the telephone switching network via the line 5605.

Voice messages delivered to the user are stored in a digital form by the host device. The control processing circuit 5609 interacts to load the voice messages into a buffer 5627 as they are needed. The control processing circuit 5609 also directs the D/A conversion circuit 5625 to begin converting the digital messages into a voice stream for delivery via the buffer 5629 and the switching circuit 5607 to either the line 5603 or 5605.

With exception to the modem/fax processing circuit 5633, the telephone access device 5519 (FIG. 55*a*) also utilizes the circuitry shown in FIG. 56*a*, and has the same functionality described above in relation thereto. The telephone access device 5519 (FIG. 55*a*) is configured to communicate on the backbone LAN 5503, and to take on the functionality provided by the computer 5515 as described above.

Similarly, the same circuitry and functionality are contained within the telephone access device 5577. However, the device 5577 is shown having no telephone connected thereto.

In such configurations, the telephone access device 5577 acts only as an access device from the telephone line 5579 into and out of the remote premises.

The computer 5517 also utilizes a computer card 5601 (FIG. 56a). However, in the configuration illustrated, the telephone 5531 is a two-line phone with a first line being connected to an outside telephone line, the line 5537, and the second being connected to the card computer 5601. When the user desires to place an outside call, the first line is chosen and vice versa. In this configuration the line 5605 of the card 5601 is not, and need not be, connected to anything. Through setup, the host device (the computer 5517) takes the missing switching network link into consideration when determining routing options to select, offer, etc.

Each of the access devices 5507, 5509, 5511 and 5553 also contain a computer card such as the computer card 5601. In particular, with the card 5601, the access device 5507 provides communication pathways via: 1) the telephone line 5539; 2) the wireless network via the access device 5505; 3) the mobile terminal 5521 via a first transceiver serving the wireless network; and 4) the wireless phone 5527 via a dedicated, second transceiver.

The access device 5509 provides pathways via the telephone line 5541 and a transceiver servicing the wireless network. The access device 5511 illustrates that a telephone 5533 can be attached to the card 5601 to provide access through the wireless network to any local or remote device, without having direct access to the telephone switching network.

Furthermore, the access device 5533 illustrates that the computer card 5601 need not be connected to either a telephone or a telephone switching network to provide operational functionality. In particular, instead of connecting an outside telephone line, the access device 5553 delivers voice streams captured by and received from the mobile terminal 5559 to the conversion circuitry of the computer card 5601 for digitizing (by the A/D conversion circuit 5621), storing and routing as voice packets back to the premises, for example. Voice packets received from the mobile terminal 5555 (which contains its own conversion circuitry) receive the same storage and routing treatment without conversion assistance.

Figure 56B:
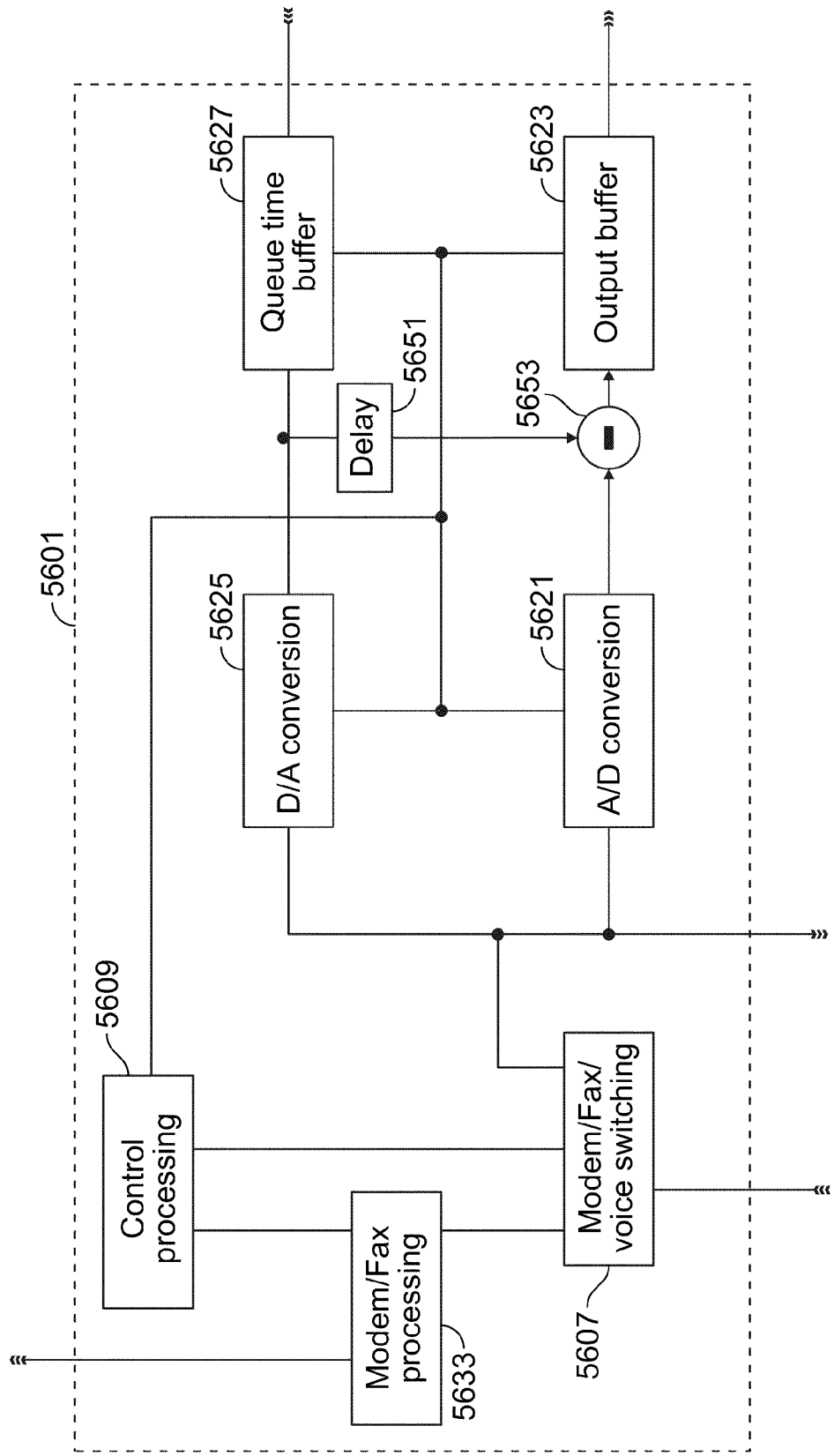
FIG. 56b illustrates an alternate embodiment of the conversion circuitry of FIG. 56a wherein instead of using an analog subtraction process to separate outgoing voice signals from the combined incoming and outgoing signals, a digital subtraction process is used (at a subtraction circuit 5653).

FIG. 56b illustrates an alternate embodiment of the conversion circuitry of FIG. 56a wherein instead of using an analog subtraction process to separate outgoing voice signals from the combined incoming and outgoing signals, a digital subtraction process is used (at a subtraction circuit 5653). In addition, the use of a delay element 5651 is shown to compensate for the D/A and A/D conversion time pathway via circuits 5625 and 5621 respectively.

Figure 57:
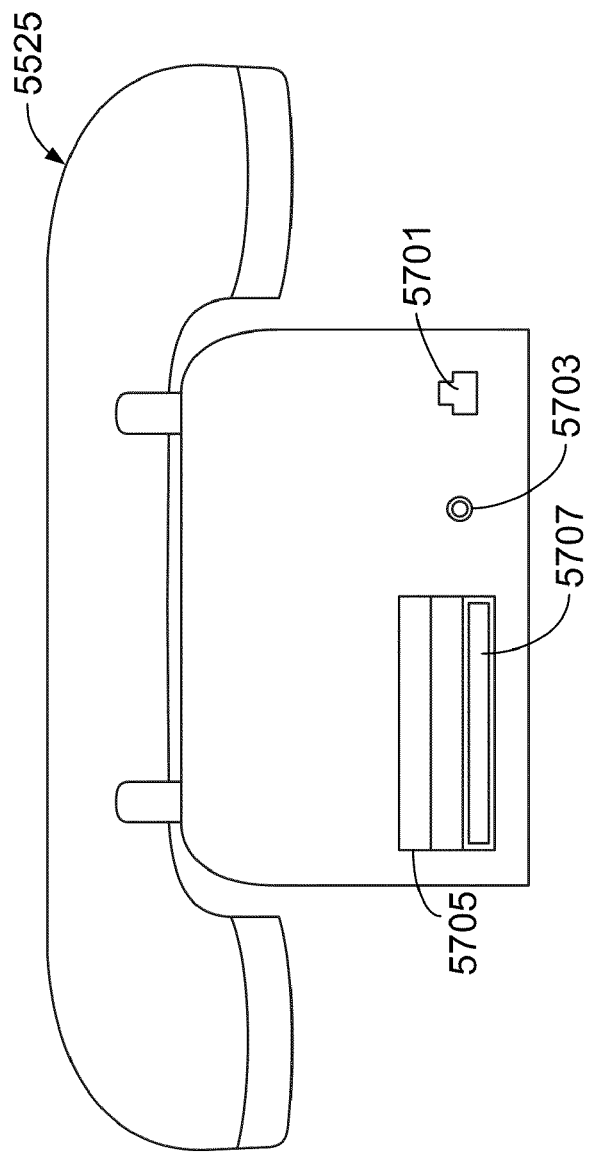
FIG. 57 is an illustration of the back of the telephone 5525 (also illustrated in FIG. 55a) as built in accordance with the present invention.

FIG. 57 is an illustration of the back of the telephone 5525 of FIG. 55a as built in accordance with the present invention. Unlike the conventional telephones 5530, 5529, 5531, 5533 and 5561 (FIG. 55a), the telephone 5525 is configured with built in conversion circuitry. In particular, the telephone 5525 contains a phone line jack 5701 for connecting to an available outside telephone line, although in need not be connected to operate (as illustrated in FIG. 55a). The power adapter jack 5703 provides power to the telephone 5525 via a typical A/C to D/C converter. Although not shown, an alternate embodiment of the telephone 5525 also utilizes internal, rechargeable battery power. Lastly, the telephone 5525 is configured to receive PCMCIA cards into slots 5705. For example, the PCMCIA card 5707 is a radio transceiver card which provides wireless access from the telephone 5525 to the access device 5509 (FIG. 55a). Alternately or in addition, an ethernet PCMCIA card may be added for direct ethernet connectivity to, for example, the backbone LAN 5503 (FIG. 55a).

The telephone 5525 provides a semi-stationary source for placing phone calls inside or outside of the premises without requiring new telephone line wiring. It also avoids incurring charges associated with other conventional mobile phone services.

Figure 58:
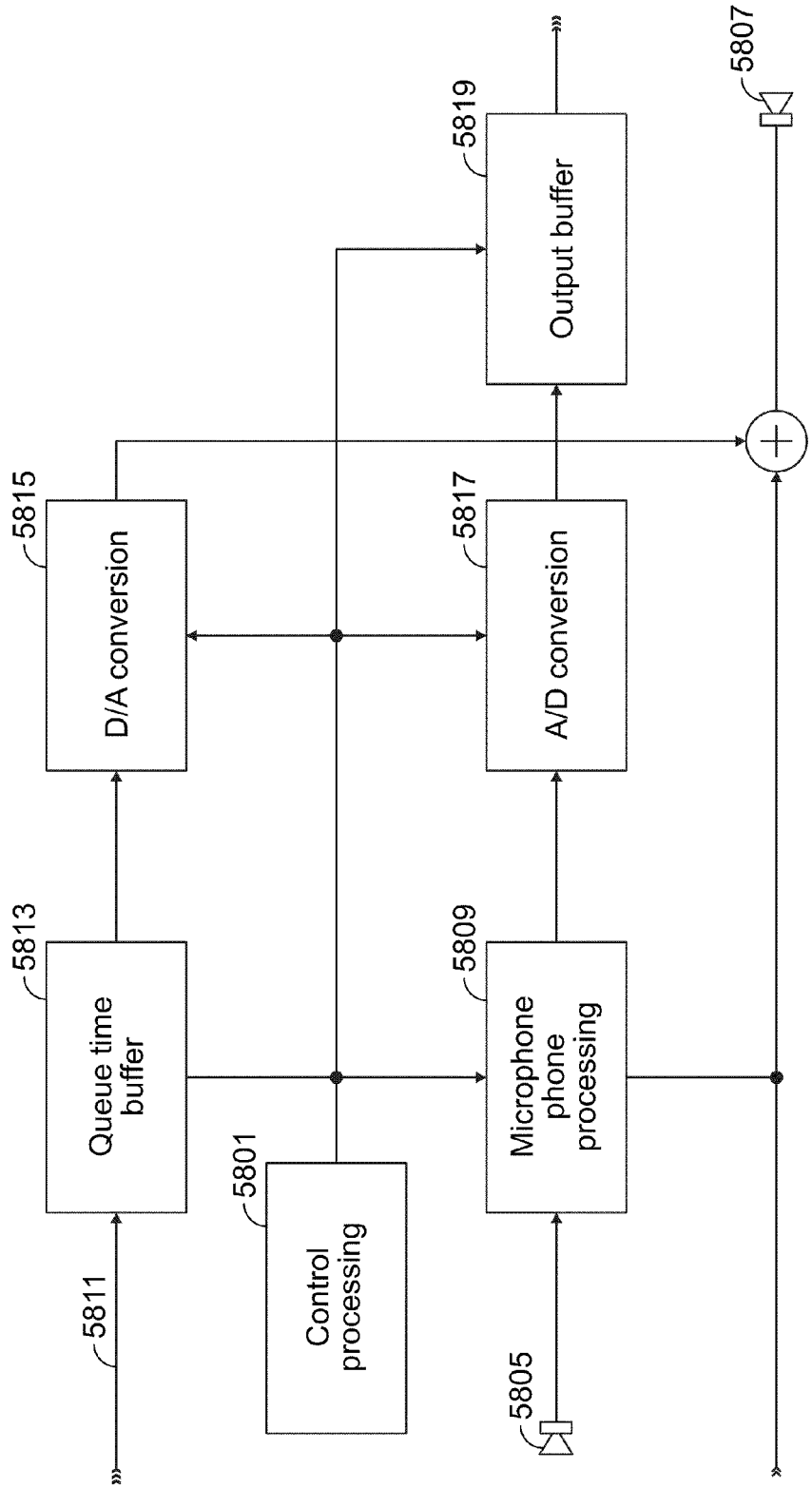
FIG. 58 is a schematic block diagram which illustrates the implementation of one embodiment of the conversion circuitry within the telephone 5525 of FIGS. 55 and 57.

FIG. 58 is a schematic block diagram which illustrates the implementation of one embodiment of the conversion circuitry within the telephone 5525 of FIGS. 55 and 57. In particular, a control processing circuit 5801 functions as described above in reference to FIG. 56a with one significant difference—there is no need for a subtraction circuit. This is because the control processing circuit 5801 already has access to the outgoing voice stream separate from that incoming.

Incoming voice streams via the jack 5701 (FIG. 57) are delivered (along with outgoing voice streams captured by a microphone 5805) to a speaker 5807 and to the other calling party. A microphone/phone processing circuit 5809 manages the call processing and delivers the outgoing voice stream per direction from a control processing circuit 5801.

To support voice packet communication, the processing circuit 5801 directs an A/D conversion circuit 5817 to process the outgoing voice stream. The resultant voice data is stored in an output buffer 5819 in a voice packet form. By attaching a PCMCIA card or cards (see FIG. 57) to the output buffer 5819, the control processing circuit 5801 can direct the delivery of the voice packets onto an ethernet LAN, telephone switching network, wireless network, etc., depending on the nature of the PCMCIA card(s) installed. Similarly, by attaching an input line 5811 to a PCMCIA card or cards (see FIG. 57) incoming voice packets can be delivered via a media defined by the attached PCMCIA card(s). Although not shown, the control processing circuit 5801 also maintains a direct interface with the attached PCMCIA cards to provide appropriate routing, call setup and control as proves necessary.

In addition, after queuing group voice data contained in incoming voice packets in a queue time buffer 5813, a D/A conversion circuit 5815 begins converting the queued data into a voice stream form. For half duplex communication, the conversion is delayed until any pending group of outgoing communication has finished. For full duplex (2-way) communication, the incoming voice stream is added to outgoing voice signals from the microphone 5805 for delivery to the speaker 5807.

Figure 59:
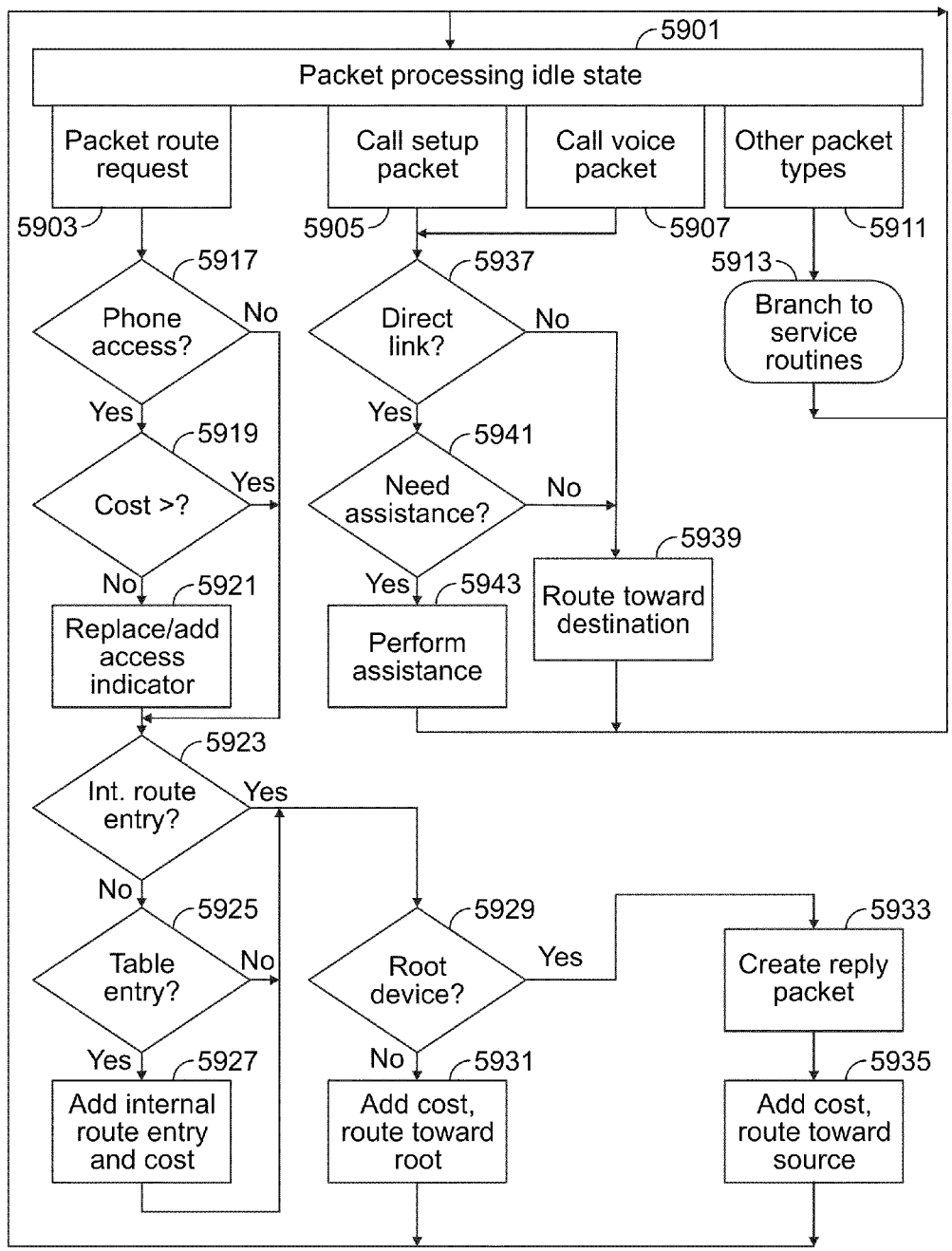

FIG. 59 is a block diagram illustrating the packet processing functionality of the access devices illustrated in FIG. 55a. At a block 5901, an access device waits in an idle state for receipt of any type of communication packet. Upon receipt of a communication packet, the access device examines an identifier field within the packet to determine the packet type. If the packet is determined to be a call route request packet as indicated at an event block 5903, the access device begins an attempt to identify potential phone call pathways. Alternatively, if the packet is a call setup packet as indicated at an event block 5905, the access device either attempts to set up the call (if directly connected to the destination and setup services are needed) or forwards the setup packet toward the destination. Otherwise, if the access device receives any other type of communication packet at an event block 5911, other routines are executed at a block 5913 to appropriately service the received packet.

More specifically, a call request packet contains an identifier field—for storing a packet type indicator, a destination field—for storing a destination phone number, a base cost field—for indicating the routing cost incurred by the calling device to reach a current access device, and an internal call routing field—for storing the lowest cost routing pathway (along with its cost), if any, which does not use an outgoing telephone line, and an external call routing field—for storing the lowest cost routing pathway (along with its cost), if any, utilizing an outgoing telephone line.

Upon receiving a call setup request packet as indicated by the event block 5903, the access device first attempts to find a lowest cost external routing pathway for the call. At a block 5917, the access device consults its routing table to identify the lowest cost direct or upstream access to an available outgoing telephone line. If no access is found, the access device branches to begin internal call route processing. However, if an outgoing telephone line is identified, the access device determines whether to replace an external routing pathway stored in the external call routing field at a block 5919.

In particular, the access device compares the cost of the currently stored external routing pathway with the cost of the access device's own lowest cost external pathway at the block 5919. If the access device has identified a lower cost external pathway, the access device replaces the current external call routing field entry (if any) with the lower cost pathway along with the associated cost at a block 5921, and branches to a block 5923 to begin internal call route processing. However, if no phone line access is available or its cost is not lower, the access device branches immediately branches to the block 5923 for internal call route processing.

The term "cost" being compared at the block 5919 consists of the sum of the routing cost involved in routing a packet from the source (the call initiator) to the current access point and the routing cost involved in routing a packet from the current access point to the access device which provides direct access to the available outgoing telephone line. Routing cost not only takes into account actual costs that may be incurred, but also takes into account the media, e.g., its bandwidth, reliability, time delays and traffic levels.

After considering the external routing pathway, the access device begins internal routing pathway processing at the block 5923. Specifically, at the block 5923, the access device determines whether the internal routing field contains an entry. If the field is empty, the access device attempts to identify a routing table entry for the telephone number of the destination device at a block 5925. If a routing table entry is found, at a block 5927 the access device inserts the table entry along with the overall cost from the source to destination into the internal routing field. Thereafter, the access device branches to a block 5929 to begin either root processing or further forwarding. The access device also branches to the block 5929 if an entry is found in the internal routing pathway field at the block 5923 or a routing table entry is not found at the block 5925.

At the block 5929, the access device considers whether it is a root device in the spanning tree. If it is not a root device, the access device increments the base cost field entry by the cost of reaching the next device in the pathway toward the root access device (as indicated by the cost entry in the routing table), routes the updated route request packet to the next device in the pathway toward the root, and returns to the idle state at the block 5901. Otherwise, if the access device is a root device, the access device converts the call route request packet to a call reply packet (by changing the packet type indicator) at a block 5933, and routes the reply packet back toward the source.

Upon receipt of the call reply packet, among other processing illustrated in reference to FIG. 60 below, the source device (the "calling device") is offered the internal and external call pathway options (if available) for establishing the call. The source device may offer the user the pathway options, or, if so programmed, automatically select the most appropriate pathway for placing the call. Having selected a pathway from the offered options, the source device generates a call setup packet and routes it toward the destination.

Upon receiving a call setup packet as indicated at an event block 5905, the access device responds at a block 5937 by first considering whether the access device has a direct link to: 1) the destination device—either a hardwired or wireless link; or 2) a telephone line which is to be used in the communication pathway to or toward to destination device. If neither direct link exists, the access device routes the call setup packet toward the destination per routing table specification at a block 5939, and, thereafter, returns to the idle state at the block 5901.

Otherwise, if either or both direct links, the access device determines whether further processing assistance is required at a block 5941. In particular, if the access device identifies that the destination device is directly connected thereto, the access device consults its routing table to determine if the destination device requires call setup assistance. When the destination device is available and not in use, setup assistance by the access devices involves: 1) the dialing of destination devices connected via a telephone line of a telephone switching network to the access device; 2) the delivery of a ring signal to conventional destination devices connected directly to the access device via hardwiring, for example; 3) sending a ringing message back toward the source device; 4) detecting a pickup at the destination device; and 5) sending a pickup message toward the source device so that the call can proceed. If the destination device is busy ("in use"), the access device sends a busy message toward the source device.

If setup assistance is not needed, the access device merely forwards the call setup packet to the destination device. Upon receipt, if not busy, the destination device sends a ringing message toward the destination, signals the user to answer the incoming call, and responds to a pickup by delivering a pickup message toward the source device. Otherwise, if busy, the destination device sends a busy message through the spanning tree network toward the source device.

Upon receipt of a pickup message, the source device begins to capture audio signals which are routed toward the destination. Similarly, upon pickup, the destination device begins capturing audio signals which are routed toward the source device.

In addition, if captured audio signals are to be routed through the wireless spanning tree network and/or through the associated hardwired networks within the communication network, the audio signals must first be converted to a packetized form (i.e., a "call voice packet" form) and then reconstructed for playback. For example, if an access device directly receives captured audio signals but must route the signals through the network, the access device converts the audio signals into voice packets, screens out all audio signals falling below a predetermined threshold level (to avoid the wasted bandwidth associated with the transmission of interleaving background noise), and forwards the call voice packets through the network. Similarly, if it has the capability of performing the packetization processing, a source or destination device connected directly to a wired or wireless network will generate call voice packets for delivery through the network.

Upon receiving a call voice packet at the block 5901 as represented by the block 5907, the access device first determines whether it has a direct link to the destination of the voice packet at a block 5937. If so, the access device considers whether call processing assistance is needed at a block 5941.

If needed, the access device performs the processing assistance at the block 5943. In particular, the processing assistance in this situation consists of converting the call voice packets back into an audio signal form (analog form) for delivery to the destination of the voice packets. In addition, as described in more detail below, the access device delays the audio signals for a predetermined queuing time before delivery to promote continuous delivery of the overall segment of captured voice.

If no direct link is available at the block 5937 or no call processing assistance is needed at the block 5941, the call voice packets are routed toward the destination at the block 5939. Thereafter, the access device reenters the idle processing state at the block 5901.

Figure 60:
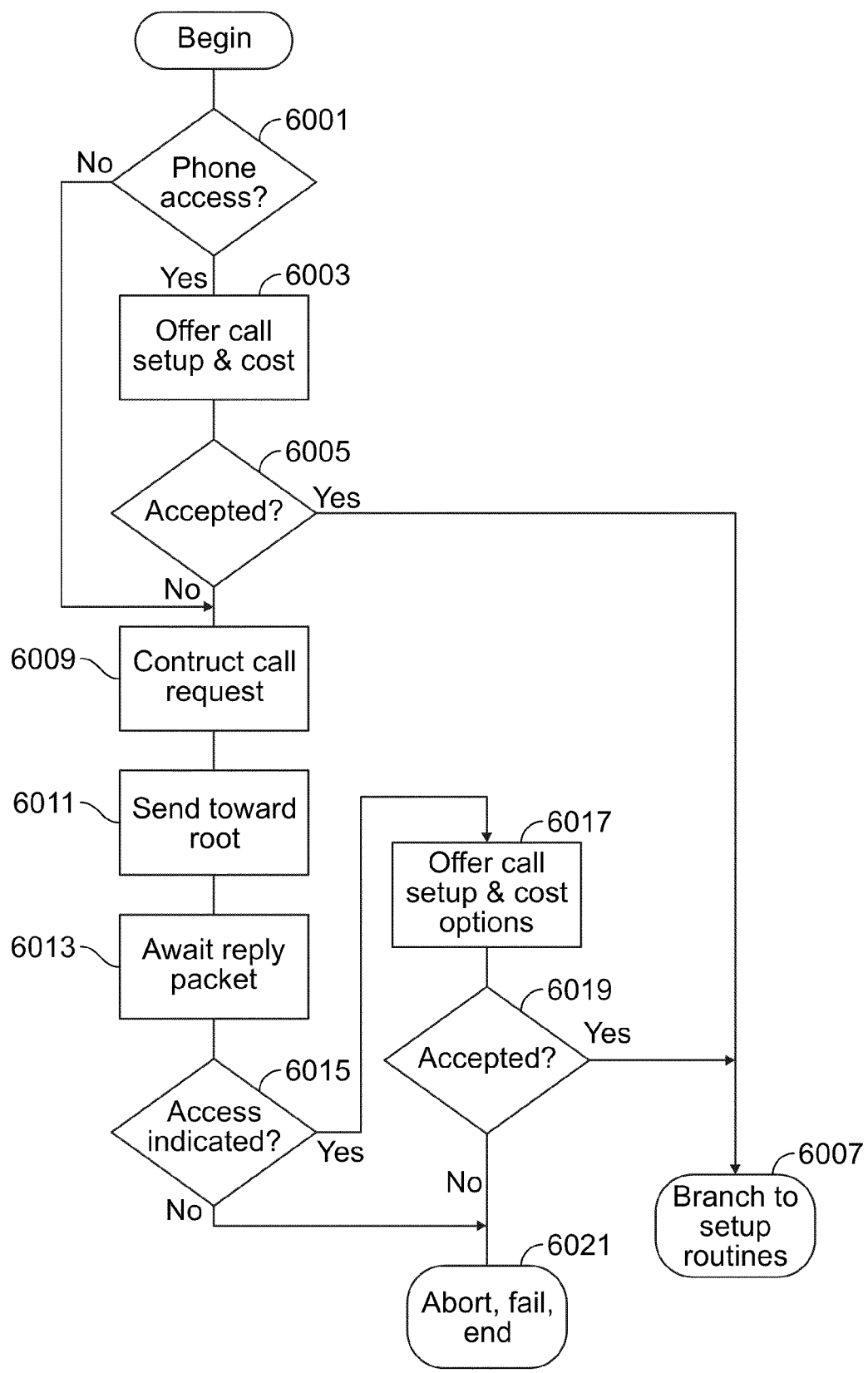
FIG. 60 is a flow diagram illustrating the functionality of a source device in the setup of a voice session.

FIG. 60 is a flow diagram illustrating the functionality of a source device in the setup of a voice session. The flow diagram also applies to an access device assisting a source device in the setup of a voice session whenever such assistance is needed.

Specifically, when a user attempts to initiate a voice session to a destination device, the source device (or assisting access device where applicable) responds by first determining whether it has direct telephone line access to an outside public telephone switching network. Such access may be via a telephone line, through a direct wireless telephone link to a telephone base unit having telephone line access, or through a cellular radio.

If direct telephone line access routing exists, the source device offers the route(s) along with associated cost(s) to the user (or user software) for selection at a block 6003. If such a route is selected, the source device branches to conventional call setup routines as indicated at a block 6007.

Alternately, if direct telephone line access is rejected or unavailable, the source device generates a call route request packet at a block 6009. Thereafter, the source device routes the request packet toward the root device of the spanning tree at the block 6011, and awaits a reply packet at a block 6013.

As described in relation to FIG. 59 above in more detail, as the call route request packet is routed toward a root device of the spanning tree, each intermediate access device along the route selectively supplements the route request packet with lowest cost routing information. Upon receipt of the packet, the root device also selectively supplements the call route request packet, converts the packet into a reply packet, and routes the reply packet back toward the source device.

Upon receiving the reply packet, at a block 6015 the source device examines the reply packet for voice session routing options. If no session options are available, the attempt is aborted at a block 6021. If routing options are indicated, they are offered along with their associated costs at a block 6017. If the user of the source device (or associated software) rejects the offered routes, the voice session is aborted as indicated at the block 6021. If an offered route is accepted, the source device branches to perform call setup at the block 6007.

Figure 61:
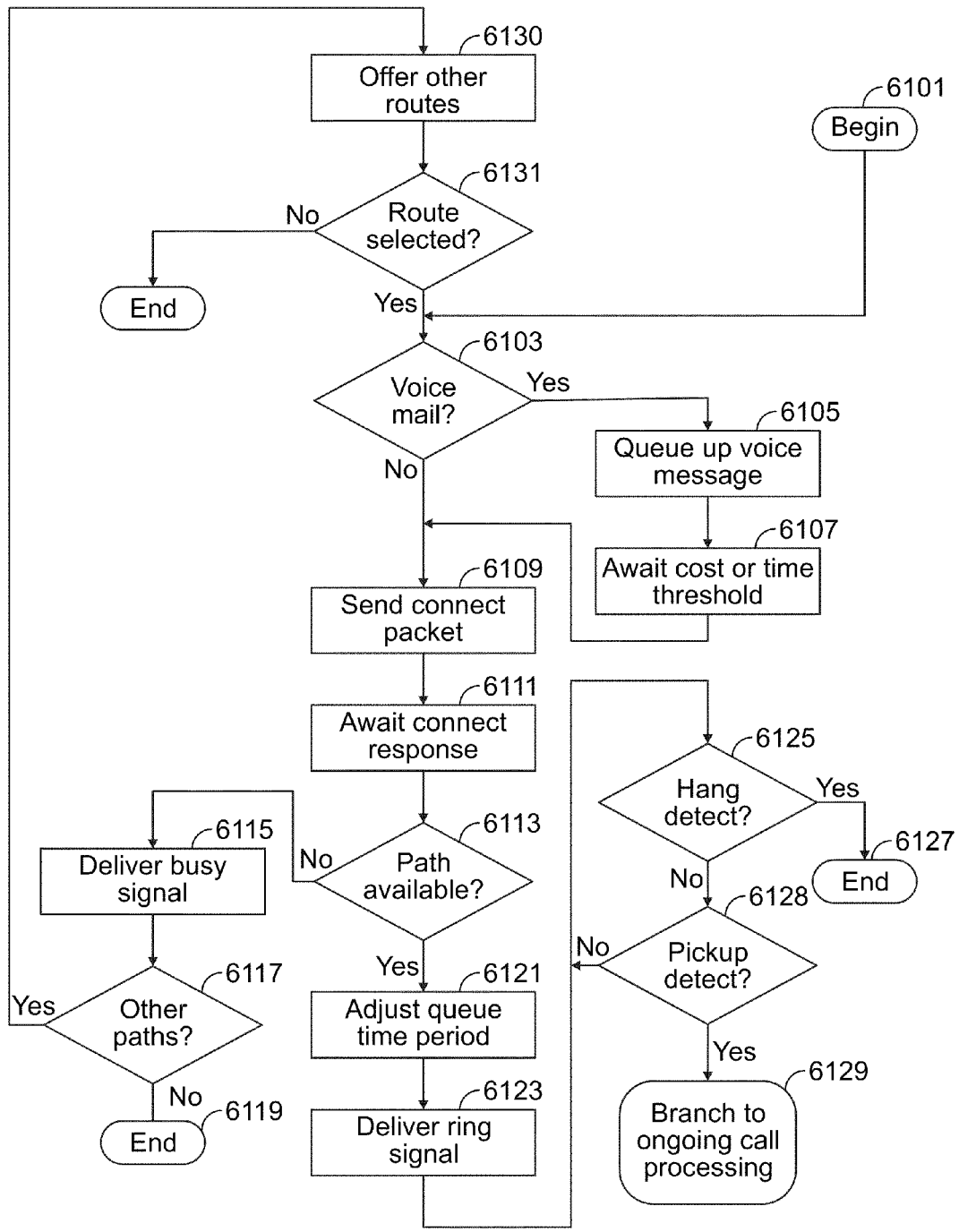
FIG. 61 is a flow diagram illustrating the functionality of the source device (or assisting access device) when performing call setup.

FIG. 61 is a flow diagram illustrating the functionality of the source device (or assisting access device) when performing call setup. The source device begins the setup functionality at a block 6101. If the source device intends to deliver voice mail, as determined at a block 6103, the source device prompts for the voice message and captures the message at a block 6105. Once the voice message is captured, the source device waits at a block 6107 for a predetermined time period before attempting to deliver the captured voice message. During the wait, the source device may have queued up other voice messages such that they may all be processed in a time and money saving batch mode. In addition, while waiting, other voice sessions might be conducted, and, during such time, delivery of the captured and queued voice mail takes place. Thus, in effect, the delivery of voice mail messages can be delayed to optimize communication resources. In an alternate embodiment, voice mail is treated no differently than any other voice session. In addition, if the voice message cannot be delivered because the destination device is busy or otherwise unavailable, delivery is periodically reattempted.

Thus, to deliver voice mail or establish a real-time voice session, at a block 6109, the source device generates and routes toward the destination device a call setup packet at a block 6109, with the pathway for the routing having been defined by one of the routing options previously offered and selected. At a block 6111, the source device waits for a response regarding the attempted setup. If a busy message is received, the source device concludes that the path is currently unavailable at a block 6113, and delivers a busy signal to the user of the source device at a block 6115. If the busy message results from a busy destination device, the source device concludes that no other pathway need be considered at a block 6117, and ends the session setup attempt at a block 6119. However, if the busy message indicates a busy pathway, the source device considers whether other pathways are available at the block 6117 through analysis of the previously received reply packet. If other pathways exist, the source device offers such other routes at the block 6130 to the user. If selected, the source device repeats the processing of the blocks 6103-6117 until either no other voice session paths are available, or the destination device or assisting access device responds with a ring message packet.

In particular, upon receiving a setup request packet, an available destination device (or assisting access device) responds by delivering a ring signal to the user, and by generating and routing a ring message packet toward the source device. Upon call pickup, the destination device (or assisting access device) generates and routes a connect packet toward the source device.

Thus, at the block 6113, when the ring message packet is received, the source device responds in one embodiment at a block 6121 by attempting to adjust the queuing time of the audio information received. This is accomplished by sending a series of round trip test packets which are sent from the source to the destination and back while ringing is taking place so as to identify the approximate delay time of the network. The overall queue time consists of a worst case relay time plus a tolerance factor generated through statistical analysis of the mean and median of the test packet round trip times. However, in an alternate embodiment, a predetermined default queue time is selected, and no test packets are delivered.

At a block 6123, the source device delivers a ringing signal to its user, indicating that the destination device is ringing. Thereafter, if the user of the source device happens to hang up, the voice session attempt ends at a block 6127. Otherwise, the source device continues to indicate ringing at the destination device until a connect packet is received. Upon receipt of the connect packet, the source device concludes that the destination device has answered the call at a block 6128 and branches to begin voice session processing at a block 6129, as further described below in reference to FIG. 62.

Figure 62:
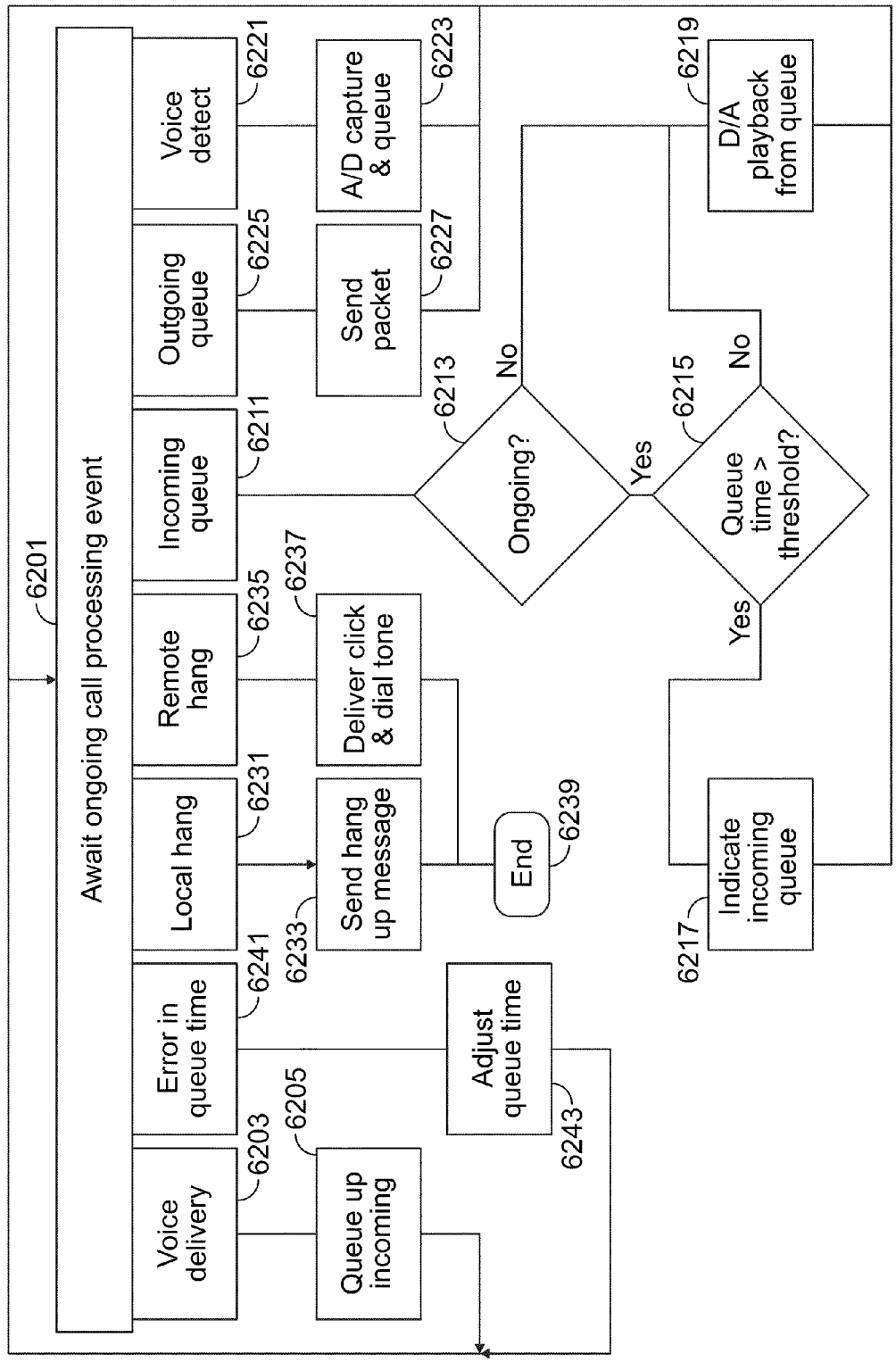
FIG. 62 is a flow diagram illustrating ongoing voice session processing performed by a source device (or its assisting access device if needed) and destination device (or its assisting access device if needed).

FIG. 62 is a flow diagram illustrating ongoing voice session processing performed by a source device (or its assisting access device if needed) and destination device (or its assisting access device if needed).

Once a connect message is generated, the destination device (or its assisting access device) enters the idle state 6201. Upon receiving the connect message, the source device also enters the idle state at a block 6201.

Any device waiting in an idle state at the block 6201 responds to several types of ongoing call processing events. If a voice packet is received as indicated by a block 6203, the device queues up the incoming digital voice data contained within the voice packet, and thereafter returns to the idle state.

If the incoming queue contains queued up information, as indicated by a block 6211, the device must consider whether full duplex operation is possible or not. To do so, at a block 6213, the device first determines whether a potential conflict with outgoing voice information might occur. If no outgoing transmission is in progress, the device evaluates whether the queuing time is greater than a predetermined threshold value at a block 6215. If it is greater, only half duplex communication is desired because the delay between the generation and playback of the incoming voice information in queue is so long that it might be detectable by the listener. In such circumstances, half duplex communication is preferred, therefore, at a block 6217, an indication is provided to the user that half duplex communication being utilized, and the device reenters the idle state, to again vector through the event block 6211 and blocks 6213 and 6215 until the outgoing transmission ends.

If no outgoing transmission is taking place or the queue time is less than the predetermined queuing threshold, the device begins playback of the queued, digital voice information through D/A conversion at a block 6219. If voice capture is detected, as indicated by a block 6221, an A/D conversion, packetization and queuing process takes place at a block 6223. Thereafter, the device reenters the idle state at the block 6201, only to vector on an "outgoing queue not empty" event indicated by a block 6225. At the block 6225, the device vectors to a block 6227 to send a queued, outgoing voice/audio packet to the other device involved in the voice session exchange. After sending the voice packet, the device reenters the idle state at the block 6201.

If a local hang is detected, as indicated at an event block 6231, the device sends a remote hangup packet to the other participating device at a block 6233, and ends the voice session at a block 6239. If a remote hangup packet is detected by the device while in the idle state, as indicated by an event block 6235, the device delivers a click and dial tone to the user at a block 6237, and also ends the voice session at the block 6239.

Finally, if an error in the queuing time is detected, as indicated by an event block 6241, the queuing time is adjusted at a block 6243 before reentering the idle state at the block 6201. In particular, if the selected "preset" queuing time for storing incoming signals proves to be too short, the queue time is adjusted up to avoid clicking sounds associated with gaps in incoming voice signals. However, the adjusted queuing time is only implemented with future groups of voice packets, i.e., not the current group.

Figure 63:
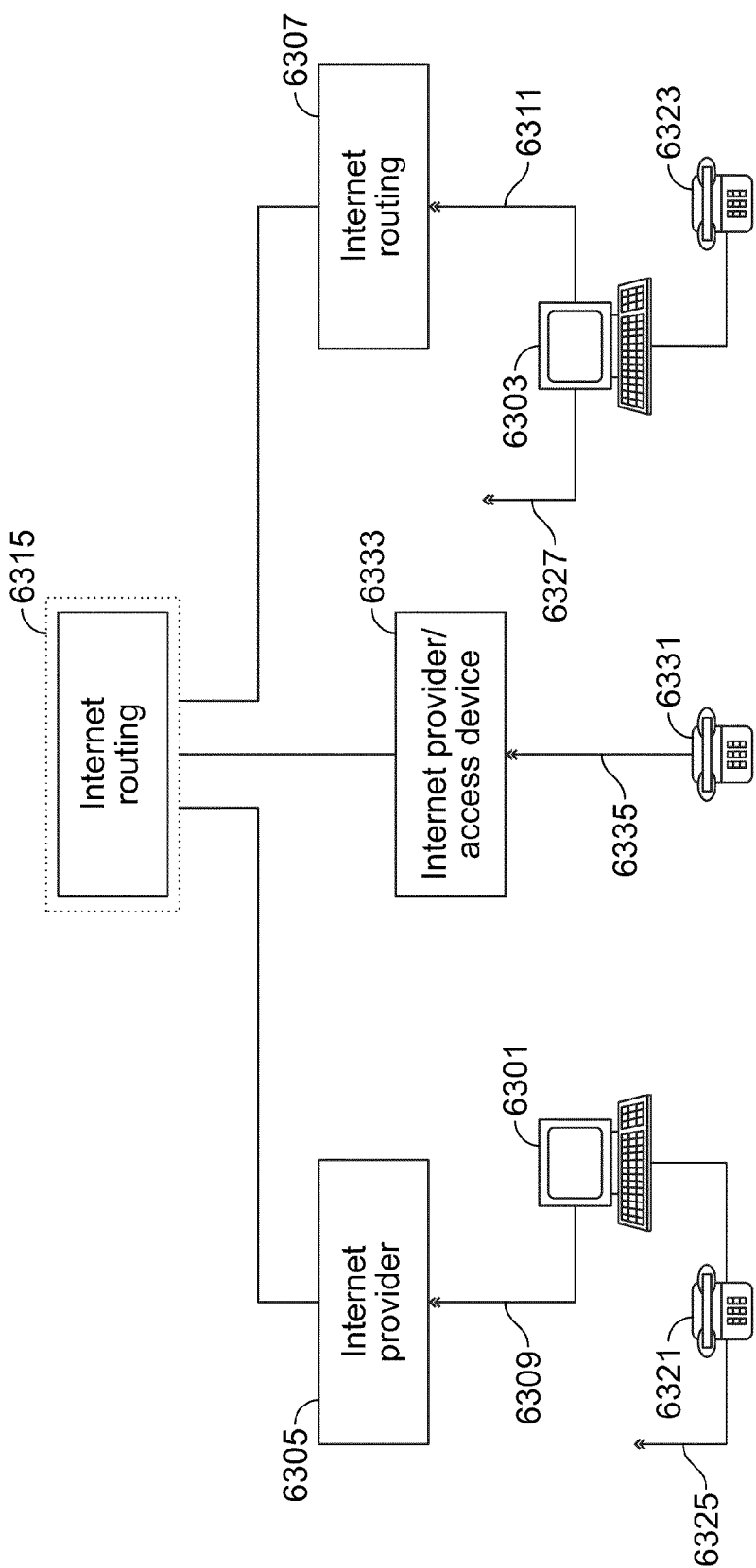
FIG. 63 is a diagram which illustrates further application of the present invention in an embodiment which transparently utilizes internet connectivity to support low-cost voice sessions.

FIG. 63 is a diagram which illustrates further application of the present invention in an embodiment which transparently utilizes internet connectivity to support low-cost voice sessions. In particular, as with convention internet services, personal computers 6301 and 6303 participate on internet via dial up service to internet providers 6305 and 6307, respectively. Such service providers typically require the computers 6301 and 6303 to communicate via modem through a telephone line, such as telephone lines 6309 and 6311 via a TCP/IP protocol.

The internet providers 6305 and 6307 participate along with other providers and participants in an overall network of internet servers and routers, as represented by a block 6315. The internet functions as a distributed information source which can be accessed by either of the computers 6301 or 6303. In addition, internet provides a pathway for exchanging data between the computers 6301 and 6303.

Beyond the typical internet functionality, the computers 6301 and 6303 are also configured with a computer card such as the card 5601 of FIG. 56a so that they can also handle voice sessioning. In addition, a two-line telephone 6321 is also provided with a first line attached to the computer card and a second line to a telephone line 6325. Via the telephone line 6325, which attaches to a conventional telephone switching network (not shown), the telephone 6321 provides typical dialing functionality outside of the internet network. On the first line, the telephone 6321 interfaces with the computer card in the computer 6301 to place phone calls through the internet.

Similarly, a single-line telephone 6323 is also attached to computer card such as the card 5601 of FIG. 56a. Through interfacing with the computer card within the computer 6303, the telephone 6323 can place calls either through a conventional telephone network via a telephone line 6327 or through the internet network via the telephone line 6311.

More specifically, to communicate from the telephone 6321 to the telephone 6323, the user first picks up the telephone 6321. If the user selects the first line, the telephone 6321 receives a dial tone and further conventional call processing via the telephone line 6325. For example, the user of the telephone 6321 could dial the telephone number of the telephone 6323 in a conventional manner. The computer 6303 would detect the incoming call ringing signals and directly interconnect the telephone 6323 with the telephone line 6327. Subsequent call processing would be left to that provided via the conventional phone service.

Alternatively, if the user of the telephone 6321 selects the first line, the computer 6301 delivers (via its computer card) an internet dial message. The message prompts for the normal telephone number of the destination device (i.e., the telephone 6323). In response, the computer 6301 attempts to identify (from the telephone number entered) an internet address which is used for routing information through the internet network. To perform this task, the computer 6301 uses an internet/telephone number, cross-reference database which contains various telephone numbers and associates therewith corresponding internet addresses.

If the computer 6301 fails to identify the corresponding internet address, a phone message prompts for entry of that internet address via the computer 6301 into the cross-reference database. Upon successful identification of the internet address, the computer 6301 communicates via the internet network (i.e., the provider 6305, routing network 6315 and the provider 6307) and to the computer 6303 a message indicating the desire to establish a voice session (hereafter a "connection request").

If the computer 6303 is not connected to the internet provider 6307 (i.e., "offline") at the time of the connection request, the computer 6301 will receive no response and timeout. The computer 6301 then sends a voice message to the telephone 6321 indicating that the telephone 6323 is offline. Otherwise, if the computer 6303 is online, the computer receives the connection request and checks to see if the telephone 6323 is currently available.

If the telephone 6323 is currently engaged in another call, the computer 6303 responds by delivering a busy message through the internet network to the computer 6301. Upon receipt of the busy message, the computer 6301 delivers a busy tone signal to the telephone 6321. Alternatively, if the telephone 6323 is not engaged, the computer 6303 responds to the connection request by delivering a ring signal to the telephone 6323. The computer 6303 also responds by delivering a ringing message through the internet network to the computer 6301. Upon receipt of the ringing message, the computer 6301 delivers a ring signal to the telephone 6321.

If the user hangs up the telephone 6321 before the call is connected, the computer 6301 detects the hang and sends a hang up message to the computer 6303. In response, the computer 6303 aborts the delivery of the ringing signals to the telephone 6323, ending the voice session setup attempt.

If the user of the telephone 6323 picks up the telephone, the computer 6303 responds by sending a message to the computer 6301 via the internet network indicating that a connection has been established. Thereafter, the computer 6303 begins compressing and packetizing voice signals captured by the telephone 6323 for delivery to the telephone 6321 via the internet network. Similarly, upon receiving the message indicating that a connection has been established, the computer 6301 also begins compressing and packetizing voice signals captured by the telephone 6321.

Both of the computers 6301 and 6303 begin exchanging the voice packets as they are generated via the internet network. The computers 6301 and 6303 queue up received voice packets before beginning playback to the telephones 6321 and 6323, respectively, to attempt to prevent gaps in the delivered voice signals due to the pseudo random delivery time associated with a given voice packet.

During the course of the ongoing voice session, if a hang up is detected by one of the computers 6301 or 6303, the detecting computer sends a hang message to the other computer. Upon receipt of the hang message, the other computer delivers a dial tone to its corresponding telephone.

Calls originating from the telephone 6323 to the telephone 6321 operate nearly the same except during initial call route selection. Upon a user's pickup of the telephone 6323 to place a call, the computer 6303 responds by delivering a dial tone to the telephone 6323. The computer 6303 then waits for the user entry of a telephone number (in this case the number of the telephone 6321). Upon receipt of the telephone number, the computer 6323 checks for an internet address in its cross reference database. If an internet address is found, the computer 6303 (via its computer card) delivers a voice message to the telephone 6323 prompting the user to select (via a keypad on the telephone 6323) either internet or telephone switching system routing. If the user selects telephone switching system routing, the computer 6303 accesses the telephone line 6331, awaits a dial tone, dials the entered number, and, thereafter, connects the telephone 6323 directly to the telephone line 6327. At that point, the telephone 6323 interacts with basic call model processing associated with the telephone switching network.

Otherwise, if the user selects internet routing, the computer 6303 begins the internet connect processing described above in relation to initiation of an internet call from the telephone 6321 to the telephone 6323.

Thus, voice sessions between the telephones 6301 and 6303 take place either over the conventional telephone switching network or through the internet. Operation through internet is virtually transparent with one exception. If the queuing time delay through the internet network proves to take too long (i.e., the delay is detectable by the users), the computers 6301 and 6303 can negotiate a half duplex mode of voice communication similar to that found in the speaker phone operation of conventional telephones.

In addition, the computers 6301 and 6303 both attempt to identify and filter captured audio during periods of time in which voice audio is not occurring, attempting to minimize overall bandwidth usage.

In addition, a computer need not be present to provide the end user with voice session transport via internet. For example, as illustrated, in one embodiment, a conventional telephone 6331 is attached to a conventional telephone switching network via a telephone line 6335. Thus, the telephone 6331 can establish and maintain voice sessions through conventional means with, for example, the telephone 6323 via the telephone line 6327.

Similarly, to place a call from the telephone 6323 to the telephone 6331, conventional telephone switching network interconnection may be established via the telephone lines 6327 and 6335. The telephone 6323 may also place a call to the telephone 6331 via the internet network. Specifically, upon detecting pickup, the computer 6303 delivers a dial tone to the telephone 6323. Upon detecting the dialed number of the telephone 6331, the computer 6303 consults its cross-reference database to attempt to identify an internet address. If an exact internet address cannot be found, the computer 6303 uses the country code/area code of the entered phone number to attempt to locate a call server somewhere near the telephone 6331 (so as to minimize telephone switching network charges). In particular, the computer 6303 uses the entered country code/area code to identify the internet address of an access device 6333 maintained by an internet provider which, for example, happens to be in the same local calling area as the telephone 6331 (although remotely located from the telephone 6331). The computer 6307 then sends a connect request containing the telephone number of the telephone 6331 to the internet address of the access device 6333. In response, the access device 6333 responds by gaining access to the conventional telephone switching network, dialing the number of the telephone 6331 and sending appropriate messages to the computer 6303 regarding the status of the call.

Particularly, if the telephone 6331 is engaged, the access device 6333 releases the telephone line and sends a busy message to the computer 6303. In response, the computer 6303 delivers a busy signal to the telephone 6323. Similarly, if the access device detects that the telephone 6331 is ringing, it awaits pickup and delivers a ringing message via internet to the computer 6303. The computer 6303 responds by delivering a ring signal to the telephone 6323.

If the telephone 6331 is answered, the access device 6333 indicates such an event by sending a connect established message to the computer 6303 via internet. Thereafter, the access device begins packetizing voice signals from the telephone 6331. The access device sends resulting voice packets through the internet network to the computer 6303. The computer 6303 also begins packetizing voice captured by the telephone 6323 and sending the resulting voice packets through the internet network to the access device 6333.

Both the access device 6333 and the computer 6303 attempt to filter periods of non-voice time periods. Similarly, both queue up incoming voice packets to take into consideration packet delivery delays within the internet network. Thus, as can be appreciated, the access device 6333 comprises rather conventional internet server functionality having at least one available outside telephone line through which call processing can be maintained.

The access device 6333 further comprises call processing circuitry such as is shown in FIG. 56a for adapting voice information for transport between internet network and the telephone switching network. Such circuit functionality is also described in more detail in reference to FIG. 56a above.

Moreover, the functionality mentioned in reference to the configuration of FIG. 63 is merely a further embodiment of the flow diagrams of the previous FIGS. 59-62.

Thus, the present invention has been described herein with reference to particular embodiments for particular applications. However, it will be apparent to one skilled in the art having read the foregoing that various modifications, variations and applications of this communication system according to the present invention are possible and is intended to include all those which are covered by the appended claims.

We claim:

1. One or more circuits for a communication device supporting the communication of voice and data, the device comprising:
   at least one processor operably coupled to wireless communication circuitry for communicating with at least one access device of a communication network using a packet protocol, to circuitry for converting an electrical signal representative of sound into digital voice data for transmission as digital voice packets via the wireless communication circuitry and to circuitry for converting digital voice data from digital voice packets received via the wireless communication circuitry into an electrical signal representing sound, the at least one processor operable to, at least:
   capture digital data into data packets for transmission via the wireless communication circuitry and receive data packets via the wireless communication circuitry, the contents of the received data packets used for reproducing digital data;
   evaluate a message wirelessly received from the at least one access device;
   send to the at least one access device an indication of a data rate based on the evaluation;
   receive digital voice packets wirelessly at a data rate selected by the at least one access device, based upon the indication of a data rate; and
   wherein digital voice packets wirelessly communicated by the communication device comprise destination information used for routing the digital voice packets through the communication network.

2. The device of claim 1 wherein the packet protocol comprises an Internet protocol (IP).

3. The device of claim 2 wherein the Internet protocol is the transmission control protocol (TCP)/Internet protocol (IP) protocol.

4. The device of claim 1 wherein the at least one access device comprises a network interface circuit that communicates using a packet protocol.

5. The device of claim 4 wherein the packet protocol is the transmission control protocol (TCP)/Internet protocol (IP) protocol.

6. The device of claim 1 wherein the at least one access device comprises a network interface circuit that communicates using a wired network.

7. The device of claim 6 wherein the wired network comprises a public switched telephone network.

8. The device of claim 7 wherein the network interface circuit is compatible with a conventional analog loop connection.

9. The device of claim 1 wherein the contents of each digital voice packet transmitted wirelessly by a communication device of a first party is received in a digital voice packet by a destination party.

10. The device of claim 1 wherein the communication network comprises a plurality of access devices, and wherein routing of digital voice packets between access devices is based upon a cost.

11. The device of claim 1, wherein a user is prompted to select a routing alternative using routing information received by the communication device.

12. The device of claim 1, wherein the wireless communication circuitry comprises at least one wireless receiver and at least one wireless transmitter.

13. The device of claim 12, wherein the at least one wireless receiver and the at least one wireless transmitter comprises a single transceiver.

14. The device of claim 1, wherein the wireless communication circuitry comprises at least one transceiver.

15. The device of claim 14, wherein the at least one transceiver comprises a single transceiver.

* * * * *